(12) United States Patent
Yeh et al.

(10) Patent No.: US 7,990,994 B1
(45) Date of Patent: Aug. 2, 2011

(54) STORAGE GATEWAY PROVISIONING AND CONFIGURING

(75) Inventors: Jia-Jen Yeh, Cupertino, CA (US); Akram A. Abou-Emara, Mountain View, CA (US); Harinder Singh Bhasin, Danville, CA (US); Sriram Chidambaram, Santa Clara, CA (US); Shreyas P. Gandhi, Sunnyvale, CA (US); Nakul Pratap Saraiya, Palo Alto, CA (US); Christopher Dean Youngworth, San Jose, CA (US)

(73) Assignee: Habanero Holdings, Inc., Saratoga, CA (US)

( * ) Notice: Subject to any disclaimer, the term of this patent is extended or adjusted under 35 U.S.C. 154(b) by 1267 days.

(21) Appl. No.: 11/256,646

(22) Filed: Oct. 22, 2005

Related U.S. Application Data

(63) Continuation-in-part of application No. 11/057,120, filed on Feb. 12, 2005, now abandoned, which is a continuation-in-part of application No. 10/889,468, filed on Jul. 12, 2004, now Pat. No. 7,757,033, and a
(Continued)

(51) Int. Cl.
 *H04L 12/28* (2006.01)
(52) U.S. Cl. ......... 370/431; 710/104; 711/141; 711/147
(58) Field of Classification Search ............... None
 See application file for complete search history.

(56) References Cited

U.S. PATENT DOCUMENTS
5,440,547 A   8/1995 Easki et al.
(Continued)

FOREIGN PATENT DOCUMENTS

| WO | WO 0239262 A2 | 5/2002 |
|---|---|---|
| WO | WO 0239262 A3 | 5/2002 |
| WO | WO 02069604 A2 | 9/2002 |
| WO | WO 02069604 A3 | 9/2002 |
| WO | WO 02086712 A1 | 10/2002 |
| WO | WO 2005003893 A2 | 1/2005 |

OTHER PUBLICATIONS

Brian Hausauer, iWARP: Reducing Ethernet Overhead in Data Center Designs, http://www.commsdesign.com/showArticle.jhtml?articleID=51202855, Nov. 9, 2004.

(Continued)

*Primary Examiner* — Daniel J Ryman
*Assistant Examiner* — Brian Roberts
(74) *Attorney, Agent, or Firm* — PatentVentures: Bennett Smith; Korbin Van Dyke

(57) ABSTRACT

Storage gateway provisioning, configuration, and management functions provide mechanisms to specify and manage parameters and operations associated with storage gateways. The parameters may include any combination of VLAN topology, zoning behavior, LUN masking, bandwidth, and priority. The parameters may also include path information describing initiator to target associations, enabling load-balancing aggregations and multipathing redundancy. Parameters may be specified at relatively low-levels, describing specific HW elements, or may be specified at relatively high-levels, describing desired bandwidth and redundancy requirements, with SW determining low-level HW assignments. Configuration and management functions enable dynamic modification of storage gateway parameters (such as bandwidth between selected initiator and target pairs). Management functions also enable dynamic switchover from a primary path to a secondary path with respect to a storage device.

20 Claims, 57 Drawing Sheets

Related U.S. Application Data continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,048, filed on Feb. 12, 2005, now Pat. No. 7,685,281, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,117, filed on Feb. 12, 2005, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,035, filed on Feb. 12, 2005, now Pat. No. 7,873,693, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,034, filed on Feb. 12, 2005, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,114, filed on Feb. 12, 2005, which is a continuation-in-part of application No. 10/889,468, filed on Jul. 12, 2004, and a continuation-in-part of application No. 10/889,467, filed on Jul. 12, 2004, and a continuation-in-part of application No. 10/889,469, filed on Jul. 12, 2004, application No. 11/256,646, which is a continuation-in-part of application No. 11/057,046, filed on Feb. 12, 2005, now abandoned, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,112, filed on Feb. 12, 2005, now Pat. No. 7,664,110, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,119, filed on Feb. 12, 2005, now Pat. No. 7,561,571, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,036, filed on Feb. 12, 2005, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,037, filed on Feb. 12, 2005, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,121, filed on Feb. 12, 2005, now abandoned, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,038, filed on Feb. 12, 2005, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,113, filed on Feb. 12, 2005, now Pat. No. 7,860,961, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 11/057,116, filed on Feb. 12, 2005, now Pat. No. 7,860,097, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned, application No. 11/256,646, which is a continuation-in-part of application No. 10/889,468, filed on Jul. 12, 2004, now Pat. No. 7,757,033, and a continuation-in-part of application No. 10/889,467, filed on Jul. 12, 2004, and a continuation-in-part of application No. 10/889,469, filed on Jul. 12, 2004, now abandoned.

(60) Provisional application No. 60/717,147, filed on Sep. 14, 2005, provisional application No. 60/684,542, filed on May 25, 2005, provisional application No. 60/544,916, filed on Feb. 13, 2004, provisional application No. 60/563,222, filed on Apr. 17, 2004, provisional application No. 60/603,250, filed on Aug.

20, 2004, provisional application No. 60/650,707, filed on Feb. 7, 2005, provisional application No. 60/651,026, filed on Feb. 7, 2005, provisional application No. 60/651,027, filed on Feb. 7, 2005.

(56) References Cited

U.S. PATENT DOCUMENTS

| | | | |
|---|---|---|---|
| 5,574,914 A | 11/1996 | Lin | |
| 5,751,967 A | 5/1998 | Raab et al. | |
| 5,892,928 A | 4/1999 | Wallach et al. | |
| 5,935,228 A | 8/1999 | Shinomura | |
| 6,038,651 A | 3/2000 | VanHuben et al. | |
| 6,061,750 A | 5/2000 | Beardsley et al. | |
| 6,088,356 A | 7/2000 | Hendel et al. | |
| 6,247,109 B1 | 6/2001 | Kleinsorge et al. | |
| 6,295,575 B1* | 9/2001 | Blumenau et al. | 711/5 |
| 6,301,257 B1 | 10/2001 | Johnson et al. | |
| 6,466,964 B1 | 10/2002 | Leung et al. | |
| 6,487,605 B1 | 11/2002 | Leung | |
| 6,519,660 B1 | 2/2003 | Rooney | |
| 6,725,343 B2 | 2/2003 | Barroso et al. | |
| 6,564,261 B1 | 5/2003 | Gudjonzzon et al. | |
| 6,580,721 B1 | 6/2003 | Beshai | |
| 6,594,275 B1 | 7/2003 | Schneider | |
| 6,600,723 B1 | 7/2003 | Reeb et al. | |
| 6,631,141 B1 | 10/2003 | Kumar et al. | |
| 6,633,916 B2 | 10/2003 | Kauffman | |
| 6,654,343 B1 | 11/2003 | Brandis et al. | |
| 6,681,262 B1 | 1/2004 | Rimmer | |
| 6,681,282 B1 | 1/2004 | Golden et al. | |
| 6,684,343 B1 | 1/2004 | Bouchier et al. | |
| 6,738,839 B2* | 5/2004 | Sinha | 710/39 |
| 6,744,654 B2 | 6/2004 | Loughmiller | |
| 6,760,859 B1 | 7/2004 | Kim et al. | |
| 6,799,220 B1 | 9/2004 | Merritt et al. | |
| 6,802,063 B1* | 10/2004 | Lee | 718/1 |
| 6,813,274 B1 | 11/2004 | Suzuki et al. | |
| 6,820,174 B2 | 11/2004 | Vanderwiel | |
| 6,851,059 B1 | 2/2005 | Pfister et al. | |
| 6,862,286 B1 | 3/2005 | Tams et al. | |
| 6,877,011 B2* | 4/2005 | Jaskiewicz | 707/102 |
| 6,904,477 B2* | 6/2005 | Padmanabhan et al. | 710/74 |
| 6,910,092 B2 | 6/2005 | Calvignac et al. | |
| 6,941,487 B1 | 9/2005 | Balakrishnan et al. | |
| 6,954,463 B1 | 10/2005 | Ma et al. | |
| 6,980,552 B1 | 12/2005 | Belz et al. | |
| 7,003,586 A1 | 2/2006 | Bailey et al. | |
| 7,007,125 B2 | 2/2006 | Barker et al. | |
| 7,010,607 B1 | 3/2006 | Bunton | |
| 7,020,796 B1 | 3/2006 | Ennis et al. | |
| 7,023,808 B2 | 4/2006 | Ball et al. | |
| 7,024,483 B2 | 4/2006 | Dinker et al. | |
| 7,054,965 B2 | 5/2006 | Bell et al. | |
| 7,093,024 B2* | 8/2006 | Craddock et al. | 709/238 |
| 7,093,158 B2 | 8/2006 | Barron et al. | |
| 7,113,988 B2 | 9/2006 | Chirashnya et al. | |
| 7,145,914 B2 | 12/2006 | Olarig et al. | |
| 7,171,495 B2* | 1/2007 | Matters et al. | 709/250 |
| 7,197,051 B1 | 3/2007 | Ginjpalli et al. | |
| 7,200,704 B2* | 4/2007 | Njoku et al. | 710/316 |
| 7,206,860 B2* | 4/2007 | Murakami et al. | 709/238 |
| 7,240,098 B1* | 7/2007 | Mansee | 709/212 |
| 7,266,733 B2 | 9/2007 | Bazinet et al. | |
| 7,313,614 B2 | 12/2007 | Considine et al. | |
| 7,324,512 B2 | 1/2008 | Larson et al. | |
| 7,336,605 B2 | 2/2008 | Bruckman et al. | |
| 7,340,167 B2 | 3/2008 | McGlaughlin | |
| 7,346,075 B1 | 3/2008 | Alexander, Jr. et al. | |
| 7,398,380 B1 | 7/2008 | Lovett et al. | |
| 7,421,710 B2* | 9/2008 | Qi et al. | 719/321 |
| 7,428,598 B2 | 9/2008 | Arndt et al. | |
| 7,586,915 B1 | 9/2009 | Indiresan et al. | |
| 2001/0002478 A1* | 5/2001 | Grun | 711/114 |
| 2002/0023080 A1 | 2/2002 | Uga et al. | |
| 2002/0032850 A1 | 3/2002 | Kauffman | |
| 2002/0105949 A1 | 8/2002 | Shinomiya | |
| 2002/0107962 A1 | 8/2002 | Richter et al. | |
| 2002/0107971 A1 | 8/2002 | Bailey et al. | |
| 2002/0120741 A1 | 8/2002 | Webb et al. | |
| 2002/0150106 A1 | 10/2002 | Kagan et al. | |
| 2002/0156612 A1 | 10/2002 | Schulter et al. | |
| 2002/0156613 A1 | 10/2002 | Geng et al. | |
| 2003/0023701 A1 | 1/2003 | Norman et al. | |
| 2003/0037224 A1 | 2/2003 | Oehler et al. | |
| 2003/0046396 A1 | 3/2003 | Richter et al. | |
| 2003/0061379 A1* | 3/2003 | Craddock et al. | 709/238 |
| 2003/0069939 A1 | 4/2003 | Russell | |
| 2003/0108058 A1 | 6/2003 | Black et al. | |
| 2003/0120852 A1 | 6/2003 | McConnell et al. | |
| 2003/0130832 A1 | 7/2003 | Schulter et al. | |
| 2003/0130833 A1 | 7/2003 | Brownell et al. | |
| 2003/0131067 A1 | 7/2003 | Downer et al. | |
| 2003/0169753 A1 | 9/2003 | Black et al. | |
| 2003/0202511 A1 | 10/2003 | Sreejith et al. | |
| 2003/0208531 A1 | 11/2003 | Matters et al. | |
| 2003/0208551 A1 | 11/2003 | Matters et al. | |
| 2003/0208631 A1 | 11/2003 | Matters et al. | |
| 2003/0208632 A1 | 11/2003 | Rimmer | |
| 2003/0212884 A1 | 11/2003 | Lee et al. | |
| 2003/0235195 A1 | 12/2003 | Shenoy et al. | |
| 2003/0236837 A1 | 12/2003 | Johnson et al. | |
| 2003/0237018 A1 | 12/2003 | Baba | |
| 2004/0003063 A1 | 1/2004 | Ashok et al. | |
| 2004/0003141 A1 | 1/2004 | Matters et al. | |
| 2004/0017816 A1 | 1/2004 | Ishwar et al. | |
| 2004/0030770 A1 | 2/2004 | Pandya | |
| 2004/0076116 A1 | 4/2004 | Hefty et al. | |
| 2004/0098373 A1 | 5/2004 | Bayliss et al. | |
| 2004/0098518 A1* | 5/2004 | Beckett et al. | 710/14 |
| 2004/0103218 A1 | 5/2004 | Blumrich et al. | |
| 2004/0109451 A1 | 6/2004 | Huang et al. | |
| 2004/0162888 A1 | 8/2004 | Reasor et al. | |
| 2004/0193764 A1 | 9/2004 | Watanabe | |
| 2004/0236874 A1 | 11/2004 | Largman et al. | |
| 2004/0249948 A1 | 12/2004 | Sethi et al. | |
| 2005/0005072 A1 | 1/2005 | Pruvost | |
| 2005/0015655 A1* | 1/2005 | Clayton et al. | 714/6 |
| 2005/0015657 A1 | 1/2005 | Sugiura et al. | |
| 2005/0018669 A1 | 1/2005 | Arndt et al. | |
| 2005/0025119 A1 | 2/2005 | Pettey et al. | |
| 2005/0038883 A1 | 2/2005 | Elko et al. | |
| 2005/0053060 A1 | 3/2005 | Pettey | |
| 2005/0053080 A1 | 3/2005 | Wybenga et al. | |
| 2005/0060445 A1 | 3/2005 | Beukema et al. | |
| 2005/0078685 A1 | 4/2005 | MacLean et al. | |
| 2005/0080881 A1* | 4/2005 | Voorhees et al. | 709/220 |
| 2005/0080982 A1* | 4/2005 | Vasilevsky et al. | 711/1 |
| 2005/0091441 A1* | 4/2005 | Qi et al. | 711/5 |
| 2005/0111445 A1 | 5/2005 | Wybenga et al. | |
| 2005/0114657 A1 | 5/2005 | Kumar et al. | |
| 2005/0129045 A1 | 6/2005 | Machulsky et al. | |
| 2005/0132089 A1 | 6/2005 | Bodell et al. | |
| 2005/0143079 A1* | 6/2005 | Seto | 455/450 |
| 2005/0144313 A1 | 6/2005 | Arndt et al. | |
| 2005/0165968 A1 | 7/2005 | Natarajan et al. | |
| 2006/0236011 A1 | 10/2006 | Narad et al. | |
| 2006/0291462 A1 | 12/2006 | Alex et al. | |
| 2007/0067435 A1 | 3/2007 | Landis et al. | |
| 2007/0101334 A1* | 5/2007 | Atyam et al. | 718/102 |
| 2008/0008471 A1 | 1/2008 | Dress | |
| 2009/0049177 A1 | 2/2009 | Iszlai et al. | |

OTHER PUBLICATIONS

H. T. Kung, CS143: Computer Networks (Switching and Fast Route Lookup), Harvard University, Oct. 14, 2004, 17 pgs.

K. Christensen et al., Performance of Packet-to-Cell Segmentation Schemes in Input Buffered Packet Switches; Proceedings of the IEEE International Conference on Communications, Jun. 2004.

Simon Stanley, Switch-Fabric Chipsets, www.lightreading.com, Mar. 3, 2004, 19 pgs.

IBM; Packet Routing Switch and Common Switch Interface; PowerPRS 16G/C192, Summary Datasheet; Jun. 17, 2003.

Simon Stanley, Packet Switch Chips, www.lightreading.com, Feb. 2, 2003, 20 pgs.

Jon Maloy, Telecom Inter Process Communication, Ericsson, Jan. 31, 2003, PA6, 58 pgs.

Michael Miller and Sean Cochrane, Optimum Search Methods for Switch/Router Databases in Access and Metro Edge Networks, IDT White Paper, Jan. 27, 2003, 24 pgs.

R. Recio et al., An RDMA Protocol Specification (Version 1.0), RDMA Consortium at http://www.rdmaconsortium.org, Oct. 21, 2002, 60pgs.

Simon Stanley, Traffic Manager Chips, www.lightreading.com, Oct. 17, 2002, 22 pgs.

IBM; IBM PowerPRS™ 64Gu Packet Routing Switch Datasheet; Sep. 9, 2002; 167 pgs.

Simon Stanley, Network Processors, www.lightreading.com, Aug. 8, 2002, 27 pgs.

Jim Pinkerton, The Case for RDMA, RDMA Consortium, May 29, 2002, 27 pgs.

FABRIC7 Systems, Abridged Presentation for AOL, May 2, 2002, 15 pgs.

Cisco Systems, Inc., Catalyst Switch Architecture and Operation, Session RST-222, May 2002, 105 pgs.

M. Ajmone Marsan et al., Input-queued router architectures exploiting cell-based switching fabrics; Computer Networks 37, Nov. 2001, pp. 541-559.

Keith Burns, Core Router Architecture Rev 1.0, Cisco Systems, Inc., 2001.

Nick McKeown, How might optics be used in IP routers and the Internet?, Optics and Routing Seminar, Oct. 24, 2000.

Nick McKeown, A quick tutorial on IP Router design, Optics and Routing Seminar, Oct. 10, 2000.

CSIX, CSIX-L1: Common Switch Interface Specification-L1, Aug. 5, 2000. 68 pgs.

Nick McKeown and Balaji Prabhakar, High Performance Switches and Routers: Theory and Practice, Sigcomm 99, Harvard University, Aug. 30, 1999.

Nick McKeown, A Fast Switched Backplane for a Gigabit Switched Router, Business Communications Review, Dec. 1997.

Excel Spreadsheet of Oct. 19, 2008 identifying references used to reject claims in related applications; 3 pages.

Excel Spreadsheet of Feb. 24, 2009 identifying references used to reject claims in related applications; 4 pages.

Table of Jul. 16, 2009 identifying references used to reject claims in related applications; 5 pages.

List of Art Rejections in a Feb. 17, 2010 Office Action in Related Case U.S. Appl. No. 11/057,035, 1 page.

List of Art Rejections in a Feb. 19, 2010 Office Action in Related Case U.S. Appl. No. 11/057,037, 1 page.

List of Art Rejections in a Feb. 2, 2010 Office Action in Related Case U.S. Appl. No. 11/057,034, 1 page.

List of Art Rejections in a Jan. 8, 2010 Office Action in Related Case U.S. Appl. No. 11/057,120, 1 page.

List of Art Rejections in a Mar. 2, 2010 Office Action in Related Case U.S. Appl. No. 11/057,038, 1 page.

List of Art Rejections in a Mar. 2, 2010 Office Action in Related Case U.S. Appl. No. 11/256,668, 1 page.

List of Art Rejections in a Jan. 21, 2010 Office Action in Related Case U.S. Appl. No. 11/057,121, 1 page.

* cited by examiner

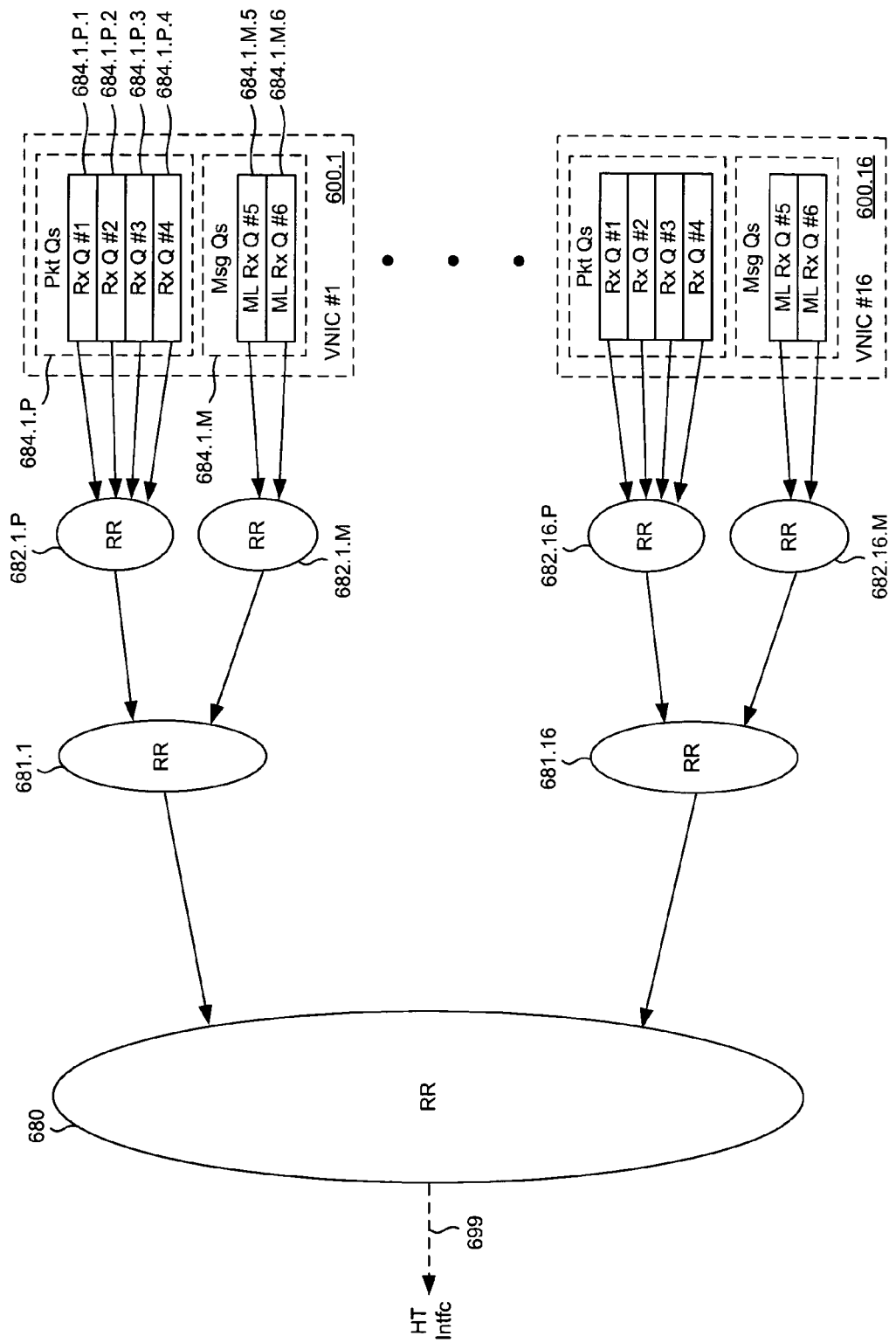

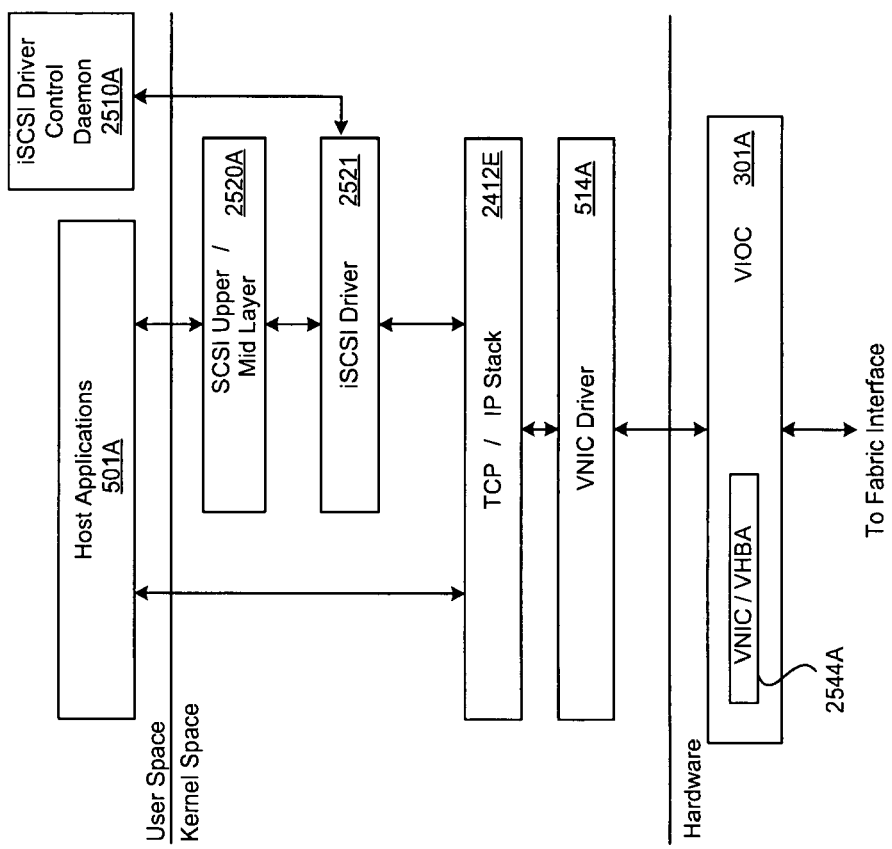

STORAGE GATEWAY PROVISIONING AND CONFIGURING

CROSS REFERENCE TO RELATED APPLICATIONS

Priority benefit claims for this application are made in the accompanying Application Data Sheet. This application incorporates by reference for all purposes the following applications, which are all owned by the owner of the instant application:

U.S. Provisional Application Ser. No. 60/717,147, filed Sep. 14, 2005, by Nakul Saraiya, et al., and entitled SCSI TRANSPORT FOR FABRIC-BACKPLANE ENTERPRISE SERVERS;

U.S. Provisional Application Ser. No. 60/684,542, filed May 25, 2005, by Nakul Saraiya, et al., and entitled STORAGE GATEWAY FOR FABRIC-BACKPLANE ENTERPRISE SERVERS;

U.S. Non-Provisional application Ser. No. 11/057,120, filed Feb. 12, 2005, by Nakul Saraiya, et al., and entitled TEMPLATE SYSTEM FOR PROVISIONING AND MANAGEMENT OF FABRIC-BACKPLANE ENTERPRISE SERVERS;

U.S. Non-Provisional application Ser. No. 11/057,048, filed Feb. 12, 2005, by Nakul Saraiya, et al., and entitled PROGRAMMATIC INSTANTIATION, PROVISIONING, AND MANAGEMENT OF FABRIC-BACKPLANE ENTERPRISE SERVERS;

U.S. Non-Provisional application Ser. No. 11/057,117, filed Feb. 12, 2005, by Sharad Mehrotra, et al., and entitled CONTROL AGENT MANAGEMENT OF MULTI-CHASSIS FABRIC-BACKPLANE ENTERPRISE SERVERS;

U.S. Non-Provisional application Ser. No. 11/057,035, filed Feb. 12, 2005, by Sharad Mehrotra, et al., and entitled MULTI-CHASSIS FABRIC-BACKPLANE ENTERPRISE SERVERS;

U.S. Non-Provisional application Ser. No. 11/057,034, filed Feb. 12, 2005, by Nakul Saraiya, and entitled UPPER/LOWER NETWORK ADDRESS TAKEOVER VIA FABRIC-BACKPLANE FORWARDING TABLE UPDATES;

U.S. Non-Provisional application Ser. No. 11/057,114, filed Feb. 12, 2005, by Nakul Saraiya, and entitled RAPID LP/MAC ADDRESS TAKEOVER VIA FORWARDING TABLE UPDATES;

U.S. Non-Provisional application Ser. No. 11/057,046, filed Feb. 12, 2005, by Mangesh Shingane, et al., and entitled LINK AGGREGATION GROUPS IN FABRIC-BACKPLANE ENTERPRISE SERVERS;

U.S. Non-Provisional application Ser. No. 11/057,112, filed Feb. 12, 2005, by Thomas Dean Lovett, et al., and entitled INPUT/OUTPUT CONTROLLER FOR COUPLING THE PROCESSOR-MEMORY COMPLEX TO THE FABRIC IN FABRIC-BACKPLANE ENTERPRISE SERVERS;

U.S. Non-Provisional application Ser. No. 11/057,119, filed Feb. 12, 2005, by Thomas Dean Lovett, et al., and entitled FABRIC ADDRESS AND SUB-ADDRESS RESOLUTION IN FABRIC-BACKPLANE ENTERPRISE SERVERS;

U.S. Non-Provisional application Ser. No. 11/057,036, filed Feb. 12, 2005, by Thomas Dean Lovett, et al., and entitled PROCESSOR-MEMORY MODULE PERFORMANCE ACCELERATION IN FABRIC-BACKPLANE ENTERPRISE SERVERS;

U.S. Non-Provisional application Ser. No. 11/057,037, filed Feb. 12, 2005, by Thomas Dean Lovett, et al., and entitled FRAME FORWARDING LOOKUPS IN FABRIC-BACKPLANE ENTERPRISE SERVERS;

U.S. Non-Provisional application Ser. No. 11/057,121, filed Feb. 12, 2005, by Yuri Finkelstein, et al., and entitled REAL TIME DETECTION OF CHANGED RESOURCES FOR PROVISIONING AND MANAGEMENT OF FABRIC-BACKPLANE ENTERPRISE SERVERS;

U.S. Non-Provisional application Ser. No. 11/057,038, filed Feb. 12, 2005, by Yuri Finkelstein, et al., and entitled UNUSED RESOURCES RECOGNITION IN REAL TIME FOR PROVISIONING AND MANAGEMENT OF FABRIC-BACKPLANE ENTERPRISE SERVERS;

U.S. Non-Provisional application Ser. No. 11/057,113, filed Feb. 12, 2005, by Yuri Finkelstein, et al., and entitled REAL TIME NOTICE OF NEW RESOURCES FOR PROVISIONING AND MANAGEMENT OF FABRIC-BACKPLANE ENTERPRISE SERVERS;

U.S. Non-Provisional application Ser. No. 11/057,116, filed Feb. 12, 2005, by Thomas Dean Lovett, et al., and entitled FABRIC-BACKPLANE ENTERPRISE SERVERS WITH VNICS AND VLANS;

U.S. Provisional Application Ser. No. 60/651,026, filed Feb. 7, 2005, by Yuri Finkelstein, et al., and entitled DURABLE QUERY REGISTRATION WITH REAL TIME RESPONSE;

U.S. Provisional Application Ser. No. 60/651,027, filed Feb. 7, 2005, by Yuri Finkelstein, et al., and entitled DYNAMIC USER INTERFACE SPECIFICATION FOR A PREDETERMINED INTERFACE ENGINE;

U.S. Provisional Application Ser. No. 60/650,707, filed Feb. 7, 2005, by Yuri Finkelstein, et al., and entitled CLASS INSTANCE RELATIONSHIP QUERY WITH OPTIONAL CONSTRAINTS;

U.S. Non-Provisional application Ser. No. 10/889,469, filed Jul. 12, 2004, by Thomas Dean Lovett, et al., and entitled COMPUTE RESOURCES FOR FABRIC-BACKPLANE ENTERPRISE SERVERS;

U.S. Non-Provisional application Ser. No. 10/889,467, filed Jul. 12, 2004, by Sharad Mehrotra, et al., and entitled CLIENT-SERVER AND APPLICATION MODELS IN FABRIC-BACKPLANE ENTERPRISE SERVERS; and U.S. Non-Provisional application Ser. No. 10/889,468, filed Jul. 12, 2004, by Sharad Mehrotra, et al., and entitled FABRIC-BACKPLANE ENTERPRISE SERVERS.

This application is related to the following applications filed simultaneously herewith:

U.S. Non-Provisional application Ser. No. 11/256,668 entitled STORAGE GATEWAY FOR FABRIC-BACKPLANE ENTERPRISE SERVERS;

U.S. Non-Provisional application Ser. No. 11/256,645 entitled STORAGE GATEWAY INITIATOR FOR FABRIC-BACKPLANE ENTERPRISE SERVERS; and U.S. Non-Provisional application Ser. No. 11/256,688 entitled STORAGE GATEWAY TARGET FOR FABRIC-BACKPLANE ENTERPRISE SERVERS;

and wherein all of the foregoing simultaneously filed applications are herein incorporated by reference for all purposes, and are all owned by the owner of the instant application.

BACKGROUND

1. Field

Advancements in interprocess and inter-module communications in servers and server clusters, including organization, provisioning, management, and interoperation of compute, storage, and network resources to enhance datacenter availability, efficiency, and utilization are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

Data center compute complexes access numerous storage devices. What is needed are effective techniques for making the accesses efficiently and reliably.

SUMMARY

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

BRIEF DESCRIPTION OF THE DRAWINGS

Various embodiments of the invention are disclosed in the following detailed description and the accompanying drawings.

FIG. 6E illustrates selected aspects of a logical view of an embodiment of VNIC receive queue organization and prioritization.

FIG. 25A illustrates selected details of an embodiment of a SW-intensive iSCSI initiator architecture.

DETAILED DESCRIPTION

Figure 1A:
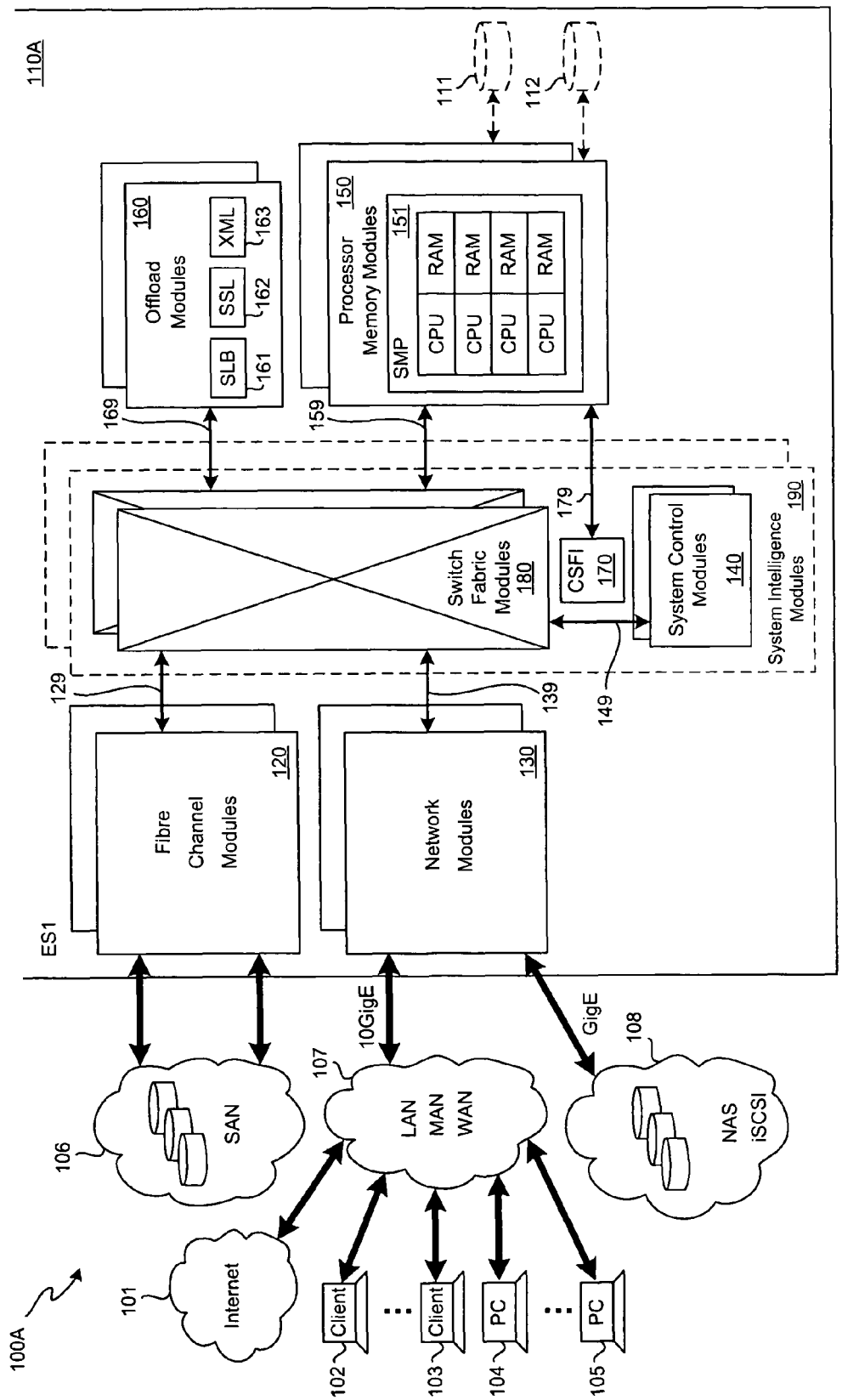
FIG. 1A illustrates a conceptual representation of an embodiment of an Enterprise Server (ES) system.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

Storage gateway provisioning, configuration, and management functions provide mechanisms to specify and manage parameters and operations associated with storage gateways. The parameters may include any combination of VLAN topology, zoning behavior, LUN masking, bandwidth, and priority. The parameters may also include path information describing initiator to target associations, enabling load-balancing aggregations and multipathing redundancy. Parameters may be specified at relatively low-levels, describing specific HW elements, or may be specified at relatively high-levels, describing desired bandwidth and redundancy requirements, with SW determining low-level HW assignments. Configuration and management functions enable dynamic modification of storage gateway parameters (such as bandwidth between selected initiator and target pairs). Management functions also enable dynamic switchover from a primary path to a secondary path with respect to a storage device.

A storage gateway enables fabric-backplane enterprise servers to access local and remote devices, including Fibre Channel (FC)-compatible storage devices, such as FC disks and Storage Attached Networks (SANs). Local devices are coupled to a local chassis including execution resources running processes accessing file systems implemented on the local devices. Remote devices are coupled to a remote chassis that is reachable from the local chassis via networking transport. A storage gateway architecture enables transparent and interchangeable use of the local and remote devices, as if the devices were coupled directly to the execution resources via Host Bus Adapters (HBAs). Bandwidth for accessing storage devices and physical interfaces to storage devices may be allocated to various application and operating system processes with the allocation managed in part by hardware devices communicating storage traffic in part via a cellifying switch fabric.

Storage gateway remote and local access to storage devices is provided in part via an initiator and a target, both implementing bandwidth-controlled access to the devices. The initiator and the target may be iSCSI-compatible, and may also optionally implement protection, security, and performance features. The protection and security features include any combination of VLANs, zoning, Logical Unit Number (LUN) masking, and encryption. The performance features include any combination of HW-accelerated Remote Direct Memory Access (RDMA), prioritized I/O operations, and service priority (such as strict priority and straight or weighted round-robin priorities). An initiator may be implemented in a Processor Memory Module (PMM) coupled to a switch fabric that is in turn coupled to a target implemented in a Fibre Channel Module (FCM). Storage traffic may be communicated as Small Computer System Interface (SCSI)- and SCSI over Transmission Control Protocol/Internet Protocol (iSCSI)-compatible information (data and commands) on the switch fabric via cellifying input/output interface devices.

Multi-chassis fabric-backplane enterprise servers include a plurality of chassis managed collectively to form one or more provisioned servers. A central client coordinates gathering of provisioning and management information from the chassis, and arranges for distribution of control information to the chassis. One of the chassis may perform as a host or proxy with respect to information and control communication between the client and the chassis. Server provisioning and management information and commands move throughout the chassis via an Open Shortest Path First (OSPF) protocol. Alternatively, the client may establish individual communication with a subset of the chassis, and directly communicate with chassis in the subset. Server provisioning and management information includes events generated when module status changes, such as when a module is inserted and becomes available, and when a module fails and is no longer available. Each chassis includes a switch fabric enabling communication between chassis modules.

A hybrid server/multi-layer switch system architecture, referred to hereinafter as the Enterprise Fabric (EF) architecture, forms the basis for a number of ES chassis embodiments. Each ES embodiment includes one or more Processor Memory Modules (PMMs, each having a symmetric multiprocessor complex), one or more Network Modules, and a System Intelligence Module (SIM). The SIM includes a cellified switching-fabric core (SF) and a System Control Module (SCM).

Each PMM has one or more resident VIOC adapters. Each VIOC is a specialized Input/Output (I/O) controller that includes embedded layer-2 forwarding and filtering functions and tightly couples the PMM to the SF. Thus the layer-2 switch functionality within the ES chassis is distributed throughout various pluggable modules (such as SIMs, NMs, and PMMs). Through the use of VIOC/VNIC device drivers, host operating system software (Host O/S) running on the PMMs is presented with a plurality of Virtual Network Interface Cards (VNICs). In some embodiments, each VNIC behaves as a high-performance Ethernet interface at the full disposal of the Host O/S. In other embodiments, at least some of the VNICs behave as high-performance FC HBAs.

The SCM is responsible for provisioning and overall system management. Via system control and management processes running on the SIM, the server and switch functionality of the ES chassis are provisioned via configuration files in accordance with respective requirements specified by server and network administrators. Configurable parameters for each server include the number of processors, memory, the number of VNICs, and VNIC bandwidth. Configurable parameters for the network include VLAN assignments for both Network Module ports and VNICs and Link Aggregation Group (LAG) definitions.

An ES system may be operated as one or more provisioned servers, each of the provisioned servers including capabilities as identified by a corresponding set of specifications and attributes, according to various embodiments. Typically the specifications (or constraints) and attributes are specified with a Server Configuration File. An ES system may be provisioned into any combination and number of servers according to needed processing and I/O capabilities. Each of these servers may include distinct compute, storage, and networking performance. Provisioned servers may be managed similar to conventional servers, including operations such as boot and shutting down.

One or more VNICs provide for communication among modules of Enterprise Server (ES) embodiments via a switch fabric dataplane. Processes executing on compute complexes of the servers exchange data as packets or messages by interfaces made available through VNICs. The VNICs further provide for transparent communication with network and storage interfaces. VNIC provisioning capabilities include programmable bandwidth, priority scheme selection, and detailed priority control (such as round-robin weights). In some embodiments, VNICs are implemented in VIOCs. In another aspect, VLANs enable access to Layer-2 (L2) and selected Layer-3 (L3) network functions while exchanging the packets and messages. VLAN identification is provided in each VNIC, and VLAN processing is partially performed in VIOCs implementing VNICs.

The compute complexes and interfaces are typically configured as pluggable modules inserted into a backplane included in a chassis. The switch fabric dataplane (sometimes simply referred to as "a dataplane") is accessible via the backplane (serving as a replacement for a conventional backplane bus), and hence ES embodiments are known as "fabric-backplane" enterprise servers. Various ES embodiments are comprised of varying numbers and arrangements of modules.

The EF architecture provides for provisioning virtual servers (also known as server-instances) with included virtual networks from underlying ES hardware and software resources. The EF architecture is applicable to application scenarios requiring dynamic combinations of compute, network, and storage performance and capabilities, and is a unifying solution for applications requiring a combination of computation and networking performance. Resources may be pooled, scaled, and reclaimed dynamically for new purposes as requirements change, using dynamic reconfiguration of virtual computing and communication hardware and software. This approach offers the advantages of reduced cost, as provisioning is "just-right" rather than over-provisioned. In addition, dynamic configuration allows for quick performance or scale modifications.

The EF architecture provides a radically different underlying server architecture compared to traditional multi-way Symmetric MultiProcessor (SMP) servers, including integrated fabric interconnectivity to enable high-bandwidth, low-latency I/O operation. Processing and I/O throughput are virtualized, providing scalable, coordinated resources. Partitioning and fail-over are hardware supported, including mechanisms for treating multiple virtual servers as a single managed entity, resulting in new high availability clustering and multi-site fail-over capabilities. Compared to a current network switch, networking capabilities are extended, including efficient RDMA, high-performance Direct Data Placement (DDP), and flexible resource pooling. Virtualized fabric services, such as Server Load Balancing (SLB), Secure Sockets Layer (SSL) protocols including Transport Layer Security (TLS) variants, eXtensible Markup Language (XML), and so forth, are also provided.

In some embodiments, a data center or other installation implemented in accordance with the EF architecture will include one or more ES chassis. In a first embodiment, the ES chassis capabilities include an 8-way SMP partition-configurable compute complex. These compute resources include a plurality of 64-bit x86 processing elements. The ES chassis hardware configuration is compatible with execution of software operating systems such as Linux and Microsoft Windows. Processing elements in the ES chassis are coupled to a low-latency high-bandwidth interconnect fabric via virtualized I/O functions, providing for efficient communication between processing elements and with network and FC interfaces coupled to the fabric. The virtualized I/O functions are distributed throughout the plurality of processing elements. Among the virtualized I/O functions, the ES chassis includes VNICs and VHBAs. Via these VNICs and VHBAs, the processing elements can selectively communicate with external networks coupled to any of several high-performance network interfaces (up to three 10 Gb Ethernet interfaces, or thirty 1 Gb Ethernet interfaces, in the first embodiment) and with several high-performance 2 Gb FC interfaces (up to eight per FCM in the first embodiment). Each VNIC/VHBA can be individually configured such that it appears to be coupled to a multi-port switch coupled to other of the VNICs/VHBA and to the network/storage interfaces. Alternatively, each VNIC/VHBA can be configured such that it appears to be directly coupled to one of the network/storage interfaces. Additional processing capabilities may be provided in the chassis in the form of offload cards (or pluggable boards or modules) supporting virtualized services, such as SLB, SSL, and XML processing.

The ES chassis is further configured with capabilities to provide for a high availability system, including modular components, hot-swap of components, and fully redundant components. Other high availability capabilities include multi-site fail-over and mainframe class Reliability, Availability, and Serviceability (RAS) features.

An ES system may be operated as one or more provisioned servers, each of the provisioned servers including capabilities as identified by a corresponding set of specifications and attributes, according to various embodiments. Typically the specifications (or constraints) and attributes are specified with an SCF (see the SCF and Related Tasks section, elsewhere herein). An ES system may be provisioned into any combination and number of servers according to needed processing and I/O capabilities. Each of these servers may include distinct compute, storage, and networking performance. Provisioned servers may be managed similar to conventional servers, including operations such as boot and shutting down (see the Server Operational States section, elsewhere herein).

The EF architecture further includes a Graphical User Interface (GUI) for configuration management. The GUI may be provided via a web browser, a network-based Java client, or some other related mechanism, according to various embodiments. The GUI provides role-based access and division of functions, and may be used as a single point of management for all EF system functions. System management personnel may use the GUI to control EF virtualized configuration and provisioning settings. Resource pooling and allocation of Central Processing Unit (CPU) and IO capabilities may be dynamically altered without requiring physical changes or re-cabling. Network and storage capabilities may be similarly dynamically modified, including Network Interface Controller (NIC), HBA, and bandwidth resources. Redundancy, fail-over and other RAS capabilities may also be configured via the GUI, including specific multi-site configuration information. Various embodiments may also include a Command Line Interface (CLI) with functions and capabilities similar to the GUI.

The GUI further provides functions for monitoring various aspects of the hardware and software performance and behavior of systems including each ES chassis. The monitoring functions are available for inspection of operations at several levels in the system, from top-level application performance to low-level network interconnect metrics.

The GUI provides hooks for integration of the functions provided therein into higher-level application software and standard applications, allowing for flexibility in specifying and monitoring the EF system configuration.

EF configuration management and monitoring may also be performed via other mechanisms. Alternate mechanisms include one or more command line interfaces, a scripting interface, and remote network-centric interfaces using standard capabilities provided for in Simple Network Management Protocol (SNMP) and Remote MONitoring (RMON).

Systems including EF capabilities may also provide for upgrades to installed software, including operating system software, application software, driver-level software, and firmware software. The upgrades may include updates to address security issues, to enable new or expanded functionality, or to repair incorrect operation (a "bug fix"). A variety of sources may provide upgrades, including EF vendors, or vendors of software installed or used in EF-based systems. Additionally, Independent Software Vendor (ISV) certifications of software associated with EF-based systems may also be performed.

Illustrative application usage scenarios include a first usage scenario including a first configuration adapted to replace a server (having an Operating System selected from a list including but not limited to Unix, Linux, Windows, etc.) or a collection of such servers. The first configuration provides for virtualization of data center capabilities, resource pooling, and consolidation of functions otherwise performed in a plurality of heterogeneous devices. Computing, networking, and services are completely virtualized, enabling dynamic deployment, scaling, and reclamation according to changing application requirements. Significant savings in capital and operating expense result.

A second usage scenario includes a second configuration adapted for I/O intensive applications. The second configuration provides high-bandwidth and low-latency storage and networking capabilities, enabling new classes of applications using fewer infrastructure components than currently possible. The high-bandwidth and low-latency capabilities are enabled in part by use of a high-bandwidth, low-latency fabric. Efficient intra-chassis communication is provided for in a transparent manner, enabling increased I/O bandwidth and reduced latency compared to existing solutions.

A third usage scenario includes a third configuration adapted for consolidating tiers in a data center application.

The third configuration provides for collapsing the physical divisions in present 3-tier data centers, enabling solutions with fewer servers, a smaller number of network switches, and reduced needs for specialized appliances. The concepts taught herein provide for completely virtualized computing, networking, and services, in contrast to existing solutions addressing tiered data systems. Dynamic configuration enables pooling of resources and on-the-fly deploying, scaling, and reclaiming of resources according to application requirements, allowing for reduced infrastructure requirements and costs compared to existing solutions.

A fourth usage scenario includes a fourth configuration adapted for enhanced high availability, or RAS functionality, including multi-site fail-over capabilities. The fourth configuration provides for new redundancy and related architectures. These new architectures reduce set-up and configuration time (and cost), and also decrease on-going operating expenses. Modular components of the ES chassis are hot-swap compatible and all EF systems are configured with fully redundant components, providing for mainframe-class RAS functionality. Reduced networking latency capabilities enable enhanced multi-site fail-over operation.

The concepts taught herein thus enable simple, fast, straightforward, low-effort deployment of systems configured and provisioned for efficient execution of heterogeneous mixes of applications requiring varying computing, networking, and I/O processing resources. Application fail-over architectures are also readily enabled with little or no additional hardware, according to further dynamic partitioning features. Accordingly, Information Technology (IT) operations are reduced in complexity and cost.

The concepts taught herein consolidate multiple devices and tiers in data center operations, requiring fewer servers (in type and quantity), reduced supporting hardware, and smaller infrastructure outlays compared to systems of the current art. Significant reductions in the total cost of ownership are thus provided for by the concepts taught herein.

The concepts taught herein, ensure highly reliable and available compute, network, storage, and application resources while also dramatically improving storage and networking performance and reliability. True multi-site fail-over and disaster recovery are possible by use of the concepts taught herein, enabling new classes of I/O and high availability applications.

Illustrative Combinations

A first embodiment of a method including the steps of determining a plurality of host bus adapter channels required to meet a list of storage interface requirements, including computing how many host bus adapter channels are needed; determining a respective plurality of operational parameters for each of the host bus adapter channels; identifying a plurality of storage interfaces to implement the determined number of host bus adapter channels; and writing mode information to configure the storage interfaces according to the respective pluralities of operational parameters. The first embodiment wherein the determining of the host bus adapter channels is performed programmatically. The first embodiment wherein the determining of the host bus adapter channels is performed manually. The first embodiment wherein the determining of the host bus adapter channels is performed at least in part by software and at least in part by a system administrator. The first embodiment wherein the determining pluralities of the operational parameters is performed programmatically. The first embodiment wherein the determining pluralities of the operational parameters is performed manually. The first embodiment wherein the determining pluralities of the operational parameters is performed at least in part by software and at least in part by a system administrator. The first embodiment wherein the identifying is performed programmatically. The first embodiment wherein the identifying is performed manually. The first embodiment wherein the identifying is performed at least in part by software and at least in part by a system administrator.

Any of the aforementioned embodiments wherein the storage interfaces are accessible by a plurality of processes executing on a plurality of physical partitions of a physically partitionable symmetric multiprocessor. Any of the aforementioned embodiments wherein the list of storage requirements includes at least one of a security requirement and a quality of service requirement. Any of the aforementioned embodiments that include a security requirement and further wherein the security requirement includes an exclusive accessibility requirement. Any of the aforementioned embodiments that include a security requirement and further wherein the security requirement includes a shared accessibility requirement. Any of the aforementioned embodiments that include a quality of service requirement and wherein the quality of service requirement includes at least one of a maximum bandwidth requirement and a minimum bandwidth requirement. Any of the aforementioned embodiments that include a quality of service requirement and wherein the quality of service requirement includes an allowance for over-provisioning. Any of the aforementioned embodiments that include a quality of service requirement and wherein the quality of service requirement includes a prohibition against over-provisioning. Any of the aforementioned embodiments that include a quality of service requirement and wherein the quality of service requirement includes an active/standby failover requirement. Any of the aforementioned embodiments that include a quality of service requirement and wherein the quality of service requirement includes a load balancing requirement.

Any of the aforementioned embodiments wherein the operational parameters include at least one of a security parameter and a quality of service parameter. Any of the aforementioned embodiments that include a security parameter and wherein the security parameter includes at least one of a Virtual Local Area Network (VLAN) identifier, an internal zone specification; and a storage volume access parameter. Any of the aforementioned embodiments that include an internal zone specification and wherein the internal zone specification identifies at least one of the storage interfaces. Any of the aforementioned embodiments that include an internal zone specification and wherein the internal zone specification identifies a storage device coupled to at least one of the storage interfaces. Any of the aforementioned embodiments that include an internal zone specification and wherein the internal zone specification identifies a portion of a storage device coupled to at least one of the storage interfaces. Any of the aforementioned embodiments that include a storage volume access parameter and wherein the storage volume access parameter identifies a portion of a storage device coupled to at least one of the storage interfaces. Any of the aforementioned embodiments that include a storage volume access parameter and wherein the storage volume access parameter identifies a group of Logical Unit Numbers (LUNs). Any of the aforementioned embodiments that include a quality of service parameter and wherein the quality of service parameter includes at least one of a maximum bandwidth, a minimum bandwidth, an absolute priority, a relative priority, a failover association, and a load balancing group membership identification.

Any of the aforementioned embodiments wherein at least one of the storage interfaces is compatible with Fibre Channel (FC). Any of the aforementioned embodiments wherein at least one of the storage interfaces is enabled for coupling to a storage device, the storage device being at least one of a disk drive, a tape drive, a tape library, a storage array, a storage switch, a storage director, a storage router, a storage network, and a storage area network (SAN). Any of the aforementioned embodiments wherein storage traffic is communicated with the storage interfaces via a switch fabric. Any of the aforementioned embodiments wherein storage traffic communicated with the storage interfaces includes Small Computer System Interface (SCSI) compatible commands. Any of the aforementioned embodiments wherein storage traffic communicated with the storage interfaces includes Small Computer System Interface (SCSI) over Transmission Control Protocol/Internet Protocol (iSCSI) compatible commands.

Enterprise Server System

FIG. 1A illustrates System 100A, a conceptual representation of an embodiment of an ES system. The system includes a particular ES chassis embodiment, ES1 110A, which is coupled to various other systems, including FC Storage Network 106, Generic Packet Network 107, and Ethernet Storage Network 108. FC Storage Network 106 provides mass storage via a collection of disks organized, for example, as a SAN. Generic Packet Network 107 conceptually includes arbitrary combinations of Local Area Network (LAN), Metro Area Network (MAN), and Wide Area Network (WAN) networks and typically includes Ethernet and Ethernet derivative links for coupling to Internet 101, an arbitrary number and arrangement of Client machines or servers, represented as Client 102 and Client 103, as well as an arbitrary number and arrangement of Personal Computers (PCs) or Workstations, represented as PC 104 and PC 105. Ethernet Storage Network 108 provides mass storage via a collection of disks organized in a Network Attached Storage (NAS) or iSCSI fashion.

ES1 110A includes a central I/O SFM (SFM 180) providing a switch fabric dataplane coupling for FCMs 120, NMs 130, SCMs 140, PMMs 150 (also known as Application Processor Modules), and OLBs 160, also known as AppLication Modules (ALMs). Cell-based communication is carried out over the switch fabric dataplane between the aforementioned elements coupled to it. In other words, the fabric functions as a cell-based switch. FCMs 120 include Fibre Channel Interfaces (FCIs) for coupling to FC standard storage devices and networks (such as SANs). NMs 130 include interfaces to standard network infrastructures. PMMs 150 include compute elements for execution of Application, Driver, and OS processes, via SMP clusters illustrated conceptually as SMP 151. A configurable Coherency Switch Fabric and Interconnect (CSFI 170) is included for partitioning or combining the CPU and Randomly Accessible read/write Memory (RAM) resources of PMMs 150. OLBs 160 include compute elements for execution of service processes, via various service acceleration modules. Service acceleration modules include SLB accelerator 161, SSL accelerator 162, and XML accelerator 163. SCMs 140 include compute elements for providing system management, controlplane (L2/L3 bridging and routing, for example), and load balancing processing for SFM 180 and the elements coupled to it. PMMs 150 also include FCIs for coupling to mass storage systems, such as Optional Local Disks 111-112, or SAN systems including mass storage.

In operation, Application, Driver, and OS processes are executed on PMMs 150 via CPU and RAM elements included in SMP 151. At least some of the data consumed and produced by the processes is exchanged in packets formatted as cells for communication on SFM 180. The data may include network data exchanged with Generic Packet Network 107 via NMs 130, and storage data exchanged with Ethernet Storage Network 108 via NMs 130 or FC Storage Network 106 via FCMs 120. The data may also include service data exchanged with OLBs 160 and SCMs 140, and other Application, Driver, or OS data exchanged with other elements of PMMs 150.

Data communicated on SFM 180 is not limited to data exchanged with PMMs 150, but may also include data communicated between any of the modules (or fabric clients) coupled to the fabric. For example, one NM may forward packets to itself or to another NM via the fabric. An NM may also exchange packets with an OLB for processing via the fabric. SCMs 140 may also exchange configuration and forwarding update information with VIOCs via VIOC Control Protocol (VIOC-CP) packets via the fabric. In some embodiments, SCMs 140 may also exchange selected system management, controlplane, and load balancing information with all modules coupled to the fabric via in-band packets communicated on the fabric.

In one embodiment, in conjunction with the VNIC functionality mentioned previously, a modified Ethernet Driver provides the illusion of local NIC functionality to Application, Driver, and OS processes locally executing on any of SCMs 140, PMMs 150, and OLBs 160. The NIC functionality can be configured to either appear to be coupled to a switch coupled to other NICs or appear to be coupled directly to one of the networking interfaces included on NMs 130. In another embodiment, this technique may be used to access networked storage devices (i.e., NAS subsystems) via the NMs 130.

As illustrated conceptually, SFM 180 includes a redundant pair of fabrics, with one of the pair typically configured as a Primary Fabric, while the other fabric is typically configured as a Redundant Fabric. SCM-Fabric coupling 149 represents two fabric dataplane couplings, a first Primary Coupling between a Primary SCM of SCMs 140 and the Primary Fabric, and a Redundant Coupling between a Redundant SCM of SCMs 140 and the Redundant Fabric. In one mode of operation, all dataplane traffic is carried on the Primary Fabric, managed by the Primary SCM, while the Redundant Fabric and the Redundant SCM are maintained in a hot-standby mode.

Further dataplane couplings to SFM 180 are illustrated conceptually as FCM-Fabric coupling 129, NM-Fabric coupling 139, PMM-Fabric coupling 159, and OLB-Fabric coupling 169. In FIG. 1, each coupling is abstractly portrayed as a single line between each group of modules and the switch fabric. It will be understood that for the FCM, NM, and OLB modules, each module instance has a Primary Fabric coupling and a Redundant Fabric coupling. For the PMM, each PMM instance has two Primary Fabric couplings and two Redundant Fabric couplings.

All of the modules coupled to SFM 180 (FCMs 120, NMs 130, SCMs 140, PMMs 150, and OLBs 160) include fabric interface communication units for exchanging data as cells on the fabric. The details of this data exchange are described in more detail elsewhere herein.

In an illustrative embodiment, the components of ES1 110A are included on a plurality of pluggable modules adapted for insertion into and removal from a backplane while the server is powered-up and operational (although software intervention to cleanly shut down or start up various processes or functions may be required). The backplane forms portions of FCM-Fabric coupling 129, NM-Fabric coupling 139, CSFI-PMM coupling 179, PMM-Fabric coupling 159, and OLB-Fabric coupling 169. The Primary Fabric of SFM 180 and the associated Primary SCM of SCMs 140 are included on pluggable module Primary SIM as illustrated by SIMs 190. Similarly, the Redundant Fabric of SFM 180 and the associated Redundant SCM of SCMs 140 are included on pluggable module Redundant SIM of SIMs 190. All of the modules of FCMs 120, NMs 130, PMMs 150, and OLBs 160 are also configured as pluggable modules adapted for operation with the backplane.

Each PMM of PMMs 150 is physically-partitionable, i.e. configurable into one or more physical partitions. The physical partitioning of PMMs 150 and related modes of CSFI 170 are configured under program control. For example, PMMs 150 may be configured as a single SMP complex in conjunction with CSFI 170. The result is a first example of a physical partition. In a second example, each PMM of PMMs 150 may instead be configured individually as an independent SMP complex, resulting in a plurality of physical partitions, one for each PMM. In a third example, each PMM of PMMs 150 may instead be configured as a pair of SMP complexes, resulting in two physical partitions per PMM. In various embodiments, CSFI 170 may be implemented as any combination of simple interconnect, coherency logic, and switching logic, operating in conjunction with any combination of interconnect and logic included on PMMs 150. Some of these embodiments are discussed in more detail later herein.

ES1 110A, as illustrated, is representative of a number of embodiments configured with various Modules to provide differing amounts of storage and network interface capability (connectivity and bandwidth), as well as differing levels of compute capability (cycles and memory). Typically, each embodiment includes at least a redundant pair of Switch Fabrics and associated System Intelligence Modules (for communication between Modules), at least one Processor Memory Module (for execution of Application, Driver, and OS processes), and at least one Network Module (for communication with external agents). Some embodiments may optionally further include any combination of additional Modules to provide additional interface and compute capability, up to the physical limits of the particular implementation. For example, additional Network Modules may be included in an embodiment to provide additional network bandwidth or connectivity. One or more Fibre Channel Modules may be included in an embodiment to provide additional storage bandwidth or connectivity. Additional Processor Memory Modules may be included to provide additional compute cycles or memory. One or more Offload Modules may be included to provide additional service compute cycles or memory, and these Offload Modules may each be individually configured with any combination of SLB, SSL, and XML accelerators.

In the embodiments represented by ES1 110A, communication between the Modules via SFM 180 is independent of the manner and arrangement of the Modules. All of the Modules communicate as peers on SFM 180 and interface to the fabric in a similar manner.

System 100A is also representative of a variety of system embodiments, for example, differing in the number, type, and arrangement of storage and network systems coupled to ES1 110A. For example, any combination of Optional Local Disks 111-112 may be included. Generic Packet Network 107 may include any combination of LAN, MAN, or WAN elements. FCMs 120 may be coupled to a single SAN, or a plurality of SANs. NMs 130 may be coupled to a plurality of networks or storage systems. Couplings between ES1 110A and other systems is limited only by the number and type of interfaces and physical couplings available according to implementation.

Figure 1B:
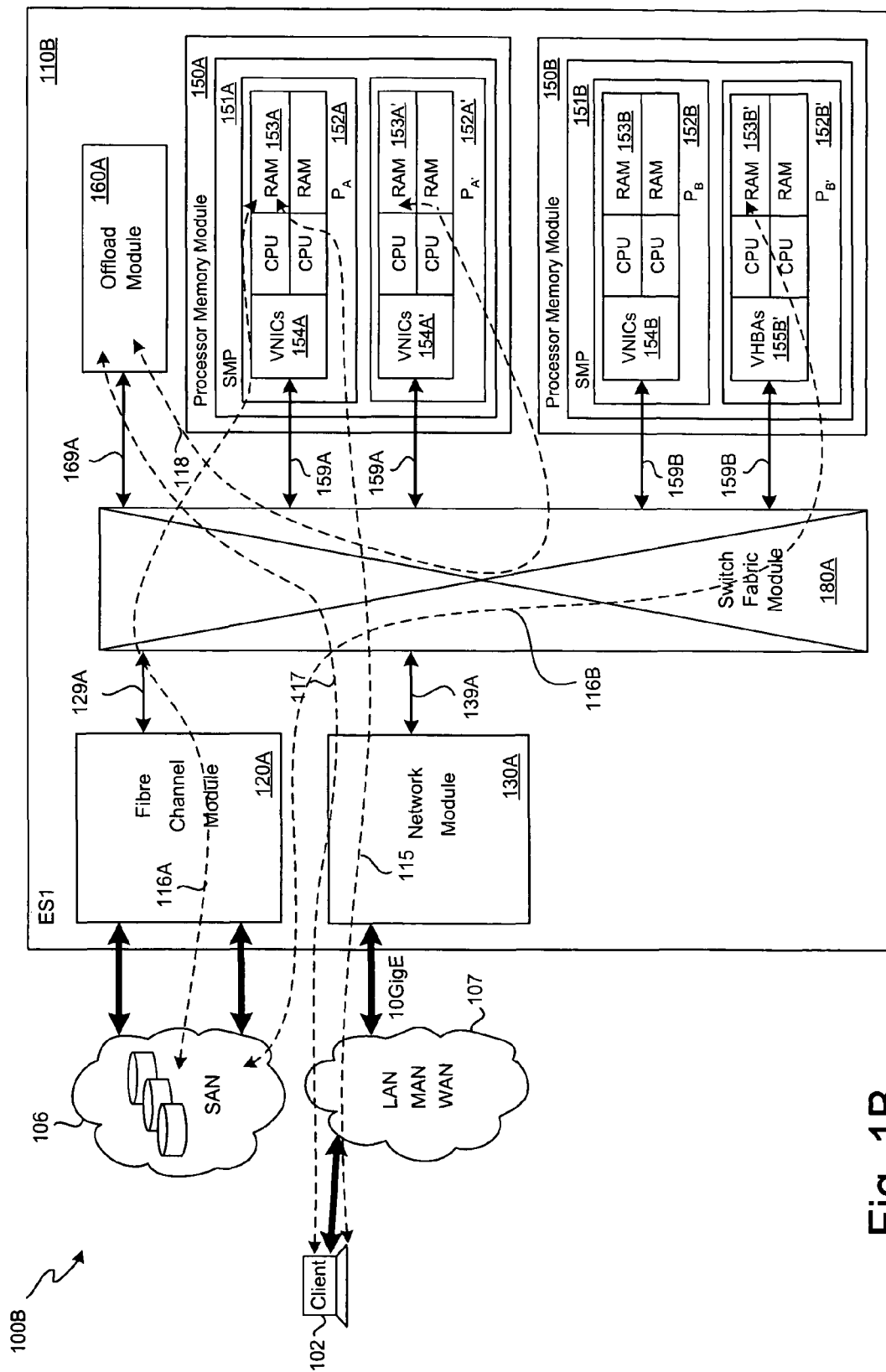
FIG. 1B illustrates a conceptual representation of selected details of data transfer in an embodiment of an ES system.

FIG. 1B illustrates System 100B, a conceptual representation of selected details of data transfer in an embodiment of an ES system. An ES chassis embodiment, illustrated as ES1 110B, is coupled to FC Storage Network 106 and Ethernet Network 107, as described elsewhere herein. In the illustrated embodiment, various modules of each type (FCM 120A, NM 130A, PMM 150A, PMM 150B, and OLB 160A) are coupled to Primary Switch Fabric Module 180A, via FCM-Fabric coupling 129A, NM-Fabric coupling 139A, PMM-Fabric couplings 159A/159A' and 159B/159B', and OLB-Fabric coupling 169A, respectively. FCM 120A provides interfaces for storage network couplings (such as used for storage gateways), including a coupling for FC Storage Network 106. NM 130A provides interfaces for network couplings, including a coupling for Ethernet Network 107, coupled in turn to Client 102. In this illustrative scenario, PMM 150A is configured as a first and a second physical partition. The first physical partition includes SMP Portion $P_A$ 152A, having RAM 153A, and is coupled by PMM-Fabric coupling 159A (via VNICs 154A) to the fabric dataplane. The second physical partition includes SMP Portion $P_{A'}$ 152A', having RAM 153A', and is coupled by PMM-Fabric coupling 159A' (via VNICs 154A') to the fabric dataplane. PMM 150B is similarly configured as two physical partitions (SMP Portion $P_B$ 152B and SMP Portion $P_{B'}$ 152B'), having respective fabric couplings 159B/159B' implemented via VNICs 154B and VHBAs 155B', respectively. Note: several elements have been omitted from the figure for clarity, including the SCMs, the Redundant Fabric, the CSFI, and optional SANs.

Several illustrative data transfer paths are shown, including Client-Server Data Exchange 115, Storage-Server Data Exchange 116A, Storage Gateway Data Exchange 116B, Client-Service Data Exchange 117, and Service Data Exchange 118. Each path illustrates the movement of data between two clients of the switch fabric. Consider now three embodiments, described from the perspective of these clients. In one embodiment, data is organized as packets transferred via a stateless connection-free (and unreliable) protocol. In another embodiment, data is organized as messages, and transferred via a connection-oriented reliable message protocol. In yet another embodiment, data is selectively organized as either packets or messages.

The underlying fabric transport process is transparent to the clients and external devices coupled to the system and to most of the host software processes on the PMMs and OLBs. As described in more detail elsewhere herein, to external network devices, each port of each NM acts as a switch port of a virtualized high-performance L2/L3 switch. As will be discussed in further detail elsewhere herein, the switch has advanced VLAN and classification functionalities. The VLAN functionality provides for selectively coupling or isolating the network segments coupled to each switch port. Each segment associated with an NM port may have one or more external physical network devices as in any conventional network segment. The classification functionality provides for special forwarding treatments in accordance with a variety of attributes of the Ethernet frames received from external network devices on the ports of the NMs. Select software processes running on the PMMs and OLBs are provided the illusion that they are coupled via high-performance Ethernet network interfaces to dedicated ports of the VLAN-enabled switch. Connectivity between the different network segments may be flexibly and arbitrarily configured through VLAN management.

In systems having FCMs, a virtualized FC switch is similarly presented to external FC devices. Likewise, certain software processes running on the PMMs are provided the illusion they are coupled to the FC switch via high-performance FC interfaces. Multiple VLANs and multiple FC networks can simultaneously co-exist on top of the fabric transport infrastructure while being completely logically separate and secure.

The underlying fabric transport process is discussed in more detail elsewhere herein, but it will now be briefly overviewed. The fabric supports the transparent transport of both packets and messages. Here, "packets" refers to conventional Ethernet frames sent via some connectionless protocol that does not have integral support for reliable delivery. The term "messages" refers to one or more data transfers of quasi-arbitrarily sized data blocks reliably delivered over a logical connection established between end-points. Packets are transported over the fabric using "fabric packets," while messages are transported over the fabric using "fabric messages." Both fabric packets and fabric messages make use of highly similar fabric frames. A fabric packet is comprised of a single fabric frame, sent over the fabric without any connection or reliable delivery support. In contrast, fabric messages are comprised of (potentially quite long) sequences of fabric frames, sent over the fabric using a connection-oriented reliable delivery protocol. Some of the fabric frames of a fabric message are for transfer of the message data blocks while other fabric frames are used for control to set up and take down connections and to implement reliable delivery (e.g., via handshake and re-delivery attempts).

Thus fabric messages require additional fabric frames for messaging control beyond the fabric frames required to transport the message data. Furthermore, the fabric frames of fabric messages require additional processing at the source and destination ends related to the management of reliable delivery, connections, and the fragmentation (segmentation) and reassembly of data blocks. Nevertheless, the transport over the fabric of individual fabric frames is essentially the same for both fabric messages and fabric packets. Since all sources and destinations on the fabric have support for processing fabric packets and fabric messages, those of ordinary skill in the art will understand that all of the data exchange illustrations below that describe the transport of packets using fabric packets are equally applicable to the transport of messages using fabric messages.

The Ethernet frames of the packets to be transported over the fabric may originate in external clients or devices coupled to the NM ports or from within the various processing modules. During processing by the NM or the VIOC, respectively, a fabric packet is formed to contain the data of each original Ethernet frame plus additional information to facilitate transport over the fabric. During the fabric packet formation, the protocol field (Ether-type) of the original Ethernet frame is examined. The fabric packet is generally labeled (tagged) in accordance with the Ether-type and other information found in the original packet. E.g., if the original Ethernet frame is an IP type frame, the fabric packet is identifiable as an "IP fabric packet." IP fabric packets are evaluated for L3 forwarding (a.k.a. IP forwarding) based upon their included destination IP address. Otherwise, non-IP fabric packets are evaluated for L2 forwarding based upon their included MAC destination address (MACDA). L2/L3 forwarding is overviewed next.

During the fabric packet formation a forwarding decision is made that determines a fabric destination address that is embedded in the fabric packet. The embedded fabric destination address controls how the fabric packet is delivered to destinations within the system. The fabric destination address includes a specification for an egress port of the switch fabric. When multiple sub-ports (corresponding to multiple L2 or L3 destination addresses) are associated with a single egress port, the fabric destination address will also include a fabric sub-address to specify a particular one of the sub-ports.

The fabric packet is subsequently cellified (segmented into cells) and presented to an ingress port of the switch fabric. Each cell includes the fabric destination address and the cell is transferred by the switch fabric to the egress port specified by the fabric destination address. After being received by the module coupled to the specified egress port, the cells are reformed into a representation of the original Ethernet frame prior to presentation to the destination. If the module at the egress port has multiple sub-ports, the module will use the included fabric sub-address to further direct the reformed Ethernet frame to the specified sub-port.

In L2 forwarding, the VLAN assignment of the network port or processing module from which the original Ethernet frame was sourced is also used with the MACDA in determination of the fabric destination address. The determination is by way of a lookup in an L2 Forwarding Information Base (L2 FIB). As discussed elsewhere herein, an L2 FIB is implemented for each VIOC and NM in the system using any combination of TCAM/SRAM structures and search engines, according to embodiment. The L2 forwarding decision is thus implemented completely within the module where the original Ethernet frame was sourced and the next fabric destination is the module most directly associated with the MACDA of the original Ethernet frame.

General L3 forwarding (i.e., to destinations beyond the IP sub-net of the source IP) requires access (on the same L2 sub-net as the source) to at least one gateway IP interface and associated L3 FIB. The number and location of gateway IP interfaces and L3 FIBs varies by embodiment. In a first L3 embodiment, a gateway IP interface and L3 FIB is implemented external to the system chassis. In the first L3 embodiment, there is no gateway IP interface or L3 FIB on any NM or VIOC and the system hardware does not provide any L3 forwarding assists. That is, the external gateway IP interface and L3 FIB are not aware of the fabric transport process and function conventionally to provide the Ethernet MACDA of the next hop. In a second L3 embodiment, at least one gateway IP interface is implemented via a media port (physical port) or pseudo-port (virtual port) somewhere on at least one NM and an L3 FIB is implemented within each NM having a gateway IP interface. In the second L3 embodiment, there is not a gateway IP interface or L3 FIB on any VIOC. The gateway IP interface is only visible from inside the chassis if implemented on a pseudo-port. The gateway IP interface is visible from inside and outside the chassis if implemented on a media port. Combinations of multiple gateway IP interfaces, some on media ports and others on pseudo ports, are envisioned. In a third L3 embodiment, a gateway IP interface is implemented somewhere on at least one NM and for each VNIC, and an L3 FIB is implemented within each NM and VIOC. Gateway IP interfaces and L3 FIBs implemented within the chassis are fabric packet aware and assist L3 forwarding by providing the fabric destination address of the next hop.

In the second and third L3 embodiments, L3 FIB management processes maintain a master L3 FIB in the SCM and maintain coherency between all L3 FIBs in the chassis. When a non-master L3 FIB encounters a destination IP address that has no corresponding entry, the IP fabric packet undergoing the forwarding decision is forwarded as an "exception packet" to the controlplane process executing on the Primary SCM. The controlplane process determines the proper fabric address for the missing entry, propagates a new entry to all of the L3 FIBs, and forwards the IP fabric packet to the destination IP (or at least one hop closer) using the newly learned fabric address. (Fabric frames exist for a single cellified hop across the fabric between fabric source and fabric destination.

In the above and the following it will be understood that when an IP fabric packet is "forwarded" via an indirection or hop via an gateway IP interface or the Primary SCM, the IP fabric packet is being re-instantiated into a new fabric frame for each traverse across the fabric.)

In accordance with the foregoing, depending upon embodiment and within which module an IP packet is first processed, an IP fabric packet may first undergo an indirection to an IP gateway interface, possibly on a different port or pseudo port on the same or a different module or external to the system. All transport is by conventional Ethernet frames outside the chassis and by fabric frames within the chassis. Once at an IP gateway interface, the destination IP address of the original Ethernet frame is used to associatively access the L3 FIB and the lookup result is used to forward the IP packet to the IP destination (or at least one hop closer).

Those of ordinary skill in the art will understand that for IP packet transfers over the fabric, generally a gateway IP interface must be involved. In the following illustrated data exchanges, the paths are drawn for scenarios that do not require additional indirection. Nevertheless, it will be understood that if an IP packet is received at an interface that is neither the IP destination address or a gateway IP interface, then generally the corresponding data exchange path is modified by interposing an intermediate hop to a gateway IP interface. Furthermore, when an IP packet is received at a gateway IP interface, either directly or as part of an indirection from a non-gateway IP interface, in the relatively rare event that there is a miss in the associated L3 FIB, the corresponding data exchange path is modified by interposing an intermediate hop to the Primary SCM. As previously indicated, Primary SCM controlplane processing services the miss in the master L3 FIB and updates the L3 FIBs throughout the chassis. Once the miss is serviced, the Primary SCM forwards the IP packet toward the originally intended destination. Thus, while not a frequent occurrence, for some IP fabric packets two intermediate hops are interposed in the data exchange paths: a first intermediate hop to a gateway IP interface and a second intermediate hop to the Primary SCM.

In at least L3 forwarding, the classification functionality of the NMs facilitates more sophisticated forwarding decisions, special data manipulation, and other data treatments, to be optionally performed as a function of additional attributes of the network data traffic encountered. In one particular example that will be examined in more detail elsewhere herein, the fabric destination address for IP fabric packets is at least in part determined by the recognition of particular service requests (and the lack thereof) embedded in the data traffic. More specifically, the service request recognition takes the form of recognizing particular Transmission Control Protocol/Internet Protocol (TCP/IP) destination ports corresponding to particular applications. The L2 and L3 FIBs are also updated dynamically, both in response to changes in the network configuration and optionally for dynamic performance optimization, such as to achieve load balancing among the processing resources of the system.

For the sake of clarity in the below initial expositions for each of the data exchanges illustrated by FIGS. 1B and 2, the foregoing details of the transport process just described will be understood to apply, but will not be repeated. It will also be understood that even though the data exchanges are described from a flattened perspective that includes operations by the clients, the modules, and the switch fabric, the underlying above described fabric transport process (and the associated management of the L2 and L3 FIBs) remains transparent to the external clients, external devices, and internal host software processes. These clients, devices and host software processes are only aware of packets and messages (and not the fabric packets or fabric messages).

The data exchanges will be described in terms of more than one type of packet. References to packet transmission, packets originating from the client, incoming packets, received packets, reassembled packets, or simply packets, are references to Ethernet frames. It will be understood that all such Ethernet frames are transported across the fabric via the process of fabric packet encapsulation, cellification, switch fabric traversal, and reassembly. References to augmented packets or cellified packets are references to fabric packets. References to cells or cellified packets being forwarded refers to the providing of fabric-addressed cells to the switch fabric for transfer by the switch fabric to the module coupled to the switch fabric egress port specified by the fabric address.

In each data exchange description, generic exchanges are purposefully not explicitly characterized as being of the IP or non-IP type. It will be understood that each of these data exchanges is generally equally applicable to the exchange of IP fabric packets or non-IP fabric packets. If IP packets are being exchanged, then the forwarding is understood to be L3 forwarding. Otherwise, the forwarding is understood to be L2 forwarding. Again for the sake of clarity in the following initial expositions, some details of the data exchanges, such as the handling of multicast, are deferred to elsewhere herein.

Client-Server Data Exchange 115 includes packet transmission from Client 102 via Ethernet Network 107 to NM 130A. Since the system may in part be providing the functionality, of an L2/L3 switch for any of many network segments, packets received in close time proximity by NM 130A may be for any of multiple destinations both internal and external to the system. The incoming packets are classified, formed into fabric packets, subjected to a forwarding decision to determine a fabric address, and selectively provided as cells to Primary Switch Fabric Module 180A via a fabric ingress port associated with NM-Fabric coupling 139A. Based in part on the classification, NM 130A addresses the cells to PMM 150A, and more specifically to SMP Portion $P_A$ 152A, as a result of the forwarding decision identifying the fabric egress port associated with PMM-Fabric coupling 159A as the destination fabric addresses for the cells. Primary Switch Fabric Module 180A then transfers the cells to the fabric egress port associated with PMM-Fabric coupling 159A. SMP Portion $P_A$ 152A receives the cells and reassembles them into received packets corresponding to the packets originating from Client 102. The received packets are formed directly in RAM 153A, typically via DMA write data transfers. Return packets follow the flow in reverse, typically beginning with DMA read transfers from RAM 153A. Although Client-Server Data Exchange 115 has been described from the perspective of packets "originating" from Client 102 and return traffic flowing in reverse, this is only for illustrative purposes. The flow from Client 102 to SMP Portion $P_A$ 152A is entirely independent of the flow in the other direction.

Not all packets received from Client 102 via Ethernet Network 107 are destined to SMP Portion $P_A$ 152A. For example, Client-Service Data Exchange 117 illustrates cellified packets selectively forwarded by NM 130A toward OLB 160A via NM-Fabric coupling 139A, Primary Switch Fabric Module 180A, and OLB-Fabric coupling 169A. Based in part on the classification, packets from Client 102 are determined to require transfer to OLB 160A (instead of other fabric clients, such as SMP Portion $P_A$ 152A as in Client-Server Data Exchange 115). NM 130A addresses the corresponding cells to OLB 160A and executes a forwarding decision identifying the fabric egress port associated with OLB-Fabric coupling 169A as the fabric destination address for the cells. Primary Switch Fabric Module 180A then transfers the cells to the fabric egress port associated with OLB-Fabric coupling 169A. OLB 160A receives the cells and reassembles them into received packets directly into a RAM local to the OLB. Return packets follow the flow in reverse.

In some embodiments, messages are used to implement FC storage transactions. Storage-Server Data Exchange 116A includes establishing a reliable end-to-end logical connection, directly reading message data from RAM 153A (included in SMP Portion $P_A$ 152A), fragmenting (as required) the message data into fabric frames, and providing corresponding cells addressed to FCM 120A via PMM-Fabric coupling 159A. As a result of a forwarding decision, the cell destination addresses specify the fabric egress port associated with FCM-Fabric coupling 129A. For each fabric frame sent, the cells are transferred, received, and reassembled in a manner similar to that described for fabric packets in conjunction with Client-Service Data Exchange 117, via functions implemented in VNICs 154A. The storage transactions are provided via a storage network coupling to at least one storage device of external Storage Network 106. In some embodiments, if more than one storage network and associated storage network coupling is associated with FCM 120A, the particular storage network coupling is specified via a fabric sub-address portion of the cell destination address. Returning storage transaction responses follow the flow in reverse.

In some embodiments, messages are used to implement storage gateway transactions, including communications with FC-compatible storage devices. Storage Gateway Data Exchange 116B includes operating an end-to-end logical connection (via a reliable transmission protocol, for example), directly reading storage information (such as iSCSI commands and data) from RAM 153B' (included in $P_{B'}$ 152B'), fragmenting (as required) the information into fabric frames, and providing corresponding cells addressed to FCM 120A via PMM-Fabric coupling 159B'. As a result of a forwarding decision, the cell destination addresses specify the fabric egress port associated with FCM-Fabric coupling 129A. For each fabric frame sent, the cells are transferred, received, and reassembled in a manner similar to that described for fabric packets in conjunction with Client-Service Data Exchange 117, via functions implemented in VHBAs 155B'. The functions may include any combination of bandwidth control, management, allocation, and partitioning, according to various embodiments. The storage information is provided via a storage network coupling to at least one storage device of external Storage Network 106. In some embodiments, if more than one storage network and associated storage network coupling is associated with FCM 120A, the particular storage network coupling is specified via a fabric sub-address portion of the cell destination address. Returning storage information follows the flow in reverse.

Service Data Exchange 118 is similar to Client-Service Data Exchange 117. Packet data is read from RAM 153A' (included in SMP Portion $P_{A'}$ 152A'), and cells are forwarded to OLB 160A by a forwarding decision specifying the fabric egress port associated with OLB-Fabric coupling 169A as the cell destination addresses. The packets exchanged by Client-Server Data Exchange 115, and Client-Service Data Exchange 117, and Service Data Exchange 118, are typically but not necessarily IP packets.

In some embodiments, Data Exchanges 115-118 are overlapped or partially concurrent with each other. For example, cells corresponding to a portion of Client-Server Data Exchange 115 traffic may be intermixed with cells relating to Client-Service Data Exchange 117 traffic, as the cells from both data exchanges are coupled via NM-Fabric coupling 139A to the fabric. However, each cell includes sufficient information in the corresponding fabric destination address and other information to specify the proper operation. For example, at NM-Fabric coupling 139A, cells of Client-Server Data Exchange 115 are forwarded to SMP Portion $P_A$ 152A by a first forwarding decision specifying the fabric egress port associated with PMM-Fabric coupling 159A, while cells of Client-Service Data Exchange 117 are forwarded to OLB 160A by a second forwarding decision specifying the fabric egress port associated with OLB-Fabric coupling 169A. Similarly, cells from Client-Service Data Exchange 117 and Service Data Exchange 118 may be intermixed on OLB-Fabric coupling 169A, because sub-port destination address and other information in the cells enable proper processing. In one embodiment, a portion of the sub-port destination address is used to associate packets with a respective input queue within the destination module.

In some embodiments, the termini of Data Exchanges are located in RAM that is directly accessible by one or more processing elements. For example, Service Data Exchange 118 includes a first terminus in RAM 153A', and a second terminus in a RAM within OLB 160A. In typical embodiments, packet data from the RAMs are read and written by DMA logic units included in each of the respective modules. Conceptually, data is streamed from a source RAM as packets, cellified and provided to the fabric, transferred to the egress port as specified by the cells, reassembled, and stored into a destination RAM in packet form. These operations, in some embodiments, are fully overlapped, or pipelined, so that data from a first cell of a packet may be stored into the destination RAM while data from a following cell of the same source packet is being read from the source RAM.

Packet and Process Data Flow

Figure 2:
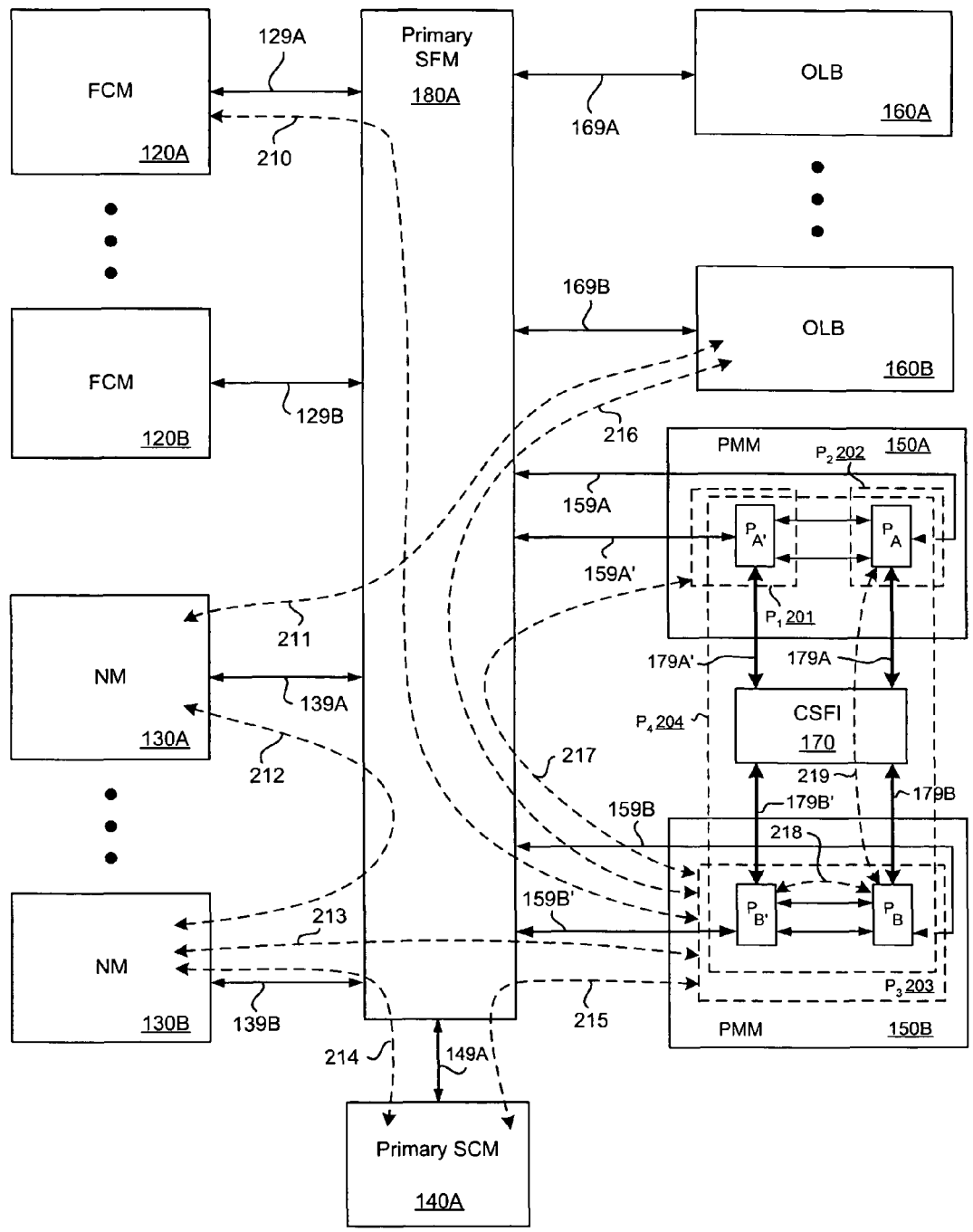
FIG. 2 illustrates various example embodiments of packet and process data flow in an ES embodiment.

FIG. 2 illustrates various example embodiments of packet and process data flow in an ES1 110A embodiment. A plurality of FCMs are illustrated by FCM 120A and FCM 120B, coupled to Primary Switch Fabric Module 180A via FCM-Fabric coupling 129A and FCM-Fabric coupling 129B, respectively. A plurality of NMs are illustrated by NM 130A and NM 130B, coupled to Primary Switch Fabric Module 180A via NM-Fabric coupling 139A and NM-Fabric coupling 139B, respectively. A plurality of PMMs are illustrated by PMM 150A and PMM 150B, coupled to Primary Switch Fabric Module 180A by PMM-Fabric couplings 159A/159A' and PMM-Fabric couplings 159B/159B', respectively. CSFI 170 is coupled to PMM 150A and PMM 150B by CSFI-PMM coupling 179A and CSFI-PMM coupling 179B, respectively. A plurality of OLBs are illustrated by OLB 160A and OLB 160B, coupled to Primary Switch Fabric Module 180A by OLB-Fabric coupling 169A and OLB-Fabric coupling 169B. Note: the Redundant SIM and associated couplings are omitted from the figure for clarity.

It will be understood that each of the active FCMs and NMs of FIG. 2 are typically, but not necessarily, coupled to external devices on external networks as illustrated in FIGS. 1A and 1B. It remains the case that all transport is by conventional Ethernet frames outside the chassis and by fabric frames within the chassis. Nevertheless, when such external devices or networks are involved, the termini of FCM-related and NM-related packet and message data exchanges may be considered from a certain perspective to extend to those external devices. However, even with coupled external devices, exchanges for at least some fabric frames related to system management and control will terminate within the various modules. Furthermore, in certain embodiments and scenarios, including scenarios with external devices, certain non-control data exchanges terminate within the NMs. Specifically, for the case of fabric IP packets unicast to the IP gateway interface on a pseudo port within an NM, the data exchange to the pseudo port terminates within the NM and is not visible externally.

As a first illustrative configuration scenario, PMM 150A is shown configured as two physical partitions, $P_1$ 201, and $P_2$ 202, while PMM 150B is shown configured as a single physical partition $P_3$ 203. As a second illustrative configuration scenario, mutually exclusive with respect to the first configuration scenario, PMM 150A and PMM 150B are shown configured as a single unified physical partition $P_4$ 204.

FCM-PMM Data Exchange 210 is representative of data exchanged between a storage sub-system coupled to an FCM and a PMM, or more specifically a physical partition of a PMM. As illustrated, this traffic is typically storage related messages between processes executing on $P_3$ 203 of PMM 150B (including any of Application, Driver, or OS Processes) and an external storage sub-system (such as SAN 106 of FIG. 1B). In operation, bidirectional message information flows as cellified fabric frames via FCM-Fabric coupling 129A, Primary Switch Fabric Module 180A, and PMM-Fabric coupling 159B. For example, a storage sub-system request is generated by a storage sub-system Driver process executing on $P_3$ 203. The request is formed as a storage sub-system message addressed to the external storage sub-system coupled to FCM 120A, and delivered as cellified fabric frames to Primary Switch Fabric Module 180A via PMM-Fabric coupling 159B. Primary Switch Fabric Module 180A routes the cells to FCM-Fabric coupling 129A.

FCM-Fabric coupling 129A delivers the cellified fabric frames to FCM 120A. In turn the cells of each fabric frame are reconstituted (or reconstructed) into the original storage sub-system message request, which is then sent to the storage sub-system attached to FCM 120A (such as FC Storage Network 106 of FIG. 1B, for example). The storage sub-system returns a response message, which is formed by FCM 120A into one or more fabric messages addressed to $P_3$ 203. The fabric messages are fragmented into fabric frames that are delivered as cells to Primary Switch Fabric Module 180A via FCM-Fabric coupling 129A. Primary Switch Fabric Module 180A routes the cells via PMM-Fabric coupling 159B to $P_3$ 203 of PMM 150B. $P_3$ 203 reconstitutes the cells into fabric frames, then reassembles and delivers the response message to the storage sub-system Driver process executing on $P_3$ 203.

In various embodiments, FCM-PMM Data Exchange 210 may flow via PMM-Fabric coupling 159B' instead of 159B, or it may flow partially via PMM-Fabric coupling 159B and partially via PMM-Fabric coupling 159B'. The operation is similar for these cases, as the fabric messages may be forwarded to $P_3$ 203 via 159B and 159B' with no other change in operation.

NM-OLB Data Exchange 211 is representative of data exchanged between an NM and a service process executing on an OLB. NM 130A receives information; typically but not necessarily in IP packet form, from an external coupled client (such as Client 102 of FIG. 1B), and classifies the packets, in part to determine a subset of the packets to be sent to OLB 160B. Based in part on the classification, an appropriate subset of the information is formed into like-kind fabric packets including the destination address of OLB 160B. An appropriate L2/L3 forwarding decision is made and the fabric packets are then communicated as cells to Primary Switch Fabric Module 180A via NM-Fabric coupling 139A. Primary Switch Fabric Module 180A forwards the cells toward OLB 160B. The cells are ultimately received via OLB-Fabric coupling 169B, reconstituted as packets, and provided directly to the service process executing on OLB 160B. The reverse path is used to transfer information from the service process to the client coupled to NM 130A. Another path may also be used to transfer information from the service process to other destinations, such as an application process executing on a PMM.

In an example of an SSL service process executing on OLB 160B, NM 130A recognizes a variety of SSL IP packet forms during classification, including HyperText Transfer Protocol Secure (HTTPS) as TCP/IP destination port 443, Secure Simple Mail Transport Protocol (SSMTP) as TCP/IP destination port 465, and Secure Network News Transfer Protocol (SNNTP) as TCP/IP destination port 563. IP fabric packets are formed including the destination IP address of OLB 160B. An L3 forwarding decision is made and the IP fabric packets are provided as cells to the fabric and forwarded toward OLB 160B. The SSL service process executing on OLB 160B, upon receiving the reconstituted IP packets, performs SSL service functions such as context switching, state look-up, protocol layer demultiplexing, and decryption.

The SSL service process executing on OLB 160B produces result data based in part on the packets received from the external client via NM 130A. The result data typically includes IP packets that may sent back to the external client via NM 130A (a handshake or acknowledgement, for example) as illustrated by NM-OLB Data Exchange 211 or alternately addressed to $P_3$ 203 (decrypted clear text, for example) as illustrated by PMM-OLB Data Exchange 216. In both cases fabric packets are provided as cells to Primary Switch Fabric Module 180A via OLB-Fabric coupling 169B and forwarded accordingly.

In an example of an SLB service process executing on OLB 160B, NM 130A recognizes TCP SYN packets during classification and forms an IP fabric packet including the destination IP address of OLB 160B. An L3 forwarding decision is made and the IP fabric packet is provided as cells to the fabric and forwarded toward OLB 160B. The SLB service process executing on OLB 160B, upon receiving a reconstituted packet, consults load information for the system, and assigns the request to a relatively unloaded physical partition of a PMM (such as one of $P_1$ 201, $P_2$ 202, and $P_3$ 203), establishing a new connection. The new connection is recorded in the appropriate L3 FIBs, in order for NM 130A to properly forward subsequent IP packets for the new connection to the assigned physical partition, enabling information flow from NM 130A to the assigned physical partition without the need for indirection through OLB 160B.

In one embodiment, SSL and SLB processing may be cascaded. For example, NM 130A forwards cellified encrypted IP packet information from an encrypted external client toward OLB 160B for SSL processing, or decryption. OLB 160B in turn forwards cellified decrypted (clear text) IP packet information to itself, another OLB, or a PMM for subsequent SLB processing. After assignment of a physical partition relating to a new encrypted connection, cellified packets are then forwarded first from NM 130A to OLB 160B for decryption, and then directly to the assigned physical partition.

In an example of an XML service executing on OLB 160B, the service process functions as an XML server. NM 130A identifies XML requests from the external client, and forwards each request, in the form of cellified IP packets, toward OLB 160B, where the XML service process analyzes the request. Appropriate response information is produced and provided as cellified packets forwarded toward NM 130A.

While NM-OLB Data Exchange 211 illustrates data exchange between NM 130A and OLB 160B, this is only an illustrative scenario. For example, during classification, NM 130A may examine a packet (typically but not necessarily an IP packet) received from the client coupled to NM 130A to determine an associated flow, and then selectively determine a destination OLB based on the determined flow (OLB 160A or OLB 160B, as appropriate). This provides a form of service processing load balancing. The destination OLB may also be determined based on the type of service (SLB, SSL, or XML), if a particular OLB includes hardware acceleration specific to a service. For example, in an embodiment where OLB 160A includes an SSL hardware accelerator, while OLB 160B includes an XML hardware accelerator, then IP packets requiring SSL processing are typically directed toward OLB 160A, and IP packets requiring XML processing are typically directed toward OLB 160B. Those of ordinary skill in the art will recognize that destination OLB determination may be performed based on combining service processing load balancing with selection based on hardware accelerator availability and location.

Service processing (such as SLB, SSL, and XML) is not restricted to OLBs, as PMMs and SCMs may also be configured to provide service processing. In these embodiments, NMs take the destination IP address assigned to a physical partition of a PMM (such as $P_1$ 201, $P_2$ 202, or $P_3$ 203, for example) or an SCM (such as Primary SCM 140A, for example) and perform an L3 forwarding decision to provide a fabric destination address in preparation for transit on the fabric as cells. The cells are then forwarded toward the appropriate PMM or SCM where the service process is executing.

NM-NM Data Exchange 212 is representative of data exchanged between NMs. This traffic is exemplary of network traffic between a first external client and a second external client coupled respectively to a port of NM 130A and a port of NM 130B, and wherein ES1 110A performs as a bridge, switch, or router. (Clients such as 102 and 103 of FIG. 1A are representative of the external clients.) The low-level details of the data exchange are substantially similar to NM-OLB Data Exchange 211. A port of NM 130A receives information, typically in packet form, from the first external client (and potentially a plurality of other external sources), and classifies the packets (which may be for a plurality of destinations), in part to determine a subset of the packets to be sent to the port of NM 130B. Based in part on the classification, an appropriate subset of the information is formed into fabric packets destination-addressed to the port of NM 130B. NM 130A makes a forwarding decision that embeds a fabric address into the fabric packet, which is then communicated as cells to Primary Switch Fabric Module 180A via NM-Fabric coupling 139A. Primary Switch Fabric Module 180A forwards the cells toward NM 130B. After arriving at NM 130B the cells are reconstituted as packets, and sent to the second external client coupled to the port of NM 130B. The reverse path is used to transfer information from the second client to the first client, and operates in a symmetric manner.

Under some circumstances, such as multiple clients coupled to one NM via multiple physical network couplings (media ports), an NM (such as NM 130A) may forward data toward itself via the fabric. Operation in this scenario is similar to NM-NM Data Exchange 212, except the packets are addressed to NM 130A, instead of NM 130B. The multiple media ports are distinguished via the sub-address portion of the fabric address.

NM-PMM Data Exchange 213 is representative of IP packets exchanged between an NM and a process (Application, Driver, or OS) executing on a PMM, typically under control of a higher-level protocol, such as Transmission Control Protocol (TCP) or User Datagram Protocol (UDP). The data exchange is substantially similar to NM-OLB Data Exchange 211. NM 130B forms a portion of received information (based on classification) as IP packets addressed to $P_3$ 203. NM 130B executes a forwarding decision on the destination IP address to obtain a fabric destination address in preparation for providing a fabric packet as cells to Primary Switch Fabric Module 180A via NM-Fabric coupling 139B. Primary Switch Fabric Module 180A forwards the cells toward $P_3$ 203. Upon arrival via PMM-Fabric coupling 159B (or alternatively PMM-Fabric coupling 159B'), the cells are reconstituted as IP packets by PMM 150B, and provided to $P_3$ 203. The process transfers information to NM 130B (and typically on to a client coupled to the NM) using the reverse path. A return IP fabric packet is formulated by the process, IP destination-addressed to NM 130B, a corresponding fabric address is obtained from a forwarding decision, and the IP fabric packet is provided as cells to Primary Switch Fabric Module 180A for forwarding toward NM 130B.

NM-SCM Data Exchange 214 is representative of data exchanged between an NM (or a client coupled thereto) and a management, forwarding, or load balancing process executing on an SCM. The data exchange is substantially similar to NM-OLB Data Exchange 211. Packets addressed to Primary SCM 140A are formulated by either an external client coupled to NM 130B or (as an alternative example) by a control plane related process running on the Network Processor of NM 130B. NM 130B forms corresponding fabric packets and a forwarding decision is made to determine the embedded fabric address. The fabric packets are then provided as cells to Primary Switch Fabric Module 180A via NM-Fabric coupling 139B. Primary Switch Fabric Module 180A forwards the cells toward Primary SCM 140A. Upon arrival at Primary SCM 140A via SCM-Fabric coupling 149A, the cells are reassembled as packets by Primary SCM 140A and provided to the management, controlplane, or load balancing process. Examples illustrating these processes are provided in the following paragraphs. The management, controlplane, or load balancing process transfers information back to NM 130B (or a client coupled thereto) using the reverse path. A management packet is addressed to NM 130B (or the client coupled thereto), is formulated by a process executing on SCM 140A, a corresponding fabric packet is formed, and a forwarding decision is made to determine the embedded fabric address. The fabric packet is provided as cells to Primary Switch Fabric Module 180A for forwarding toward NM 130B. Upon arrival at NM 130B, the management packet is reconstructed. If addressed to NM 130B, the packet is consumed therein. If addressed to the external client, the reconstructed packet is provided thereto.

In an example of a management process executing on Primary SCM 140A, a management client coupled externally to NM 130B (typically for remote server management, provisioning, configuration, or other related activities) sends a management related packet via NM 130B with the destination address of the management process executing on Primary SCM 140A. Within NM 130B, the packet is classified and determined to be a management related packet. A forwarding decision is then made and a cellified version of the management packet is forwarded toward the management process via Primary Switch Fabric Module 180A. Return information from the management process to the management client uses the reverse path, by formulation (within SCM 140A) of packets having the destination address of the management client coupled to NM 130B. A forwarding decision is then made and a cellified version of the return information packets are forwarded toward the management client via Primary Switch Fabric Module 180A and NM 130B. Typically but not necessarily, IP packets would be used for the exchange between the management client and process.

In an example of a controlplane process executing on Primary SCM 140A, in some embodiments and under some circumstances NM 130B classification determines that the proper L2 forwarding for a received packet is not known, and designates the received packet is an "exception packet". In one embodiment, NM 130B forwards a cellified version of the exception packet to an L2 FIB management process executing on the Primary SCM via Primary Switch Fabric Module 180A. The L2 FIB management process examines the exception packet, master L2 FIB, and other forwarding related information, to determine the proper fabric address for the missing L2 FIB entry. The updated forwarding information is then recorded in the master L2 FIB, in some embodiments, and propagated to the ancillary L2 FIBs in order for NM 130B to properly forward subsequent packets having the same or similar classification. Primary SCM 140A also provides a correct fabric address for the exception packet and emits an IP fabric packet equivalent to the exception packet (but addressed to the updated fabric address) as corresponding cells to Primary Switch Fabric Module 180A for forwarding to the interface at destination IP address (or at least one hop closer). In this circumstance the fabric destination could be any of the elements coupled to the dataplane of Primary Switch Fabric Module 180A, including NM 130B or Primary SCM 140A (this general data exchange is not illustrated in the figure).

In an example of a load balancing process executing on Primary SCM 140A, operation is similar to the SLB service executing on an OLB, except the IP packets are destination IP addressed to Primary SCM 140A instead of an OLB.

PMM-SCM Data Exchange 215 is representative of data exchanged between an Application, Driver, or OS process executing on a physical partition of a PMM and a management, controlplane, or load balancing process executing on an SCM. The data exchange is substantially similar to the exchanges described elsewhere herein. A PMM-to-SCM communication is formed as a packet addressed to Primary SCM 140A by a Driver process, for example, executing on $P_3$ 203. A fabric packet is formed and a forwarding decision is made to determine the embedded fabric address. The fabric packet is then provided as cells via PMM-Fabric coupling 159B (or 159B'), and forwarded via Primary Switch Fabric Module 180A toward Primary SCM 140A. Upon arrival at Primary SCM 140A and subsequent reassembly, the reassembled packet is provided to the management, controlplane, or load balancing process. The reverse path is used for SCM-to-PMM communication, with the management, controlplane, or load balancing process formulating a packet addressed to $P_3$ 203, for communication to the Driver process.

In an example of the load balancing process executing on Primary SCM 140A, the communication includes server load information relating to PMM 150B. PMM-SCM Data Exchange 215 is also representative of a variety of paths between an SCM and all other elements coupled to the fabric dataplane (such as FCMs, NMs, OLBs, and other PMMs), to update forwarding information maintained in each of the elements. For each element requiring a forwarding information update, the controlplane process executing on Primary SCM 140A formulates one or more packets to include the updated forwarding information and addresses the packet(s) to the appropriate fabric destination. The packets are provided as cells to the fabric and the fabric forwards the cells according to the fabric destination. In another embodiment the fabric destination includes a multicast destination, and the cellified packets are delivered to a plurality of destinations by the fabric.

PMM-OLB Data Exchange 216 is representative of data exchanged between a process (Application, Driver, or OS) executing on a physical partition of a PMM and a service process executing on an OLB. The data exchange is substantially similar to PMM-SCM Data Exchange 215, except that OLB 160B takes the place of Primary SCM 140A, and data is coupled via OLB-Fabric coupling 169B instead of SCM-Fabric coupling 149A.

Data exchanges between processes executing on different physical partitions are communicated on the fabric (PMM-PMM-Fabric Data Exchange 217, for example). Data exchanges between processes executing within the same physical partition are communicated by coherent shared memory and coherent cache memory transactions (PMM-Internal Data Exchange 218, for example). When multiple PMMs are configured as a single physical partition, coherent shared memory and coherent cache memory transactions travel between the PMMs of the partitions via CSFI 170 (PMM-PMM-CSFI Data Exchange 219, for example).

PMM-PMM-Fabric Data Exchange 217 is representative of data exchanged between a first process and a second process executing on different physical partitions, i.e. message-passing InterProcess Communication (IPC). The two processes may be any combination of Application, Driver, or OS processes. The data exchange is substantially similar to PMM-SCM Data Exchange 215, except $P_1$ 201 takes the place of Primary SCM 140A, and data is coupled via PMM-Fabric coupling 159A' instead of SCM-Fabric coupling 149A. Another example of this type of communication would be between $P_1$ 201 and $P_2$ 202, (via PMM-Fabric coupling 159A' and PMM-Fabric coupling 159A) even though these two physical partitions are on the same PMM.

PMM-Internal Data Exchange 218 is representative of data exchanged between two processes executing on the same physical partition, and the physical partition resides entirely within a single PMM. A source process, executing on a first compute element of $P_3$ 203, writes to a shared memory location, and a sink process, executing on a second compute element of $P_3$ 203, reads the shared memory modified by the write. Communication is provided by links internal to PMM 150B supporting coherent shared memory and coherent cache memory.

PMM-PMM-CSFI Data Exchange 219 is representative of data exchanged between two processes executing on the same physical partition, the physical partition spans more than one PMM, and the two processes execute on different PMMs. An example of this physical partition configuration is illustrated as $P_4$ 204, where $P_4$ 204 includes all of the compute elements of PMM 150A and PMM 150B. Coherent shared memory and coherent cache memory transactions are used to exchange data, as in PMM-Internal Data Exchange 218. However, the transactions are communicated via CSFI 170, instead of links internal to the PMMs.

Data exchanges may also occur between processes executing on physical partitions distributed across multiple PMMs via a combination of paths similar to PMM-Internal Data Exchange 218 and PMM-PMM-CSFI Data Exchange 219. That is, particular coherent memory traffic (for both shared memory and cache memory) may travel via both CSFI 170 and via links internal to the PMMs.

Data exchanges involving an NM (such as 211, 212, 213, and 214) typically include Tag processing. Specifically, during ingress processing on an NM, incoming packets from a first client coupled to the NM are classified, producing a condensed representation of certain details of the incoming packet, typically by analyzing the header of the incoming packet. A portion of the classification result is represented by a Tag, and typically a portion of the Tag, referred to as the egress Tag, is included in a header of the fabric packet produced by the NM in response to the incoming packet. The egress Tag may specify selected packet processing operations to be performed by the NM during egress processing, thus modifying the packet header, data, or both, before receipt by a second client. Egress packet processing may be performed in response to the corresponding Tag produced during ingress processing (in the NM that did the ingress processing on the packet) or in response to a Tag 'manufactured' by a service process on an OLB or an Application, Driver, or OS process executing on a PMM. In one embodiment egress processing is specified directly by the Tag, and in another embodiment egress processing is determined indirectly by the Tag (via a table look-up, for example).

As an example, during NM-OLB Data Exchange 211, in the case of an SSL service process, the egress Tag provided may include information examined by the SSL process in order to perform any combination of SSL processing related context switching, SSL related per context state look-up, and early protocol layer demultiplexing.

As another example, during NM-SCM Data Exchange 214, in the case of a routing process, the exception packet delivered to the routing process may include an egress Tag providing exception information to determine a particular Quality of Service (QoS) for the associated routing protocol. The routing process examines the exception information of the egress Tag to determine the particular route processing queue to insert the exception packet into.

In one embodiment, Primary Switch Fabric Module 180A provides for only a single transport of cells at a time between any pairing of ingress and egress ports. In another embodiment, Primary Switch Fabric Module 180A provides for a plurality of simultaneous transports of cells between multiple pairings of fabric ingress and egress ports. This simultaneous transport may be by parallel communication paths available in the fabric, by interleaving cells from different transports in time on a single communication path, or any combination of these and other techniques. Those of ordinary skill in the art will recognize that the details of Primary Switch Fabric Module 180A operation affect only the available bandwidth and latency provided by the fabric, not details of data exchanges as exemplified by FCM-PMM Data Exchange 210, NM-OLB Data Exchange 211, and so forth. In one embodiment, Primary Switch Fabric Module 180A includes sufficient parallel resources to provide substantially simultaneous communication for all of the data exchanges illustrated in the figure.

Packet Transmission and Reception

Figure 3A:
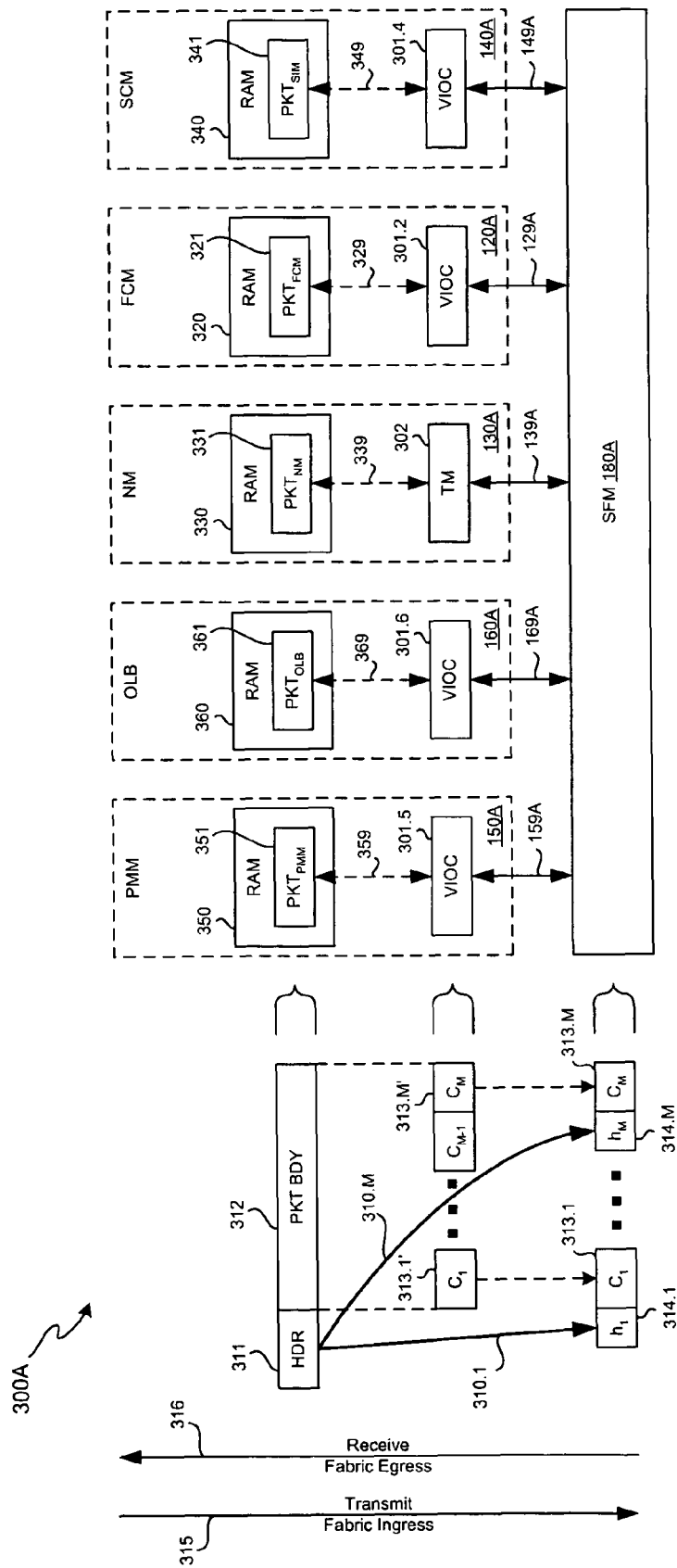
FIG. 3A illustrates selected aspects of an embodiment of packet transmission and reception in an ES embodiment.

FIG. 3A illustrates Fabric Communication 300A, conceptually showing selected aspects of an embodiment of packet transmission and reception in an ES embodiment, used in FCM-PMM Data Exchange 210 and other similar data exchanges described elsewhere herein. Fabric client elements coupled to Primary Switch Fabric Module 180A include PMM 150A, OLB 160A, NM 130A, FCM 120A, and Primary SCM 140A. Each coupled client includes RAM, shown respectively as PMM RAM 350, OLB RAM 360, NM RAM 330, FCM RAM 320, and SCM RAM 340. Each RAM in turn includes a packet memory image, shown respectively as Packet Memory Image $PKT_{PMM}$ 351, Packet Memory Image $PKT_{OLB}$ 361, Packet Memory Image $PKT_{NM}$ 331, Packet Memory Image $PKT_{FCM}$ 321, and Packet Memory Image $PKT_{SCM}$ 341. A VIOC is included in each of PMM 150A, OLB 160A, FCM 120A, and Primary SCM 140A, illustrated as VIOC 301.5, VIOC 301.6, VIOC 301.2, and VIOC 301.4, respectively. The VIOCs are shown conceptually coupled to corresponding packet images as dashed arrows 359, 369, 329, and 349, respectively. The VIOCs provide an interface to the fabric via PMM-Fabric coupling 159A, OLB-Fabric coupling 169A, FCM-Fabric coupling 129A, and SCM-Fabric coupling 149A, respectively.

NM 130A includes a Traffic Manager (TM 302), also known as a Buffer and Traffic Manager (BTM) instead of a VIOC. The TM is shown conceptually coupled to Packet Memory Image $PKT_{NM}$ 331 via dashed arrow 339. TM 302 provides an interface for NM-Fabric coupling 139A.

Data is exchanged between fabric clients (modules on the fabric) by procedures of packet transmission, routing (as cells) on the fabric, and packet reception. Arrow 315 conceptually shows the direction of flow for packet transmission to the fabric, also referred to as ingress to the fabric, while arrow 316 conceptually shows the direction of flow for packet reception from the fabric, also referred to as egress from the fabric. Conceptually, packet transmission begins at the source fabric client by reading a packet image from a source RAM and providing the packet as cells for transmission via the fabric. The fabric routes the cells to the appropriate destination fabric client. Packet reception conceptually begins at the fabric edge of the destination fabric client, where the cells are received from the fabric and reassembled into a corresponding packet (including information from the packet image as read from the source RAM) and written into a destination RAM in the destination fabric client.

Each of TM 302 and the VIOCs (301.5, 301.6, 301.2, and 301.4) comprise various logic blocks, including a fabric interface communication unit (also known as a packet-cell converter) for performing the functions relating to packet transmission and packet reception via cells on the fabric. The fabric communication operation of all fabric clients (PMM 150A, OLB 160A, NM 130A, FCM 120A, and Primary SCM 140A) is substantially similar, but for clarity is described in a context of data exchanged between PMM 150A and NM 130A (such as NM-PMM Data Exchange 213, for example).

For a packet transmission operation, the fabric interface communication units read a packet image from a RAM included in a fabric client (such as Packet Memory Image $PKT_{PMM}$ 351 included in PMM RAM 350). The packet image includes a header and packet body data, illustrated as Header 311 and Packet Body 312 respectively. The fabric interface communication unit (included in VIOC 301.5 in this example) conceptually segments the packet into a plurality of cells of equal length, illustrated as Cell $C_1$ 313.1' through Cell $C_{M-1}$ 313.(M−1)'. The final Cell $C_M$ 313.M' is typically a different length than the other cells as packets are not restricted to integer multiples of cell sizes. Although illustrated as contiguous in RAM, the packet body data may instead be scattered in various non-contiguous buffers in RAM, according to various embodiments.

Each of the cells are encapsulated with headers, illustrated as Cell Header $h_1$ 314.1, corresponding to Cell $C_1$ 313.1, and Cell Header $h_M$ 314.M corresponding to Cell $C_M$ 313.M. The cell headers for each of the cells segmented from a given packet are determined in part from the packet header, as shown conceptually by arrow 310.1 and arrow 310.M flowing from Header 311 to Cell Header $h_1$ 314.1 and to Cell Header $h_M$ 314.M respectively. Each of the resultant encapsulated cells is provided, in order, to the fabric for routing to the destination. Segmenting the packet into cells and encapsulating the cells is also referred to as "cellification".

Header 311 includes a packet destination address, and VIOC 301.1 determines a cell destination address in part from the destination address of the packet header in addition to routing tables and state information available to the VIOC. The cell destination address, also known as a fabric destination or egress port address, is included in each of the cell headers (Cell Header $h_1$ 314.1 through Cell Header $h_M$ 314.M).

This technique enables a process executing on a fabric client to transparently address a packet to another fabric client using a logical address for the addressed client. The resolution of the packet address to a fabric egress port address corresponds to resolving the logical address to a physical address, i.e. a specific port of the switch that the addressed client is coupled to.

The reverse direction receive path operates in a complementary, conceptually symmetric, inverse manner. The segmented cells are routed by the fabric, in order, to the fabric port specified by the cell destination address. The fabric interface communication unit included in the destination fabric client receives the cells, processes the headers, and reconstitutes (or reconstructs) the cells into a packet image in RAM, resulting in a packet image substantially similar to the packet image originally provided by the transmitting fabric client. Continuing with the example, if the destination address of Packet Memory Image $PKT_{PMM}$ 351 resolves to NM 130A, then the cells are routed to NM-Fabric coupling 139A by Primary Switch Fabric Module 180A. TM 302 receives the cells via NM-Fabric coupling 139A, assembles them back into a packet, and stores the resultant image as Packet Memory Image $PKT_{NM}$ 331 in NM RAM 330.

Those of ordinary skill in the art will recognize that packet transmission and reception procedures are not limited to complete packet images in RAM. For example, on an NM, packet information flowing to the fabric may be provided, in some embodiments, directly from a network interface included on the NM, without intermediate storage in RAM. Similarly, packet information flowing from the fabric may, in some embodiments, be provided directly to the network interface without intermediate storage in RAM. The same techniques may be used on an FCM with respect to information flowing to and from the storage interface. Those of ordinary skill in the art will also recognize that the sans-header intermediate cells, Cell $C_1$ 313.1' through Cell $C_M$ 313.M', are only conceptual in nature as some embodiments implement cellification without copying packet data. Instead, packet data is accessed in-situ in cell-sized chunks and encapsulation performed on-the-fly.

The fabric interface communication units included in TMs and VIOCs further include logic adapted to allocate and manage bandwidth and priority for various flows as identified by any combination of classification information, Tag, and a sub-port portion of a fabric egress port address. This enables provisioning of bandwidth and setting of priorities for transport according to operational requirements.

In one embodiment, the particular priority at which transport is performed is selectively determined by examination of the sub-port portion of the fabric egress port address. For example, NM 130A may be configured with a high-priority queue and a low-priority queue, having corresponding high-priority and low-priority sub-port addresses. With respect to NM-PMM Data Exchange 213, for example, a portion of the data exchange may be performed via the low priority queue and another portion performed via the high-priority queue. A process desiring selective access to the high-priority queue and low-priority queue addresses packets accordingly, providing a corresponding high-priority packet destination address to high-priority packets and a corresponding low-priority packet destination address to low-priority packets.

During transmission to the fabric, the high-priority packet address and the low-priority packet address are resolved by the appropriate VIOC on PMM 150B to a corresponding high-priority fabric egress port address and a corresponding low-priority egress port address. The high-priority egress port address and the low-priority egress port address include a fabric port number sub-portion that is identical for the two egress port addresses, since both packets are destined to the same pluggable module. However, the sub-port portion is different to distinguish between high and low priorities.

Upon receipt in the NM of high-priority cells and low-priority cells (corresponding to cells from packets addressed to the high-priority queue and the low-priority queue, respectively), the TM on NM 130A examines the sub-port portion of the fabric egress port addresses provided with each cell, and selectively identifies packets as associated with the high-priority queue or the low-priority queue as appropriate.

In another embodiment, the sub-port portion may also include a bandwidth allocation portion to identify one of a plurality of bandwidth allocations to associate with the packet assembled from the cell. Still other embodiments provide for combining priority and bandwidth allocation dependent processing according to the sub-port portion of the fabric egress port address. Those of ordinary skill in the art will recognize that these techniques are not limited to communication between NMs and PMMs as in the example, but may be used between all modules operating as fabric clients (such as FCMs, SCMs, and OLBs). FCMs, for example, may provide for allocation of bandwidth to various coupled storage devices or networks via the sub-port mechanism.

In one embodiment, the fabric interface communication units of TMs and VIOCs provide hardware support for a reliable message protocol in addition to packet communication. State machines implement a connection-oriented procedure including establishing a connection via a connection request and a corresponding acknowledgement, sending and receiving one or more messages using the established connection, and terminating the connection after it is no longer needed. Delivery of message content is guaranteed, using a limited number of retries, otherwise an error is returned to the sender. In operation, message images are constructed similar to packet images, with an indicator included in the message image identifying the image as a message instead of a packet. The message image includes a message header, similar in format to a packet header, and message body data, similar to packet body data. The message body data is communicated in the same manner as packet body data. The message header includes a message destination similar in format to a packet destination address. The message destination address is resolved into a cell destination address for inclusion in the cells during cellification, similar to the resolution of a packet destination address.

Figure 3B:
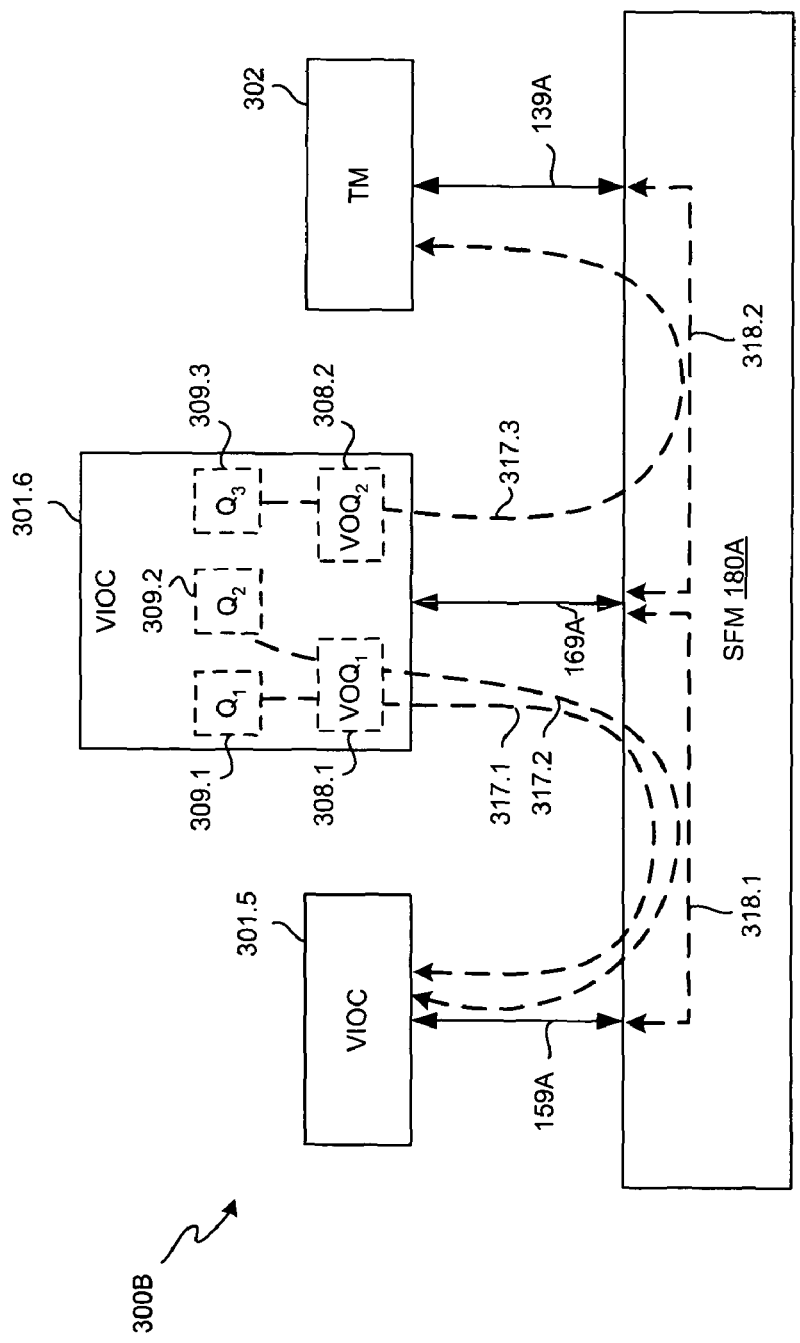
FIG. 3B illustrates selected aspects of an embodiment of packet and cell prioritized transmission in an ES embodiment.

FIG. 3B illustrates Prioritized Fabric Communication 300B, conceptually showing selected aspects of an embodiment of packet and cell prioritized transmission in an ES embodiment, focusing on transports originating from a VIOC. VIOCs 301.5 and 301.6, along with TM 302, are coupled to Primary Switch Fabric Module 180A, via couplings 159A, 169A, and 139A, respectively. A VIOC typically is closely associated with 16 groups of four transmit queues each, providing a total of 64 transmit queues. Here in this initial illustrative embodiment the transmit queues are conceptualized as existing within the VIOC. In a later discussed illustrative embodiment, the transmit queues physically reside in shared portions of the host memory, although their state is managed within the VIOC and portions are buffered within the VIOC.

A subset of three transmit queues are shown conceptually in VIOC 301.6, as $Q_1$ 309.1, $Q_2$ 309.2, and $Q_3$ 309.3. Each transmit queue is configurable as operating according to a specified priority or according to a specified bandwidth. For example, $Q_1$ 309.1 may be configured to operate at a strictly higher priority than $Q_2$ 309.2 and $Q_3$ 309.3, or the queues may be configured to operate in a round-robin priority with respect to each other. As another example, $Q_1$ 309.1 may be configured to operate at twice the bandwidth of $Q_2$ 309.2 and $Q_3$ 309.3. As another example, $Q_1$ 309.1 may be configured for a first maximum bandwidth and a first minimum bandwidth, $Q_2$ 309.2 may be configured for a second maximum and a second minimum bandwidth, and $Q_3$ 309.3 may be configured for third maximum and minimum bandwidths. Those of ordinary skill in the art will recognize that many other priority and bandwidth schemes are possible.

In addition to transmit queues, VIOCs typically implement virtual output queues (VOQs) to prevent head of line blocking, in order to maximize the bandwidth of transmission to the fabric. In an illustrative embodiment discussed herein below, the VOQs are implemented as pointer managed buffers within an egress shared memory internal to the VIOC. A subset of VOQs in VIOC 301.6 are illustrated as $VOQ_1$ 308.1 and $VOQ_2$ 308.2, one for each of the two illustrated destinations (VIOC 301.5 and TM 302). The VOQs are processed according to configurable priority algorithms, including a straight (or strict) priority algorithm, a straight round-robin algorithm (without weights), a weighted round-robin algorithm, and a weighted round-robin algorithm with configurable weights, according to embodiment.

In operation, a transmit queue selection is made according to the configured priority and bandwidth. Data is then made available from the selected queue accordingly, and provided to the fabric for transfer to the destination according to the virtual output queue associated with the destination. These procedures repeat as long as any of the queues are not empty. In the example, one of $Q_1$ 309.1, $Q_2$ 309.2, and $Q_3$ 309.3 is selected, and then examined to determine the next packet (or message) to transmit. For illustrative purposes, $Q_1$ 309.1 is configured as the highest priority, $Q_2$ 309.2 is the next highest priority, and $Q_3$ 309.3 is configured as the lowest priority.

A first selection and subsequent transmission, shown conceptually as Packet Transmission Path 317.1, is made from $Q_1$ 309.1, as it is configured as the highest priority, and includes at least one packet ready for transmission. Data is read according to $Q_1$ 309.1, and determined to be destined for the fabric egress port associated with PMM-Fabric coupling 159A. Data is transferred to Primary Switch Fabric Module 180A under the control of $VOQ_1$ 308.1, and further transferred to PMM-Fabric coupling 159A.

Subsequently, a second selection and transmission, shown conceptually as Packet Transmission Path 317.2, is made from $Q_2$ 309.2, as it is configured as the next highest priority, it includes at least one packet ready for transmission, and $Q_1$ 309.1 is empty. Data is read according to $Q_2$ 309.2, determined to be destined for PMM-Fabric coupling 159A, provided to Primary Switch Fabric Module 180A under the control of $VOQ_1$ 308.1, and transferred to PMM-Fabric coupling 159A.

Subsequently, a third selection and transmission, shown conceptually as Packet Transmission Path 317.3, is made from $Q_3$ 309.3, as it is configured as the lowest priority, it is not empty, and $Q_1$ 309.1 and $Q_2$ 309.2 are empty. Data is read according to the selected transmit queue ($Q_3$ 309.3) as in the previous two scenarios, but the destination is determined to be the fabric egress port associated with NM-Fabric coupling 139A, and therefore data is provided to the fabric under the control of $VOQ_2$ 308.2.

Although the three selections and transmissions corresponding to Packet Transmission Paths 317.1, 317.2, and 317.3 have been described as occurring strictly sequentially, transmission of data from differing virtual output queues may instead be interleaved on the fabric. For example, transmission of data from $VOQ_1$ 308.1 (such as Packet Transmission Paths 317.1 or 317.2) may overlap in time with the transmission of data from $VOQ_2$ 308.2 (such as Packet Transmission Path 317.3). In this circumstance, cells from the overlapping transmissions are wholly or partially interleaved on the fabric.

In addition to prioritized selection among the transmit queues, the switch fabric also typically provides for prioritized transport. Each cell may specify a priority, and in one embodiment there are four priority levels available. The cell priority is developed from any combination of various parameters, including packet size, packet type, packet class of service, packet quality of service, transmit queue priority, and other packet header information. As shown in the figure, Cell Transmission Path 318.1 provides for transmission of cells from VIOC 301.6 to VIOC 301.5, and Cell Transmission Path 318.2 provides for transmission of cells from VIOC 301.6 to TM 302. Each of Paths 318.1 and 318.2 may transfer cells according to any of the four priorities. For example, cells corresponding to Packet Transmission Path 317.1 may be transferred at the highest priority, while cells corresponding to Packet Transmission Path 317.2 may be transferred at a lower priority.

Those of ordinary skill in the art will recognize that these described scenarios are examples only, as entries in the transmit queues may be destined for any of the egress ports of the fabric, and therefore any of the corresponding VOQs. In addition, dynamic transmit queue priorities (such as round-robin) and bandwidth allocation associated constraints and processing may result in data from various transmit queues being intermingled in various VOQs, although all of the data for a given packet will necessarily be present in the same VOQ, since the packet is destined for only a single fabric egress port. Furthermore, fabric transport priorities may vary amongst entries in the VOQs, such that the switch fabric traffic typically appears intermixed and complicated.

Pluggable Modules

FIGS. 4A-4E illustrate various embodiments of pluggable modules included in various ES embodiments. The modules share many similar characteristics. For example, each of the modules includes a fabric interface communication unit included in a TM or a VIOC. Each of the modules typically includes one or more computation and memory elements. Couplings between elements of the modules typically operate in the same or substantially similar fashion. These similarities are illustrated by common element presentation and identification, as follows.

RAM elements are shown with identifiers prefixed with 411, and these elements are typically Dynamic Random Access Memories (DRAMs) organized as Dual Inline Memory Modules (DIMMs) in some embodiments. CPU elements are shown with identifiers prefixed with 410, and these elements are typically Opteron processors. VIOC identifiers are prefixed with 301. Elements representing combined Ternary Content Addressable Memory (TCAM) and Static Random Access Memory (SRAM) identifiers are prefixed with 403. BMC elements are prefixed with 402. FCI elements are prefixed with 413, and the associated optional coupling identifiers are prefixed with 414. HT sub-modules are identified as prefixed with 424. HyperTransport (HT) channel couplings are shown with identifiers prefixed with 460.

Those of ordinary skill in the art will recognize that while the aforementioned elements shown with common prefix identifiers are closely related to each other in operation and function, they are not identical, and may differ in various characteristics. Differences may include size, organization, bandwidth, capacity, or speed, according to embodiment. Such differences have no effect on the overall operation of the associated pluggable module.

Figure 4A:
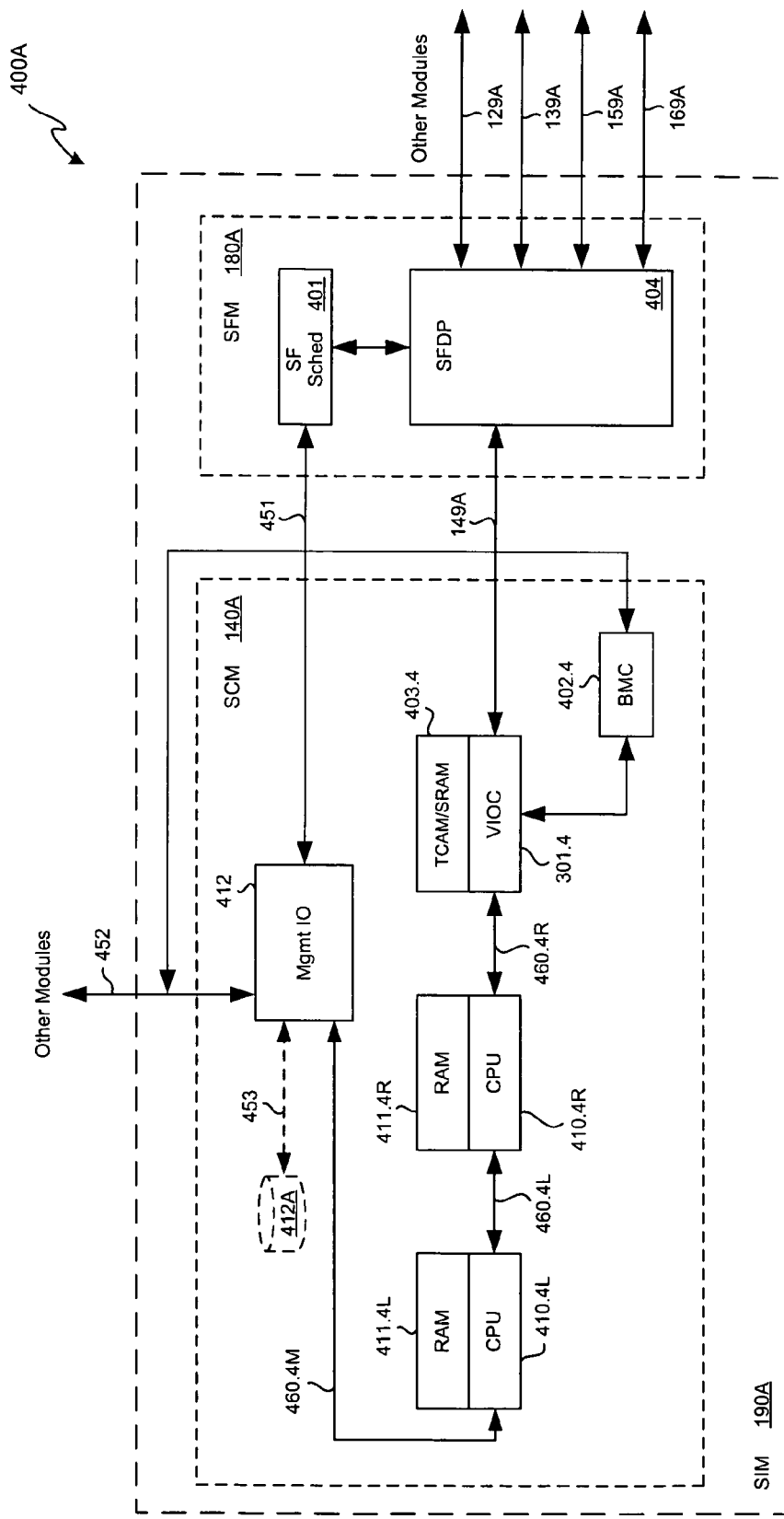
FIG. 4A illustrates selected aspects of an embodiment of a System Intelligence Module (SIM) configured as a pluggable module including a System Control Module (SCM) and an associated Switch Fabric Module (SFM).

FIG. 4A illustrates SIM Detail 400A, including selected aspects of an embodiment of a SIM configured as a pluggable module including an SCM and an associated SFM. It will be understood that the discussion of FIG. 4A is made with respect to the capabilities and topology of the primary SIM and primary fabric, but the discussion equally describes the redundant topology and latent capabilities of the secondary SIM and secondary fabric. As discussed elsewhere herein, the secondary fabric remains dormant with respect to non-control dataplane functionally as long as the primary fabric operates properly. Primary SCM 140A includes compute and associated memory elements CPU 410.4L/RAM 411.4L coupled to CPU 410.4R/RAM 411.4R via HT coupling 460.4L. VIOC 301.4 is coupled to CPU 410.4R via HT coupling 460.R. VIOC 301.4 is in communication with TCAM/SRAM 403.4. and provides a fabric interface for SCM-Fabric coupling 149A. Management I/O 412 is coupled to CPU 410.4L via HT coupling 460.4M and provides an interface to the intra-chassis BMCs via coupling 452. Primary SCM 140A also includes BMC 402.4 coupled to VIOC 301.4 and Management I/O 412. As discussed in more detail later herein, Mass Storage 412A is coupled to Management I/O 412 via coupling 453 and provides local mass storage.

Primary Switch Fabric Module 180A includes Primary SFM Dataplane (SFDP) 404 having a plurality of fabric ports with respective fabric port addresses. The fabric ports are coupled to the various system modules via SCM-Fabric coupling 149A, FCM-Fabric coupling 129A, NM-Fabric coupling 139A, PMM-Fabric coupling 159A, and OLB-Fabric coupling 169A. Each module in the system may be coupled to one or more of the fabric ports and at least some of the foregoing illustrated fabric couplings represent more than one full-duplex fabric coupling to the Primary Switch Fabric Module 180A. For example, in one embodiment, there maybe up to two PMMs and each PMM has two full-duplex fabric couplings. Thus PMM-Fabric coupling 159A may be representative of four full-duplex fabric couplings to four respective fabric ports, each having a respective fabric port address. Each module or portion thereof having its own fabric coupling to a fabric port is addressable via the corresponding fabric port address. Primary Switch Fabric Module 180A also includes Primary Switch Fabric Scheduler 401 coupled to Primary SFDP 404.

In operation, SFDP 404, under the direction of Switch Fabric Scheduler 401, routes data as cells provided to a fabric ingress port to a fabric egress port, according to a cell destination address, as described elsewhere herein. Each of dataplane couplings 149A, 129A, 139A, 159A, and 169A couples with a respective fabric ingress port and a respective fabric egress port.

Primary SCM 140A executes any combination of management, controlplane, and load balancing processes using compute and memory resources provided by CPU 410.4L/RAM 411.4L and CPU 410.4R/RAM 411.4R. The CPUs operate as a single SMP complex, communicating shared memory coherency and cache memory coherency transactions via HT coupling 460.4L.

VIOC 301.4 operates as an intelligent I/O device responding to commands from the CPUs, typically originating from a Driver process. A Driver process executing on one of the CPUs forms a packet image in one of the RAMs, including specifying a destination address for the packet, and then notifies the VIOC that a new packet is available for transmission. In response, the VIOC fabric interface communication transmit unit directly accesses the packet image from RAM via an included transmit Direct Memory Access (DMA) unit. The VIOC examines the packet header and identifies the packet destination address. The transmission of packets as cells proceeds without direct assistance from any of the processes executing on the CPUs. The packet address and other associated information are referenced in accessing forwarding and state information maintained in TCAM/SRAM 403.4 to determine the corresponding fabric egress port address and other related information for inclusion in headers of cells provided to the fabric to transmit the packet as cells.

VIOC 301.4 also operates as an intelligent I/O device in the reverse direction, in a conceptually symmetric fashion. Cells are received from the fabric and reassembled as packets by the VIOC fabric interface communication receive unit. In one embodiment the packet data is partially reassembled directly into a packet image stored in one of the RAMs via an included receive DMA unit. The reception of packets as cells proceeds without direct assistance from any of the processes executing on the CPUs. The VIOC notifies one or more of the CPUs that new packet data is available, and subsequently a process, typically a Driver process, accesses the packet image provided in RAM and processes it accordingly.

The management process (or processes) executing on the CPUs of Primary SCM 140A communicate management and configuration control information via Management I/O 412 between Primary SCM 140A and other modules via coupling 452 coupled to BMCs included in PMM 150A, NM 130A, FCM 120A, OLB 160A, and Primary SCM 140A (local BMC 402.4). This communication is typically via a dedicated management Ethernet network, and is consequently out-of-band with respect to Primary Switch Fabric Module 180A. BMC 402.4 provides baseboard management functions, communicating with Management I/O 412 and VIOC 301.4. The processes executing on the CPUs of Primary SCM 140A collect selected management information from all BMCs in the server and in response to the collected information and provisioning commands received from elsewhere, provide management and configuration commands to the BMCs. Management I/O 412 also communicates configuration and control information via coupling 451 between management and controlplane processes executing on the CPUs and Switch Fabric Scheduler 401. This provides, for example, for static or dynamic configuration of the SCMs, one as the Primary SCM and the other as the Redundant SCM.

In selected embodiments, a mass storage device (such as Mass Storage 412A) or storage network interface is available locally to provide boot images, management information, provisioning information, or log file storage. Mass Storage 412A may include any combination of mass storage device types including Flash memory, Magnetic Disk memory, and Optical Disk memory. The mass storage devices may be coupled via any combination of storage interface types including but not limited to PC Card, Compact Flash, Multi-Media Card, Memory Stick, Smart Card, Secure Digital, Universal Serial Bus (USB), FireWire (also knows as "1394"), SCSI (Small Computer System Interface), IDE (Integrated Device Electronics), EIDE (Enhanced IDE) and variations and successors thereof. In other embodiments, the local mass storage is omitted, and this data is accessed from mass storage devices or networks remotely via FCMs 120 or NMs 130.

Figure 4B:
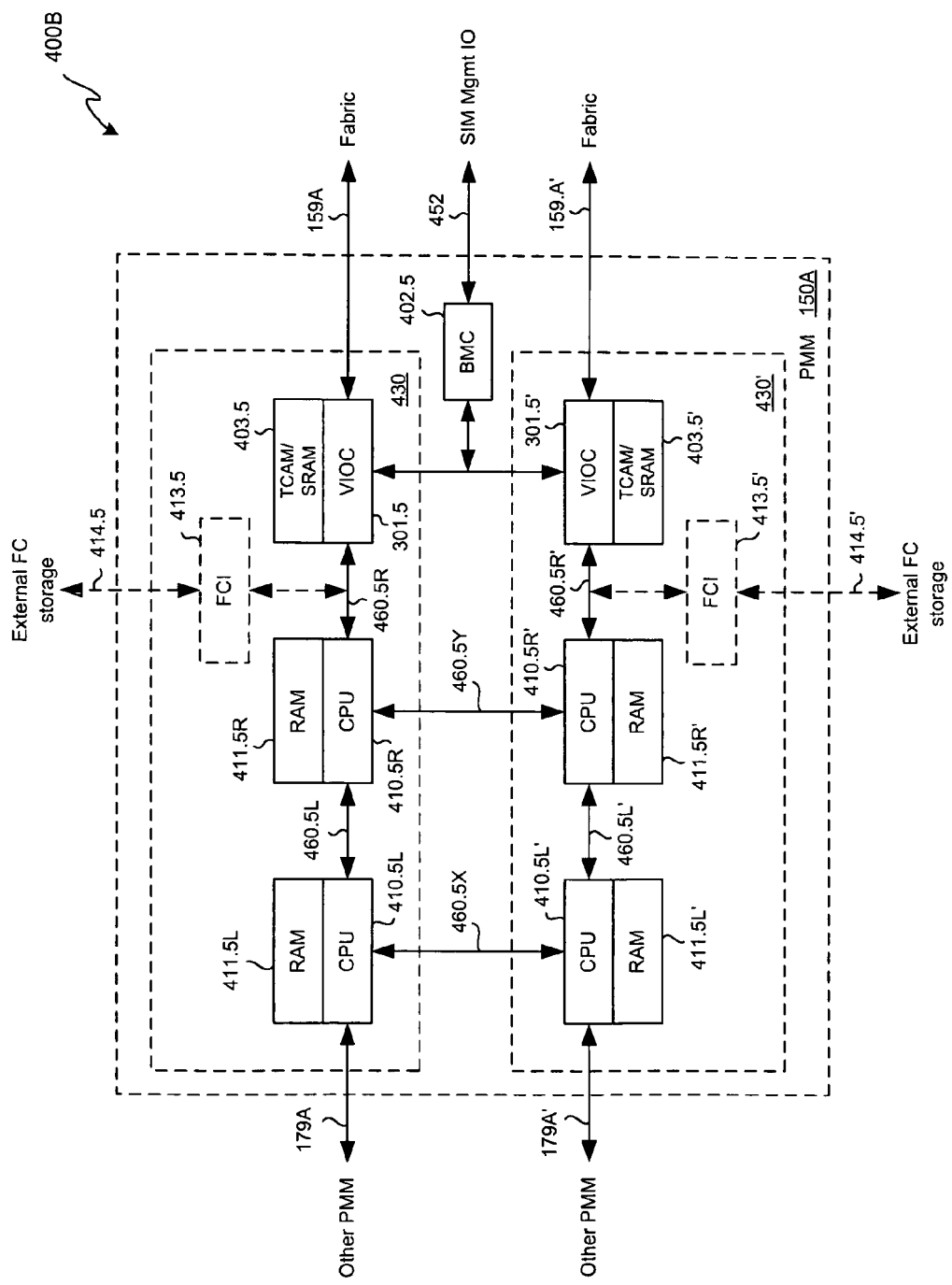
FIG. 4B illustrates selected aspects of an embodiment of a Processor Memory Module (PMM) configured as a pluggable module.

FIG. 4B illustrates PMM Detail 400B, including selected aspects of an embodiment of a PMM configured as a pluggable module. The PMM is arranged as a pair of identical sections, Half-PMM 430 and Half-PMM 430'. Each section includes two CPU/RAM elements coupled to each other by HT links, a VIOC/TCAM/SRAM element interfacing to a fabric coupling, and an optional FCI. The coupling of these elements is substantially similar to corresponding elements of Primary SCM 140A, except that Management I/O 412 is omitted. The two Half-PMMs share BMC 402.5.

The two Half-PMMs are coupled to each other by a pair of HT links (HT coupling 460.5X and HT coupling 460.5Y). One of the CPUs of each half also provides an HT interface for coupling to another PMM (such as PMM 150B of FIG. 2) via CSFI-PMM coupling 179A and CSFI-PMM coupling 179A'. As discussed in more detail below, in one embodiment these couplings are coupled directly to another identically configured PMM, and in other embodiments these couplings are coupled indirectly to another PMM via CSFI 170 (with variations illustrated in FIG. 1A and FIG. 2). Shared memory coherency and cache memory coherency transactions are communicated over the HT couplings internal to the PMM (460.5L, 460.5X, 460.5L', and 460.5Y) and over HT couplings external to the PMM (179A, and 179A').

The HT couplings communicating shared memory coherency and cache memory coherency transactions and CSFI 170 are programmatically configurable to provide for physical partitioning of the CPU/RAM elements of PMMs. The PMM is configured as a single 4-way physical partition by programming the internal HT links (460.5L, 460.5X, 460.5L', and 460.5Y) for coherent operation, and programming the external HT links (179A, and 179A') for "isolated" operation (i.e. links 179A and 179A' are disabled). In another embodiment, isolating a PMM for configuration as a single 4-way physical partition (or as two 2-way physical partitions) is performed by programmatically configuring CSFI 170 (of FIG. 1A) to isolate the PMM from other PMMs.

The PMM is configured as a pair of identical 2-way physical partitions (Half-PMM 430 and Half-PMM 430') by programmatically configuring a portion of the internal HT links (460.5L, and 460.5L') for coherent operation, and another portion of the internal HT links (460.5X, and 460.5Y) for isolated operation. The external HT links (179A, and 179A') or CSFI 170 are also programmed for isolated operation.

A plurality of PMMs are configured as a single unified 8-way physical partition by programmatically configuring all of the internal and external HT links of all of the PMMs (and also CSFI 170, depending on the embodiment) for coherent operation. Those of ordinary skill in the art will recognize that an arbitrary number and arrangement of physical partitions may be configured from PMMs 150, as limited only by the available resources, using the techniques described.

In operation, each PMM is programmatically partitioned according to provisioning information. Physical partitions can be established that have one-half of a PMM (2-way), a single PMM (4-way), or two PMMs (8-way). It will be understood that the number of SMP-ways per half of a PMM is merely illustrative and not limiting as is the configurable topology for aggregation of SMP-ways. Application, Driver, and OS processes are executed on the resultant physical partitions. Each resultant physical partition always includes at least one VIOC. The VIOC provides for communication between the executing processes and other clients of the fabric via packet images in memory, operating as described elsewhere herein.

In selected embodiments, one or both of optional FCIs 413.5 and FCIs 413.5' are included, to access boot images or related information, via couplings 414.5 and 414.5' and FCIs 413.5 and 413.5', from either a local mass storage device or via a mass storage network. In some embodiments, an FCI implements four FC ports (i.e. each of couplings 414.5 and 414.5' are representative of four FC ports) and includes an interface between an HT link (such as HT coupling 460.5R) and a pair of included Peripheral Component Interconnect (PCI)-X interfaces coupled to an included Media Data Card (MDC) connector. The MDC connector is in turn coupled to an included Fibre Channel Daughter Card (FCDC) implementing the four FC ports. According to other embodiments, an FCI implements a single FC port or a pair of FC ports. In other embodiments, the optional FCIs are omitted, and mass storage data is accessed via the fabric from mass storage devices or networks via fabric-coupled FCMs 120 or NMs 130 (see the Storage Gateway section, elsewhere herein).

As suggested by the CSFI variations illustrated by FIGS. 1A and 2, those of ordinary skill in the art will recognize that CSFI 170 may be wholly or partially implemented on the SIM, on the PMM, on a separate module, or any combination of SIM, PMM, and separate module, or any other convenient location. The coherent switch functionality may be implemented in conjunction with the HT links on the PMM, or implemented independently of these functions without substantially modifying the operation. In some embodiments, CSFI 170 is limited to interconnect operating in conjunction with coherency and switching logic implemented internal to the CPU elements included on the PMMs. In other embodiments, CSFI 170 includes some portion of coherency and switching logic operating in conjunction with coherency and switching logic included on the PMMs.

Figure 4C:
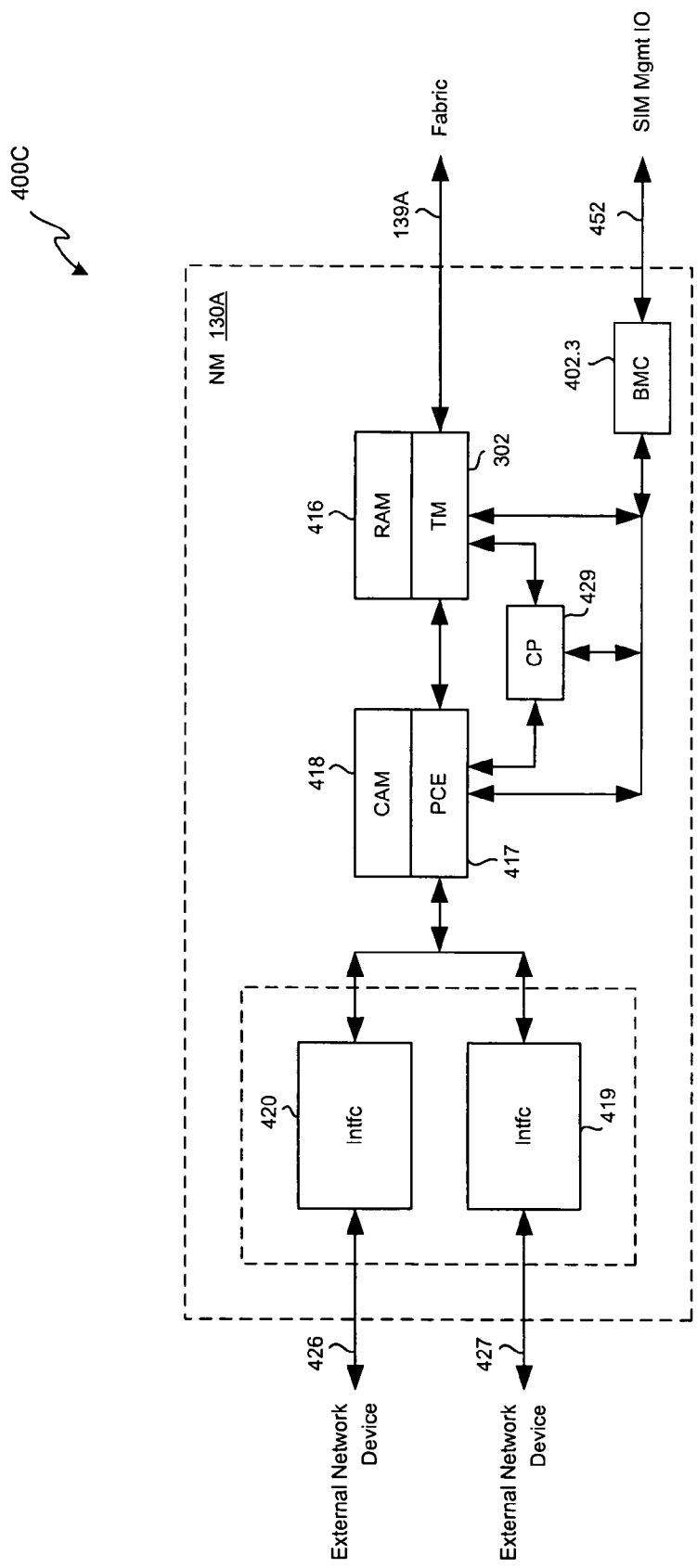
FIG. 4C illustrates selected aspects of an embodiment of a Network Module (NM) configured as a pluggable module.

FIG. 4C illustrates NM Detail 400C, including selected aspects of an embodiment of a Network Module (NM) configured as a pluggable module. NM 130A includes media interface hardware specific to a particular type of network coupling (Interfaces 420 and 419 for couplings 426 and 427, respectively), coupled to network processing elements adapted for packet processing, including Packet Classification and Editor (PCE 417) and associated CAM 418, coupled in turn to Traffic Manager (TM 302). TM 302 is in communication with RAM 416, and provides a fabric interface for NM-Fabric coupling 139A. Control Processor (CP) 429 is coupled to PCE 417 and TM 302. NM 130A also includes BMC 402.3, coupled to CP 429, PCE 417 and TM 302. The BMC provides an interface for coupling 452. While the illustrated embodiment shows CP 429 coupled to Management I/O 412 indirectly via BMC 402.3, in alternate embodiments the CP is coupled to the Management I/O via a coupling shared with the BMC, and in further alternate embodiments the CP is coupled to the Management I/O via a dedicated (i.e. not shared) coupling.

In operation, information (typically in the form of packets) communicated between a network device (typically external to the ES1) coupled to coupling 426 is processed at a low-level and in an interface-specific manner by Interface 420 (the operation of coupling 427 and Interface 419 is substantially similar). Packets received from the network device are provided to PCE 417 for classification and Tag determination, as described elsewhere herein. The packet data and Tag are stored in RAM 416, and provided to the fabric as cells by TM 302 via NM-Fabric coupling 139A. In the reverse direction, cells are reassembled by TM 302 as received from the fabric via NM-Fabric coupling 139A, and the resultant packets are stored in RAM 416. PCE 417 reads the stored packet data, and dynamically modifies it according to any associated Tag information, providing the result to Interface 420 for transmission to the network device via coupling 426.

TM 302 operates as a fabric interface communication unit, and includes a fabric interface communication transmit unit that directly accesses the packet image from RAM via an included DMA unit. The TM examines the packet header and identifies the packet destination address. The packet address and other associated information are referenced in accessing routing and state information maintained in one or more of CAM 418 and RAM 416. The resultant fabric egress port address and other related information are included in headers of cells provided to the fabric to transmit the packet as cells.

TM 302 also includes a fabric interface communication receive unit that operates in a conceptually symmetric fashion. Cells are received from the fabric and reassembled as packets stored into RAM 416 via an included DMA unit. The TM notifies the PCE as new packet data becomes available for editing and transport to Interface 420.

CP 429 manages various HW resources on the NM, including PCE 417 and TM 302, and respective lookup elements CAM 418 and RAM 416. The CP receives management information via coupling 452 (either indirectly via the BMC or directly via a Management I/O coupling, according to embodiment) and programs lookup, forwarding, and data structure information included in CAM 418 (such as associatively searched information) and RAM 416 (such as trie table information).

Figure 4D:
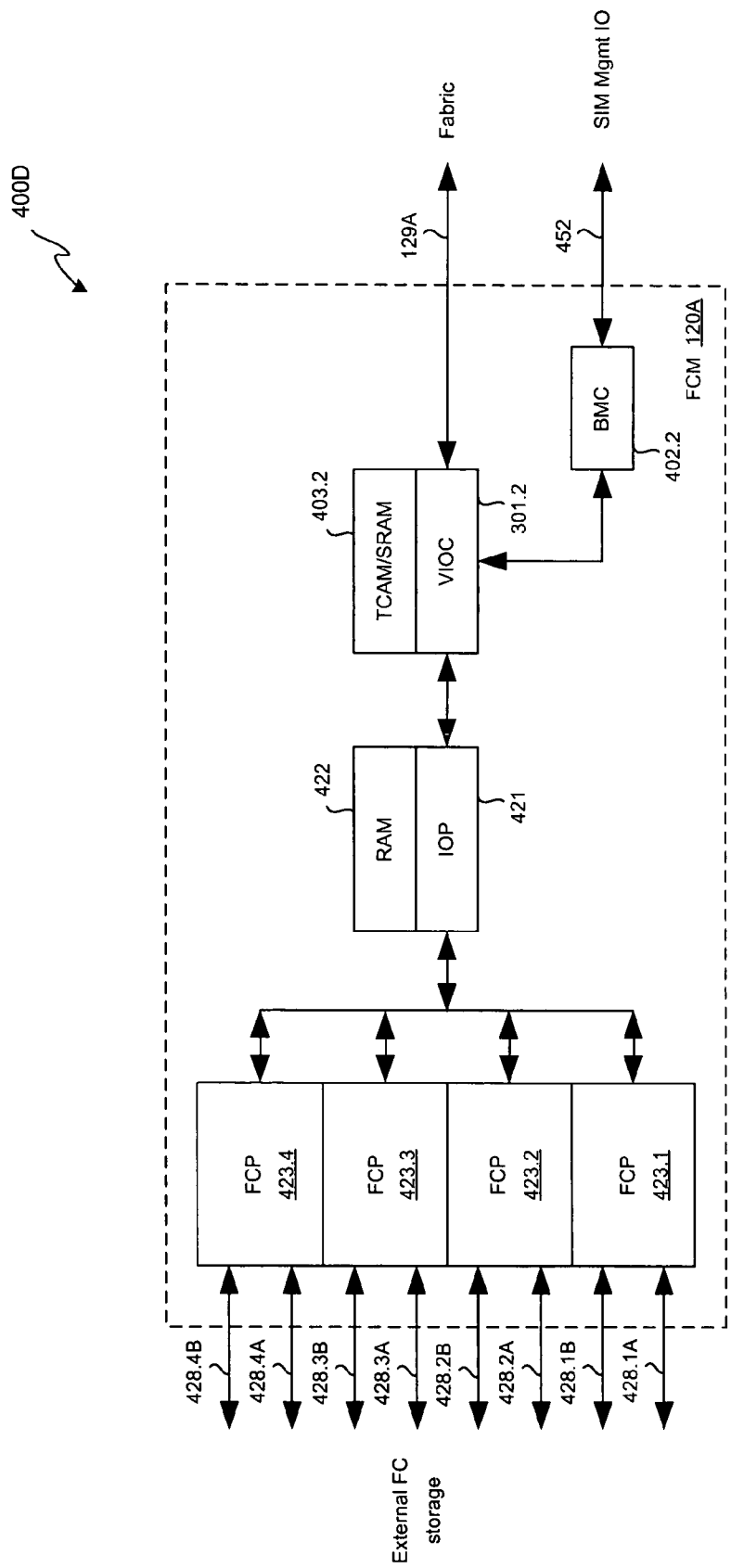
FIG. 4D illustrates selected aspects of an embodiment of a Fibre Channel Module (FCM) configured as a pluggable module.

FIG. 4D illustrates FCM Detail 400D, including selected aspects of an embodiment of an FCM configured as a pluggable module. FCM 120A includes FC compatible couplings 428.1A through 428.4B, each being an FC port, coupled in pairs to Fibre Channel interface Processors (FCPs 423.1-423.4). The FCPs are in turn coupled to a compute and storage element including Input Output Processor (IOP 421) and associated RAM 422, coupled in turn to VIOC 301.2. The VIOC provides a fabric interface for FCM-Fabric coupling 129A. FCM 120A also includes BMC 402.2 coupled to VIOC 301.2 and providing an interface for coupling 452.

In operation, information communicated between FC compatible devices or networks coupled to couplings (or FC ports) 428.1A through 428.4B is processed in a low-level manner by FCPs 423.1-423.4. Information received from external storage devices is typically stored as packets in RAM 422. After optional processing by IOP 421, packet data is transmitted as cells to the fabric by the fabric interface communication transmit unit of VIOC 301.2 via FCM-Fabric coupling 129A (as described elsewhere herein). In the reverse direction, cells are reassembled by VIOC 301.2 as received from the fabric via FCM-Fabric coupling 129A, and the resultant packets are stored in RAM 422. In one embodiment, IOP 421 reads the stored data, providing the end result to FCPs 423.1-423.4 for transmission to the coupled device or network. In an alternate embodiment, FCPs 423.1-423.4 access the data directly via DMA.

In some embodiments, a pair of FCPs is substantially similar to an FCI, and a set of four couplings for FC compatible devices (such as couplings 428.1A, 428.1B, 428.2A, and 428.2B) is substantially similar to four FC ports provided by an FCI (such as the four FC ports accessible via coupling 414.5 of FIG. 4B). In various embodiments, FC ports implemented by any combination of FCIs and FCPs are auto-sensing 1 Gb/2 Gb/4 Gb/8 Gb ports, 10 Gb ports, or both.

Figure 4E:
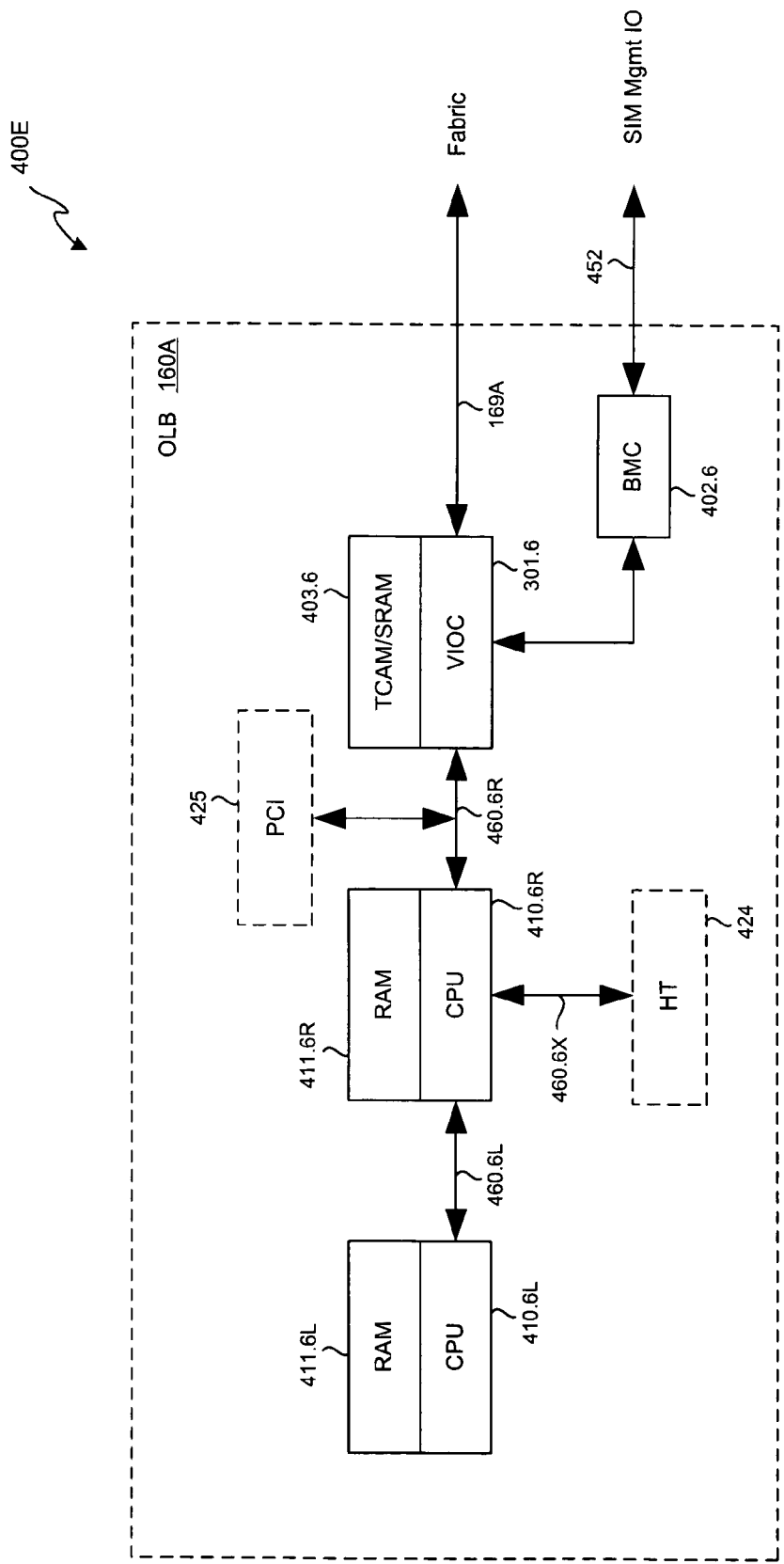
FIG. 4E illustrates selected aspects of an embodiment of an OffLoad Board (OLB), also known as an OffLoad Module (OLM) configured as a pluggable module.

FIG. 4E illustrates OLB Detail 400E, including selected aspects of an embodiment of an OLB configured as a pluggable module. OLB 160A is similar in many respects to Primary SCM 140A, and includes compute and associated memory elements CPU 410.6L/RAM 411.6L coupled to CPU 410.6R/RAM 411.6R via HT coupling 460.6L. VIOC 301.6 is coupled to CPU 410.6R via HT coupling 460.6R. VIOC 301.6 is in communication with TCAM/SRAM 403.6 and provides a fabric interface for OLB-Fabric coupling 169A. PCI sub-module 425 and HT sub-module 424 are optionally included in various combinations and configurations in several embodiments to provide additional service-specific computational capabilities as service acceleration modules. OLB 160A also includes BMC 402.6 coupled to VIOC 301.6 and providing an interface for coupling 452.

PCI sub-module 425 includes a PCI interface for interfacing PCI-adapter based devices to HT coupling 460.6R. HT sub-module 424 includes an HT interface for coupling to CPU 410.6R via coupling 460.6X. Various embodiments of PCI sub-modules and HT-sub-modules further include any number and combination of service-specific hardware accelerators according to implementation, such as an SLB hardware accelerator, an SSL hardware accelerator, and an XML hardware accelerator.

In operation, OLB 160A executes any combination of service processes (relating to SLB, SSL, or XML, for example) using compute and memory resources provided by CPU 410.6L/RAM 411.6L and CPU 410.6R/RAM 411.6R. The CPUs operate as a single SMP complex, communicating shared memory coherency and cache memory coherency transactions via HT coupling 460.6L. The VIOC provides for communication between the executing processes and other clients of the fabric via packet images in memory, operating as described elsewhere herein. Service processes executing on embodiments including any combination of PCI sub-module 425 and HT sub-module 424 access elements of the sub-modules in order to accelerate processing related to the service processes.

Figure 4F:
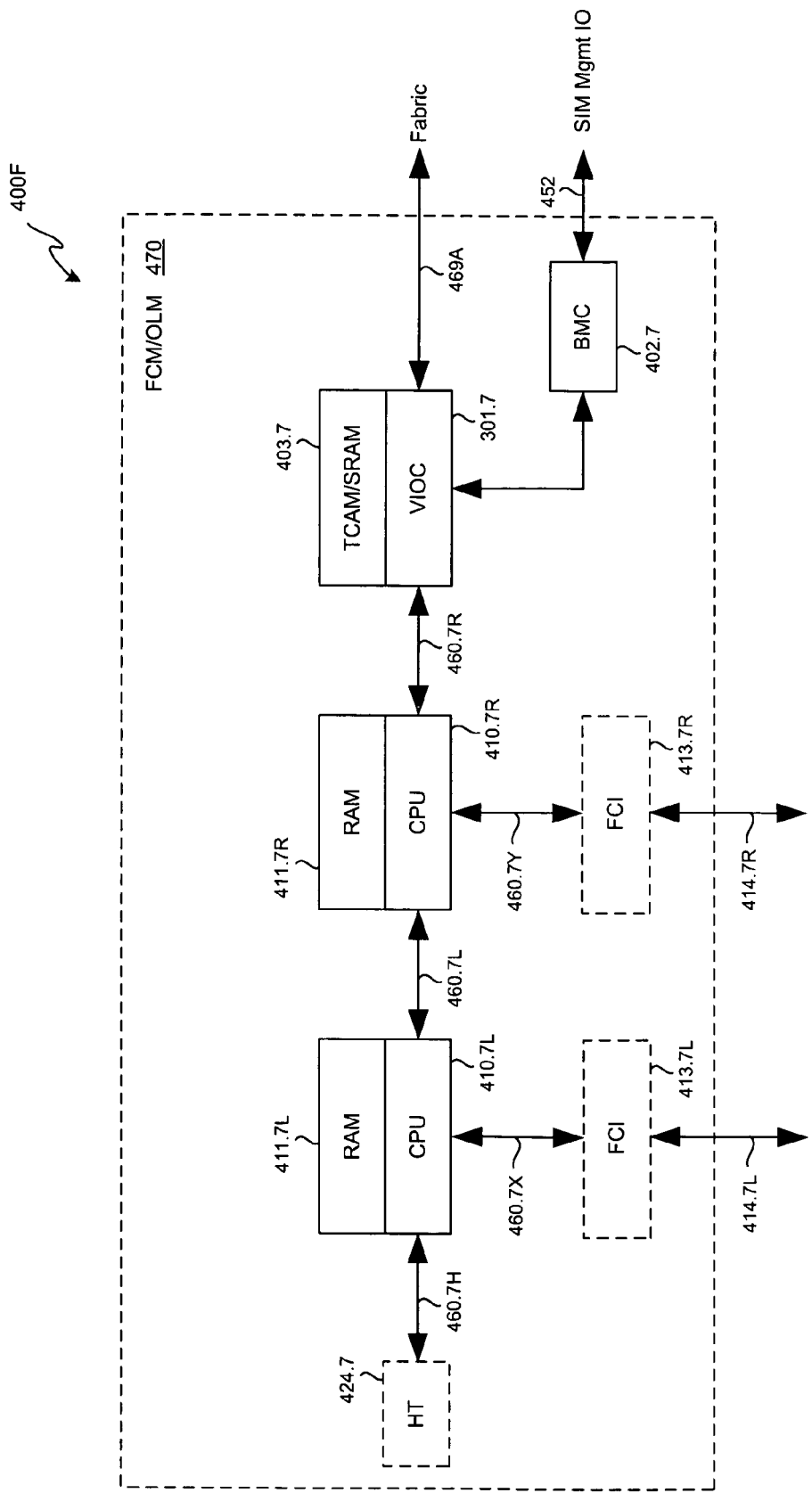
FIG. 4F illustrates selected aspects of an embodiment of an FCM/OLM configured as a pluggable module.

FIG. 4F illustrates FCM/OLM detail 400F, including selected aspects of an embodiment of an FCM/OLM configured as a pluggable module. FCM/OLM 470 includes selected elements of an FCM (see FIG. 4D) and an OLM or OLB (see FIG. 4E), and is usable as an FCM or as an OLM according to various usage scenarios. For example, if optional FCIs 413.7L and 413.7R are omitted and optional HT sub-module 424.7 is included, then functionality substantially similar to an OLM is available. As another example, if the optional FCIs are included and the optional HT is omitted, then functionality substantially to an FCM is available.

FCM/OLM 470 includes compute and associated memory elements CPU 410.7L/RAM 411.7L coupled to CPU 410.7R/RAM 411.7R via HT coupling 460.7L. VIOC 301.7 is coupled to CPU 410.7R via HT coupling 460.7R. VIOC 301.7 is in communication with TCAM/SRAM 403.7 and provides a fabric interface for coupling to a switch fabric (such as Primary Switch Fabric Module 180A) via coupling 469A. FCIs 413.7L and 413.7R and HT sub-module 424.7 are optionally included in various combinations and configurations in several embodiments to provide OLM-like or FCM-like functionality. FCM/OLM 470 also includes BMC 402.7 coupled to VIOC 301.7 and providing an interface for coupling 452.

Operation of FCM/OLM 470 is similar to the operation of an FCM in usage scenarios including the optional FCIs. Operation of the FCM/OLM is similar to the operation of an OLB in usage scenarios including the optional HT sub-module. Other usage scenarios may combine FCM and OLM characteristics when the optional HT sub-module having a service-specific hardware accelerator and at least one optional FCI are included. For example, storage data may be encrypted/decrypted using an FCI for a storage interface and an SSL hardware accelerator for cryptographic processing. Other similar usage scenarios are possible.

In some embodiments the HT sub-module includes a HyperTransport Technology Consortium compatible HTX connector for coupling to compatible modules. In some embodiments an FCI includes a Fibre Channel Controller (FCC) such as a QLogic QS2313, and in alternate embodiments two or more FCCs are included. In some embodiments an MDC included in an FCI includes a pair of substantially similar buses (such as a pair of 64-bit 133 MHz PCI-X buses). In some alternate embodiments only one CPU/RAM is provided and the other CPU/RAM is omitted (for example 410.7R/RAM 411.7R is present and CPU 410.7L/RAM 411.7L is not), thus providing only a single FCI and no HT sub-module.

Throughout the following discussion, and in particular with respect to storage gateway descriptive information, the term FCM is to be considered representative of any pluggable module implementing FC ports accessible from another pluggable module. The accessibility is typically provided in part by a VIOC included on the FC port providing module, and an associated SF that the VIOC is coupled to. Example modules providing FC ports accessible via an SF include PMMs, FCMs, OLBs, and FCM/OLMs, according to various usage scenarios and embodiments.

Software Layers

Figure 5A:
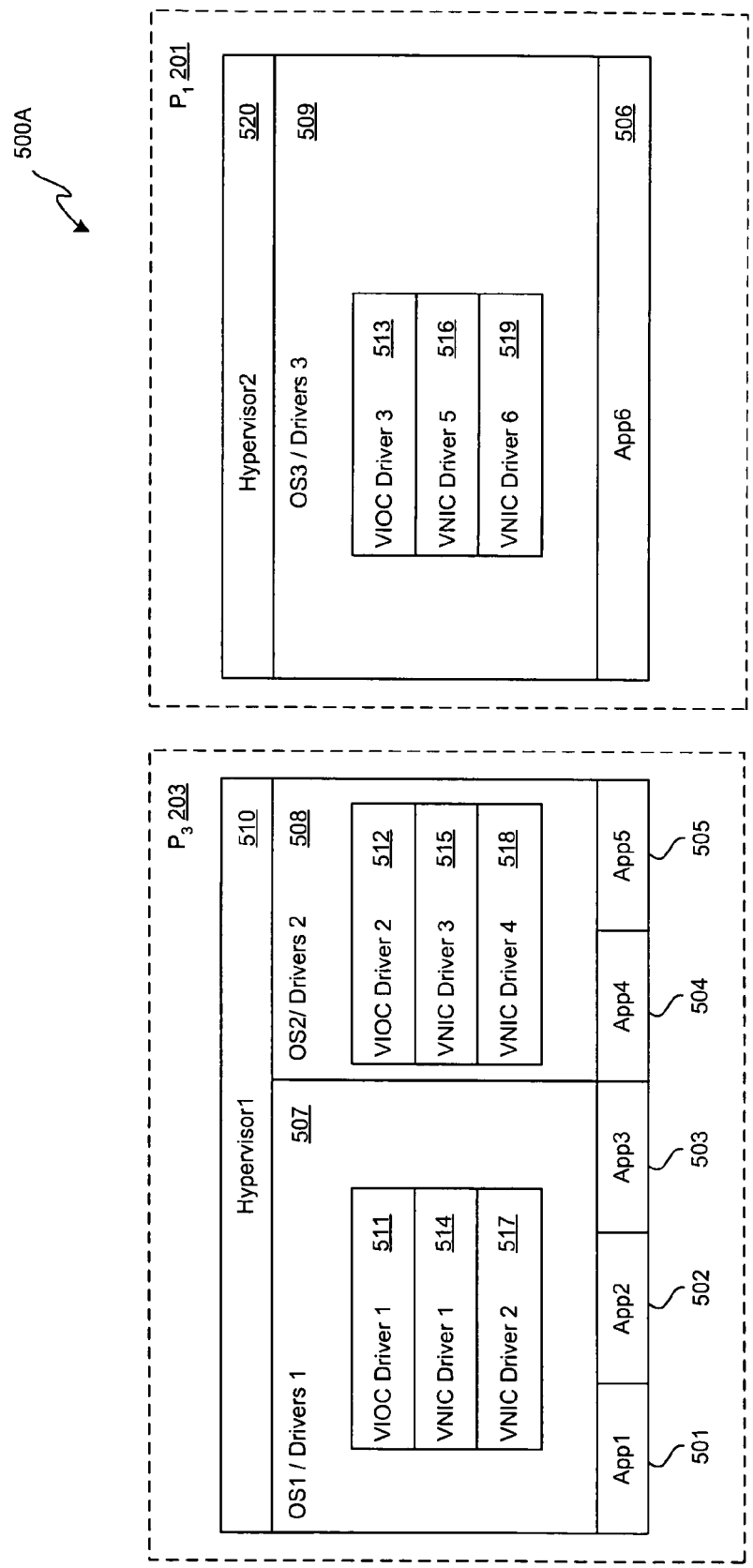
FIG. 5A illustrates selected aspects of embodiments of SoftWare (SW) layers for executing on application processor resources in an ES embodiment.

FIG. 5A illustrates Application SW Layering 500A, including selected aspects of embodiments of SW layers for executing on application processor resources, such as CPUs included on PMMs, of an ES embodiment. The layers are represented in a first context for execution on $P_3$ 203, and in a second context for execution on $P_1$ 201. As described elsewhere herein, $P_3$ 203 and $P_1$ 201 correspond to distinct physical partitions configured from one or more PMMs.

Although Application SW Layering 500A is illustrated as representative of a collection of code images, in some contexts it may be useful to consider it as conceptually representative of processes, or groups of processes associated with each of the illustrated elements. For example, Hypervisor1 510 represents a code image of a specific Hypervisor, but it may also be considered conceptually representative of all processes and related execution threads associated with executing any portion of the Hypervisor code image. In typical embodiments, a plurality of concurrent execution streams co-exists and cooperates while executing portions of the code image. Similarly, OS1/Drivers 1 507, App1 501, and so forth, may be considered representative of groups of respective processes associated with each of the respective SW elements.

Illustrated at the highest (most fundamental and privileged) SW layer level is a Hypervisor layer, as shown by Hypervisor1 510 and Hypervisor2 520. Hypervisors typically provide a software environment for executing a plurality of OS instances in an apparently concurrent manner via timesharing on a shared hardware resource, such as $P_3$ 203 or $P_1$ 201, as illustrated in the figure. At the middle SW layer level is an OS layer. As shown, Hypervisor1 510 provides two logical partitions, one for OS1/Drivers 1 507, and another for OS2/Drivers 2 508. Hypervisor2 520 provides a single logical partition for OS3/Drivers 3 509.

Illustrated within the OS layer are Drivers, including VIOC and VNIC Drivers. A VIOC Driver provides an interface between management and controlplane processes and VIOCs. VIOC Drivers include VIOC Driver 1 511 in OS1/Drivers 1 507, VIOC Driver 2 512 in OS2/Drivers 2 508, and VIOC Driver 3 513 in OS3/Drivers 3 509. VIOC Drivers, in some embodiments, are customized according to OS environment, such that VIOC Driver 1 511, VIOC Driver 2 512, and VIOC Driver 3 513 may be distinct if OS1/Drivers 1 507, OS2/Drivers 2 508, and OS3/Drivers 3 509 or associated environments are distinct. An OS layer may include one or more VIOC Drivers, depending on embodiment.

A VNIC Driver provides an interface between processes (executing on application processor resources, for example) and communication resources as provided by VNICs (implemented by VIOCs, for example). In some embodiments, a VNIC Driver is conceptually similar to a modified Ethernet Driver. VNIC Drivers include VNIC Driver 1 514 and VNIC Driver 2 515 in OS1/Drivers 1 507, VNIC Driver 3 516 and VNIC Driver 4 517 in OS2/Drivers 2 508, and VNIC Driver 5 518 and VNIC Driver 6 519 in OS3/Drivers 3 509. VNIC Drivers, in some embodiments, are customized according to OS environment, such that VNIC Driver 1 514 and VNIC Driver 3 516 may be distinct if OS1/Drivers 1 507 and OS2/Drivers 2 508 or associated environments are distinct. In some embodiments, VNIC drivers are further customized according to OS requirements or contexts, such that VNIC drivers within the same OS are distinct (VNIC Driver 1 514 being distinct with respect to VNIC Driver 2 515, for example). An OS layer may include one or more VNIC Drivers, each having unique functions, parameters, or customizations, depending on embodiment.

The lowest SW layer level, the Application layer, is provided by the OSs for executing Applications. OS1/Drivers 1 507 hosts a plurality of Applications as shown by App1-App3 501-503. Similarly, OS2/Drivers 2 508 hosts two applications, App4 504, and App5 505. OS3/Drivers 3 509 hosts a single application, App6 506.

Execution of SW at the different layers typically results in a plurality of processes or execution streams, corresponding to program execution of various portions or sub-portions of code from the illustrated SW layers. For example, execution of each of Hypervisor1 510, OS1/Drivers 1 507, and App1 501 may result in a plurality of concurrently running processes. One example of a process spawned from OS1/Drivers 1 507 is a Device Driver process, for example a Device Driver process corresponding to execution of the modified Ethernet Driver described elsewhere herein.

In typical embodiments, VIOC Device Drivers are associated with VIOC management and control, and VNIC Device Drivers are associated with VNIC management and control. According to various embodiments, OS1/Drivers 1 507, OS2/Drivers 2 508, and OS3/Drivers 3 509 include various combinations of VIOC and VNIC Drivers. VIOC Drivers, VNIC Drivers, and associated functions may be wholly or partially shared and combined according to embodiment.

Those of ordinary skill in the art will recognize that the illustrated SW layering is only on example embodiment. Other embodiments may include more layers (such as Application sub-layers) or fewer layers (such as dedicated physical partitions requiring no Hypervisor layer). There is also no restriction as to the number and arrangement of Hypervisors, OSs, Drivers, and Applications, other than restrictions imposed by the finite resources in an embodiment.

Figure 5B:
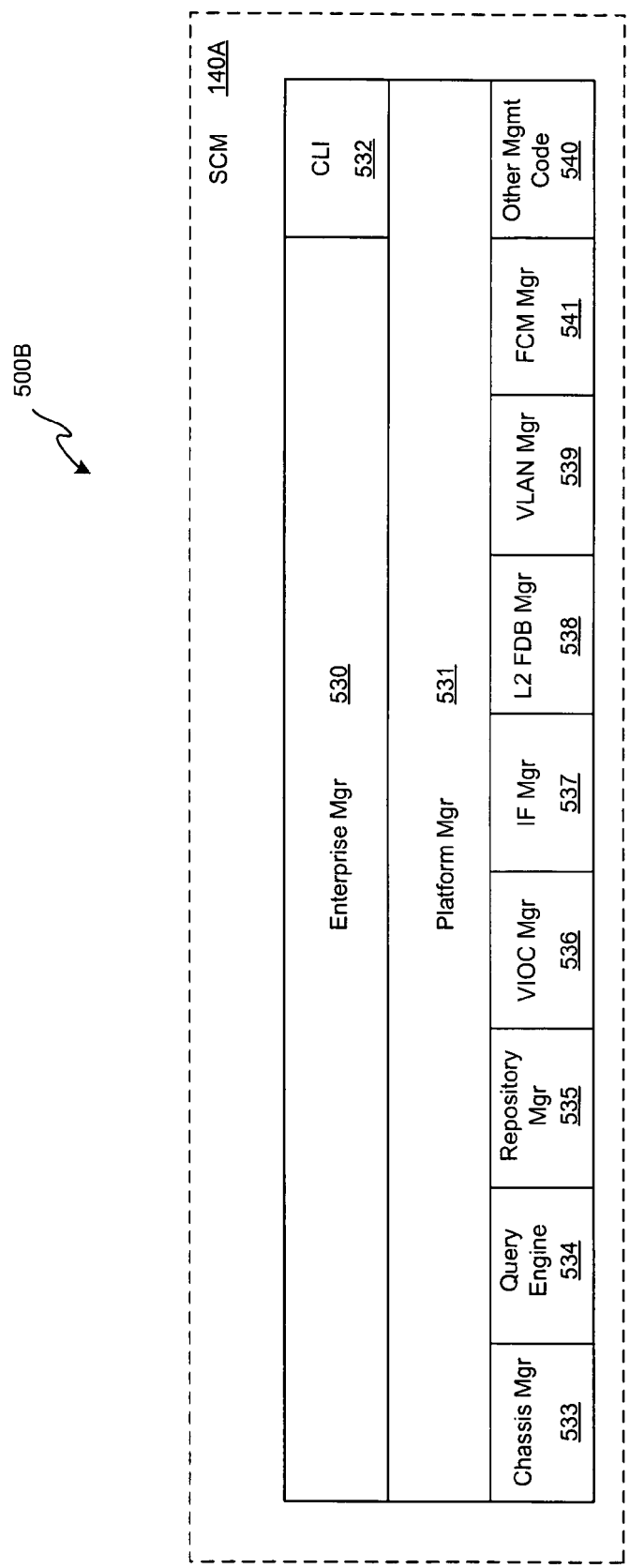
FIG. 5B illustrates selected aspects of embodiments of SW layers for executing on management processor resources in an ES embodiment.

FIG. 5B illustrates Management SW Layering 500B, including selected aspects of SW layers for executing on management processor resources, such as processor resources included on SCMs (Primary SCM 140A, for example), OLBs (OLB 160A, for example); and PMMs (PMM 150A, for example), according to various ES system embodiments. Generally execution of these SW layers results in various system control and system operational processes such as management, controlplane, and load balancing processes. As described elsewhere herein, the system control and management processes program various configuration and lookup state information to implement provisioning, switching, and routing functions in the EF architecture. Similar to Application SW Layering 500A, Management SW Layering 500B represents a collection of code images, and each element may be usefully considered as representative of one or more processes executing portions of each respective element.

Enterprise Manager 530 supports multi-chassis management, complex provisioning, interfaces to client GUIs, and generally operates at a relatively high level of abstraction, as does CLI 532. Platform Manager 531 generally performs in-chassis (or single-chassis) management operations and tends to manipulate system objects directly at a relatively low level of abstraction. Several SW modules operate in close cooperation with the Platform Manager, including Chassis Manager (CM) 533, Query Engine 534, Repository Manager 535, VIOC Manager 536, Interface Manager 537, L2 Forwarding DataBase (FDB) Manager 538, VLAN Manager 539, FCM Manager 541, and Other Management Code 540.

CLI 532 generally provides some combination of the CLI proper and related services to support the interface. CM 533 discovers and manages chassis resources. Query Engine 534 processes queries relating to persistent state managed by Repository Manager 535. VIOC Manager 536 generally provides an interface between the system control and management processes and VIOCs in a system. Interface Manager 537 generally provides an interface between the system control and management processes and NMs in a system. L2 FDB Manager 538 provides L2 forwarding information management by maintaining one or more FDBs. The L2 FDB Manager further manages dissemination of information related to portions of the FDB throughout the system as needed (such as updating the forwarding and state information maintained in TCAM/SRAM elements coupled to VIOCs). VLAN Manager 539 generally provides system-wide management functions relating to provisioning VLANs and maintaining VLAN related information, such as associations between VNICs, VLANs, and NM ports. Typically a Logical InterFace identifier (LIF) is allocated per port per VLAN, identifying a "connection" to the VLAN. FCM Manager 541 provides system-wide management and interface functions relating to storage gateways. Other Management Code 540 generally provides other management, control-plane, and load balancing functions. The platform manager and the aforementioned closely cooperating SW modules are described in more detail elsewhere herein.

Figure 5C:
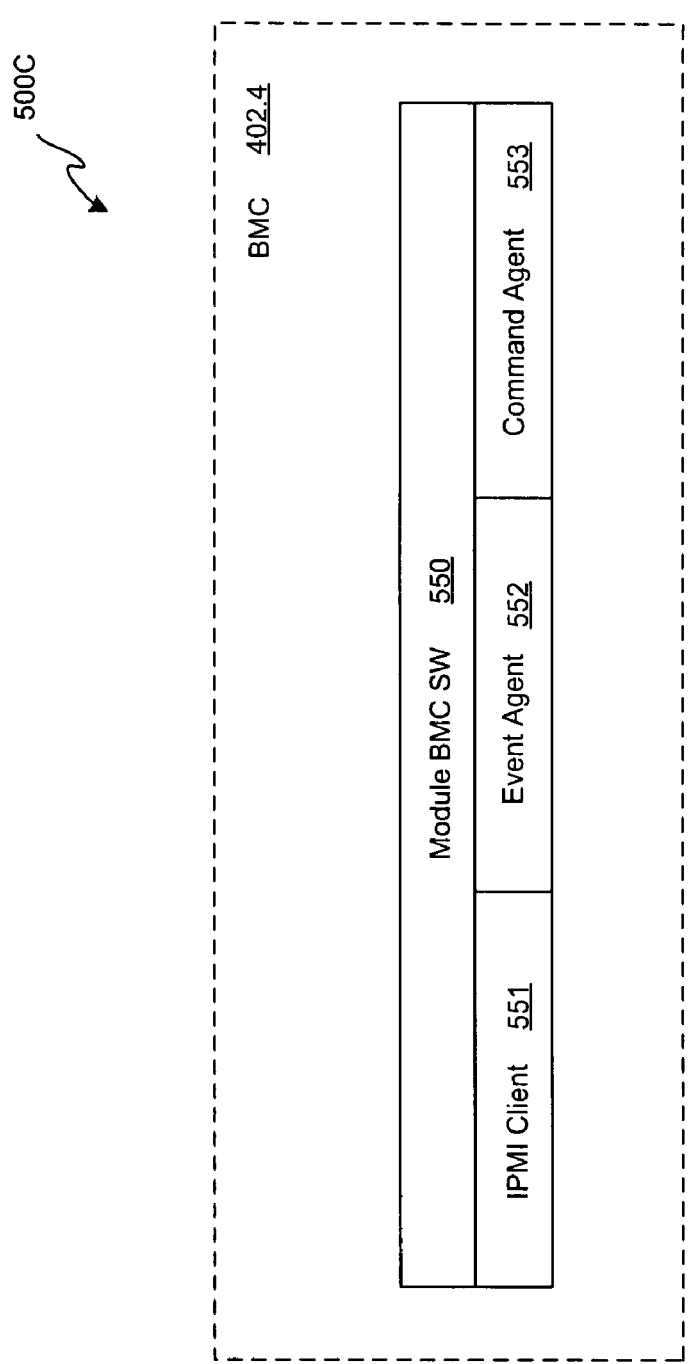
FIG. 5C illustrates selected aspects of embodiments of SW layers for executing on module-level configuration and management processor resources in an ES embodiment.

FIG. 5C illustrates BMC SW Layering 500C, including selected aspects of SW layers for executing on module-level configuration and management processor resources, such as BMCs (BMC 402.4 of FIG. 4A, for example), according to various ES system embodiments. Module BMC SW 550 supports module-level operations, typically via interfaces with HW components on the module the BMC is included on. The Module BMC SW generally functions at a relatively low level of abstraction. Similar to Application SW Layering 500A and Management SW Layering 500B, BMC SW Layering 500C represents a collection of code images, and each element may be usefully considered as representative of one or more processes executing portions of each respective element.

In some embodiments, optional IPMI Client 551 provides an interface to IPMI services (typically part of Platform Manager 531) and in some embodiments serves to export low-level platform services to various elements of the Management SW. Event Agent 552 monitors module-level information (such as sensors and board insertion detection logic) to recognize changes in status and configuration of the module. The Event Agent then communicates these changes as events delivered to various elements of the Management SW (such as CM 533). The Selected BMC Event Details section, included elsewhere herein, provides further details on BMC events. Command Agent 553 receives BMC commands from various elements of the Management SW (such as CM 533) and sequences and forwards the commands. The Command Agent communicates results of command execution as events via functions provided by the Event Agent. The Selected BMC Command Details section, included elsewhere herein, provides further details on BMC commands.

VNIC Overview and Queuing Operation

As previously described, VNICs provide each processing element with access via a modified Ethernet Driver to other system resources connected to the fabric. For example, each VNIC, in conjunction with transport via the fabric and external communication via an NM, provides capabilities similar to that of a conventional NIC, made available to processes by way of a driver functionally similar to a conventional Ethernet driver. In the general case, the accessible system resources include networking interfaces provided by NMs, storage interfaces provided by FCMs, and computing capabilities provided by SCMs, PMMs, and OLBs. In some embodiments, VNICs are implemented by VIOCs included in modules such as PMMs, OLBs, FCMs, and SCMs, thereby providing processing elements on such modules with access to VNIC capabilities.

VNIC operation generally provides for communication of data directly between processes executing on a Local Processor and the fabric via Local Processor Memory. The Local Processor Memory is typically accessible by the Local Processor and, for example, a VIOC implementing VNIC functionality. Conceptually, a VNIC provides transmit and receive queues for use by processes executing on a Local Processor for communication of data (as packets or messages) to and from the Local Processor Memory.

As VNICs (like conventional NICs) are bidirectional, VNICs also provide access to each processing element from other system resources connected to the fabric. For example, each VNIC on an OLB provides a separate portal to execution resources provided by the OLB. A first VNIC on the OLB may be allocated to and accessed by processes executing on a first provisioned server, while a second VNIC on the same OLB may be used by a second provisioned server. As another example, each VNIC on an FCM provides a separate path to storage resources enabled by the FCM, and each of the separate paths may be accessed by distinct provisioned servers.

Figure 6A:
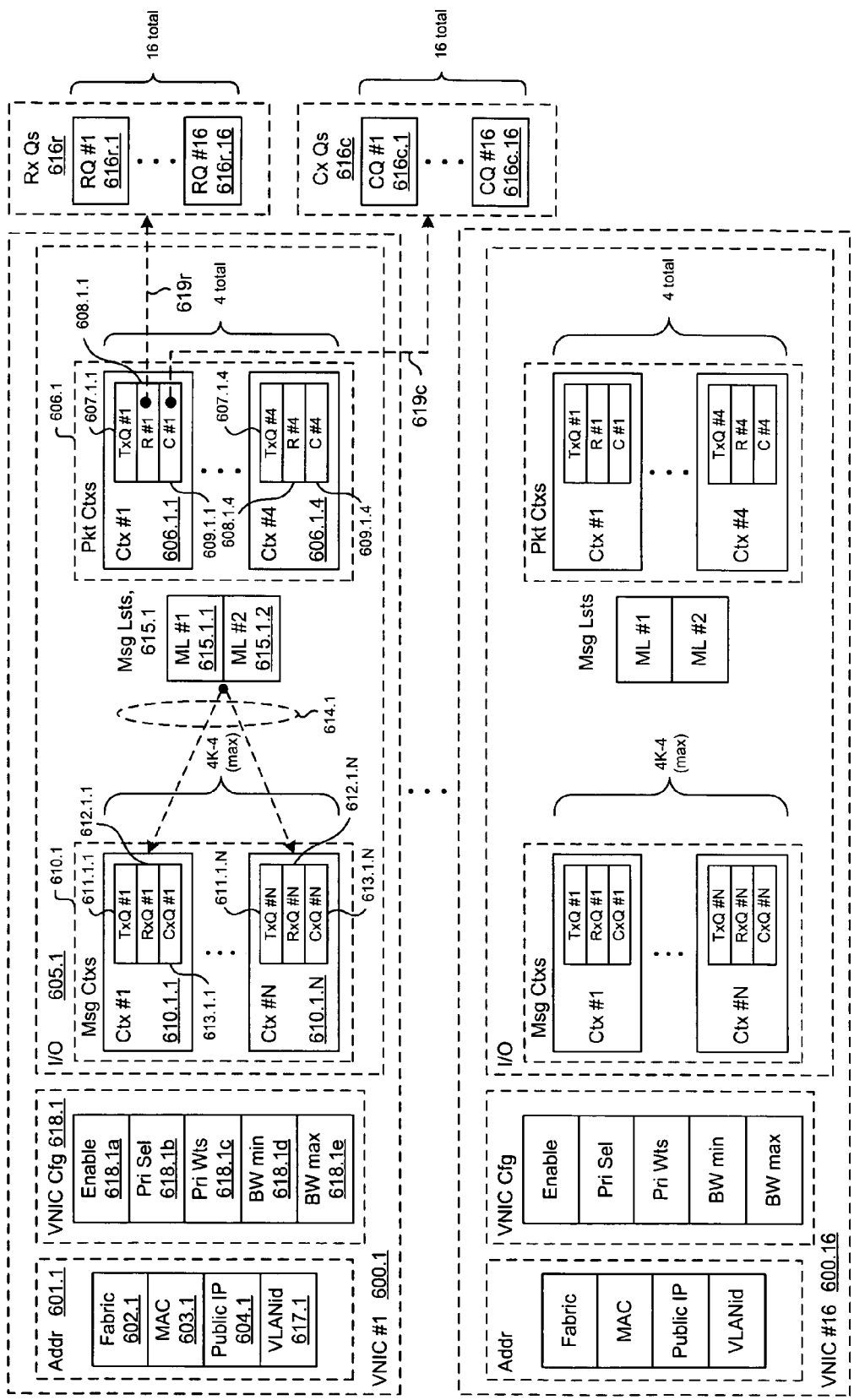
FIG. 6A illustrates selected aspects of a logical view of an embodiment of a plurality of virtual Network Interface Controllers (VNICs), also known as virtualized Network Interface Cards.

FIG. 6A illustrates selected aspects of a logical view of an embodiment of a plurality of VNICs. According to one embodiment, VIOC 301 implements 16 identical VNICs. In the figure only two of the VNICs are shown (for clarity), VNIC #1 600.1 and VNIC #16 600.16. Each VNIC, such as VNIC #1 600.1, includes programmable identification information illustrated as Address Block 601.1, VNIC configuration registers illustrated as VNIC Configuration Block 618.1, and packet and message data communication interfaces illustrated as I/O Block 605.1.

Address Block 601.1 includes Fabric Address 602.1, for specifying the source fabric address of the VNIC, and MAC Address 603.1, defining the MAC address associated with the VNIC. In some embodiments, a first portion of Fabric Address 602.1 is common to some or all of the VNICs of a VIOC, and corresponds to the physical fabric address of the VIOC. A second portion of Fabric Address 602.1, also known as the fabric sub-address, is unique to each VNIC. Address Block 601.1 optionally includes, according to embodiment, Public Internet Protocol (Public IP) Address 604.1, for specifying the IP address associated with the VNIC, to enable selected L3 processing.

Address Block 601.1 also includes a Virtual Local Area Network (VLAN) Identifier (VLANid 617.1), for use according to embodiment to map a destination address according to VLAN information, or as a tag to identify the VNIC with respect to a VLAN for selected L3 processing, or both. In some embodiments, a separate L3 VLAN identifier (in addition to VLAN Identifier 617.1) may be provided for use with selected L3 VLAN operations. Examples of VLAN processing include formulating a packet or cell header including a VLAN tag, and filtering incoming traffic with respect to a VLAN. In various embodiments, programming of VLAN Identifier 617.1 further enables implementation of fabric-port-based, MAC address-based, IP address-based, and general L3 type VLAN functions.

VNIC Configuration Block 618.1 includes VNIC Enable 618.1*a*, for enabling (and disabling) the corresponding VNIC, and priority and bandwidth configuration registers. The priority configuration registers include Priority Scheme Selection 618.1*b* and Priority Weights 618.1*c*, for specifying priority processing related information, such as priority scheme selection and weights, respectively. The bandwidth configuration registers include Bandwidth Minimum 618.1*d* and Bandwidth Maximum 618.1*e*, for specifying bandwidth allocation and control configurations, such as minimum and maximum bandwidth allocations, respectively, for the corresponding VNIC.

I/O Block 605.1 includes separate collections of queues for packets and messages. Each collection includes transmit, receive, and completion queues (the completion queues are also known as receive completion queues). The packet and message queues are organized by "context". Each context includes a transmit queue, a receive queue, and either a completion queue or a pointer to a completion queue. In a typical usage scenario, the transmit, receive, and completion queues of a context are associated with a particular protocol connection or a particular multiplexed set of protocol connections. Each context is established by software running on the Local Processors. In certain embodiments, while each context has a respective pair of dedicated transmit and receive queues, multiple contexts are associated with a common completion queue. This is detailed further below.

A packet (or message) context may be used for IP traffic, interprocess communication (directly or over IP), or other similar communications. When accessed via physical buffer addresses, packet (or message) contexts are typically used directly by OS and Hypervisor processes, and typically used indirectly (via system calls, for example) by application processes. When accessed via virtual buffer addresses, packet (or message) contexts are typically usable directly by application processes, in addition to direct use by OS and Hypervisor processes.

A single packet context may be used to implement multiple connections via SW, while a single message context typically implements a single connection managed (at least in part) by HW. Message contexts may be used by RDMA operations with fewer SW operations than similar functionality implemented with packet contexts. In some embodiments, message contexts are typically directly accessible via application processes.

Each context has particular state associated with it, organized within a Context State Block (CSB), which identifies the context's transmit, receive, and completion queues. The CSBs are maintained in various embodiments by any combination of hypervisor, OS, and Driver processes providing control information for the VNIC.

The queues contain descriptors that are organized within circular buffers in contiguous memory and thus are also known as descriptor rings. Each enqueued descriptor describes various aspects (detailed herein below) of the packets or messages being transmitted and received. In particular, the packet transmit and receive descriptors correspond to the raw data buffers in the Local Processor Memory where packet data is respectively read and written by the VIOC. A common scenario is for these descriptors to have been prepared by processes of the Local Processors (such as a Driver).

Packet Contexts 606.1 provides four packet CSBs (also referred to as packet contexts) of identical capability, two of which are illustrated in the figure (Packet Context Block #1 606.1.1 and Packet Context Block #4 606.1.4). As shown, each packet context includes a transmit queue, such as Packet Transmit Queue #1 607.1.1 and Packet Transmit Queue #4 607.1.4., and a receive queue pointer, such as Packet Receive Queue Pointer #1 608.1.1 and Packet Receive Queue Pointer #4 608.1.4.

Each packet receive queue pointer identifies one of 16 identical shared packet receive queues, as illustrated by dashed-arrow 619*r* pointing toward Packet Receive Queues 616*r*. For clarity, only two of the 16 packet receive queues are illustrated in the figure, specifically Packet Receive Queue #1 616*r*.1 and Packet Receive Queue #16 616*r*.16. The packet receive queue pointers enable arbitrary sharing of packet receive queues among packet contexts, including sharing among packet contexts in multiple distinct VNICs.

In alternate embodiments, packet context receive queues are not shared among VNICs, but are dedicated per VNIC as packet context transmit queues are. In these alternate embodiments, 608.1.1 . . . 608.1.4 operate directly as the packet receive queues for a given VNIC, and Packet Receive Queues 616*r* (of FIG. 6A) is not provided.

Also included in each packet context is a completion queue pointer, such as Packet Complete Queue Pointer #1 609.1.1 and Packet Complete Queue Pointer #4 609.1.4. Each packet completion queue pointer identifies one of 16 identical shared packet completion queues, as illustrated by dashed-arrow 619*c* pointing toward Packet Completion Queues 616*c*. For clarity, only two of the 16 packet completion queues are illustrated in the figure, specifically Packet Completion Queue #1 616*c*.1 and Packet Completion Queue #16 616*c*.16. Similar to the packet receive queue pointers, the packet completion queue pointers enable arbitrary sharing of packet completion queues among packet contexts, including sharing among packet contexts in multiple distinct VNICs.

The packet transmit queues of a VNIC (such as Packet Transmit Queue #1 607.1.1, for example), also known as transmit rings, are used to communicate transmit packet availability and location in memory. The transmit queues include a plurality of transmit descriptors, each of which refer to a buffer in memory having a complete or partial packet image for transmission. The descriptor includes the address of the buffer (in Local Processor Memory), the buffer size, a packet state indicator, a valid indicator, a done indicator, and other related information. The packet state indicator describes the buffer information as associated with the start, the middle, or the end of a packet. Assertion of the valid indicator specifies that the descriptor refers to packet image data ready for transmission. Deassertion indicates otherwise: that no data is ready, the descriptor is invalid, or some other related condition. The valid indicator allows a VNIC implementation (such as a VIOC) to poll (or scan) the transmit queues for valid descriptors to discover packet data ready for transmission without requiring any further information or stimulus from the processes executing on the Local Processor. The processes may also interrupt the VIOC by accessing a Doorbell location in the VIOC memory-mapped I/O address space to indicate new or modified descriptors in a transmit queue, corresponding to additional packet data ready for transmission. A plurality of Doorbell locations are typically provided per VNIC. In some embodiments, packet transmit queues and message contexts of all VNICs are allocated distinct doorbells.

The packet receive queues of a VNIC (such as those pointed to by Packet Receive Queue Pointer #1 608.1.1, for example), also known as receive rings, are used to communicate receive packet data locations in memory. The receive queues include a plurality of receive descriptors, each of which refers to a buffer in memory for reception of a complete or partial packet image. The descriptor includes the address of the buffer (in Local Processor Memory), the buffer size, a valid indicator, and other related information. The valid indicator specifies that the buffer the descriptor refers to is ready to receive packet image data, enabling a VNIC implementation (such as a VIOC) to determine receive buffer availability without direct involvement of processes executing on the Local Processor.

The shared packet completion queues (Packet Completion Queue #1 616c.1, for example) are used to communicate completion information, including receive packet data availability and status. The completion queues include a plurality of entries, each of which includes a packet status indicator and other related information. The packet status indicator identifies buffer data as corresponding to the start, middle, or end of a packet. When a receive buffer is filled, corresponding to consumption of an associated receive descriptor, an entry is created in one of the completion queues. The completion queue data structure and related processing further enable a VNIC implementation (such as a VIOC) to provide packet data to processes executing on Local Processors with little direct involvement of the processes. In some embodiments, the ingress processing (e.g., packet reassembly from cells) performed by the VIOC/VNIC frees up resources for other tasks, and may also simplify implementation of other portions of the system.

In the illustrated embodiment, Message Contexts 610.1 provides up to a total of 4K-4 (i.e., 2 to the $12^{th}$ power, minus 4, or 4092) message CSBs (also referred to as message contexts) per VNIC. Each message context has identical capability, and two are illustrated in the figure (Message Context Block #1 610.1.1 and Message Context Block #N 610.1.N). In other embodiments, (not illustrated), the message contexts of the 16 VNICs are shared, for a total of 64K-16 (i.e., 2 to the $16^{th}$ power, minus 16, or 65,520) message contexts available collectively to all of the VNICs. As shown, each message context includes a transmit queue, such as Message Transmit Queue #1 611.1.1 and Message Transmit Queue #N 611.1.N, and a receive queue, such as Message Receive Queue #1 612.1.1 and Message Receive Queue #N 612.1.N. Also included in each message context is a completion queue, such as Message Completion Queue #1 613.1.1 and Message Completion Queue #N 613.1.N. The message transmit, receive, and completion queue data structures are similar to those defined for packet processing. The message data structures specify message location and availability for transmission, for determining buffer location and availability for reception, and for directly providing message data and completion status to processes executing on Local Processors.

Messages are processed via an additional level of indirection not used for packet processing. Message Lists 615.1 includes two linked lists of messages to be processed (Message List #1 615.1.1 and Message List #2 615.1.2). Each of the lists includes an active entry pointing to (or selecting) one of the message contexts, as illustrated by dashed-ellipse 614.1 and associated dashed-arrows pointing to message contexts in Message Contexts 610.1. In embodiments with 4K-4 message contexts per VNIC the active entries point to message contexts associated with the VNIC, and in embodiments with 64K-16 shared message contexts, the active entries point to any of the shared message contexts. Each of the selected message contexts in turn includes transmit, receive, and completion queues, as illustrated.

Transmit and receive packet and message buffer addresses may be provided as physical addresses or virtual addresses subsequently translated by a VNIC implementation (such as a VIOC), depending on embodiment and configuration. In some embodiments and configurations, address type varies according to queue, and may also vary according to other configuration information.

In typical implementations, VNICs share resources amongst each other and between queues within each respective VNIC. Shared transmit resources include access to the fabric (based on destination, for example) and effective bandwidth to the fabric (allocated between VNICs and queues included in VNICs, for example). Shared receive resources include input queuing (or enqueuing) bandwidth from the fabric (based on a categorization included in the received data, for example) and dequeuing bandwidth from input queues to Local Processor Memory (allocated between VNICs and queues included in VNICs, for example).

Egress Path VNIC/Queue Operation

Sharing of transmit resources is managed by three scheduling policies. These are the transmit-descriptor-fetch scheduling policy, the VOQ scheduling policy, and the subsequent-transmit-data-read scheduling policy. From a high-level perspective, the transmit-descriptor-fetch scheduling policy decides which transmit tasks the VIOC will do next. More specifically, the transmit-descriptor-fetch scheduling policy, described in more detail below in conjunction with FIG. 6B, determines the next transmit-descriptor to be fetched. (An initial data read is also performed in conjunction with each transmit descriptor fetch.) Each transmit descriptor describes a transmit buffer in the local processor memory that holds one or more packets awaiting transport to their addressed destinations. The transmit descriptor to be next fetched is the descriptor identified by the next descriptor pointer of a transmit queue selected by the transmit-descriptor-fetch scheduling policy from the candidate pool of all VNIC transmit queues. The selection is based in part on a prioritization among the VNIC transmit queues, in a manner that is configurable in part. The selection is also based in part on an approximate fabric bandwidth allocation among the VNICs.

The VOQ scheduling policy, described in more detail below in conjunction with FIG. 6C, determines the next cell to transmit to the fabric. The cell to be next transmitted to the fabric is the cell at the head of the VOQ selected by the VOQ scheduling policy from the candidate pool of all VOQs. The selection is based in part on a prioritization among the VOQs, in a manner that is configurable in part.

The subsequent-transmit-data-read scheduling policy determines the next transmit data to read (for all reads required to retire a transmit descriptor made after the first data read). The transmit data to be next read is the data (generally a cache-line in memory) identified by the next data unit prefetch pointer of a transmit queue packet buffer (in transmit shared memory) selected by the subsequent-transmit-data-read scheduling policy from the candidate pool of all transmit queue packet buffers awaiting to do transmit data reads.

Note that the solid arrows drawn in FIGS. 6B through 6E do not represent data flows (at least not required ones). Taking an analogy from sports, each of the solid-arrow diagrams is very similar to a "tournament bracket" (also known as a tournament chart), wherein a pool of competitors is reduced by successive stages of competition to arrive at an overall winner. In terms of this sports analogy, the transmit queues represented at the start (on the left for transmit, on the right for receive) "compete" in accordance with rules that may differ at each stage to be chosen as the queue for which an action (different in each figure) is next performed.

In the following scheduling discussions, it will be understood that although the description may refer to queue selections in each of multiple stages ("prioritization levels"), and that subsequent to the scheduling selection data is generally transferred, that nevertheless each selection described is a logical abstraction that generally does not necessitate any data movement corresponding to any of: the queues, identifiers (or pointers) representing the queues, descriptors pointed to by the queues, or data associated with the descriptors. Furthermore, evaluation in each of the discrete stages described is also a logical abstraction that need not be physically implemented in order to realize the overall result. While in some embodiments the selection logic could implement pass gate or other multiplexing logic to pass transmit queue identifiers (or other related data items) along circuit topographies that are fashioned after the tournament bracket topologies illustrated, this is not at all essential. Those of ordinary skill in the art will understand that each scheduling policy of FIGS. 6B through 6E is reducible to logic equations that can be implemented in many functionally equivalent ways, including but not limited to: pass gates, multiplexers, AND/OR-gating, memory or programmable-logic arrays, microprogramming, and combinations thereof. Furthermore, only the final result of the scheduling process need be actually realized. That is, certain implementation approaches and optimizations may not actually implement or expose the intermediate prioritization level results.

Figure 6B:
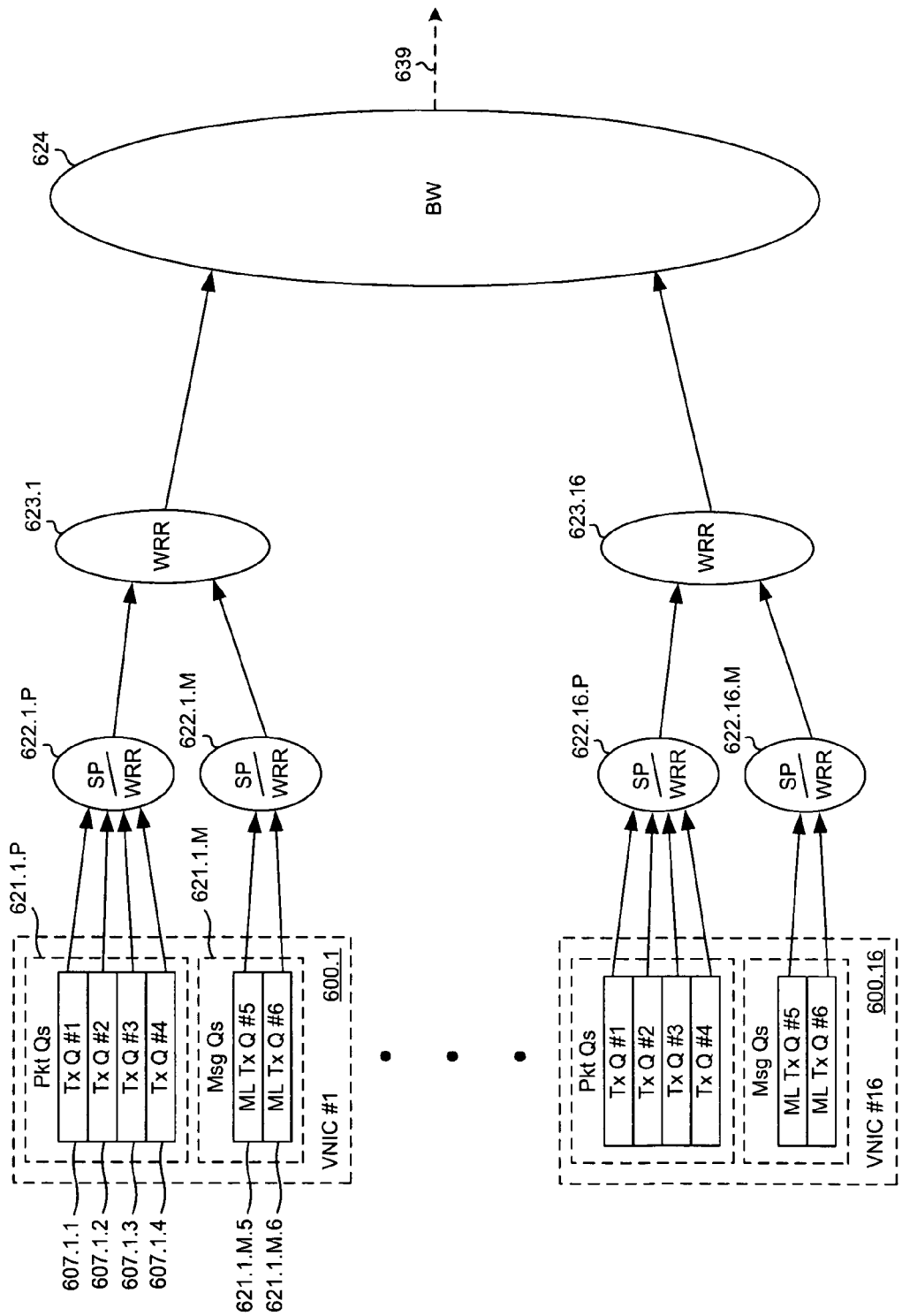
FIG. 6B illustrates selected aspects of a logical view of an embodiment of VNIC transmit queue organization and prioritization.

FIG. 6B illustrates selected aspects of a logical view of an embodiment of VNIC transmit-descriptor-fetch scheduling. For clarity, only the transmit queue functions of two of the 16 VNICs are illustrated (VNIC #1 600.1 and VNIC #16 600.16). The figure represents operations related to selecting a transmit queue from among all the transmit queues. The next descriptor pointer of the selected transmit queue in turn identifies the next transmit descriptor to fetch, according to various priority techniques. This determines the relative processing order of packet and message buffers described by the transmit descriptors, and thereby approximates and manages a per-VNIC effective bandwidth allocation to the fabric.

Packet Transmit Queues 621.1.P, as shown, includes the four transmit queues (Packet Transmit Queue #1 607.1.1 .... Packet Transmit Queue #4 607.1.4) of VNIC #1 600.1. Message Transmit Queues 621.1.M, as shown, includes two message transmit queues (Message Transmit Queue #5 621.1.M.5 and Message Transmit Queue #6 621.1.M.6) of VNIC #1 600.1. (The above and subsequent uses of " . . . " can be read as "through.") These correspond to the two message transmit queues identified by an active message identified by each of Message Lists 615.1 (Message List #1 615.1.1 and Message List #2 615.1.2), as shown by dashed-ellipse 614.1 (of FIG. 6A). The other 15 VNICs are organized identically.

Several levels of prioritization are performed to determine the next transmit descriptor to read (if not previously prefetched) and process when a new transmit descriptor is needed. Generally, the transmit descriptors are prefetched in advance of their need. A first prioritization level selects (identifies), for each VNIC, one packet transmit queue and one message transmit queue. The first level includes Packet Transmit Queue Prioritization 622.1.P, selecting one of Packet Transmit Queues 621.1.P according to either a straight or weighted round-robin priority scheme. The first level also includes Message Transmit Queue Prioritization 622.1.M, selecting one of Message Transmit Queues 621.1.M according to either a straight or weighted round-robin priority scheme. Identical prioritization processing is performed for each of the 16 VNICs, selecting one potential packet queue and one potential message queue for each VNIC. The resultant 32 candidate queues are then evaluated in a second prioritization level.

The second prioritization level selects, for each VNIC, between the packet queue or the message queue as selected by the first prioritization level. The second level includes Packet vs. Message Transmit Prioritization 623.1, selecting a packet queue or a message queue according to a weighted round-robin priority scheme. Identical prioritization processing is performed for each of the 16 VNICs, selecting one candidate queue for each VNIC. These 16 queues are then evaluated in a third prioritization level.

The third prioritization level selects, across the 16 VNICs, a single transmit queue for subsequent evaluation. The third level includes VNIC Bandwidth Management 624, selecting one of the 16 queues provided by the second level according to a bandwidth allocation priority scheme. Bandwidth schemes include enforcing a maximum bandwidth per VNIC, a minimum bandwidth per VNIC, and arbitrary combinations of maximum and minimum bandwidths (individually selectable) per VNIC. A single resultant transmit queue is selected for processing as indicated by dashed-arrow 639. The processing includes accessing a transmit descriptor identified by the selected transmit queue, reading data for transmission according to the accessed descriptor, and then readying the data for transmission over the fabric in accordance to the VOQ scheduling policy discussed in conjunction with FIG. 6C below.

The selection of straight or round-robin prioritization (Packet Transmit Queue Prioritization 622.1.P and Message Transmit Queue Prioritization 622.1.M, for example) is individually programmable for each VNIC and may be distinct for packet and message prioritization, in various embodiments. Weights for each of the weighted round-robin prioritizations (Packet Transmit Queue Prioritization 622.1.P, Message Transmit Queue Prioritization 622.1.M, and Packet vs. Message Transmit Prioritization 623.1, for example), are individually programmable, in various embodiments. The maximum and minimum bandwidths per VNIC (VNIC Bandwidth Management 624) are also programmable in typical embodiments.

Once a transmit descriptor becomes scheduled in accordance with the transmit-descriptor-fetch scheduling policy, the descriptor is fetched and the first transfer is made (corresponding to a fabric-cell-worth of data) from the first packet in the transmit memory buffer pointed to by the descriptor to a packet buffer in shared memory associated with the transmit queue. This first read and the subsequent reads are performed by one or more transmit DMA engines, which operate in accordance with the transmit-descriptor-fetch scheduling policy and the subsequent-transmit-data-read scheduling policy, discussed below. As described elsewhere herein, a lookup is generally performed on the MACDA contained in the first read, the nature of the destination becomes known as a result of the lookup, and the data can subsequently be appropriately directed to either a multicast VOQ or a fabric-port-specific unicast VOQ. Operation of the VOQs is discussed in more detail below, in conjunction with FIG. 6C.

On a cell-by-cell basis as space becomes available in the appropriate VOQ, the data from the transmit queue packet buffer (in shared memory) is read, additional information is added (such as priority and the destination fabric address and fabric sub-address), and the data is transferred to the appropriate VOQ as cells. As a matter of policy, cells from different packets are not co-mingled in the VOQs. The VOQs act as variable depth FIFOs, wherein the order in which cells enter a VOQ determines the order in which the cells leave the VOQ. As previously indicated, cells are released by the VOQs and transmitted to the fabric in accordance with the VOQ scheduling policy.

As data is transferred from the transmit queue packet buffers to the VOQs, the packet buffers are depleted. Responsive to the depletion, the subsequent-transmit-data-read scheduling policy generally attempts to keep the transmit queue packet buffers full of pre-fetched transmit read data up to the allocated pre-fetch depth, which is 16 cache-lines in one embodiment. In doing so, it gives higher priority to those transmit queue packet buffers that are supplying cells for a packet that is at the head of a VOQ (a packet being actively transferred as cells over the fabric). It gives lower priority to those transmit queue packet buffers that are not yet supplying cells to a VOQ.

Figure 6C:
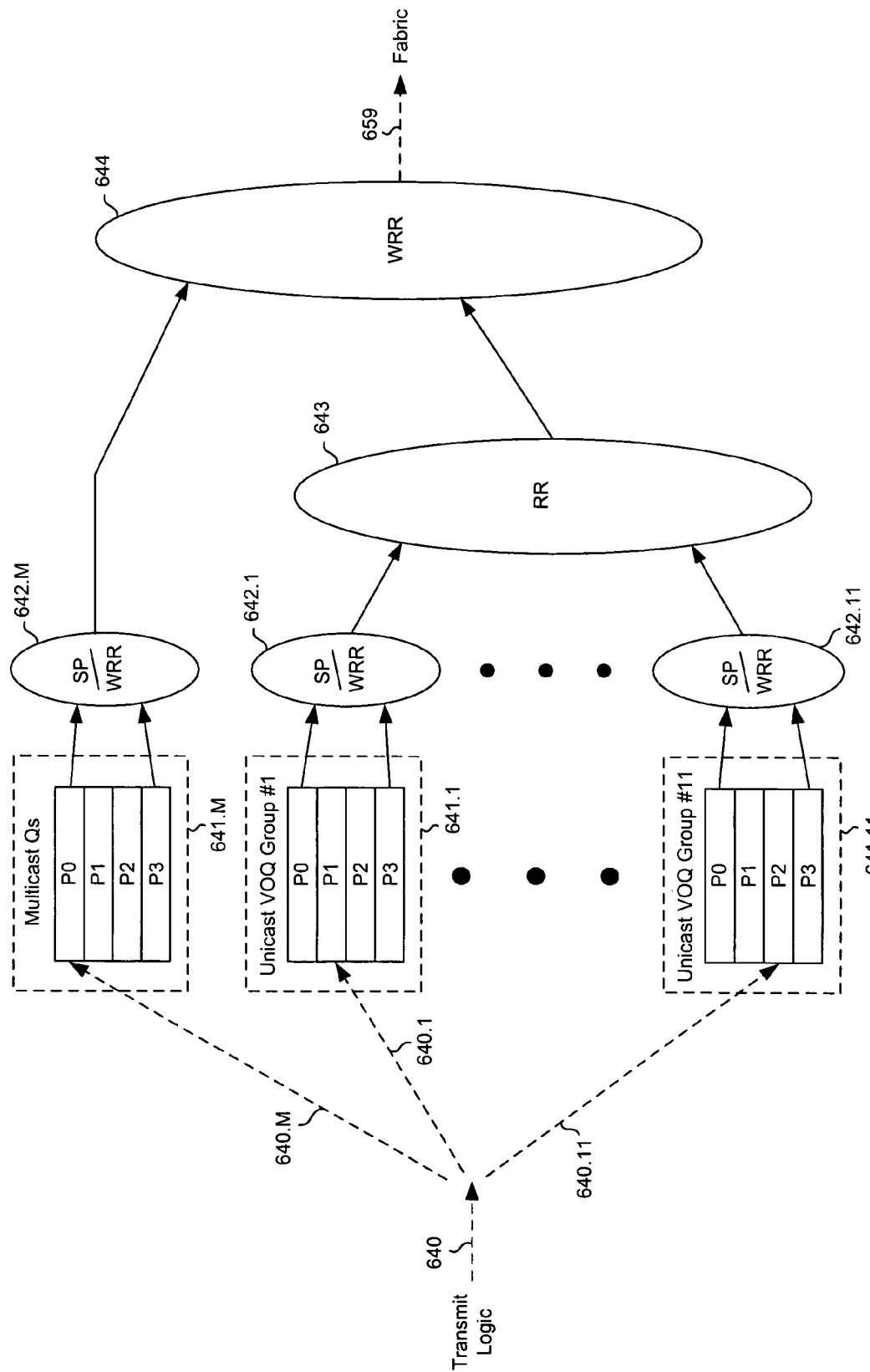
FIG. 6C illustrates selected aspects of a logical view of an embodiment of transmit output queue organization and prioritization.

FIG. 6C illustrates selected aspects of a logical view of an embodiment of a VOQ scheduling policy to provide efficient access to the fabric. The figure represents processing to select the VOQ to send the next data unit (cells in one embodiment) to the fabric. The VOQs send information to the fabric interface as cells. Accordingly, at least logically the VOQ receives information as cells. Physically, the VOQ could receive cells as constituent components (data, priority, fabric address, etc.) and assemble the cells just prior to sending the cells to the fabric interface. Furthermore, the VOQs may be implemented within the egress shared memory. Thus a number of levels of virtualization and indirection are possible. In one embodiment, the VOQs are implemented within the egress shared memory and they hold cells that have been pre-assembled and are ready for immediate transfer via the fabric interface to the switch fabric. The pre-assembly is performed at least in part by transfers to each VOQ from an appropriately dynamically associated transmit queue packet buffer (also in the egress shared memory).

Figure 7A:
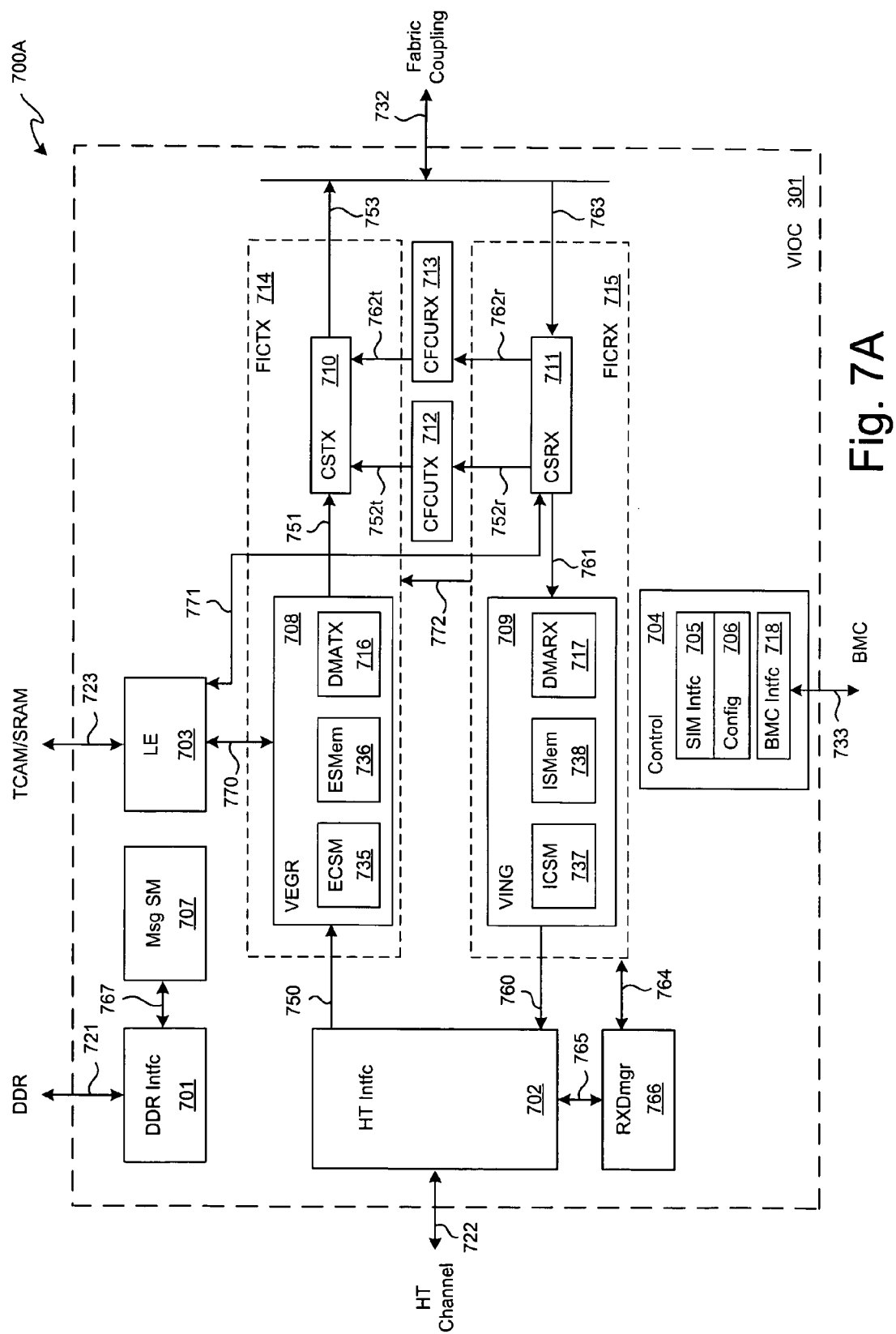
FIG. 7A illustrates selected aspects of an embodiment of a Virtual Input Output Controller (VIOC).

As indicated previously, transmit logic included in the VNIC implementation (such as in the egress logic of a VIOC as illustrated in FIG. 7A and as discussed below), assembles cells in preparation for providing them to the VOQs as represented abstractly by dashed-arrow 640. Included within each cell is a corresponding priority indication (one of four levels: P0, P1, P2, and P3, in selected embodiments) and a corresponding fabric destination address. The destination address may be a unicast address (one of up to 11 destinations, in some embodiments), or a multicast address. Multicast cells are enqueued into one of Multicast Output Queues 641.M (also known as Multicast VOQs) according to priority, as abstractly represented by dashed-arrow 640.M, illustrating insertion into the P0 priority multicast VOQ.

Unicast cells are enqueued into one of 11 unicast VOQ groups (Unicast VOQ Group #1 641.1 . . . . Unicast VOQ Group #11 641.11) according to the fabric destination address (VOQ Group #1 . . . VOQ Group #11) and further according to priority (P0 . . . P3) within each VOQ group. Since there are 11 destinations, each having four priorities, there are a total of 44 unicast VOQs. The unicast enqueue operation is illustrated by dashed-arrows 640.1, and 640.11. Arrow 640.1 abstractly represents a unicast transmit cell addressed to the first fabric destination being enqueued into the P1 priority VOQ of Unicast VOQ Group #1 641.1. Arrow 640.11 abstractly represents a unicast transmit cell addressed to fabric destination #11 being enqueued into the P2 priority VOQ of Unicast VOQ Group #11 641.11. For clarity, only two of the 11 Unicast VOQ groups of identical operation are shown in the figure.

Several levels of prioritization are performed to select the VOQ that will be permitted to send the next transmit cell to the fabric. A first prioritization level selects a candidate VOQ from within the Multicast VOQs (Multicast Output Queues 641.M) and each of the Unicast VOQ groups (Unicast VOQ Group #1 641.1 . . . . Unicast VOQ Group #11 641.11). The first level includes Multicast Output Queue Prioritization 642.M, selecting a single multicast VOQ from Multicast Output Queues 641.M according to either a straight or weighted round-robin priority scheme. The first level also includes Unicast Output Queue Prioritization 642.1, selecting one of Unicast VOQ Group #1 641.1 according to either a straight or weighted round-robin priority scheme. Identical prioritization processing is performed for each of the 11 Unicast VOQ groups, selecting one potential VOQ for each Unicast VOQ group. The resultant 11 unicast VOQ candidates are then evaluated in a second prioritization level, and the resultant single multicast VOQ candidate is then evaluated in a third prioritization level.

The second prioritization level selects, on a per VOQ group basis, one of the 11 unicast VOQ group VOQ candidates as selected by the first level. The second level includes Destination Prioritization 643, selecting a VOQ according to a round-robin priority scheme. Since the VOQ groups are organized by fabric destination, the second level is a fabric-destination-based prioritization. The single result unicast VOQ candidate is then evaluated in the third prioritization level.

The third and final prioritization level selects between the multicast and unicast VOQ candidates as provided by the first and second levels respectively. The third level includes Multicast vs. Unicast Output Prioritization 644, selecting the final multicast or the unicast VOQ candidate according to a weighted round-robin priority scheme. The final selected VOQ is then permitted to provide one cell to the fabric, as abstractly represented by dashed-arrow 659.

The selection of straight or round-robin prioritization is individually programmable for Multicast Output Queue Prioritization 642.M and each of Unicast Output Queue Prioritization 642.1 . . . 642.11. Weights for each of the weighted round-robin prioritizations (Multicast Output Queue Prioritization 642.M, Unicast Output Queue Prioritization 642.1 . . . . Unicast Output Queue Prioritization 642.11, and Multicast vs. Unicast Output Prioritization 644, for example) are individually programmable, in various embodiments.

In some embodiments, the number of VOQ groups is equal to the number of fabric destinations in the ES system (such as 11 VOQ groups and 11 fabric destinations). In some embodiments, the number of VOQ groups is greater than the number of fabric destinations (such as 16 VOQ groups and 11 fabric destinations). In some embodiments, more than one priority may share a VOQ, instead of each priority having a separate VOQ. For example, P0 and P1 priorities may share a first VOQ within a VOQ group and P2 and P3 priorities may share a second VOQ within the VOQ group. These and all similar variations are contemplated within the contexts of various embodiments.

Ingress Path VNIC/Queue Operation

Shared receive resources include enqueuing bandwidth for cells received from the fabric. The bandwidth is shared based on a priority included in the received data units (see the following FIG. 6D discussion). After enqueuing, the data units are classified according to destination VNIC and associated queue, including processing according to multicast and unicast destinations. Then the data units are dequeued for storage into Local Processor Memory according to priorities associated with the VNICs and the queues of the VNICs. The shared receive resources further include the dequeuing bandwidth (see the following FIG. 6E discussion).

Figure 6D:
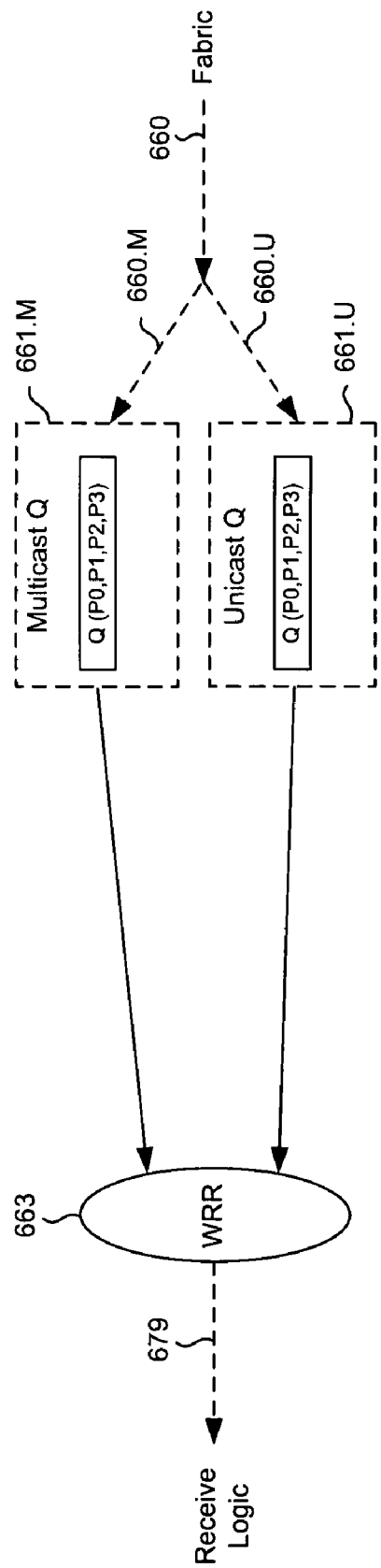
FIG. 6D illustrates selected aspects of a logical view of an embodiment of receive input queue organization and prioritization.

FIG. 6D illustrates selected aspects of a logical view of an embodiment to schedule the start of receive processing for incoming cells. Received cells are pushed into the VIOC from the fabric, typically via one or more First-In-First-Out (FIFO) or similar buffering mechanisms external to the VIOC, as suggested by dashed-arrow 660. As they enter, the cells are classified according to multicast or unicast (dashed arrows 660.M and 660.U, respectively), and inserted into Multicast Input Queues 661.M or Unicast Input Queues 661.U accordingly. In the illustrated embodiment, queue insertion is without regard to priority, as all priorities (P0, . . . P3) share the same queue for a given traffic type.

As illustrated, a single level of prioritization is performed by the receive logic to select an input queue from a candidate pool that includes Multicast Input Queues 661.M and Unicast Input Queues 661.U. The single level selects between the multicast and the unicast queues according to Multicast vs. Unicast Input Prioritization 663, a weighted round-robin priority scheme. As abstractly represented by dashed-arrow 679, the receive logic then pulls one cell from the queue selected for storage into receive logic memory (such as ISMem 738) and subsequent processing. Weights for Multicast vs. Unicast Input Prioritization 663 are individually programmable, according to various embodiments.

In a variation of FIG. 6D, some embodiments select the next cell to pull from the input queues at least in part according to priorities associated with the received cells. For example, the multicast and unicast input queues may be managed with priority information either included in the received data unit or determined as a function of the fabric transport priority associated with the received cell, according to embodiment. Multicast and unicast input queue insertion is then partially determined by the priority associated with the received cell, in addition to multicast versus unicast categorization. Multicast Input Queues 661.M and Unicast Input Queues 661.U are thus each modified to be organized with respect to data unit priority.

In some embodiments, there are four defined priority levels (P0, P1, P2, and P3), and each queue includes data associated with a single priority (i.e. there is a queue per categorization and priority pair). In some embodiments, each queue may include cells from a pair of priorities (P0 and P1 in a first queue, and P2 and P3 in a second queue, for example). In other embodiments, queue insertion is further determined according to information provided in response to a lookup operation based on information included in the received cell (see the TCAM/SRAM lookup state section, elsewhere herein).

In embodiments of FIG. 6D modified to have queues partially managed by priority, a first prioritization level selects, on a per queue priority basis, one candidate multicast input queue and one candidate unicast input queue from the multicast and unicast input queue groups respectively. The first prioritization may be straight priority, straight round-robin, or weighted round-robin, according to embodiment. The resultant two input queue candidates are then evaluated in a second prioritization level. The second prioritization level selects between the multicast and unicast input queue candidates according to a straight priority, straight round-robin, or weighted round-robin, according to embodiment.

In some embodiments that include priority-managed receive path input queues, at least some of the queues may be implemented with queue depths substantially larger than queue depths implemented for embodiments lacking priority-managed queues. In some of these embodiments having priority-managed queues, the receive path input queue depths are substantially larger than the effective queue depth of the fabric providing the receive data units.

In some embodiments, selected received cells are ignored (or dropped) according to programmable receive (or ingress) bandwidth limitations or policies, to prevent overuse of subsequent VIOC receive resources or associated Local Processor resources. In various embodiments, the ingress bandwidth limitation policies operate in parallel with the prioritization illustrated in FIG. 6D, and in various other embodiments the ingress policies operate either "before" or "after" the operations depicted in the figure. Some embodiments implement dropping policies according to a single cell, while other embodiments drop all subsequent cells of a packet or a message after dropping a first cell in response to a dropping policy operation.

Incoming unicast cells have a fabric sub-address that identifies the VNIC and receive queue to which the cell is associated. As each unicast cell is pulled from the unicast queue, the receive queue is ascertained and the data payload of the cell is placed into a corresponding receive queue packet buffer. The data carried by multicast cells is replicated in accordance with a Multicast Group IDentifier (MGID) and appropriately placed into multiple receive queue packet buffers. The data held within the receive queue packet buffers accumulates until written to Local Processor Memory in accordance with a receive-data-write scheduling policy, as illustrated in FIG. 6E.

The receive-data-write scheduling policy of FIG. 6E selects the next receive queue to be serviced. The queue selection determines the next receive data to write through the following indirection. Each receive queue points to a currently active receive descriptor, which describes a receive buffer in the Local Processor Memory that is ready to receive one or more packets. Each receive queue also has a corresponding receive queue packet buffer in the ingress shared memory. The receive data to be next written is the data unit (generally a cache-line in memory) identified by the next data unit write pointer of the receive queue packet buffer corresponding to the receive queue selected by the receive-data-write scheduling policy from the candidate pool of all VNIC receive queues. The selection is based in part on a prioritization among the VNIC receive queues, in a manner that is configurable in part. Each data unit written is scheduled independently (generally on a cache-line by cache-line basis) by the receive-data-write scheduling policy. The writes associated with each receive descriptor carry out the reassembly of corresponding data link layer frames (typically Ethernet frames).

For clarity, only two of the 16 VNICs (VNIC #1 600.1 and VNIC #16 600.16) are illustrated in FIG. 6E. Packet Receive Queues 684.1.P, as shown, includes four packet receive queues such as Packet Receive Queue #1 684.1.P.1 and Packet Receive Queue #4 684.1.P.4 of VNIC #1 600.1. These correspond to the four packet receive queues identified by each of Packet Receive Queue Pointer #1 608.1.1 . . . . Packet Receive Queue Pointer #4 608.1.4 respectively (of FIG. 6A).

Message Receive Queues 684.1.M, as shown, includes two message receive queues (Message Receive Queue #5 684.1.M.5 and Message Receive Queue #6 684.1.M.6) of VNIC #1 600.1. These correspond to the two message receive queues identified by an active message identified by each of Message Lists 615.1 (Message List #1 615.1.1 and Message List #2 615.1.2), as shown by dashed-ellipse 614.1 (of FIG. 6A). The other 15 VNICs are organized identically.

Several levels of prioritization are performed to select the next receive queue. A first prioritization level selects, for each VNIC, one candidate packet receive queue and one candidate message receive queue. The first level includes Packet Receive Queue Prioritization 682.1.P, selecting one of Packet Receive Queues 684.1.P according to a straight round-robin priority scheme. The first level also includes Message Receive Queue Prioritization 682.1.M, selecting one of Message Receive Queues 684.1.M according to a straight round-robin prioritization scheme. Identical processing is performed for each of the 16 VNICs, selecting one potential receive packet queue and one potential receive message queue for reach VNIC. The resultant 32 candidate queues are then evaluated in a second prioritization level.

The second processing level selects, for each VNIC, between the packet or the message receive queue as selected by the first prioritization level. The second level includes Packet vs. Message Receive Prioritization 681.1, selecting a packet or a message receive queue according to a straight round-robin priority scheme. Identical prioritization processing is performed for each of the 16 VNICs, selecting one candidate receive queue for each VNIC. These 16 candidate data units are then evaluated in a third prioritization level.

The third and final prioritization level selects, across the 16 VNICs, a single receive queue. The third level includes VNIC Prioritization 680, selecting one of the 16 receive queues provided by the second level according to a straight round-robin priority scheme. A final single resultant receive queue is selected and, through the indirection process described previously, a single data unit (generally a cache-line) is written via the HT interface into Local Processor Memory as abstractly represented by dashed-arrow 699.

In some embodiments, weighted round-robin prioritization may be performed for any combination of the first, second, and third prioritization levels, and the associated weights may be fixed or individually programmable, according to embodiment. Various embodiments may also provide individual programmable selection between straight and weighted round-robin for each of the first, second, and third prioritization levels.

Queue Priorities

Transmit and receive priority algorithms may vary according to embodiments. For example, in some embodiments, straight priority may implement a static priority having queue #1 as the highest, queue #2 as the next highest, and so forth with queue #4 as the lowest priority. In other embodiments, the priority order may be reversed (i.e. #4 is the highest and #1 is the lowest). In some embodiments, instead of weighted round-robin, straight, or simple (i.e. un-weighted round-robin) may be implemented. Round-robin weighting may be based on data units (cells, for example) or bytes, according to various embodiments. Weighted fair queuing may also be provided by some embodiments in place of or in addition to weighted round-robin, and the weighted fair queuing may be based on data units or bytes, according to various embodiments. Round-robin processing may be based on previously processed information or on queue depth, also according to embodiment.

VLAN Overview

In some embodiments, each VNIC is a member of one VLAN, which is a port-based VLAN (i.e., a virtual LAN defined by logical connection to a designated subset of available logical L2 switch ports). In other embodiments, each VNIC may be a member of a plurality of VLANs, including at least one port-based VLAN. In various embodiments, the VLANs may be port-based, MAC address-based, IP address-based, and L3 type VLANs. VLANs may be provisioned and managed by programming VNIC address information accordingly (such as VLAN Identifier 617.1, for example) and by writing corresponding lookup state (such as that retained in TCAM/SRAMs). VLAN management operations may be relatively static, as related to endpoints included within a server, or relatively dynamic, as related to endpoints external to the server. Internal endpoint VLAN operations include server and cluster provisioning and re-provisioning, VLAN specific provisioning, pluggable module insertion and removal, and failover responses, for example. VLAN operations may be supervised by controlplane processes executing on a SCM (such as Primary. SCM 140A), Driver processes executing on Local Processors, or combinations of the two, according to embodiment.

In some embodiments, VLAN related processing for egress data to the fabric includes determining a VLAN identifier. If the VLAN identifier does not match the source VLAN identifier, then the egress data may optionally be dropped, according to embodiment. The source VLAN identifier may be provided directly from VLAN Identifier 617.1 or derived from it, according to embodiment. If the destination MAC is not identifiable, then the egress data may be flooded to all destinations allowed by the source VLAN configuration, according to embodiment.

In some embodiments, VLAN related processing for ingress data from the fabric includes determining which VNICs, if any, are members of the VLAN identified by the received data, and providing the data to the member VNICs appropriately. If no VNICs are members of the destination VLAN, then the ingress data may be optionally dropped, according to embodiment. In some embodiments, VLAN related broadcasts to VNICs may be wholly or partially implemented using multicast group processing. VLAN ingress processing may optionally include determining the VLAN identifier associated with learning a MAC Source Address (MACSA) associated with the ingress data. Optionally processing may further include dropping the ingress data if the learning VLAN (i.e. the VLAN from which the MACSA was learned from) is different from the destination VLAN.

In some embodiments, VLAN broadcasts are implemented by assigning an MGID to each of the VLAN broadcast groups. In one embodiment there are 32K available MGIDs sharable between VLAN and IP broadcast groups.

Some embodiments implement Independent VLAN Learning (IVL), other embodiments implement Shared VLAN Learning (SVL), and still other embodiments implement IVL and SVL modes and configurable selection between them. IVL and SVL both enforce inter-VLAN isolation (within the same abstraction layer) through confirmation of VLAN membership based on MAC address. In IVL, forwarding entries (i.e., entries of the FIBs) are shared throughout the VLAN on which they are learned, but are not shared with other VLANs. In SVL, forwarding entries learned on a first VLAN are "shared" with other VLANs. Under SVL, a forwarding entry learned for a MAC address on a first VLAN (and therefore unreachable at the same abstraction layer by other VLANs) is used by the other VLANs for the limited purpose of dropping frames addressed to the MAC address on the first VLAN. The MAC address is known by the other VLANs to be unreachable only because of the SVL sharing. In this way, SVL prevents unnecessary flooding within any of the other VLANs, which under IVL would have occurred in a futile effort to reach the MAC address on the first VLAN (which under IVL, is guaranteed to be unknown to the other VLANs). Further details of IVL and SVL, particularly with respect to TCAM/SRAM configuration and use, is provided in conjunction with the discussion of FIGS. 8A and 8B.

Static VLAN management operations typically include distribution of VLAN membership information, removing the need for learning VLAN membership changes relating to provisioning, module insertion and removal, and failover responses. Typically VLAN learning operations are performed under the supervision of SCM-based management processes.

VIOC Internals

As previously described, at least one VIOC is included in each of PMM 150A, OLB 160A, FCM 120A, and each of the SCMs 140 (including Primary SCM 140A). Each VIOC typically implements functionality for a plurality of VNICs. The VIOC is illustrated in these various operating contexts in FIGS. 3A, 4A, 4B, 4D, and 4E. VIOC operation was summarized in the pluggable modules section above, in conjunction with an examination of VIOC 301.4 of FIG. 4A. As shown in FIG. 3A, the VIOC 301.5 is coupled and adapted to directly communicate packets 351 between RAM elements 350 and the Primary Switch Fabric Module 180A. The RAM elements are also accessible by one or more CPUs, enabling processes executing on the CPUs to directly exchange data via the fabric. With reference particularly to FIGS. 4A and 4B, CPUs coupled to RAMs accessible by VIOCs in this manner are examples of Local Processors, and the coupled RAMs are examples of Local Processor Memory. RAM elements 411.4L and 411.4R are accessible via an HT Channel 460.4R, and the fabric is accessible via a Common Switch Interface consortium (CSIX) channel 149A.

The transmission and reception of packet (and message) data directly between Local Processor Memory and the fabric corresponds to dataplane functionality. Control of dataplane functionality corresponds to controlplane functionality and conceptually includes forwarding tables and related state information included in part in the TCAM/SRAM. Control packets (also known as VIOC-CP packets) generated by the SCM are received via the fabric and processed by the VIOCs, resulting in selective accesses to configuration registers and the TCAM/SRAM coupled to each VIOC. The forwarding and state information of the TCAMs/SRAMs is typically initialized and maintained in this way. In various embodiments, the control packets are provided by management and controlplane processes executing on any combination of the SCMs, PMMs, and OLBs. Configuration information of a more general nature is typically provided in part by a BMC.

The VIOC and processes executing on the Local Processors communicate in part by sharing portions of the Local Processor Memory space. Included in these shared portions are the packet and message queues as described in the VNIC overview and queuing operation section. In addition, the VIOC itself appears as an intelligent memory-mapped I/O device residing in a portion of the Local Processor Memory space. In this way, the VIOC provides access to configuration registers and certain state relating to packet (and message) transmission and reception.

The packet transmit and receive descriptors associated with the VNICs describe raw data buffers in the Local Processor Memory where packet data is respectively read and written by the VIOC, via DMA operations, in order to implement VNIC functions. In some embodiments, at least some of the packet transmit and receive descriptors are prefetched into buffers onto the VIOC to improve performance. In certain embodiments, all of the packet receive descriptors corresponding to the VIOC's VNICs are buffered. When reference is made herein to one or more descriptors within or on the VIOC, those skilled in the art will understand that such descriptors are the buffered copies of the same descriptors within the Local Processor Memory. The VIOC operates on the completion queues directly in the Local Processor Memory.

In certain embodiments, the packet CSB's are held within the VIOC to improve performance. The message context state is kept in either the Local Processor Memory, or in memory private to the VIOC (such as the TCAM/SRAM or the DDR DRAM discussed herein below). Since in certain embodiments the packet CSBs that represent the packet queues are held on-chip, and since some descriptors are buffered on-chip, for some conceptual purposes the queues may be thought of as residing within the VIOC. Those skilled in the art will understand that this is an informal abstraction, as the queues actually reside in Local Processor Memory.

Packet and message transmission corresponds to data flowing out from the VIOC to the fabric, also known as VIOC egress, or simply as egress when discussing the VIOC operation. Conversely, packet and message reception corresponds to VIOC ingress, or simply ingress.

FIG. 7A illustrates selected aspects of one VIOC embodiment as VIOC block diagram 700A. Included in VIOC 301 are several interfaces, including a unit for coupling to Double Data Rate (DDR) DRAM memories (DDR Interface 701) via coupling 721, a unit for coupling to an HT channel (HT Interface 702) via coupling 722, and a block for coupling to a BMC (BMC Interface 718 included in VIOC Control 704) via coupling 733.

Further included in VIOC 301 are FICTX 714 (an instance of a VIOC fabric interface communication transmit unit) and FICRX 715 (an instance of a VIOC fabric interface communication receive unit). FICTX 714 includes egress path elements Vioc EGRess interface (VEGR) 708, and CSix Transmit unit (CSTX) 710. VEGR 708 includes DMATX 716, an instance of a transmit DMA unit; ECSM 735, an instance of Egress Control State Machines; and ESMem 736, an instance of an Egress Shared Memory. FICRX 715 includes ingress path elements Vioc INGress interface (VING) 709, and CSix Receive unit (CSRX) 711. VING 709 includes DMARX 717, an instance of a receive DMA unit; ICSM 737, an instance of an Ingress Control State Machines; and ISMem 738, an instance of an Ingress Shared Memory that in some embodiments is an implementation of the receive logic memory.

Flow control blocks Csix Flow Control Unit Transmit side (CFCUTX) 712 and Csix Flow Control Unit Receive side (CFCURX) 713, included in VIOC 301, are coupled from the receive path to the transmit path. As described in more detail elsewhere herein, CFCUTX 712 is used to temporarily suspend sending by CSTX 710 upon receiving an indication of fabric congestion and CFCURX 713 is used to indicate VIOC congestion to other modules. Other VIOC elements include RXDmgr 766, and shared egress and ingress elements Lookup Engine (LE) 703 and Message State Machine 707. VIOC 301 control elements include VIOC Control 704, in turn including SIM Interface 705, VIOC Configuration block 706, and BMC Interface 718.

For clarity and emphasis, only selected egress and ingress data flows are indicated explicitly in the figure. Generally, egress data enters VIOC 301 via HT Channel coupling 722, and flows from HT Interface 702 to VEGR 708 via coupling 750, under control of DMA read protocols implemented by DMATX 716. The egress data continues to CSTX 710 via coupling 751, exiting CSTX 710 via coupling 753, and exits VIOC 301 via Fabric Coupling 732. Similarly, ingress data flows in a symmetric reverse path, entering via Fabric Coupling 732 and continuing to CSRX 711 via coupling 763 and then to VING 709 via coupling 761. The ingress data proceeds to HT Interface 702 via coupling 760 under control of DMA write protocols implemented by DMARX 717 to exit VIOC 301 via HT Channel coupling 722.

Information related to egress flow control is provided from CSRX 711 to CFCUTX 712 via coupling 752r. Egress flow control commands are provided from CFCUTX 712 to CSTX 710 via coupling 752t. Information related to ingress flow control is provided from CSRX 711 to CFCURX 713 via coupling 762r. Ingress flow control commands are provided from CFCURX 713 to CSTX 710 via coupling 762t. Control packet handshaking is provided from FICRX 715 to FICTX 714 as shown by ingress-egress coupling 772.

Although couplings 750, 751, 753, 760, 761, 763, and 772 are illustrated as unidirectional, this is only to highlight the primary flow of data, as control and status information, for example, flows along similar pathways in a bidirectional manner. Internal egress path related coupling 770 and ingress path related coupling 771 illustrate LE 703 request and returning status and result communication with VEGR 708 and CSRX 711, respectively.

VIOC Configuration block 706 includes configuration and mode information relating to operation of VIOC 301, generally organized into registers, including system configuration registers and local configuration registers. The system and local configuration registers are typically accessed by management processes executing on Primary SCM 140A, by control packets sent to Fabric Coupling 732, and then processed by CSRX 711 and SIM Interface 705. The system registers are typically inaccessible to processes executing on Local Processors, and include a plurality of scratchpad registers typically used for communication with the management processes via a scratchpad communication protocol. However, the local registers are typically accessible via the HT channel by Hypervisor, OS, and Driver processes executing on Local Processors. Hypervisor and OS processes typically configure environments for Application processes so that the local configuration registers are inaccessible to the Application processes.

The system registers include VNIC related registers, such as Address Block 601.1 (of FIG. 6A) for each of 16 VNICs. Also included is a bit (or mask) per VNIC to enable and disable the corresponding VNIC. The local registers include pointers and state information associated with I/O Block 605.1 (of FIG. 6A) of each of the 16 VNICs.

During initialization and debug, Local Processor access to the system registers may be provided by manipulation of a field in the system configuration registers. In addition, the system and local configuration registers are accessible via BMC command and data information received from BMC Interface 718.

In one embodiment, VIOCs included on controlplane modules (such as SCMs included in SIMs) are initialized by BMC commands to enable selected privileged operations, including transmission via the fabric of control packets without lookup processing (these packets are also referred to as 'No Touch' packets). No Touch packets may be used for control packets (to initialize or modify forwarding information included in TCAM/SRAMs) and to forward an exception packet from an SCM to the proper destination. VIOCs included on other modules (such as PMMs, OLBs, and FCMs) are initialized to disable No Touch packet transmission, i.e. packets (and messages) are always processed with an egress lookup.

SIM Interface 705 is coupled to receive control packets from CSRX 711 as typically provided by controlplane processes executing on an SCM included in a SIM. The control packets are parsed to determine the included command and any associated parameters, such as address and data. SIM Interface 705 then passes the command and parameters to the proper element of VIOC 301 for execution. Return handshake status is typically provided in the form of a packet addressed to the sending SCM from FICRX 715 to FICTX 714 via ingress-egress coupling 772, and FICTX 714 provides the packet to the fabric.

BMC Interface 718 includes logic for interfacing to a BMC, including receiving, processing, and responding to BMC commands received via coupling 733. The interface parses the command, provides the command and any associated parameters to the proper unit of VIOC 301, and returns response information as appropriate.

HT Interface 702 includes an HT Channel compatible external interface providing read and write style accesses to resources available via coupling 722. Read response information (typically associated with egress processing) is provided to VEGR 708 via coupling 750. Write information (typically associated with ingress processing) is provided from VING 709 via coupling 760. In a typical usage scenario, the read and write accesses target memory locations in RAMs coupled to CPUs coupled in turn to HT Channel coupling 722 (i.e. Local Processor Memory). HT Channel coupling 722 is an illustrative instance of HT couplings including 460.4R, 460.5R, 460.5R', 460.6R (of FIGS. 4A, 4B, 4B, and 4E, respectively).

DDR Interface 701 includes logic for coupling to DDR DRAMs via coupling 721. DDR Interface 701 communicates with Message State Machine 707 via coupling 767, as shown. DDR Interface 701 also communicates with other elements of VIOC 301 via implicit communication paths that allow access to the DRAMs via control packets (SIM Interface 705), BMC commands (BMC Interface 718), and processes executing on Local Processors (HT Channel coupling 722), in addition to VIOC internal requests (Message State Machine 707, VIOC Control 704, FICTX 714, and FICRX 715). The topology of these paths will be understood by those of ordinary skill in the art. In various embodiments, DDR SDRAM typically includes data structures related to context and message related processing (such as CSBs), as well as virtual to physical address translation for transmit and receive buffer addresses in Local Processor Memory.

Message State Machine 707 manages message state (including connecting, established, closing, and closed) for a plurality of message contexts, such as those associated with the 16 VNICs, according to a connection-oriented reliable protocol. According to embodiment, message state is stored in part in DDR coupled via coupling 721 to DDR Interface 701, and coupling 767 communicates requests for DDR reads and writes, as well as resultant read data between the state machine and the DDR interface. The state machine also provides for message handshaking and re-delivery attempts by appropriate processing and communication with FICTX 714 and FICRX 715, via implicit couplings that will be understood to those of ordinary skill in the art. For example, message related inspection and processing of incoming information may be performed in CSRX 711 under the direction of Message State Machine 707. Similarly, message related processing and information insertion may be performed in CSTX 710 also under the control of the state machine. Further included in Message State Machine 707 are logic units for performing RDMA.

RXDmgr 766 includes logic for fetching and prefetching receive descriptors to support ingress operation. Receive descriptor requirements and results are communicated with FICRX 715 via coupling 764. Requests to read descriptors from Local Processor Memory are provided to HT Interface 702 via coupling 765, and returning data is returned via coupling 765.

FICTX 714 includes logic (VEGR 708) implementing egress path processing, including accessing packet data for transmission and cellification using DMA protocols, according to configured priorities and bandwidth allocations, and including one lookup (LE 703 via coupling 770). The lookup typically provides a fabric egress port based in part on the packet destination address (typically a MAC address) and relevant VLAN related information. The included logic also implements packet data cellification and CSIX cell-level processing (CSTX 710). An overview of selected aspects of packet access and cellification is provided with respect to FIG. 3A. In some embodiments, FICTX 714 processes selected multicast packets (and hence cells) using cell-level multicast capability provided by the fabric.

VEGR 708 includes logic blocks performing packet egress processing functions including transmit queue management and scheduling (see FIG. 6B and the related discussion), transmit packet scheduling, packet segmentation into cells (including a packet address processing lookup via LE 703), various control state machines within ECSM 735, and an egress shared memory ESMem 736. DMATX 716, included in VEGR 708, is configured to transfer packet image data from Local Processor Memory to the egress shared memory, and further configured to transfer data from the egress shared memory to CSTX 710. In an illustrative embodiment, the VOQs are implemented as pointer managed buffers that reside within the egress shared memory. The DMA transfers are managed by the control state machines in VEGR 708 according to bandwidth and priority scheduling algorithms.

CSTX 710 includes logic blocks performing cell egress processing functions. Logic units in CSTX 710 read cell data according to the VOQs as scheduled by a VOQ prioritizing algorithm (see FIG. 6C and the related discussion), calculate horizontal parity, vertical parity, and CRC for each cell, and then send the results and the cell data to the fabric. Logic units in CSTX 710 include CSIX egress queue structures and associated transmit data path (FIFO) buffers, CSIX compatible transmit flow control logic responsive to information received from CFCUTX 712, logic responsive to information received from CFCURX 713 (to apply fabric back-pressure using CSIX compatible receive flow control instructions), and a transmit-side CSIX compatible external interface for Fabric Coupling 732.

CFCUTX 712 (shown outside of FICTX 714 in the figure, but closely associated with egress processing) includes fabric congestion detection logic and VOQ feedback control logic to instruct CSTX 710 to stop sending cell traffic from a VOQ when fabric congestion is detected. When the congestion is relieved, the logic instructs CSTX 710 to resume cell traffic from the stopped VOQ. Fabric congestion information is provided to CFCUTX 712 from CSRX 711 as it is received from the fabric.

The VOQ prioritizing algorithm implemented in CSTX 710, as illustrated in FIG. 6C, includes configurable weighted round-robin priority between unicast output queues and multicast output queues, round-robin priority among VOQ groups, and straight priority within VOQ groups. The algorithm also guarantees that all cells associated with a given packet are sent in order, and further that cells from different packets from the same VOQ are not intermingled. In other words, once a first cell for a packet from a selected one of the VOQs is sent, then the remainder of the cells for the packet are sent before any cells of any other packet from the selected VOQ are sent.

FICRX 715 includes logic implementing ingress path processing, including CSIX cell-level processing (CSRX 711), and packet-level processing (VING 709), including storing reassembled packets using DMA protocols. An optional lookup (LE 703) is performed under the control of CSRX 711 via coupling 771. The lookup provides information related to processing the packet, including mapping the packet to the proper receive queue.

CSRX 711 includes logic blocks performing cell ingress processing functions. Logic units in CSRX 711 receive, buffer, and parse cell data from the fabric. Logic units in CSRX 711 include a receive-side CSIX compatible external interface for Fabric Coupling 732, CSIX ingress queue structures and associated CSIX receive data path (FIFO) buffers, a CSIX cell parser unit, and transmit and receive flow control information detection logic.

CFCURX 713 (shown outside of FICRX 715 in the figure, but closely associated with ingress processing) includes VIOC congestion detection logic and fabric feedback control logic to instruct the fabric to stop sending cell traffic of a specific priority when VIOC congestion is detected for that priority. When the congestion is relieved, the logic instructs the fabric to resume cell transmission. Receive flow control instructions to the fabric are communicated via CSTX 710. This method of congestion relief is referred to elsewhere herein as applying fabric back-pressure.

Cell data is received from the fabric, including horizontal parity, vertical parity, and CRC. The parities and CRC are computed for the received data, checked, and errors logged. Cell and packet headers are parsed, and in some embodiments an optional lookup is performed (LE 703) for selected unicast packets to determine in part an appropriate receive queue. In some embodiments, an optional lookup is performed for multicast packets, VLAN broadcast packets, or both, according to embodiment, to determine in part one or more appropriate receive queues or multicast group identifiers, also according to embodiment. Unicast lookups (if performed) are typically based in part on a source fabric port address and a context key included in the packet header. Some embodiments omit unicast lookups entirely. Control packet data is written into a control packet portion of the CSRX's FIFOs, and subsequently sent to SIM Interface 705 for further processing, while non-control packet data is written to a data portion of the CSRX's FIFOs.

VING 709 includes logic blocks performing packet ingress processing functions including receive and completion queue management and scheduling, receive packet scheduling (see FIG. 6D and the related discussion), cell reassembly into packets, various control state machines, and an ingress shared memory. DMARX 717, included in VING 709, is configured to transfer cell data into Local Processor Memory from the Ingress Shared Memory (ISMem 738). The DMA transfers are managed by the Ingress Control State Machines (ICSM 737) in VING 709. A receive buffer is considered complete (or consumed) when either the last available location in a buffer is written, or the last cell of a packet is written. Buffer completion is indicated by writing an entry to one of the completion queues, with data including packet receive status (Error or OK), receive processing (or thread) number, and context key (if the data includes the last cell of the packet).

The completion queue write information optionally includes results of packet-level CRC and 1's complement computations for use by Driver or other processes executing on the Local Processors.

VING 709 controls movement of cell data from the ingress shared memory (ISMem 738) to Local Processor Memory during packet reconstruction according to various receive scheduling algorithms (see FIG. 6E and the related discussion), including determination of buffers in the Local Processor Memory, selection of cell data to transfer, and movement of the packet data to the Local Processor Memory. Buffers are determined by processing receive descriptors, and in some embodiments the receive descriptors are fetched and processed according to a round-robin priority between the groups of receive queues. Cell data is scheduled for transfer to the Local Processor Memory according to a selection between unicast and multicast queues for insertion into the receive queues, as illustrated by FIG. 6D. This is followed by a weighted round robin-scheduling algorithm between the groups of receive queues, as illustrated by FIG. 6E, according to various embodiments. Packet data movement into the Local Processor Memory is also directed in part according to flow control information from HT Interface 702 that VING 709 responds to in order to prevent overrunning limited resources in the HT interface.

Fabric Coupling 732, in one embodiment, includes a Fabric Interface Chip (FIC) providing low-level functions relating to coupling to an embodiment of SFM 180 that includes Fabric Switch Chips (FSCs). Fabric Coupling 732 is an illustrative instance of generic fabric couplings, which in the system as a whole further includes FCM-Fabric coupling 129A, NM-Fabric coupling 139A, OLB-Fabric coupling 169A, PMM-Fabric coupling 159A, and PMM-Fabric coupling 159A', for example.

LE 703 includes TCAM and SRAM interfaces, and accepts egress lookup requests from VEGR 708 and ingress lookup requests from CSRX 711. Lookup requests include a key and a look up transaction identifier. The TCAM is searched for a first entry matching the key, and if a match is found, a corresponding entry from the SRAM is read. When processing is complete and lookup information available, the requestor is notified by a handshake, and the transaction identifier, a match indication, and result data (if a match) are returned to the requestor (one of VEGR 708 and CSRX 711). Request processing is pipelined in LE 703, but if the Lookup Engine is unable to accept a request, then an acceptance delayed indicator is provided to the requestor. In one embodiment the key and the results are each 64 bits, both are multiplexed in two 32-bit chunks, and the transaction identifier is 4 bits.

In addition to lookup requests during egress and ingress processing, LE 703 supports directly reading and writing the TCAM and SRAM to examine and modify lookup information, via requests from BMC Interface 718, SIM Interface 705, and HT Interface 702.

In operation, VIOC 301 and related components are initialized to set configuration, mode, initial state, and other related information. For example, selected management and configuration control information maintained in VIOC Configuration block 706 is written by an external BMC via coupling 733 and BMC Interface 718. Additional information is optionally written by an external agent via packets received from Fabric Coupling 732, CSRX 711, and SIM Interface 705. Additional information may also be optionally written by an agent coupled to HT Channel coupling 722 via HT Interface 702. Typically, the management and configuration control information is provided by management processes executing on Primary SCM 140A, as described elsewhere herein.

Initial (as well as subsequent) ingress and egress lookup information, including forwarding, VLAN, and multicast information, is typically provided by controlplane and related processes executing on Primary SCM 140A. The information is included in packets sent by the processes and received via Fabric Coupling 732, CSRX 711, and SIM Interface 705. The lookup information is stored in TCAM/SRAM resources coupled to VIOC 301 via TCAM/SRAM coupling 723 by LE 703. Portions of state stored in the TCAM/SRAM may also be optionally initialized by the agent coupled to HT Channel coupling 722 via HT Interface 702 and LE 703.

After initialization, VIOC 301 and related elements are available for directly communicating packets (and messages) between clients coupled to the fabric, as described with respect to FIG. 3A and FIG. 4A. The communication is bidirectional, including egress (from Local Processor Memory to fabric) and ingress (from fabric to Local Processor Memory), and is typically accessible to processes executing on Local Processors via a VNIC-style interface as illustrated by FIG. 6A.

Egress operation serves to directly transmit a buffer of packet data, as provided by a Driver process in conjunction with an OS executing on a Local Processor, to the fabric. The Driver (or optionally an Application process) forms a packet image within the buffer. A transmit descriptor, including the physical address of the buffer, the buffer size, a valid indicator, and a done indicator, is fabricated by the Driver and placed on one of the transmit descriptors. The valid indicator is asserted by the Driver to indicate the descriptor is ready for processing by VIOC 301. The done indicator is initially deasserted by the Driver and later asserted by VIOC 301 when the descriptor and the underlying buffer data have been fully processed by the VIOC. Upon assertion of done the buffer is available for subsequent use by the Driver.

After forming the packet image and the transmit descriptor, in one illustrative scenario, the Driver informs VIOC 301 that additional packet data is available for transmission by accessing a corresponding Doorbell, asynchronously interrupting VIOC 301. The Doorbell access is sent via HT Channel coupling 722, received by HT Interface 702, and processed by VIOC Control 704. In another illustrative scenario, instead of the Doorbell access, VIOC 301 polls transmit descriptors, examining the associated valid indicators, to determine that additional packet data is available for transmission.

When additional packet data is available for transmission, VEGR 708 accesses the transmit queue using DMA processing functions included in DMATX 716 according to the bandwidth and priority scheduling algorithms of FIG. 6B. Algorithms implemented by the priority scheduling of the transmit queue accesses include straight priority, round-robin, and weighted round-robin, and priority is determined between transmit packet queues and transmit message queues. The information obtained from the queue includes a descriptor including a pointer to the new packet images. VEGR 708 analyzes the descriptor, providing the pointer to DMATX 716 and requesting additional accesses to begin to read in the packet image. The packet image begins with a packet header, including packet destination and priority information. VEGR 708 formats information from the packet header, including the destination, along with VLAN processing related information, into a lookup request in a suitable format, and passes the request to LE 703. LE 703, in turn, accepts the request when room for the request is available, and processes it by accessing the coupled TCAM/SRAM. The lookup result, including a destination fabric port address, is used in forming appropriate cell headers, including a fabric destination port address. Packet data is cellified and sent to CSTX 710 for further processing.

CSTX 710 receives the cellified packet data, including cell header information, and processes the data according to the VOQ prioritizing algorithms of FIG. 6C. Cell data is sent according to the configured priority algorithm, and CSTX 710 is further responsive to flow control instructions received from CFCUTX 712. Cell parities and CRC are calculated and provided to Fabric Coupling 732 along with the cell header and data information.

Ingress operation is conceptually the reverse of egress operation, and serves to directly receive packet data into a buffer in Local Processor Memory, the buffer being directly accessible by a Driver process (and optionally an Application process) executing on a Local Processor. A receive descriptor, including the physical address of the buffer, the buffer size, and a valid indicator, is fabricated by the Driver and placed on one of the receive descriptor queues. The valid indicator is asserted by the Driver to indicate the descriptor is ready for use by VIOC 301. Typically VIOC 301 prefetches (under the direction of RXDmgr 766) and preprocesses one or more receive descriptors in preparation for receiving cell data and storing it into a new receive buffer in Local Processor Memory. A completion queue entry is written by VIOC 301 when the buffer has been filled with packet image data.

CSRX 711 receives CSIX cells, checks parities and CRC for the received cells, parses cell headers, and for the first cells of packets, parses a packet header. Information related to flow control is provided to CFCURX 713, and fabric back-pressure is applied (via CSTX 710) when VIOC congestion is detected. A lookup is performed via LE 703 for the first cells of multicast packets, to determine proper destinations and required replication of the packet. Further within CSRX 711, control packet data is FIFOed for presentation to and processing by SIM Interface 705, while non-control packet data is FIFOed for further data path processing in accordance with FIG. 6D as discussed elsewhere herein.

VING 709 directs DMARX 717 to store received non-control packet data as complete or partially reassembled packets into Local Host Memory via DMA transfers according to the various receive scheduling algorithms of FIG. 6E. When a buffer is completely filled (or the last datum of a last cell of a packet is stored), VING 709 directs writing a corresponding completion queue entry, including status (Error or OK), thread number, context key, and optionally packet-level CRC and 1's complement results. This completes the reception of the packet (if the last cell was received) and the packet image is available for use directly by the Driver (or optionally an Application) process executing on a Local Processor.

Control packets are sent in-order to SIM Interface 705 for further processing. SIM Interface 705 parses the control packet and passes command, address, and data information to the appropriate VIOC element for execution. Return handshake status and result information is typically provided via ingress-egress coupling 772 as a packet (typically addressed to an SCM) for transmission to Fabric Coupling 732. Control packets, typically provided from a controlplane process executing on Primary SCM 140A, may be used at any time to effect updates or changes to forwarding, VLAN, multicast, and other related state information included in TCAM/SRAM coupled to VIOC 301.

Egress and ingress buffer operation is not restricted to physical addresses, as virtual addresses may be supplied in transmit and receive descriptors. VIOC 301 references coupled DDR DRAM via coupling 721 to access translation mapping information. The VIOC then translates the virtual addresses to physical addresses and processing proceeds accordingly.

During message operation, Message State Machine 707 manages various aspects of the reliable connection-oriented protocol, and directs overall processing according to message related queues and associated descriptors. The reliable protocol includes handshake and retry information that is communicated from VING 709 to VEGR 708 via ingress-egress coupling 772 for communication as messages on Fabric Coupling 732. Message operation is otherwise similar to packet operation.

Some embodiments implement packet operation only, while other embodiments implement packet and message operation. Embodiments implementing only packet operation omit Message State Machine 707 and associated processing logic.

Those of ordinary skill in the art will recognize that VIOC 301 is an example embodiment only. For example, consider that in other embodiments the external couplings may have differing bandwidths to that described heretofore. For example, a VIOC used in a controlplane context, such as an SCM included on a SIM, may be implemented with reduced bandwidth variations of Fabric Coupling 732 and HT Channel coupling 722 compared to a VIOC used in a dataplane context, such as a PMM. In one embodiment, the VIOC included in the SCM is coupled to the SFM via one-half the coupling bandwidth of the VIOC included in the PMM. In another embodiment, the VIOC included in the OLB is coupled to the SFM via one-half the coupling bandwidth of the VIOC included in the PMM.

Those of ordinary skill in the art will also recognize that the partitioning illustrated in VIOC 301 is only illustrative, and that any number of other arrangements and variations may be implemented. For example, the functions relating to SIM Interface 705, VIOC Configuration block 706, and Message State Machine 707, may be incorporated within the control state machines of VEGR 708 and VING 709. Functions implemented in the blocks of FICTX 714 and FICRX 715 may be rearranged in other equivalent organizations. These and other such arrangements are contemplated in various embodiments.

VIOC Egress Operation

Figure 7B:
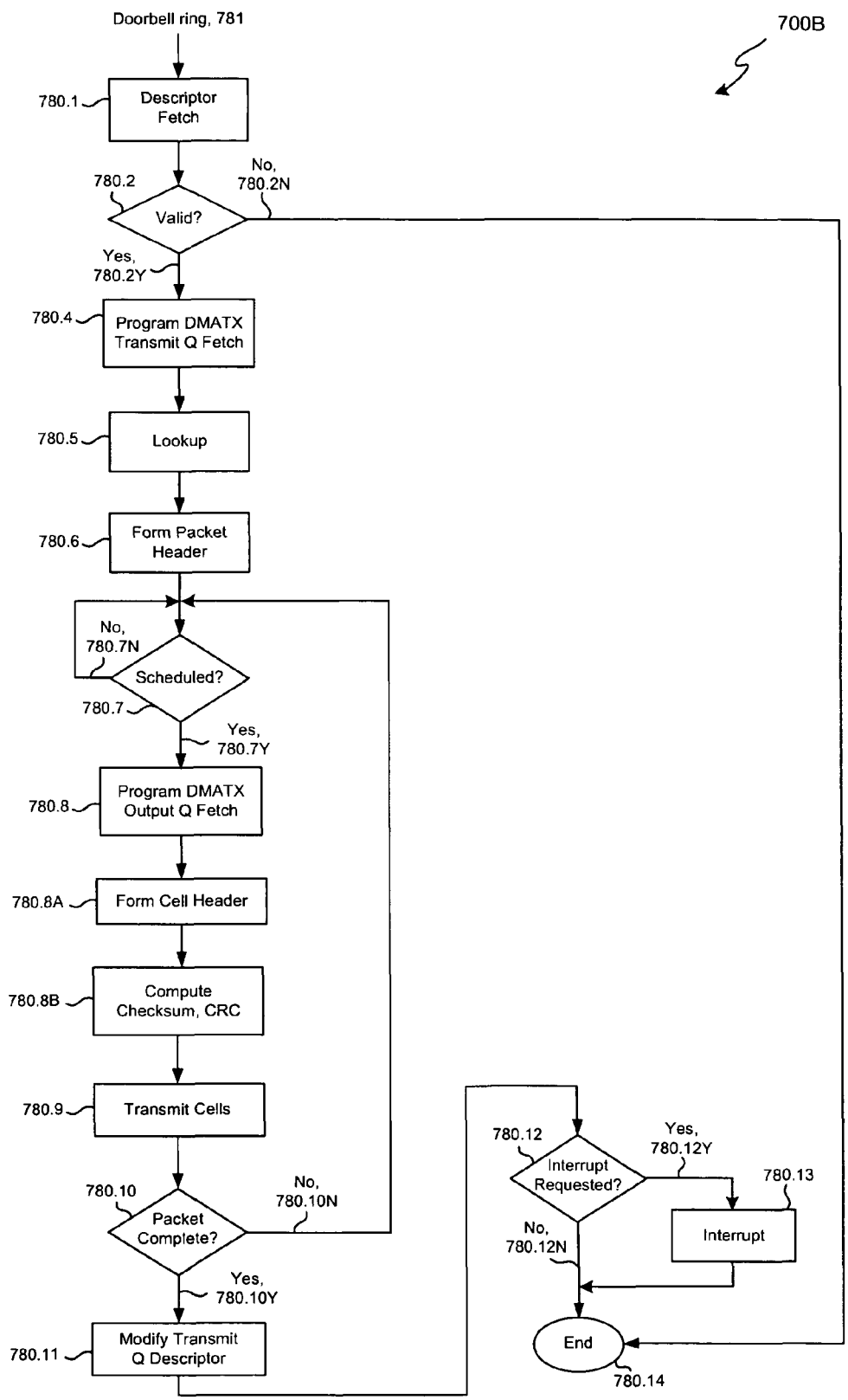
FIG. 7B illustrates selected aspects of egress operation of an embodiment of a VIOC.

FIG. 7B illustrates selected aspects of egress operation of an embodiment of a VIOC as flow diagram Egress Overview 700B. For clarity, only selected details related to packet processing are shown (message processing is similar). Processing begins upon receipt of "Doorbell Ring" 781, indicating availability of one or more new transmit descriptors pointing to packets available for transmission. Flow proceeds to "Descriptor Fetch" 780.1, where transmit descriptors are fetched (in accordance with the scheduling illustrated by FIG. 6B) and passed to "Valid?" 780.2 to determine which descriptors are valid for processing by the VIOC. If an invalid descriptor is detected, then an error condition is present, and processing is complete ("No" 780.2N proceeds to "End" 780.14). If the descriptor is valid, then flow continues to "Program DMATX Transmit Q Fetch" 780.4 via "Yes" 780.2Y.

Processing continues as "Program DMATX Transmit Q Fetch" 780.4 analyzes the fetched descriptor information to determine the buffer address and length, and configures DMATX 716 to fetch the packet data located in the buffer and to store the data into ESMem 736. The fetched packet data is in turn analyzed to determine the destination, and a lookup is performed according to the MAC destination address (MACDA) and the VLAN of the associated with the descriptor at "Lookup" 780.5. The lookup result, including a destination fabric port address is used in part by "Form Packet Header" 780.6 to formulate a working image of a packet header. Typically the packet header includes other information from the address block of the VNIC sourcing the transmission (such as Address Block 601.1, of FIG. 6A), including a MAC source address (such as MAC Address 603.1, of FIG. 6A), and a VLAN tag (such as VLAN Identifier 617.1, of FIG. 6A). Some embodiments implement VLAN processing such as dropping the packet if source and destination VLANs are different.

Processing continues as "Scheduled?" 780.7 determines if a first cell of the packet is scheduled, and if not, loops back via "No" 780.7N until the cell is scheduled. The scheduling is as illustrated in FIG. 6C. When the cell is scheduled ("Yes" 780.7Y), flow proceeds to "Program DMATX Output Q Fetch" 780.8 where DMATX 716 is programmed to fetch data from ESMem 736 for insertion into the appropriate output queue. In one embodiment, the output queues are implemented within ESMem 736. It will be understood that data transfers within the same memory structure may be at least in part performed logically via pointer manipulation rather than via physical data transfers. A cell header is formulated in "Form Cell Header" 780.8A, for encapsulating cells corresponding to the packet. The fetched data is processed ("Compute Checksum, CRC" 780.8B) to determine packet-level error detection information in CSTX 710 (of FIG. 7A). The cell header and cell data (corresponding to cell-sized chunks of the packet data) are then ready for transmission on the fabric by CSTX 710 ("Transmit Cells" 780.9).

Processing continues as "Packet Complete?" 780.10 determines if the entire packet has been transmitted. If not ("No" 780.10N), then flow returns to "Scheduled?" 780.7 to continue sending the packet. If the entire packet has been transmitted ("Yes" 780.10Y), then flow proceeds to "Modify Transmit Q Descriptor" 780.11 to indicate that the buffer identified by the transmit descriptor has been transmitted by setting the done indicator accordingly.

Processing continues as "Interrupt Requested?" 780.12 determines if an interrupt to the Local Processor is requested, based in part on an interrupt request indicator included in the transmit descriptor, in one embodiment. If an interrupt is requested ("Yes" 780.12Y), then flow continues to request an interrupt ("Interrupt" 780.13) and then processing of the information related to the descriptor is complete ("End" 780.14). If an interrupt is not requested ("No" 780.12N), then processing is complete ("End" 780.14).

The processing illustrated in Egress Overview 700B is representative of the overall flow with respect to one cell, including any special processing relating to completion of a packet. However, according to various embodiments, such processing may be wholly or partially overlapped for a plurality of cells. For example, in some embodiments Descriptor Fetch 780.1 may provide a plurality of descriptors, each pointing to a plurality of cells, and each of the respective cells are processed according to the remainder of the flow. In other embodiments, a first cell may remain in ESMem 736 indefinitely once processed by Program DMATX Transmit Q Fetch 780.4, while subsequent cells are processed according to Program DMATX Transmit Q Fetch 780.4. In addition, cells may be removed from ESMem 736 in a different order than stored, according to Program DMATX Output Q Fetch 780.8. These and all other such variations are contemplated in various embodiments.

VIOC Ingress Operation

Figure 7C:
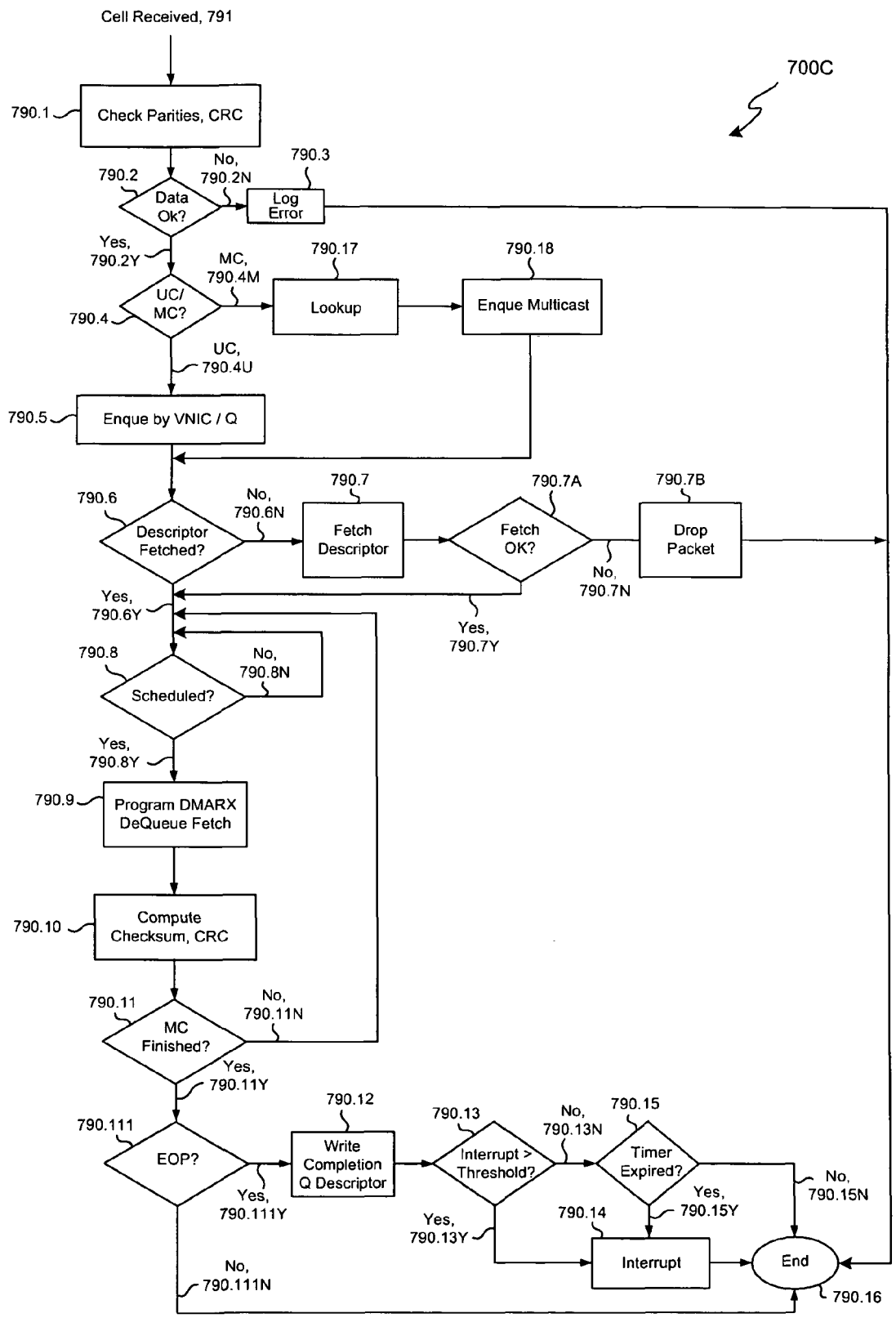
FIG. 7C illustrates selected aspects of ingress operation of an embodiment of a VIOC.

FIG. 7C illustrates selected aspects of ingress operation of an embodiment of a VIOC as flow diagram Ingress Overview 700C. For clarity, only selected details related to packet processing are shown (message processing is similar and is omitted). Processing begins when a cell is received from the fabric and enqueued (according to priorities illustrated by FIG. 6D) by CSRX 711, as indicated by "Cell Received" 791. Flow continues to "Check Parities, CRC" 790.1, where cell-level error check computations are performed. The error results are checked ("Data OK?" 790.2), and if the data is incorrect ("No" 790.2N), then the error is recorded ("Log Error" 790.3) and processing for the cell is complete ("End" 790.16). If the data is correct ("Yes" 790.2Y), then processing proceeds to "UC/MC?" 790.4.

Processing continues as "UC/MC?" 790.4 determines if the cell is a multicast ("MC" 790.4M) or a unicast ("UC" 790.4U) type cell. Unicast processing continues at "Enqueue By VNIC/Q" 790.5, where the received cell is enqueued in a selected unicast receive queue according to VNIC number and receive priority (or queue). Multicast processing continues at "Lookup" 790.17, where a lookup is performed by LE 703 (of FIG. 7A) based at least in part on the MGID as discussed elsewhere herein in conjunction with FIG. 8B. The lookup provides information describing the VNICs to receive the multicast data, and the cell is enqueued accordingly ("Enqueue Multicast" 790.18). Some embodiments implement selected VLAN processing such as dropping the cell if the learning VLAN is different from the destination VLAN. In one embodiment, the receive queues are implemented within ISMem 738.

Unicast and multicast processing continue at "Descriptor Fetched?" 790.6, where a determination is made as to whether a receive descriptor appropriate for the cell received has been fetched. If not ("No" 790.6N), then a descriptor is fetched by RXDmgr 766 (of FIG. 7A) in "Fetch Descriptor" 790.7 and examined for validity ("Fetch OK?" 790.7A). If the fetched descriptor is invalid, or no descriptors are available, then the cell is dropped (i.e. not received) along flow "No" 790.7N. The packet that the cell is part of is also dropped ("Drop Packet" 790.7B), and processing is complete at "End" 790.16. If the fetched descriptor is valid, then flow proceeds ("Yes" 790.7Y) for receive scheduling at "Scheduled?" 790.8. If an appropriate receive descriptor is already available ("Yes" 790.6Y), then processing also continues at "Scheduled?" 790.8.

Processing in "Scheduled?" 790.8 determines if the cell has been scheduled (according to priorities illustrated in FIG. 6E), and if not ("No" 790.8N), then processing loops back. If the cell has been scheduled ("Yes" 790.8Y), then processing continues at "Program DMARX DeQueue Fetch" 790.9, where DMARX 717 (of FIG. 7A) is programmed to fetch the cell data from the shared ingress memory and to store the cell data into local host memory according to the fetched receive descriptor. Error checking information is then computed ("Compute Checksum, CRC" 790.10), and for multicast cells a check is made to determine if multicast replication is complete ("MC Finished?" 790.11). If multicast processing is not complete ("No" 790.11N), then processing returns to "Scheduled?" 790.8 to await subsequent scheduling of the next multicast operation. If multicast processing is complete (or the cell is a unicast cell), then flow continues along "Yes" 790.11Y to "EOP?" 790.11I. If the cell is not an End Of Packet (EOP) cell and there is room available for storage of additional cell data (according to the fetched receive descriptor), then processing for the cell is complete ("End" 790.16). Otherwise, flow proceeds to "Write Completion Q Descriptor" 790.12 to record completion of the receive descriptor. In alternate embodiments, processing for multicast cells is performed wholly or partially in parallel, including embodiments where all multicast destinations for the cell are processed in parallel.

Processing in "Write Completion Q Descriptor" 790.12 records completion of the processing of the receive descriptor, or consumption of the descriptor, by entering an entry on a designated write complete queue. The entry includes packet and error status. Then a determination is made ("Interrupt>Threshold ?" 790.13) as to whether the number of receive events exceeds a specified threshold. If so ("Yes" 790.13Y), then an interrupt is signaled to the Local Processor ("Interrupt" 790.14). If the threshold has not been reached ("No" 790.13N), then a further determination is made if a timer has expired ("Timer Expired?" 790.15). If so ("Yes" 790.15Y), then an interrupt request is sent to the Local Processor ("Interrupt" 790.14), and then processing for the cell is complete ("End" 780.14). If not ("No" 790.15N), then processing for the cell is immediately complete ("End" 780.14).

The processing illustrated in Ingress Overview 700C is representative of the overall flow with respect to one cell, including any required multicast processing and special processing relating to an EOP cell or consumption of a receive descriptor. However, according to various embodiments, such processing may be wholly or partially overlapped for a plurality of cells. For example, once a first cell has been processed according to "Enque By VNIC/Q" 790.5, processing for the first cell may be suspended indefinitely, and in the meantime a plurality of additional cells may be received and processed up to and including "Enque By VNIC/Q" 790.5. In addition, cells may be processed according to "Program DMARX DeQueue Fetch" 790.9 in a different order than processed according to "Enque By VNIC/Q" 790.5. As another example, "Scheduled?" 790.8 is conceptually performed for many (for example all) enqueued cells on every cycle, even though only a subset of cells is scheduled according to "Yes" 790.8Y (for example, only a single cell may be scheduled). In some embodiments, ISMem 738 is used to store received cells during some portion of the processing time corresponding to "Enque By VNIC/Q" 790.5 through "Yes" 790.8Y. As another example of overlapped processing, processing of a first cell according to "Lookup" 790.17 may be wholly or partially concurrent with processing of a second cell according to "Check Parities, CRC" 790.1. These and all other such similar variations are contemplated in various embodiments.

In some embodiments, packets are aligned on cache line boundaries, and packets are segmented along cache line boundaries into cells. In embodiments where local host memory may be referenced a cache line at a time, there is a one-to-one correspondence between local host memory cache line references and cells. For example, during egress processing, reading the first cache line of the packet provides data corresponding entirely to the first cell. Reading the second cache line provides data entirely for the second cell, and so forth. During ingress processing, reception of the first cell of the packet provides a full cache line of data that is also aligned with respect to the receiving buffer, and the entire received cell may be written to the local host memory in a single transaction. Subsequently received cells may also be written one cell per cache line transaction.

In some embodiments, packet-level error detection information is computed, transmitted, and checked upon reception irrespective of packet size. In other embodiments, if all of the data for a packet fits in a single cell, then no packet-level error detection information is computed or transmitted, enabling the transmission of additional data bytes instead of the error detection information. For example, if a two-byte CRC is used for error detection, then two additional data bytes may be sent instead of the CRC. In these circumstances the cell error detection information (such as a CRC) provides error detection information for the packet.

Those of ordinary skill in the art will recognize that the processing illustrated by the aforementioned flow diagrams is illustrative of certain embodiments, and that other embodiments are also possible. For example, operations may be partitioned or ordered differently, or selected aspects of processing may be altered. These and all other related variations are contemplated.

TCAM/SRAM Lookup State

In their most general form, TCAM lookups may be performed using a combination of "local" and "global" masks. Each entry in the Tag array logically has a data field (holding a data value) and an associated equal width local mask field (holding a local mask value). Equivalently (and possibly physically), the Tag array may also be described as having a data array and a corresponding mask array. Also provided are one or more global mask registers (holding a global mask value of the same width as the data and local mask values) located outside the Tag array. In parallel for all entries in the Tag array, the data value of each entry has applied to it the associated local mask value of the entry and a selected global mask value. The masked data value is then compared against the search key. One or more entries in the Tag array may result in a hit (a match with the key). A priority-encoder selects the highest priority entry (the match at the lowest address), which is used as an index to address the SRAM and retrieve the corresponding result entry.

The mask values that will be used for a search are often known well in advance and are often stable for extended periods of operation. Accordingly, many mask values (in the local mask array and the global mask registers) may be programmed well in advance of the search. This permits the searches to proceed more quickly.

Generally, local mask values are required at least in part if the use of simultaneous prioritized hits to more than one entry is desired. Specifically, in some broadcast embodiments, the use of local mask values is used to establish an arbitrary-MACDA low-priority broadcast entry for each VLAN. For the broadcast TCAM entry, the data value includes the VLANid for the VLAN and a null MACDA, and the MACDA-related bits of the local mask are cleared to prevent the null MACDA field from participating in comparison with presented keys. If there are no other entries in the TCAM to match on the VLANid, then the multicast result (and included MGID) corresponding to the broadcast entry will be returned. The broadcast entry is used to flood the frame being forwarded to all members of the VLAN. In some addressing embodiments, this is accomplished by providing a multicast result that includes an MGID that has been assigned to the VLAN. When a MACDA on a VLAN is learned, a higher-priority (lower addressed) MACDA-specific non-broadcast entry is created wherein the data value generally includes the VLANid for the VLAN and the learned MACDA, and the MACDA-related bits of the local mask are set to enable the MACDA field to participate in the comparison with presented keys. Subsequent searches using a key having both the VLANid and the MACDA will cause hits to both the non-broadcast and broadcast entries. Since the broadcast entry is created at a higher address, the TCAM's priority encoder only returns the MACDA-specific non-broadcast entry.

The following TCAM illustrations are intentionally general to encompass a number of implementation options and variations. For example, the use of both local and global masks is allowed for as are TCAM Tag-entry and SRAM result-entry organizations that support both IVL and SVL modes of operation. The combination of local and global masks is illustrative and not limiting. Within a given implementation, either local masks or global masks could be eliminated with an associated reduction in the logic associated with the eliminated functionality. (However, elimination of local masks generally requires performing a subsequent broadcast lookup upon encountering a previously unlearned MACDA.) Likewise, the combination of IVL and SVL is merely illustrative and not limiting. One of either IVL or SVL could be eliminated with possibly associated reductions in certain fields within the TCAM Tag-entries and SRAM result-entries.

It will be understood that some operations could be carried out equivalently (although generally not as quickly) through use of just individual local mask values or just global mask values, and likewise could be carried out through values formulated at the time of the search (and stored into either a global mask register or the local mask array). In particular, the selective masking of the VLANid field within the TCAM Tag array to selectively implement one of the IVL and SVL modes of operation could be done through use of a global mask value or through use of the local mask values. Whether operations are based upon the use of local mask values, the use of global mask values, or some combination of local and global masks, and whether a given mask value is pre-programmed or formulated and programmed at the time of the search, will be based upon designer preference and situational specifics in a manner that is understood to those of ordinary skill in the art.

The following TCAM illustrations are also described in terms of a single overall TCAM/SRAM combination. It will be understood that the overall TCAM/SRAM may be physically implemented using a plurality of smaller TCAM/SRAM primitives (i.e., smaller in entry-width, number of entries, or both) arranged in ways known to those of ordinary skill in the art to provide the desired number of entries and entry-width of the overall TCAM/SRAM.

As previously described with respect to egress operation, "Lookup" 780.5 (see FIG. 7B) includes a lookup in a TCAM/SRAM coupled to a VIOC (such as VIOC 301.5 coupled to TCAM/SRAM 403.5), as performed by LE 703. Similarly, with respect to ingress operation, "Lookup" 790.17 (see FIG. 7C) includes a lookup in the TCAM/SRAM. The lookup operations are performed by formulating a lookup key, optionally selecting a global mask register, and presenting the key and optional global mask value to the TCAM portion of the TCAM/SRAM. A result is then produced by reading the first matching entry (if any) as determined by the TCAM from the SRAM portion of the TCAM/SRAM. The TCAM/SRAM is programmed according to various provisioning, switching, and routing functions, as described elsewhere herein.

Egress TCAM/SRAM keys, masks, and results are formulated to provide for transparent processing of various L2 switching related activities, and selected L3 switching and routing related activities. The L2 and L3 operations include multicast and unicast, with and without Link Aggregation Group (LAG) processing, and further include VLAN processing. A lookup key is formed without specific knowledge concerning the destination, other than the MAC Destination Address (MACDA). In other words, the key is formed in the same manner for multicast and unicast destinations. As described in more detail below, the lookup result provides information specifying the type of destination (multicast, unicast, or unicast LAG), along with information specific to the destination according to the destination type.

Figure 8A:
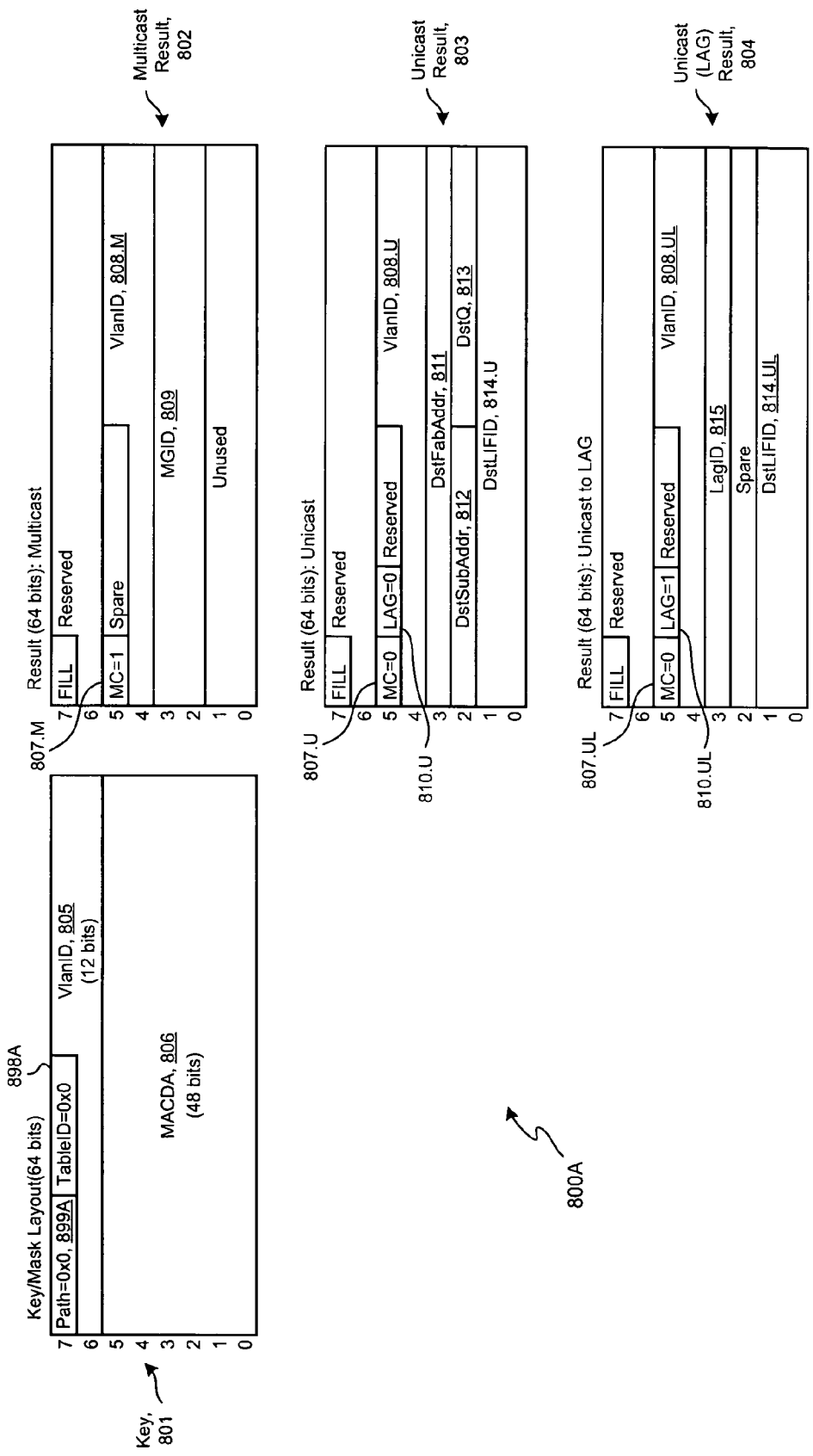
FIG. 8A illustrates selected aspects of an embodiment of an egress lookup key and result entries.

FIG. 8A illustrates selected aspects of an embodiment of an egress lookup key and result entries as TCAM/SRAM Egress Layout 800A. The egress layout is an example of a portion of a MAC Forwarding Information Base (MACFIB) implementation. A 64-bit lookup key, Egress Key 801, has several fields, including: Egress PathID 899A (two bits), Egress TableID 898A (two bits), VLANid 805 (12 bits), and MACDA 806 (48 bits). In various embodiments, the PathID is 0x0 and the TableID is 0x0.

Embodiments implementing IVL formulate lookup keys including the VLANid associated with the source (such as a VNIC or NM port), such as VLAN Identifier 617.1 or a value derived from it, according to embodiment. If the VLANid and the MACDA of the key match to a TCAM entry having both the same VLANid and the same MACDA as the key, then a non-broadcast (unicast or multicast) entry has been identified and the corresponding SRAM result is retrieved.

In a first SVL embodiment, lookup keys and TCAM data array values are formed with a common predetermined value (such as all zeros) in the VLANid field of the key and in the corresponding VLANid field of the TCAM entries. Since the TCAM entries so programmed always match on the common predetermined VLANid, forwarding entries learned for one VLAN are accessible by other VLANs. If no entry matches on the common predetermined VLANid, then the MACDA has yet to be learned, and some subsequent means must be used to broadcast over the VLAN. The previously discussed catch-all broadcast entry (wherein the MACDA field is masked) could still be used, being looked-up using a key with the VLANid of the source VLAN in a follow-up TCAM search.

A second SVL embodiment uses two global mask registers. In a first search, lookup keys are formed with the MACDA specified by the source, but with arbitrary values in the VLANid portion of the key. In a first global mask register, mask bit locations corresponding to the VLANid bits are cleared to remove the VLANid bits of the data array from participation in the TCAM search, while mask bit locations corresponding the MACDA bits are set to ensure their participation in the search. As a result, for previously learned MACDAs, TCAM entries match on the MACDA of the key regardless of the VLANid of the key, and forwarding entries learned for one VLAN are accessible by other VLANs. If no entry matches, then the MACDA has yet to be learned. In order to broadcast over the VLAN of the source, a second lookup is performed, this time with a key having the VLANid of the source and arbitrary values in the MACDA portion of the key. In the second lookup, a second global mask register is used, this time having the mask bit locations corresponding to the VLANid set and the mask bit locations corresponding to the MACDA bits cleared. In the second SVL embodiment, the VLANid field is not strictly required in the lookup key for SVL-only implementations. However, if the VLANid field is not present in the TCAM, then in order to implement broadcast when the MACDA is yet to be learned by the TCAM, the VLANid to broadcast address mapping must be resolved using other logic.

A third SVL embodiment uses local masks. For non-broadcast entries, the mask bit locations in the local mask array corresponding to the VLANid field are cleared to remove the VLANid bits of the data array from participation in the TCAM search (the mask bit locations in the local mask array corresponding to the MACDA field are set). As before, for previously learned MACDAs, TCAM entries match on the MACDA of the key regardless of the VLANid of the key, and forwarding entries learned for one VLAN are accessible by other VLANs. A broadcast entry as described above, which reverses the local masking between the VLANid field and the MACDA field, would within the same lookup still provide the broadcast match if the MACDA has yet to be learned.

The MACDA is a value provided in the packet (or message) header included in the buffer image formed in the Local Processor Memory, or the MACDA is derived in part from the header. Since the destination may be one of several types, the format of the 64-bit result returned varies accordingly, including: multicast, unicast, and unicast LAG formats, as illustrated by Multicast Result 802, Unicast Result 803, and Unicast (LAG) Result 804, respectively.

Multicast Result 802 has several fields, including: Multicast Bit (Multicast) 807.M (one bit), VLANid (Multicast) 808.M (12 bits), and Egress MGID 809 (16 bits). The multicast bit is asserted if the result corresponds to a multicast destination, and deasserted otherwise. As this is a multicast result, the multicast bit is asserted. The VLANid identifies the VLAN membership of the destination. The MGID identifies the destination multicast group, and may be associated with a VLAN broadcast group or an IP broadcast group. Subsequent processing uses the MGID to replicate information to one or more destinations, as determined by the identified multicast group.

Under SVL, in order to enforce inter-VLAN isolation, if the destination VLAN identifier does not match the source VLAN identifier, then the egress data is discarded. The VLANid field is not strictly required in the multicast, unicast, or LAG results of IVL-only implementations. Under IVL, TCAM matches (and subsequent result retrievals) are predicated upon the destination residing within the VLAN of the source, thus checking the VLANid field of the result is superfluous.

Unicast Result 803 has several fields, including: Multicast Bit (Unicast) 807.0 (one bit), LAG Bit (Unicast) 810.0 (one bit), VLANid (Unicast) 808.0 (12 bits), DstFabAddr 811 (eight bits), DstSubAddr 812 (four bits), Egress DstQ 813 (four bits), and DstLFIFID (Unicast) 814.0 (12 bits). The multicast bit is deasserted to indicate the result is a unicast result. The LAG bit is deasserted to indicate the result is not a LAG result. VLANid (Unicast) 808.0 is identical in format and function to VLANid (Multicast) 808.M.

DstFabAddr 811 identifies the destination fabric port address (typically associated with a slot having an inserted pluggable module). DstSubAddr 812 identifies a sub-address distinguishing one of a plurality of sub-destinations associated with the destination fabric port address. In embodiments including a VIOC implementing VNICs, DstSubAddr 812 typically identifies either a) one of the plurality of VNICs implemented in the VIOC at the destination, or b) one of the plurality of network ports of a multi-ported NM. DstQ 813 typically identifies a packet receive queue associated with the identified VNIC.

Certain L3 processing operations (such as port filtering) are implemented in some embodiments according to DeSTination Logical InterFace IDentifers (DstLIFIDs). DstLIFIDs are typically global, and may be used by software or hardware components (such as NMs), according to embodiment. DstLIFID (Unicast) 814.0 is a DstLIFID associated with the destination identified by MACDA 806.

Unicast (LAG) Result 804 has several fields, including: Multicast Bit (LAG) 807.UL (one bit), LAG Bit (LAG) 810.UL (one bit), VLANid (LAG) 808.UL (12 bits), LagID 815 (eight bits), and DstLIFID (LAG) 814.UL (16 bits). The multicast bit is deasserted to indicate the result is a unicast result. The LAG bit is asserted to indicate the result is a LAG result. VLANid (LAG) 808.UL is identical in format and function to VLANid (Multicast) 808.M. LagID 815 identifies the LAG the destination is associated with to enable load balancing, failover, and other related operations with respect to the identified LAG. DstLIFID (LAG) 814.UL is identical in format and function to DstLIFID (Unicast) 814.U.

Subsequent processing of Unicast Result 803 and Unicast (LAG) Result 804 provides portions of the lookup result, or information derived in part from the lookup result, for use in forming selected egress cell headers. For example, various combinations of DstFabAddr 811, DstSubAddr 812, Egress DstQ 813, and DstLIFID (Unicast) 814.0 (or data derived from them, according to embodiment) are included in selected cell headers formulated during data transmission, according to embodiment. Similarly, various combinations of LagID 815 and DstLIFID (LAG) 814.UL (or data derived from them, according to embodiment) are included in selected cell headers during data transmission, according to embodiment.

Providing destination information such as the destination fabric port address, sub-address (or VNIC identifier), destination queue, and destination logical interface in the lookup result enables transparent L2 and selected L3 operations with respect to processes sending data. The sending processes address data by MACDA, and are not aware of multicast, unicast, and LAG properties associated with the destination. The lookup destination information further enables transparent management of bandwidth and other related resources by agents other than the Local Processor process sending the data. Such agents include management, controlplane, and load balancing processes executing elsewhere.

Figure 8B:
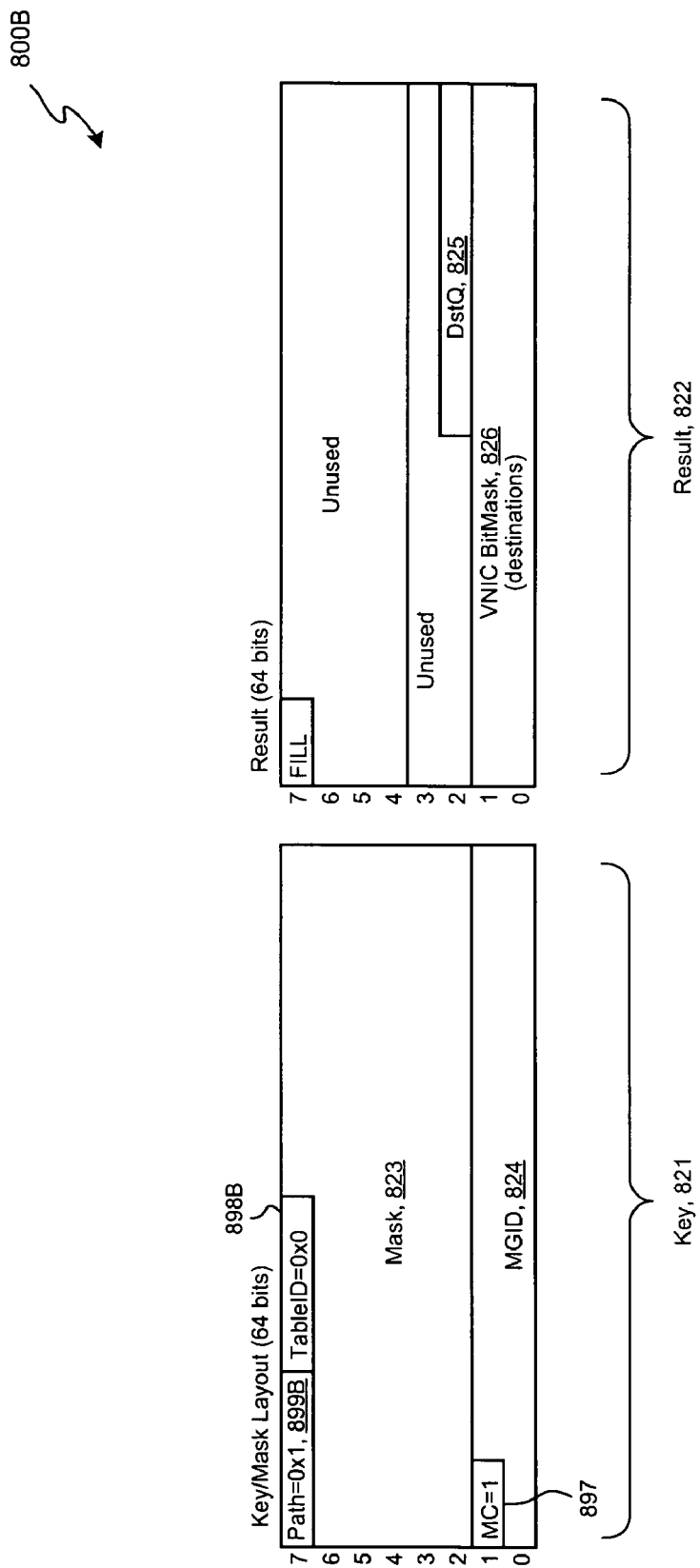
FIG. 8B illustrates selected aspects of an embodiment of an ingress lookup key and entry.

FIG. 8B illustrates selected aspects of an embodiment of an ingress lookup key and result entry, as TCAM/SRAM Ingress Layout 800B. The illustrated ingress layout embodiment is an example of an implementation of an MGID table. A 64-bit lookup key, Ingress Key 821, has several fields, including: Ingress PathID 899B (two bits), Ingress TableID 898B (two bits), Ingress Mask 823 (44 bits), Multicast Key Bit 897 (one bit), and Ingress MGID 824 (15 bits). In various embodiments, the PathID is 0x1 and the TableID is 0x0.

To enable use of the same TCAM on ingress and egress, the same size key is used for both ingress and egress searches. At a physical level the TCAM operates identically for ingress and egress searches, comparing each presented key in parallel with all of the stored data values as masked by the local mask values and the global mask value, as described previously. As discussed in further detail below, the PathID and TableID bits are commonly laid out between the ingress and egress entries. These bits participate in the TCAM comparisons, allowing if so desired the ingress and egress entries, and entries from multiple tables, to be co-mingled in the TCAM while remaining logically distinct subsets. Beyond the PathID and TableID bits, ingress searches only require the 16 bits corresponding to the Ingress MGID 824 bits and the Multicast Key Bit 897. Multicast Key Bit 897 is asserted to indicate the lookup is a multicast type search. Ingress MGID 824 is directly from an MGID field included in the received cell header, or is derived from the header, according to embodiment.

The remaining 44 bit positions of the common key layout, denoted by Ingress Mask 823, are null place-holders, being neither required nor logically used on ingress lookups. In a first ingress embodiment, for each ingress entry, the mask bit locations within the local mask array corresponding to Ingress Mask 823 are cleared to insure that the bit locations within the data array corresponding to Ingress Mask 823 do not participate in ingress searches. In a second ingress embodiment, the corresponding mask bits within a global mask register are cleared to accomplish the same result.

Ingress Result 822 is 64 bits and has several fields, including: Ingress DstQ 825 (four bits) and VNIC BitMask 826 (16 bits). In some embodiments, Ingress DstQ 825 identifies one of a plurality of multicast packet receive queues for insertion of the received data into (see the discussion relating to FIG. 6D). In embodiments including a VIOC implementing VNICs, VNIC BitMask 826 identifies destination VNICs for replication of the received data. Typically there is a one-to-one correspondence between asserted bits in VNIC BitMask 826 and VNICs that are to receive the multicast data.

Egress PathID 899A and Ingress PathID 899B are arranged to be in the same location in the egress and ingress lookup keys, respectively. An egress path lookup is identified by the value 0x0 and an ingress path lookup is identified by the value 0x1, thus enabling selected embodiments to include egress and ingress lookup information in a shared TCAM/SRAM (such as TCAM/SRAM 403.4). Other embodiments may provide separate TCAM/SRAM resources for egress and ingress processing. Egress TableID 898A and Ingress TableID 898B are in the same location and may be used to specify one of a plurality of tables to facilitate additional lookup information for use in other scenarios.

Those of ordinary skill in the art will recognize that the egress and ingress key and result layouts described are example embodiments only, and that there are any number of possible arrangements of keys and results that provide similar information. For example, the widths and encodings of fields may vary, selected fields may be omitted, and additional fields may be added.

Server Provisioning and Management

An ES system provides one or more provisioned servers in conjunction with a provisioned L2/L3 switch and associated network topology. Each of the provisioned servers and the provisioned switch and network include capabilities as identified by a corresponding set of specifications and attributes, according to various embodiments. Typically the specifications (or constraints) and attributes are specified with an SCF (see the SCF and Related Tasks section, elsewhere herein).

An ES system may be provisioned into a wide-range of server combinations according to needed processing and I/O capabilities. For example, servers may be provisioned according to various illustrative application usage scenarios described elsewhere herein including: a Unix server, an I/O intensive server, a data-center tier-consolidation server, and an enhanced high availability server. Each of these servers may include distinct compute, storage, and networking performance. Provisioned servers may be managed similar to conventional servers, including operations such as booting and shutting down (see the server operational states section, elsewhere herein).

An ES system may also be provisioned to configure a wide range of networking capabilities and logical switch topologies within the ES system (i.e., internal to the chassis of the ES system). For example, the networking may be provisioned such that a logical L2/L3 switch provides L2 and L3 forwarding for VNICs of provisioned servers within the ES system and other network interfaces external to the ES system. Any of the logical ports of the L2/L3 switch may be configured to be part of a VLAN and multiple simultaneous VLANs are possible. A provisioned server may optionally be provided with a dedicated (a.k.a. "pinned") network port for direct non-switched coupling to an external network. Another option is the implementation one or more LAGs, where multiple physical network ports are aggregated to form one logical port of the L2/L3 switch.

Figure 9B:
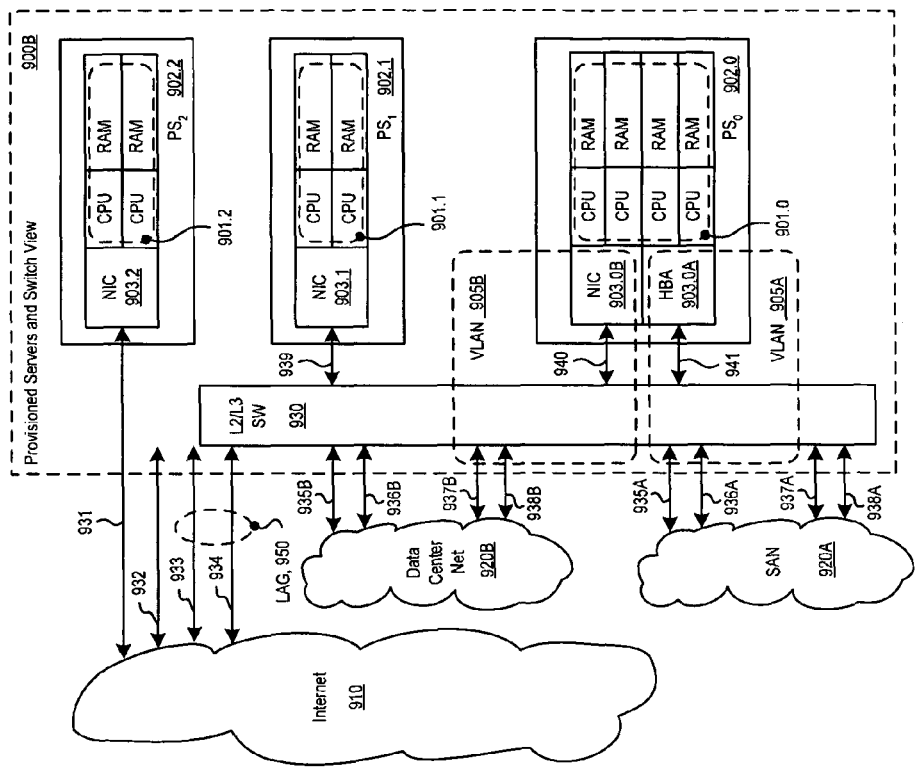
FIGS. 9A and 9B illustrate a Hardware Resources view and a Provisioned Servers and Switch view of an embodiment of an ES system, respectively.
Figure 9A:
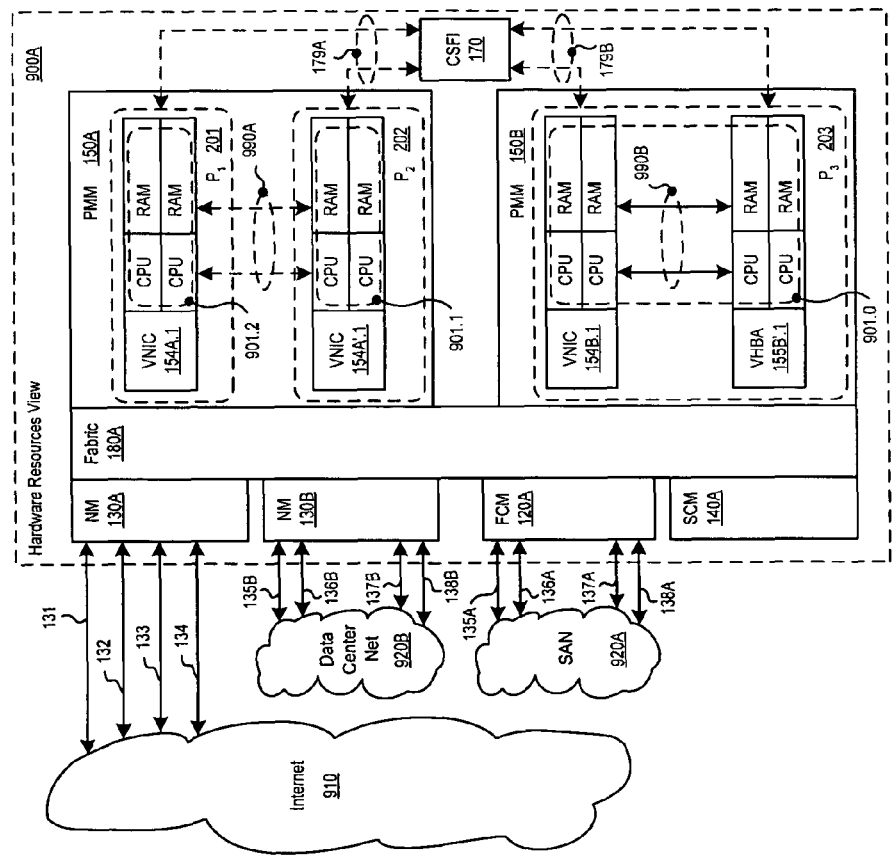

FIG. 9A illustrates a Hardware Resources View 900A of an embodiment of an ES system. Provisioned servers and an associated network and switch complex are formed by assigning hardware resources from a collection of available hardware resources (such as any or all of the elements of Hardware Resources View 900A) and then programming configuration and management state associated with the assigned hardware resources. FIG. 9B illustrates a Provisioned Servers and Switch View 900B of an embodiment of an ES system, and conceptually represents the result of provisioning several servers and network functionality from the hardware elements of Hardware Resources View 900A.

More specifically, Hardware Resources View 900A illustrates one embodiment having a Primary SFM 180A, a Primary SCM 140A, an FCM 120A, a first NM 130A, a second NM 130B, a first PMM 150A, and a second PMM 150B. FCM 120A provides a plurality of FC ports for interfacing with storage resources external to the ES system, and further adapts those ports to couple with the cell-based Primary SFM 180A. As illustrated, the ports of FCM 120A are coupled to SAN 920A. NM 130A and NM 130B each provide a plurality of network ports for interfacing with networks external to the ES system and further adapts those ports to couple with the cell-based Primary SFM 180A. As illustrated, the ports of NM 130A are coupled to the Internet 910 while the ports of NM 130B are coupled to Data Center Network 920B. It will be understood that this configuration is merely illustrative and the ES system may be configured for use with a wide range of external network topologies. Each NM has an associated fabric address on the Primary SFM 180A and each network port of the NMs has an associated fabric sub-address.

Each PMM has two 2-way SMP Processing Complexes that can be optionally coupled (via configurable couplings 990A and 990B respectively) as a single 4-way SMP Processing Complex. (Each of couplings 990A and 990B represents coupling pair 460.5X and 460.5Y of FIG. 4B.) Additionally, couplings 179A and 179B may be configured in conjunction with CSFI 170 to couple the two PMMs together as a single 8-way SMP Processing Complex. In an illustrative scenario, 2-way and 4-way configurations have been chosen and thus couplings 179A and 179B are configured as inactive (as suggested by dashed lines, rather than solid lines). PMM 150A is configured such that coupling 990A is not active (as suggested by dashed lines), facilitating the formation of 2-way SMP Processing Complex 901.2 and 2-way SMP Processing Complex 901.1. PMM 150B is configured such that coupling 990B is active (as suggested by solid lines), facilitating the formation of 4-way SMP Processing Complex 901.0. It will be understood that since the two PMMs are physically identical, the illustrated scenario is an arbitrary choice. Both PMMs can just as easily be configured in any combination of 2-way and 4-way SMP Processing Complexes (up to four 2-ways, one 4-way and up to two 2-ways, up to two 4-ways, or one 8-way). In this way, the ES system provides for an easily scalable number of SMP processor-ways from which to configure physical partitions, which are the basis for provisioned servers.

Each 2-way SMP Processing Complex is associated with a VIOC that adapts the Complex to the cell-based Primary SFM 180A. While in FIG. 9A each VIOC is represented by only one VNIC, in one illustrative embodiment each VIOC includes 16 VNICs. Each VIOC has an associated fabric address on the Primary SFM 180A and each VNIC has an associated fabric sub-address. In conjunction with appropriate device drivers, each VNIC appears to the operating software on the SMP Complex as a high-performance Ethernet compatible NIC. Each VNIC can be selectively enabled, thus any subset of the 16 VNICs may be provisioned for use by the associated 2-way SMP Processing Complex. In this way, the ES system provides easily scalable virtualized I/O services to the provisioned servers. In one embodiment, 2-way, 4-way, and 8-way physical partitions are envisioned that make use of the 2-way SMP Processing Complex and it's associated VIOC and VINCs as an underlying primitive. Accordingly, each of up to four 2-way physical partitions consists of a 2-way SMP Processing Complex and up to 16 VNICs, each of up to two 4-way physical partitions consists of two coupled 2-way SMP Processing Complexes and up to 32 VINCs (up to 16 VNICS in each of two groups), and an 8-way physical partition consists of four coupled 2-way SMP Processing Complexes and up to 64 VNICs (up to 16 VNICs in each of four groups). In some embodiments a VNIC may be operated as a VHBA, as illustrated conceptually by VHBA 155B'.1. As illustrated, physical partition $P_1$ 201 consists of 2-way SMP Processing Complex 901.2 and VNIC 154A.1, physical partition $P_2$ 202 consists of 2-way SMP Processing Complex 901.1 and VNIC 154A'.1, and physical partition $P_3$ 203 consists of 4-way SMP Processing Complex 901.0, VNIC 154B.1, and VHBA 155B'.1.

The fabric infrastructure of FIG. 9A is not seen by the software operating on the SMP Complexes or by external sub-systems. These entities need not be concerned with (and in fact are isolated from) knowledge about the fabric addresses and fabric sub-addresses. Software and external sub-systems operate conventionally, communicating through packets and messages over Ethernet frames using either Ethernet-style MACDAs or IP addressing. The SCM 140A maintains separate master L2 and L3 FIBs (an L2 FIB and a separate L3 FIB). The L2 FIB maps Ethernet-style MACDAs to fabric addresses and sub-addresses and the L3 FIB maps destination IP addresses to fabric addresses and sub-addresses. The L2 and L3 FIBs are initialized and updated with mappings for the provisioned hardware resources internal to the ES system and other mappings are learned over time based on network traffic processed.

Each NM and VIOC makes L2 forwarding decisions for packets they receive (via the network ports of the NM and via the SMP Complex associated with each VIOC) by referencing a local copy of the L2 FIB. That is, each NM and VIOC does a local L2 FIB lookup on the MACDA of each packet received (packets heading toward the SFM) and determines the fabric address and sub-address within the ES system where the packet should be delivered. The NM or VIOC then provides a fabric-addressed cellified version of the packet to the Primary SFM 180A, which delivers the cellified packet to the module specified by the fabric address (PMM 150A, PMM 150B, NM 130A, or NM 130B). In turn, each module delivers the reconstructed packet to the network port or VNIC specified by the fabric sub-address.

As detailed elsewhere herein, for multicast packets (including packets broadcast on VLANs), the packets are replicated as required both prior to fabric insertion (for each fabric address in the multicast group) and after fabric egress (for each fabric sub-address in the multicast group). In one embodiment, the multicast to fabric sub-address mapping is determined via multicast group lookups in the L2 FIBs.

Provisioned Servers and Switch View 900B (of FIG. 9B) illustrates three example resultant provisioned servers as Provisioned Server $PS_2$ 902.2, Provisioned Server $PS_1$ 902.1, and Provisioned Server $PS_0$ 902.0. These correspond respectively to physical partition $P_1$ 201, physical partition $P_2$ 202, and physical partition $P_3$ 203, of the Hardware Resources View 900A of FIG. 9A. Each provisioned server includes compute and I/O resources. For example, Provisioned Server $PS_1$ 902.1 includes 2-way SMP Processing Complex 901.1 and network connectivity via NIC Function 903.1. Provisioned Server $PS_0$ 902.0 includes 4-way SMP Processing Complex 901.0, network connectivity via NIC Function 903.0B, and storage resource interfacing via HBA Function 903.0A.

In accordance with the above described L2 forwarding decision functionality of the NMs and VIOCs, the network ports and VNICs readily lend themselves to the logical view (of FIG. 9B) that they are coupled to the ports of a L2 switch (exemplified by L2/L3 Switch 930). (While in the hardware view of FIG. 9A, the L2 switch forwarding decisions are in fact performed within the NMs and VIOCs.) Switch 930 provides selective isolation between the logical network segments coupled to each switch port. Switch 930 forwards packets between the switch ports (network segments) only when warranted to reach a known MACDA on an otherwise isolated segment (or when the MACDA is unknown and thus can only be reached via a broadcast on the otherwise isolated segments).

As illustrated, Switch 930 provides its selective isolation/forwarding functionality to resources both within and external to the ES system. For example, packets originating in Data Center Network 920B are selectively isolated-from/forwarded-to destinations associated with Internet 910, Provisioned Server $PS_1$ 902.1, and Provisioned Server $PS_0$ 902.0, as warranted by the specified MACDA. Unicast packets exchanged solely between two end-points nodes are not observable by other nodes either inside or outside the ES system.

VLANs are a common networking administration tool to selectively isolate or couple multiple network segments for collaboration, security, and performance motives. A common VLAN implementation is the so-called port-based VLAN, wherein each logical switch-port is defined to be associated with a particular VLAN. Switch ports (and associated network segments) belonging to the same VLAN are logically coupled for forwarding and broadcast events (they are part of the same broadcast domain), while switch ports (and associated network segments) belonging to different VLANs are L2 isolated for all events (they are in different broadcast domains).

The L2 FIB lookup architecture of the ES system has integral support for port-based VLANs. In the logical view of FIG. 9B, port-based VLANs are defined by associating each of the switch-ports of Switch 930 with a particular VLAN. In the hardware resource view of FIG. 9A, SCM 140A has a VLAN Manager that associates each NM port and each VNIC with a particular VLAN.

Unless expressly identified as a member of another VLAN, each NM port and VNIC in the system is by default a member of the VLAN known as VLAN1. As illustrated in FIG. 9B, a subset of the switch-ports of Switch 930 are expressly associated with VLAN 905B (a different VLAN than VLAN1) and VLAN 905A (a different VLAN than 905B and VLAN1). Specifically, those switch-ports associated with interconnect 937B, 938B, and 940, are members of VLAN 905B. Those switch-ports associated with interconnect 935A, 936A, and 941, are members of VLAN 905A. Switch ports and associated network segments within VLAN1 are selectively coupled for forwarding and broadcast events as warranted. Network segments (switch ports) within VLAN 905B are similarly selectively coupled for forwarding and broadcast events as warranted. Network segments (switch ports) within VLAN 905A are similarly selectively coupled for forwarding and broadcast events as warranted. From a strict L2 view, network segments within VLAN1 are never coupled to network segments within VLAN 905B or VLAN 905A. In effect, the three VLANs function as though each were topographically segregated including having three separate switches (one for each VLAN).

Provisioned Server $PS_2$ 902.2 includes 2-way SMP Processing Complex 901.2 and network connectivity as illustrated by (virtualized) NIC Function 903.2. In an example of a special networking option, VNIC 154A.1 is "pinned" to the port of NM 130A associated with interconnect 131. That is, the port of NM 130A associated with interconnect 131 has been dedicated to data traffic to and from VNIC 154A.1. More specifically, data traffic coming into the dedicated network port goes only to VNIC 154A.1 and data traffic coming from VNIC 154A.1 goes only to the dedicated network port. This creates the logical view shown in FIG. 9B, where NIC 903.2 appears to be coupled directly to Internet 910 via interconnect 931, without use of L2/L3 Switch 930.

As described elsewhere herein, provisioned servers may include OLB (not shown explicitly in FIGS. 9A and 9B) and FCM resources. In contrast to PMMs, where granularity of allocation is typically by physical partition (such as 2-way, 4-way, or 8-way), OLB and FCM allocation granularity is by number, bandwidth capacity, and relative queuing priorities of VNICs implemented in VIOCs included on OLBs and FCMs. A first level of resource partitioning between provisioned servers may be accomplished by allocating appropriate numbers of VNICs to each of the provisioned servers (a greater number of VNICs generally corresponding to larger allocations). For example, a first provisioned server may be allocated a single first VNIC of an OLB, while a second provisioned server may be allocated second, third, and fourth VNICs of the OLB. In some embodiments, VNICs implement various combinations of minimum and maximum bandwidth, providing a second level of resource control, such that the first VNIC may be allocated a first maximum bandwidth and the second, third, and fourth VNICs may be allocated respective second, third, and fourth maximum bandwidths. A third level of resource sharing control may be implemented by proper variation of VNIC queuing priorities, as described elsewhere herein. FCM resource partitioning may be accomplished in the same manner, by assigning proper number, bandwidth capacity, and relative queuing priorities of VNICs implemented by VIOCs on FCMs.

Provisioned servers are logically isolated from each other. For example, each provisioned server may be characterized by a group of VNICs corresponding to resources allocated to the server. By assigning each group of VNICs to distinct VLANs, at least one VLAN per server, then each of the provisioned servers remains completely isolated form the others, even though multiple servers may be using resources from the same module (such as an OLB or FCM). For example, first and second provisioned servers may be using a shared OLB via respective first and second VNICs. If the first and second VNICs are assigned respectively to distinct first and second VLANs, then the provisioned servers are isolated, even though both are using the shared OLB. Similar isolation may be provided when provisioned servers share an FCM, by associating the groups of VNICs to distinct VLANs.

Link Aggregation

Link aggregation provides a way to linearly scale connectivity bandwidth and also offers reliability and availability benefits. The L2 FIB lookup architecture of the ES system supports link aggregation. The NM 130A ports associated with interconnect 133 and 134 in FIG. 9A (interconnect 933 and 934 in FIG. 9B) are aggregated to form one logical port (with double the bandwidth) illustrated in FIG. 9B as LAG 950. While not expressly illustrated, link aggregation across multiple NMs is also possible. Load balancing processing is performed in conjunction with the L2 FIB lookup architecture to distribute the traffic quasi-evenly over the ports that comprise the aggregate. In some embodiments, NM ports that are aggregated must be of the same media type.

Control and Management Processes

Figure 9C:
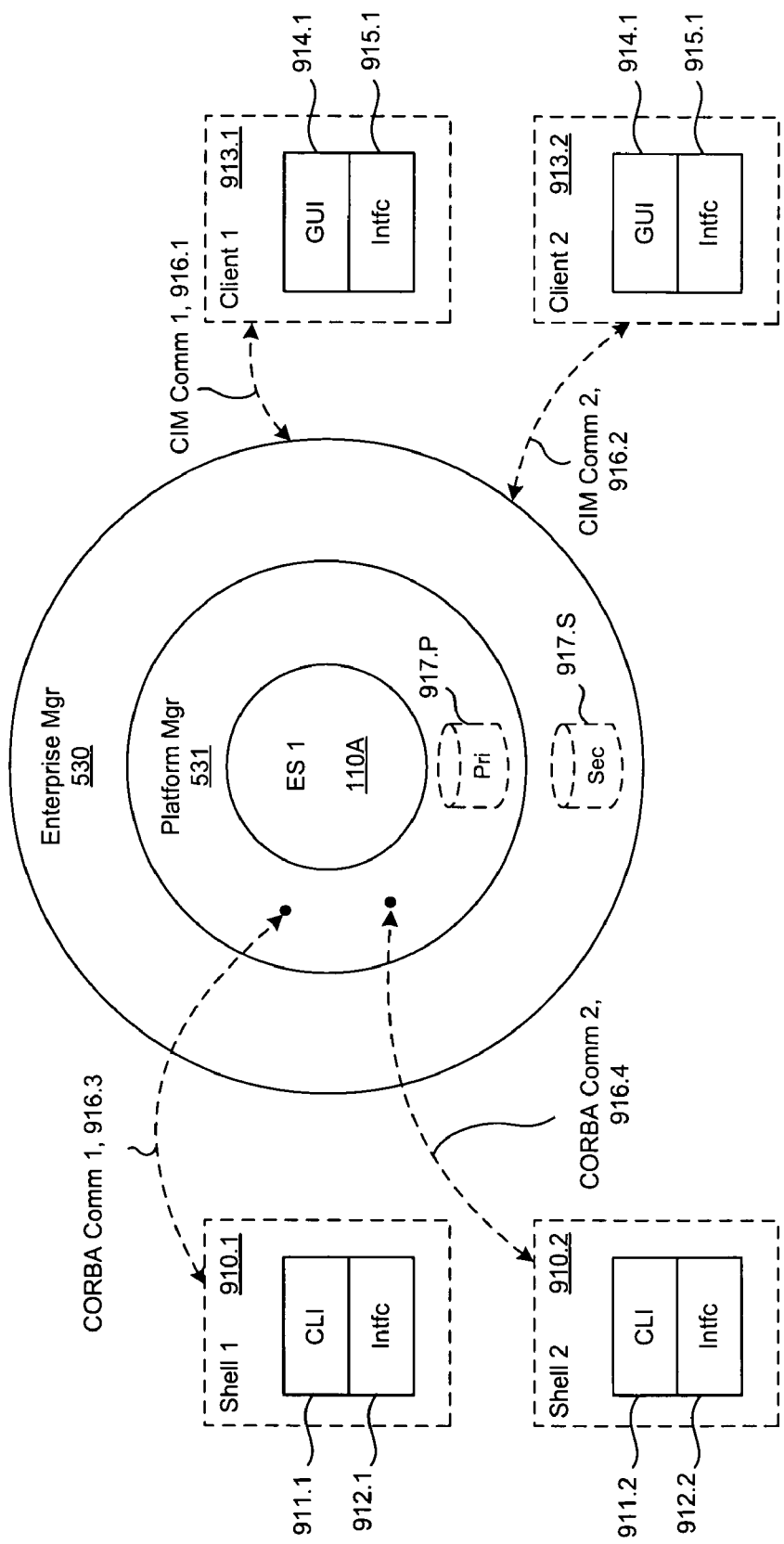
FIG. 9C illustrates an operational view of selected aspects of provisioning and management SW in an ES embodiment.

FIG. 9C illustrates an operational view of selected aspects of various system control and system management SW and processes (including provisioning) in an embodiment of an ES system. Many provisioning functions store, access, and communicate data using abstractions and representations derived from the Common Information Model (CIM) of the Distributed Management Task Force (DMTF), as described by CIM Schema v2.8.2 from http://www.dmtf.org, herein incorporated by reference for all purposes, for example. Selected command and result communications use abstractions and representations derived from the Common Object Request Broker Architecture (CORBA), as described by CORBA: Core Specification Version 3.0.3, March 2004, from http://www.omg.org, herein incorporated by reference for all purposes, for example.

SW layers (Platform Manager 531, and Enterprise Manager 530, of FIG. 5B) conceptually surround HW core ES1 110A (FIG. 1A). As illustrated, Platform Manager 531 is representative of not only Platform Manager 531 but also the SW modules operating in close cooperation with the Platform Manager. Such modules may include CLI 532, CM 533, Query Engine 534, Repository Manager 535, VIOC Manager 536, Interface Manager 537, L2 FDB Manager 538, VLAN Manager 539, FCM Manager 541, and Other Management Code 540 (see FIG. 5B), according to embodiment. The SW layers execute using resources included in the HW core (such as Primary SCM 140A), and provide system-level control and management of the HW core. Persistent state relating to these operations is maintained in CIM-compatible formats in two repositories, Primary CIM Instance Repository 917.P and Secondary CIM Instance Repository 917.S. Non-volatile storage for these repositories may be included in various elements of Flash memory, Magnetic Disk memory, and Optical Disk memory, according to embodiment, and interfaced to various elements of ES1 110A (such as SCMs, PMMs, or OLBs), or directly included in such elements, also according to embodiment. In some embodiments, the secondary repository is not specifically stored in persistent storage, but is stored as data structures in portions of processor main memory (such as DRAM and cache memory), although OS related paging operations may swap memory pages including portions of the repository to disk. In some embodiments, the secondary repository is not present, and accesses to the secondary repository are replaced with accesses to the primary repository.

Enterprise Manager 530 provides an interface for client GUIs (such as GUI 914.1 and GUI 914.2) and maintains Secondary CIM Instance Repository 917.S. Platform Manager 531 provides an interface for remote shell window CLIs (such as CLI 911.1 and CLI 911.2), and maintains Primary CIM Instance Repository 917.P. The Enterprise and Platform Managers cooperate to keep the Primary and Secondary Repositories synchronized. Communication between Client GUIs and remote shell CLIs is generally via CIM and CORBA standard representations, (or similar techniques), as shown by CIM Communication 1 916.1, CIM Communication 2 916.2, CORBA Communication 1 916.3, and CORBA Communication 2 916.4.

GUIs enable performance of various system management and configuration control operations by system management personnel, including various aspects of HW and SW operation. Typically GUIs are provided via network-based Java clients (such as Client 1 913.1 and Client 2 913.2) executing on PCs, Workstations, or other similar computing elements. The clients include interface functions (such as Interface 915.1 and Interface 915.2) to facilitate processing of GUI commands and display of GUI data, as well as communication of commands and data. GUIs generally operate on managed objects (such as provisioned servers), and typically independently maintain state information about the managed objects (i.e. the GUIs are "stateful"). GUIs update in real time as status of managed objects changes in real time. Communications between the GUIs and the Enterprise Manager (such as CIM Communication 1 916.1 and CIM Communication 2 916.2) may be transported via any combination of WAN (including the Internet), MAN, LAN, or a direct connection to any compatible communication interface provided by ES1 110A, according to various embodiments. For example, communications between GUIs and the Enterprise Manager may be coupled via an Ethernet port provided by one of NMs 130, or by Management I/O 412 (FIG. 4A), according to embodiment.

CLIs enable all or any subset of system management and configuration control operations available via GUIs, according to embodiment. In some embodiments, CLIs enable somewhat limited functionality with respect to the GUIs. CLIs are typically provided via network-based text-oriented command shells (such as Shell 1 910.1 and Shell 2 910.2) executing on PCs, Workstations, or other similar computing elements. The shells and related SW include interface functions (such as Interface 912.1 and Interface 912.2) similar in operation to the client interface functions. CLIs are typically stateless, relying on the Platform Manager 531 to manage objects on their behalves. The CLIs send commands to the Platform Manager for translation into operations on managed objects (such as provisioned servers). Communications between the CLIs and the Platform Manager (such as CORBA Communication 1 916.3 and CORBA Communication 2 916.4) may be transported via any of the mechanisms provided for the communications between the clients and the Enterprise Manager. In some embodiments, CLIs, low-level services supporting CLIs, or both, are provided by SW executing on resources of ES1 110A, such as CLI 532 (FIG. 5B) executing on Primary SCM 140A.

One or more GUI sessions may be simultaneously active and in communication with the Enterprise Manager, receiving data and providing commands in real time. The Enterprise Manager updates Secondary CIM Instance Repository 917.S according to the commands received from all of the GUI sessions. Similarly, one or more CLI sessions may be simultaneously active and in communication with the Platform Manager, receiving data and providing commands in real time. The Platform Manager updates Primary CIM Instance Repository 917.P according to the commands received from all of the CLI sessions. Any number of GUI sessions and any number CLI sessions may also be active concurrently, and the Enterprise and Platform Managers receive and process the respective commands, synchronizing the two repositories as necessary.

In some embodiments, GUIs and CLIs provide an integrated view of processing and networking functions available in an ES system. In other embodiments, GUIs and CLIs provide a "legacy" view of logically separate elements including switches, routers, accelerators for Layer-4 to Layer-7 processing (such as SSL accelerators), management servers, and enterprise servers. In still other embodiments, GUIs and CLIs providing integrated and legacy views may be operated simultaneously.

Platform Manager 531 (and closely cooperating SW modules) functions performed include HW and SW inventory discovery and maintenance, SW services relating to internal subsystem management and RAS, networking services, low-level user interface services, and component level services. A single Application Programming Interface (API) is provided by Platform Manager 531 to enable accessing the aforementioned functions by other SW modules (such as Enterprise Manager 530, and CLI 532, for example).

HW and SW inventory discovery functions include any combination of several elements, according to various embodiments. A chassis manager (such as CM 533 of FIG. 5B) discovers and manages chassis resources, a query engine (such as Query Engine 534) processes queries, and a persistent state manager (such as Repository Manager 535) records and provides system configuration, status, and query information. A VIOC manager (such as VIOC Manager 536) provides control information directly to VIOCs via the SFM, and indirectly interfaces to VIOC Drivers via the scratchpad registers included in the VIOC. A write to any of the scratchpad registers typically results in an interrupt being delivered to a VIOC Driver. An interface manager (such as Interface Manager 537) discovers interfaces on NMs and detects changes in state on NMs. In some embodiments, a VLAN Manager (such as VLAN Manager 539) provides services and operations relating to VLANs, such as some aspects of provisioning VLANs in relation to VIOCs. An event service and related Event Monitor Service (EMS) implement a general publish and subscribe message layer and an alarm service enables management processes to set and clear alarms. A software versioning and upgrade service enables management of binary software releases.

Internal subsystem management SW services include, according to various embodiments, an Interface Definition Language (IDL) based communication infrastructure for use between various system components. The IDL-based infrastructure is also used for process management and monitoring (via SNMP, for example) of system components, services, and applications, and also for use for information logging from one or more processors.

Other internal subsystem management SW services are provided, according to embodiment. Security services and virtualization services (relating to modularity and ownership records of system components and resources, for example) may be provided. Maintenance services (relating to a persistent database to store configuration and other related information across system restarts and failures, for example) may be provided. A naming service (serving name and location information to processes executing on resources inside a chassis, and to executing agents external to the chassis, for example) may be provided. An IPC communication framework and associated services (for communication between management and controlplane processes) may be provided. A low-level CLI (for accessing various platform manager functions) may be provided.

RAS SW services include, according to various embodiments, state replication, quorum protocols, fast restart mechanisms, product validation techniques, support for in-service upgrades, and statistics and tracing collection and storage. Platform manager functions further include, according to embodiment, an interface for Enterprise Manager 530, a debugging infrastructure, a highly available process infrastructure (with disaster recovery), and various support functions relating to security, logging in, filtering and secure communication.

Networking services include, according to various embodiments, L2 and L3 protocols and functions, such as those associated with management of FIB data, and Routing Information Base (RIB) data, respectively. According to embodiment, networking services further include selected Layer 4 and above services, and protocols and services relating to SNMP Management Information Base (MIB) data and SNMP agent support for external management systems.

Component level services include, according to various embodiments, services and frameworks relating to management of processing resources included on NMs, FCMs, OLBs (including system and user code), and PMMs. An example of such a framework is a configuration framework to be used by CLIs, SNMP agents, the Enterprise Manager (via a GUI), and other similar mechanisms to deliver configuration information to components. An example of such a service is a boot management service to provide support and boot image management for booting pluggable modules (such as PMMs, NMs, FCMs, and OLBs) in a system.

Enterprise Manager 530 functions performed include multi-chassis functions analogous to functions performed by the Platform Manager, selected complex provisioning operations, and interfacing to GUIs (described elsewhere herein). In some embodiments, the Enterprise Manager includes functions to integrate one or more ES systems into surrounding management infrastructure.

SCF and Related Tasks

Figure 10:
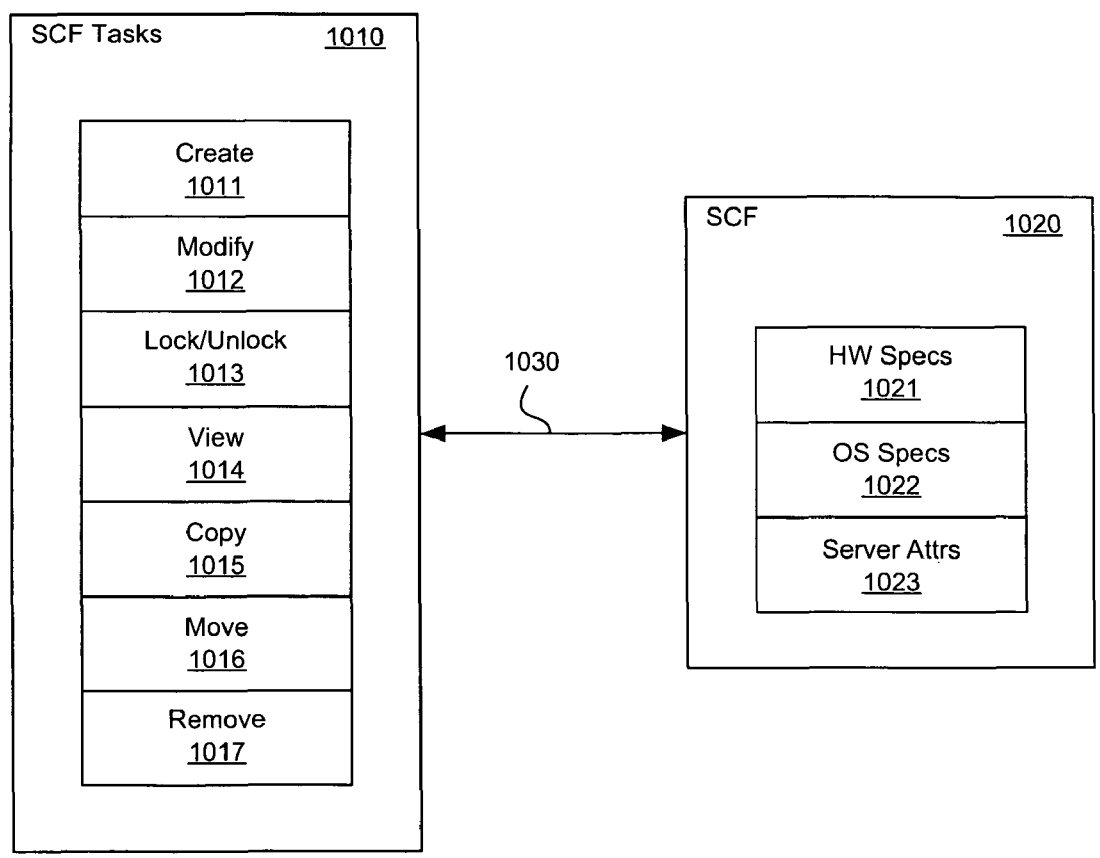
FIG. 10 illustrates a conceptual view of an embodiment of a Server Configuration File (SCF) and related SCF tasks.

FIG. 10 illustrates a conceptual view of an embodiment of a Server Configuration File (SCF) and related SCF tasks. SCF Tasks 1010 operate on SCF 1020 as illustrated by Interaction 1030 between SCF Tasks 1010 and SCF 1020. SCF 1020 serves to describe a desired server by specifying a list of required (or desired) resources, typically in the form of constraints. A server specification, as illustrated by SCF 1020, may include HW details such as HW Specifications 1021, and SW details such as OS Specifications 1022. Additionally, various HW and SW attributes and organization and operational details may also be included in SCF 1020, as illustrated by Server Attributes 1023.

According to various embodiments, SCF 1020 may be implemented as a human-readable text file or as a machine-readable binary file. Typically text file implementations enable editing and viewing operations via standard text editors. Typically binary file implementations enable editing and viewing operations via a specialized Command Line Interface (CLI) or a specialized GUI. In some embodiments, text file SCF implementations may provide CLI and GUI driven editing and viewing operations.

Tasks that may be performed on an SCF include creating an SCF, as illustrated by Create 1011, and modifying an SCF (including editing), as illustrated by Modify 1012. An SCF may be explicitly locked to prevent inadvertent or unauthorized modifications, and explicitly unlocked to allow modifications, as illustrated by Lock/Unlock 1013. Viewing an SCF, as illustrated by View 1014, enables examining the SCF to inspect various details (such as parameters in HW Specifications 1021, OS Specifications 1022, and Server Attributes 1023). In some embodiments, View 1014 may provide error checking operations to determine if the SCF is legal and is syntactically correct. An SCF may be copied, as illustrated by Copy 1015, moved (or renamed) as illustrated by Move 1016, and removed, as illustrated by Remove 1017.

HW Specifications 1021 may describe constraints in a logical manner (for example 'CreateServer 2way SMP') or in a physical manner (for example 'CreateServer 2way SMP-slot 2', referring specifically to HW inserted into slot 2). The HW specifications may include a combination of logical and physical specifications. In some embodiments, the constraints are interpreted by default as minimum (i.e. 'CreateServer 2way SMP' may be satisfied by one or more 2-way SMPs), and may be specified explicitly to match exactly (for example 'CreateServer 2way SMP-exact' only allows for a single 2-way SMP). Constraints for some types of resources (such as VNICs, for example), may be described by a full or a partial specification. The full specification is expressed by itemizing and fully specifying each individual resource (enumerating bandwidth, priority scheme selection and associated weights, and other similar parameters, for example). Alternatively, the partial specification is expressed by listing a number of a particular type of resource required (each of the resources is assumed to require identical parameters, for example).

Figure 11:
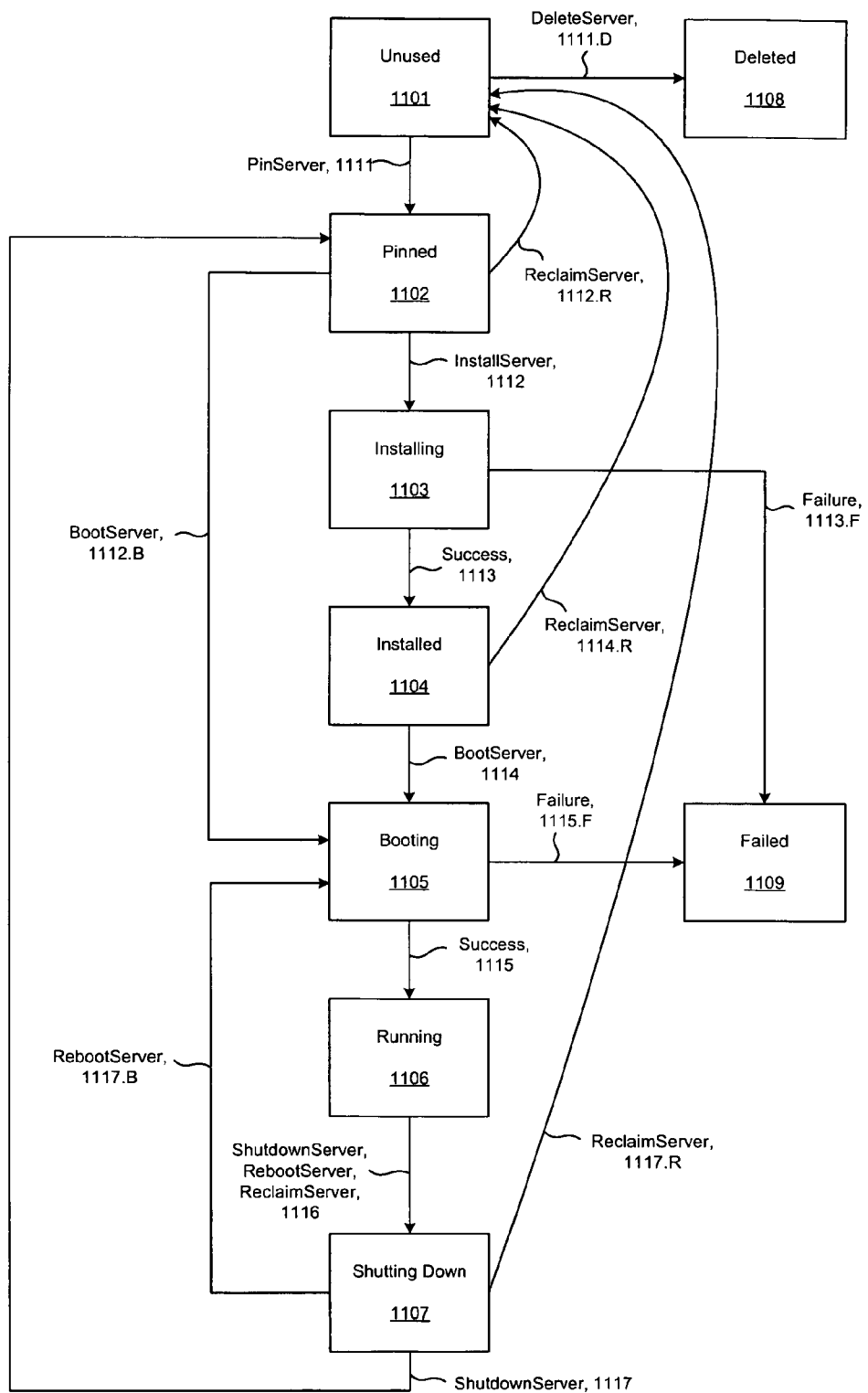
FIG. 11 illustrates selected aspects of an embodiment of server operational states and associated transitions.

Server Operational States FIG. 11 illustrates selected aspects of an embodiment of server operational states and associated transitions. Flow typically begins at "Unused" 1101 with a defined SCF (such as SCF 1020 of FIG. 10, for example) and an available resource collection (such as Hardware Resources View 900A of FIG. 9A). When a command to pin a server is received, flow proceeds along "PinServer" 1111 to "Pinned" 1102, where resources are assigned (or allocated) from the available resource collection according to constraints in the SCF. In some embodiments, resource allocation (or binding) is managed by a platform manager (such as Platform Manager 531 of FIG. 5B). The result of the pinning is a provisioned server (such as any of Provisioned Server $PS_2$ 902.2, Provisioned Server $PS_1$ 902.1, and Provisioned Server $PS_0$ 902.0 illustrated in FIG. 9B).

In various embodiments, there may be further processing relating to pinning a server, such as programming resources based in part on the assignment, based in part on attributes specified in the SCF, or any combination thereof. For example, the SCF may specify a two-processor constraint, and during processing relating to "Pinned" 1102 an assignment of SMP Portion $P_A$ 152A is made from an available resource pool originally including SMP Portion $P_A$ 152A and SMP Portion $P_{A'}$ 152A' (see FIGS. 9A and 9B, for example). SMP 151A (see FIG. 1B, for example) may then be configured as the pair of two-processor physical partitions 152A and 152A' (if this has not already been accomplished).

VNIC 154A.1 may also be configured with an IP address, a MAC address, a VLANid, and so forth, according to information in the SCF or according to other management related criteria. Selected lookup state information (such as keys and results illustrated in FIG. 8A and FIG. 8B) may be programmed, including a VNIC MAC destination address (MACDA) to corresponding fabric port mapping, for subsequent reference by VIOCs when processing packets (and messages). Other programming may be performed relating to VLAN membership, bandwidth, queuing behaviors, or other related properties (such as programming any combination of VNIC registers including those of Address Block 601.1 and VNIC Configuration Block 618.1 of FIG. 6A).

When a command to install the server is received, flow proceeds along "InstallServer" 1112 to "Installing" 1103 where initial operating software is installed. The initial operating software includes any combination of a boot image, an OS boot loader, a root file system image, portions of an OS image, and an entire OS image. The software is customized as required according to attributes included in the SCF, and stored so that it is accessible by hardware resources assigned during processing relating to "Pinned" 1102. If installation fails, then flow proceeds along "Failure" 1113.F to "Failed" 1109, where corrective action may be taken. If installation is successful, then flow proceeds along "Success" 1113 to "Installed" 1104.

When a command to boot the server is received, flow proceeds along "BootServer" 1114 to "Booting" 1105, where execution of the boot image begins, followed by execution of the OS boot loader, with references to the root file system image as needed. If booting fails, then flow proceeds along "Failure" 1115.F to "Failed" 1109, where corrective action may be taken. If booting is successful, then flow proceeds along "Success" 1115 to "Running" 1106. The server is then fully operational with an executing OS, and may begin executing various application processes. In situations where installation has been performed previously, the server may be booted directly from "Pinned" 1102 via "BootServer" 1112.B.

"Running" 1106 is exited when any of several server operational commands, including shutdown, reboot, and reclaim are received, as illustrated by "ShutdownServer, RebootServer, ReclaimServer" 1116. In the case of a shutdown command, flow proceeds to "Shutting Down" 1107, where any executing applications are closed and the executing OS is terminated. When termination is complete, then flow proceeds along "ShutdownServer" 1117 to "Pinned" 1102, awaiting the next command. In the case of a reboot command, flow proceeds to "Shutting Down" 1107 (where software execution is terminated) and then proceeds along "RebootServer" 1117.8 to "Booting" 1105 to boot the server again.

In the case of a reclaim server command, flow proceeds to "Shutting Down" 1107 (terminating software) and then proceeds along "ReclaimServer" 1117.R to "Unused" 1101, where processing frees the resources assigned when pinning the server and returns them to the available resource collection. A reclaim server command may also be processed from "Installed" 1104 (via "ReclaimServer" 1114.R) and from "Pinned" 1102 (via "ReclaimServer" 1112.R). When an SCF is unused (as in "Unused" 1101, after processing of a reclaim server command, for example), the unused SCF may be deleted, as indicated by flow "DeleteServer" 1111.D proceeding to "Deleted" 1108.

The initial operating software, in various embodiments, may correspond to a generic operating system environment (such as Linux, Windows, or any similar commercially available OS). In other embodiments, the initial operating software may correspond to a wholly or partially customized operating system environment, according to user requirements. Such customization may be based in part on one of the commercially available generic operating system environments. As illustrated in FIG. 5A, in some embodiments the initial operating software may include a Hypervisor (such as Hypervisor1 510 or Hypervisor2 520).

In some embodiments, operations such as those illustrated in SCF Tasks 1010 may be performed on an SCF only while there is no corresponding provisioned server, as designated by "Unused" 1101. The previous discussion of SCF Tasks assumes this scenario, and is roughly analogous to operating on the SCF when a server is "off-line". However, other embodiments enable some or all SCF Tasks to be performed while a server is "on-line" (i.e. in any combination of operational states "Pinned" 1102, "Installing" 1103, "Installed" 1104, "Booting" 1105, "Running" 1106, and "Failed" 1109, in addition to "Unused" 1101). For example, Modify 1012 may be performed while a server is running, in order to add resources associated with the server, and has the effect of changing the SCF as well as pinning additional resources that are then made available to the running server. Similarly, resources may be subtracted from the running server via Modify 1012. Parameters that may be modified while a server is running are considered dynamic parameters, and parameters that may not be modified are considered static parameters. Various parameters may be dynamic or static, according to implementation.

The operation of various SCF Tasks with respect to server operational state (such as Running and Unused) may also vary by embodiment. For example, in some embodiments, when View 1014 is performed, information specific to the operational state of the server corresponding to the selected SCF may be provided. This information may include current operating state, any relevant error information, data concerning processing load, and other similar information relating to status of an on-line server. In alternate embodiments, variants of the View operation may provide a system-wide listing of defined SCFs and any corresponding server operational state.

A server as defined by an SCF may be physically relocated from one set of resources to another, including resources in distinct geographical locations, according to various embodiments. In a first embodiment, an SCF may be developed on a first EF system and then the SCF may be used on a second EF system. This effectively deassigns resources for the server from the first EF system and then assigns resources for the server from the second EF system. The two systems may be co-located in a single server facility, or located in geographically distinct server facilities. In a second embodiment, a server provisioned according to an SCF may be unpinned with respect to a first assignment of resources, and then pinned anew to a second assignment of resources.

Real Time Server Provisioning and Management

Real time server provisioning and management includes recognizing system status changes and responding to the system status changes at approximately the same rates, and performing these operations with low latency. As an example, when a pluggable module is inserted into a running ES, availability of new HW resources included in the pluggable module is reflected immediately to an operator of the ES, according to a previously recorded query. The operator may then request booting a new provisioned server, and this request is performed immediately (provided sufficient resources are available to provision the server).

At the level of a single chassis, CM 533, executing on an SCM (such as Primary SCM 140A), manages many aspects of real time server provisioning and management, including managing modules in the chassis and maintaining an inventory of modules in the chassis. The CM also monitors operational status of the modules and provides user interfaces for configuration of modules and provisioning of servers (via CLIs or GUIs, as provided directly by the CM or in conjunction with other SW, according to various embodiments). Additional information concerning the CM is included elsewhere in this section (see also the Chassis Manager Operation section, elsewhere herein). Operating in parallel with the CM, instances of Module BMC SW 550, executing on BMCs in the system (such as BMCs 402.4, 402.5, and so forth), provide events to and receive commands from the CM. The events convey information regarding module status changes and command execution results, providing information necessary for module management and inventory maintenance.

Figure 12A:
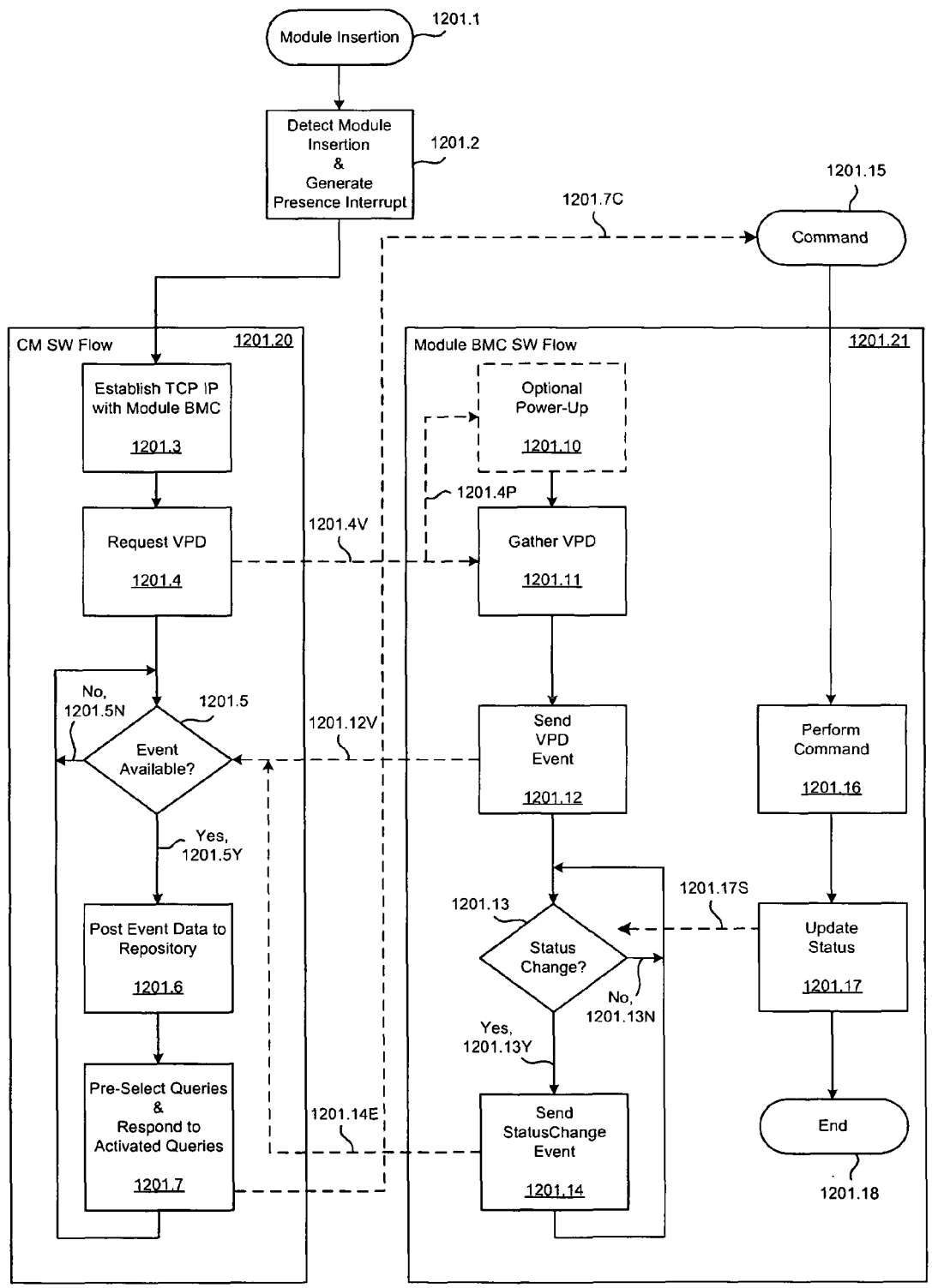
FIGS. 12A and 12B are flow diagrams illustrating selected operational aspects of real time server provisioning and management in an ES embodiment.

FIG. 12A is a flow diagram illustrating selected operational aspects of real time server provisioning and management in an ES system embodiment, including "CM SW Flow" 1201.20 and "Module BMC SW Flow" 1201.21. The CM flow illustrates portions of processing performed directly by or under the control of CM 533 (FIG. 5B). The BMC flow illustrates portions of processing performed directly or under the control of the Module BMC SW 550 (FIG. 5C) executing on the BMCs.

Processing begins when a module (a PMM, such as PMM 150A, for example) is introduced into an ES chassis backplane ("Module Insertion" 1201.1), and continues as a presence interrupt is generated and delivered to CM 533, indicating insertion of the pluggable module ("Detect Module Insertion and Generate Presence Interrupt" 1201.2). Processing then continues under the control of the CM, as illustrated in "CM SW Flow" 1201.20.

When the CM receives the presence interrupt, a request is made to establish communication between the CM and a BMC included on the inserted module, such as BMC 402.5 of PMM 150A ("Establish TCP IP with Module BMC" 1201.3). In parallel, the module BMC has been powered (due to insertion of the module) and has begun booting. Depending on various implementation dependent timing behaviors, the module BMC may have completed booting. Eventually the BMC completes booting, responds to the TCP/IP communication channel, and listens for commands from the CM (by executing various portions of Command Agent 553 of FIG. 5B, for example).

At this point, CM 533 is aware only that a module has been inserted, but is not aware of any particular details of the module (such as if the module is a PMM, NM, FCM, or OLB). The CM then interrogates the module for Vital Product Data (VPD) to determine the particular details of the module ("Request VPD" 1201.4) by issuing a Module Get VPD command to the module BMC. The CM then awaits a BMC event in response to the command ("Event Available?" 1201.5), looping back ("No" 1201.5N) until a response is received ("Yes" 1201.5Y).

In parallel, the BMC SW receives the command (as illustrated conceptually by dashed-arrow 1201.4V) and begins to gather the VPD for the module. Depending on embodiment, optional power-up processing may occur ("Optional Power-Up" 1201.10 via dashed-arrow 1201.4P) to enable various components on the module to respond to BMC interrogatories concerning various capacities and capabilities. For example, in some embodiments it may be necessary for a portion of the module to operate in a reduced or full manner in order to determine a maximum operational frequency, which may be an element of the VPD. The various elements of the VPD are eventually gathered from components of the module ("Gather VPD" 1201.11). The BMC SW flow then proceeds to send an event ("Send VPD Event" 1201.12) to the CM in response to the command (as illustrated conceptually by dashed-arrow 1201.12V). Processing relating to sending the event is generally performed by executing various portions of Event Agent 552 (5B), for example.

In parallel, the CM has been awaiting a response from the BMC, and when an event arrives conveying the response, the VPD included in the response is parsed and corresponding entries are stored into a repository ("Post Event Data to Repository" 1201.6 via "Yes" 1201.5Y). In some embodiments, the repository is Primary CIM Instance Repository 917.P (FIG. 9C) and Repository Manager 535 accesses the repository at the request of CM 533. In some embodiments, the repository includes any combination of Primary CIM Instance Repository 917.P and Secondary CIM Instance Repository 917.S.

The CM then processes queries that depend on at least one of the corresponding entries stored in the repository ("Pre-Select Queries and Respond to Activated Queries" 1201.7). Processing includes determining queries that are dependent on any of the newly stored entries (or "pre-selecting" such queries), evaluating the pre-selected queries (to determine which, if any, are activated or deactivated), and processing any resultant triggered queries (and ceasing processing of any queries that are no longer triggered). In some embodiments, query processing is performed via SW routines included in Query Engine 534 (FIG. 5B). Flow then loops back to await a subsequent event ("Event Available?" 1201.5).

In parallel to the processing of the VPD data by the CM, the BMC SW has entered a loop monitoring for status changes on the module ("Status Change?" 1201.13). If no change has occurred, then processing loops back ("No" 1201.13N). If a change has occurred, then processing flows forward ("Yes" 1201.13Y) to send a status change event indicating and describing the new status to the CM ("Send StatusChange Event" 1201.14). The event communication is indicated conceptually by dashed-arrow 1201.14E, pointing to "Event Available?" 1201.5, where the CM is looping while awaiting a newly available event.

In some embodiments, processing of triggered queries may result in one or more commands being sent to the BMC to alter the status or configuration of the module (as illustrated conceptually by dashed-arrow 1201.7C, for example). For example, a query may be registered that is activated whenever a module is inserted, and the query may result in an action including provisioning a server. If the module is a PMM, then provisioning the server may require sending a command to the BMC on the PMM to partition the PMM according to the requirements of the server to be provisioned. Other such scenarios are possible, such as re-provisioning a failed server when a replacement module is inserted.

Generally the BMC SW is enabled to receive and process commands in parallel with performing other processing. The received BMC commands are typically generated by the CM, and in some embodiments are provided in response to server provisioning and management commands, that may be provided manually by a user, or generated automatically in response to an activated query, according to various usage scenarios. Examples include booting a server, such as processing related to "BootServer" 1114 (FIG. 12), and shutting down a server, such as processing relating to "ShutdownServer" 1117.

Typically a command is sent asynchronously to the BMC ("Command" 1201.15), as a result, for example, of processing related to an activated query (see dashed-arrow 1201.7C originating from "Pre-Select Queries and Respond to Activated Queries" 1201.7. The command is then received, any accompanying parameters are parsed, and the required operation is performed ("Perform Command" 1201.16). Status that may change as a result of executing the command is updated ("Update Status" 1201.17) and processing of the command is complete ("End" 1201.18). Updating the status, as shown conceptually by dashed-arrow 1201.17S, eventually results in recognition of the status change ("Yes" 1201.13Y exiting "Status Change?" 1201.13). In turn, an event is sent to the CM (dashed-arrow 1201.14E), typically including a response to the command.

Recognized status changes ("Status Change?" 1201.13) are not limited to those occurring as a result of processing a command, but may include a change in any monitored parameter, state, or other related variable associated with the module. Such status changes may include a module failing or becoming operational or powered up, a sensor crossing a threshold, or completion of a boot operation. See the Selected BMC Event Details section, included elsewhere herein, for other examples.

Those of ordinary skill in the art will recognize that the figure is illustrative only, as only selected portions of the CM and BMC SW flows are shown. Furthermore, the CM is typically in communication with an instance of BMC SW associated with each inserted module of an ES system embodiment. Thus there are typically multiple instances (operating in parallel) of the illustrated flow.

Those of ordinary skill in the art will also recognize that although the figure illustrates loop back control (such as "Event Available?" 1201.5) implemented as a "busy loop", in alternate embodiments an interrupt may be used instead. These and all similar variations are contemplated according to various embodiments.

Figure 12B:
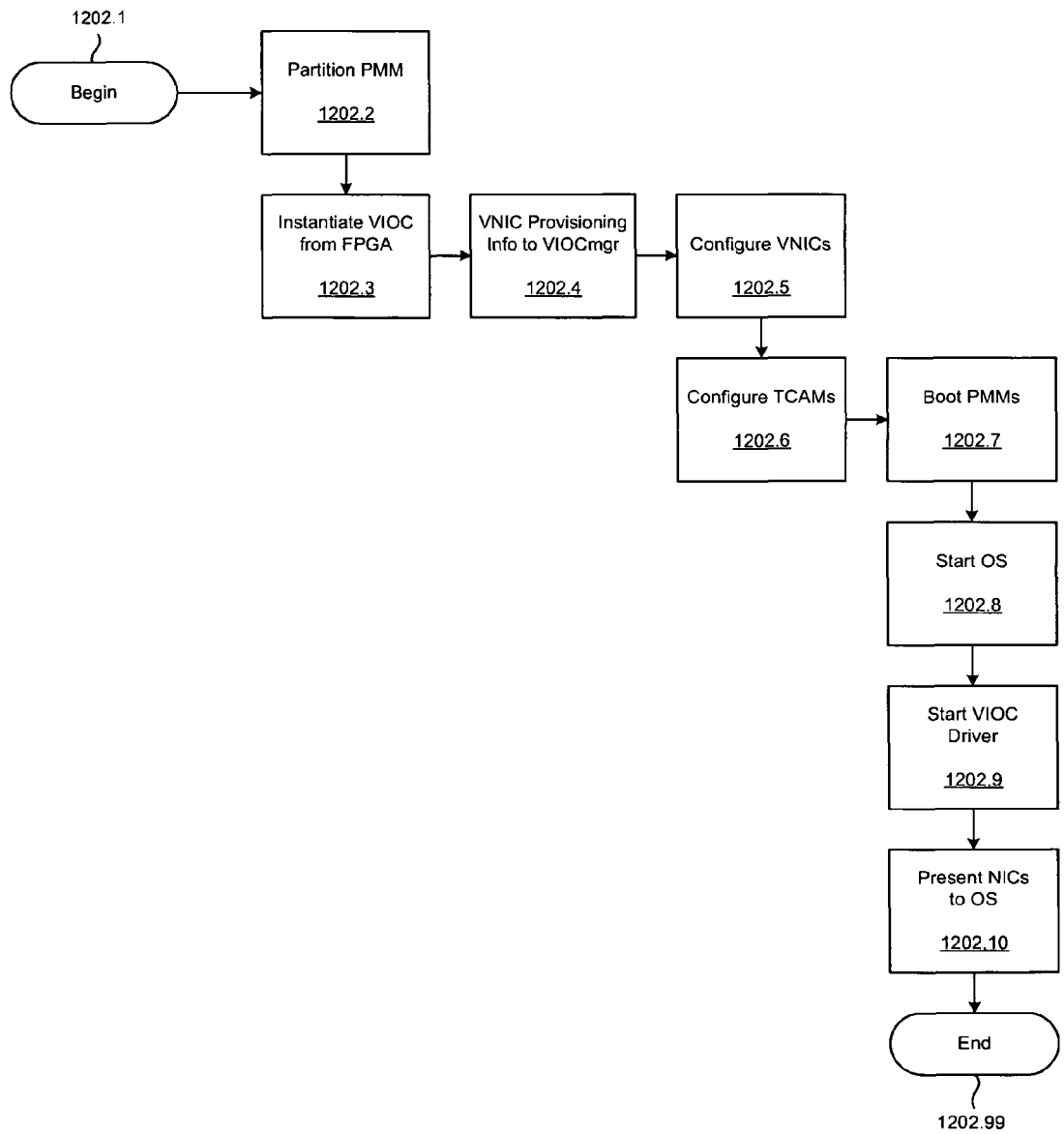

FIG. 12B is a flow diagram illustrating selected operational aspects of real time server provisioning and management in an ES system embodiment, including selected details relating to provisioning VNICs and booting PMMs, as typically performed during processing related to "Booting" 1105 (see FIG. 11). FIG. 12B is representative of operations performed by various SW elements, including the CM, the BMC SW, the VIOC Manager, and the BIOS, OS, and VIOC drivers executing on a PMM.

Flow starts ("Begin" 1202.1) when a command or request to boot a server is processed. In response the CM instructs the BMC to partition the PMM according to an SCF, and the BMC configures the HT links on the PMM to form the appropriate physical partitions ("Partition PMM" 1202.2). In some embodiments the BMC also "constructs" or "routes" a VIOC implementation in all or a portion of a Field Programmable Gate Array (FPGA) device ("Instantiate VIOC from FPGA" 1202.3). In some usage scenarios a plurality of VIOCs may be instantiated, such as VIOC 301.5 and VIOC 301.5' of PMM 150A (FIG. 4B). In other usage scenarios a further plurality of VIOCs, included on a plurality of PMMs, may be instantiated, depending on the requirements stated in the SCF.

After the VIOC (or VIOCs) are instantiated, the CM provides VNIC provisioning information from the SCF to a controlplane process (such as VIOC Manager 536 of FIG. 5B) responsible for configuring VNICs in the VIOC ("VNIC Provisioning Info to VIOCmgr" 1202.4). The VNICs are then configured according to the provisioning information ("Configure VNICs" 1202.5), typically by asserting corresponding VNIC enable bits (such as VNIC Enable 618.1$a$ of FIG. 6A) of respective VNICs. In some embodiments, the VNIC configuration further includes setting minimum and maximum bandwidth parameters (such as Bandwidth Minimum 618.1$d$ and Bandwidth Maximum 618.1, both of FIG. 6A), as specified in the SCF. Subsequently, lookup information is programmed into TCAM/SRAMs coupled to the VIOC ("Configure TCAMs" 1202.6), based in part on the SCF and also based on additional system configuration and topological information.

The PMM configuration (including partitioning and VIOC setup) is now complete and processing continues by booting the PMM (or PMMs) used in the instantiated server ("Boot PMMs" 1202.7). Processing in the PMM continues as an OS (such as OS1/Drivers 1 507 of FIG. 5A) is booted ("Start OS" 1202.8). A kernel mode VIOC Driver (such as VIOC Driver 1 511) is in turn initialized and spawned by the OS ("Start VIOC Driver" 1202.9). The VIOC Driver is typically responsible for communication between the OS and selected VIOC resources, including VNICs. The VIOC Driver subsequently instantiates OS-level interfaces for each of the configured VNICs, presenting the VNICs as NIC resources to the OS ("Present NICs to OS" 1202.10). Presenting the NICs includes the VIOC Driver reading the VNIC enable bits implemented in the VIOC, and for each asserted bit (indicating an active VNIC), allocating and initializing driver-level SW data structures for the respective enabled VNIC to enable the OS to access the VNIC as a NIC. The illustrated processing is then complete ("End" 1202.9).

Removal of a VNIC (as a result of operations relating to server management, for example) is typically accomplished in several stages. The VIOC Manager disables a corresponding VNIC enable bit in (included in a VNIC enable register of a VIOC). In response to writing the VNIC enable register, the VIOC generates an interrupt that is delivered to the VIOC Driver executing on the module including the VIOC (such as a PMM). The VIOC Driver reads the VNIC enable register, determines that a VNIC has been disables, and deletes any corresponding OS-level interfaces previously configured and presented to the OS. Reconfiguration of a VNIC, with respect to properties visible to the OS, is accomplished in a similar manner: the VIOC Manager writes VIOC registers, an interrupt is delivered to the VIOC Driver, and the VIOC Driver modifies corresponding OS-level interfaces appropriately. Results may be returned by the VIOC Driver by writing one or more VIOC scratchpad registers with return value information. Typically the VIOC Manager polls the proper scratchpad registers awaiting results.

Figure 13A:
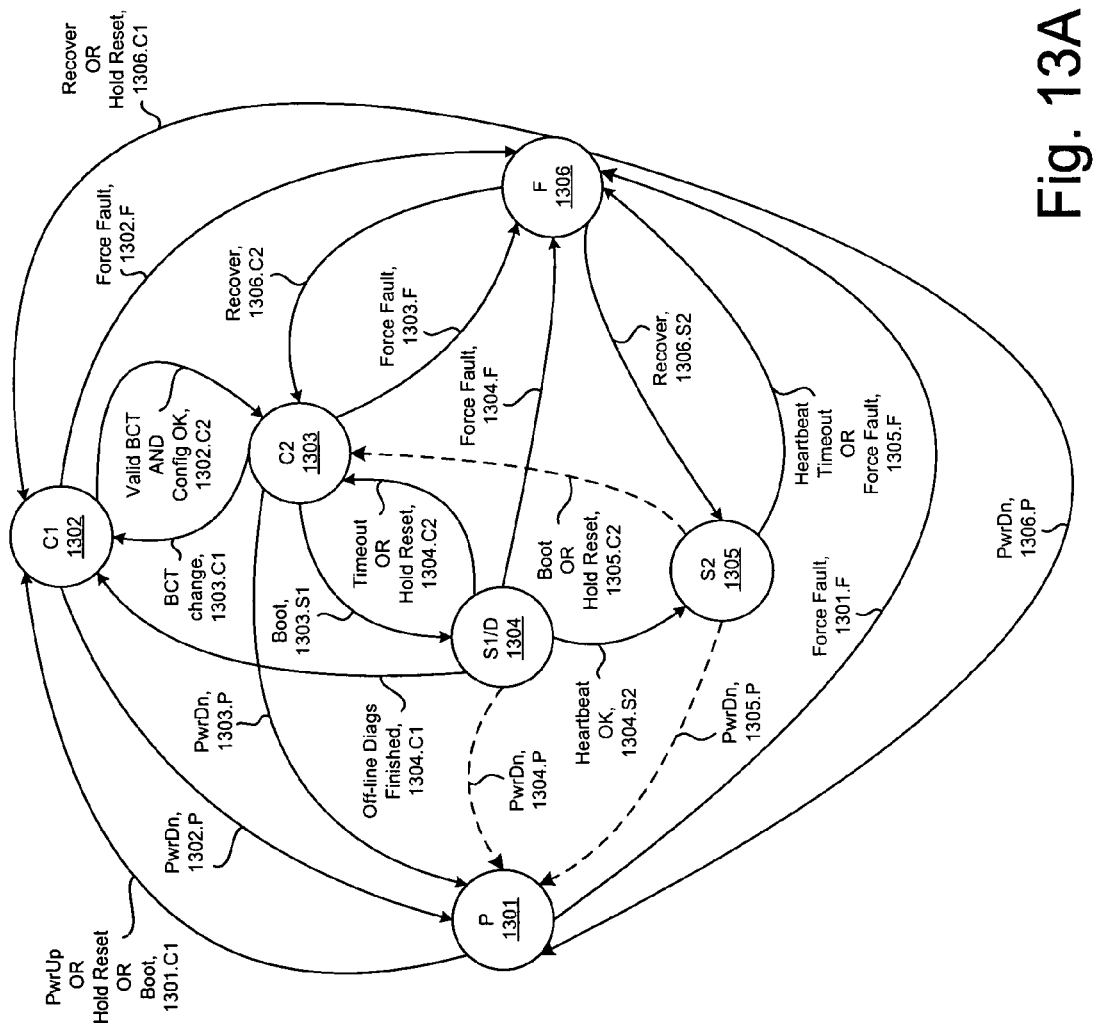
FIG. 13A is a state diagram illustrating processing of selected Baseboard Management Controller (BMC) related commands in an ES embodiment.

In some embodiments, the VIOC Manager executes using resources on an SCM (such as Primary SCM 140A), and in such embodiments the VIOC Driver typically communicates via an SFM with the Manager (as shown by PMM-SCM Data Exchange 215, for example). In some embodiments, one or more of the VIOC Drivers communicate with the same VIOC Manager, and or more of the VIOC Drivers communicate with the same VLAN Manager. In some embodiments, there is only a single VIOC Manager and a single VLAN Manager.
BMC Command and Low-Level Hardware Boot Processing FIG. 13A is a state diagram illustrating processing of selected BMC related commands in an ES embodiment. In some embodiments, all or any portion of BMC commands are implemented as IPMI type commands, and in some of these embodiments, an IPMI Client (such as PMI Client 551 of FIG. 5C) may provide interface functions for communication with Command Agent 553. The BMC commands are typically provided by CM 533 and processed by BMC SW, as illustrated by "Perform Command" 1201.16 (FIG. 12A).

In some embodiments, the BMC SW implements processing of BMC commands via a BMC Operational State Machine, and the figure is representative of states and transitions of these embodiments. In other embodiments, the BMC command processing is performed by any combination of SW and HW. In some embodiments, a plurality of BMC state machine instances are provided on a module (such as a PMM), one for each possible partition the module may be partitioned into. In some embodiments, the BMC Operational State Machine receives IPMI commands and passes them through to an IPMI implementation, returning IPMI status from the IPMI implementation if needed. Some BMC events correspond to pass-through IPMI events, such as Sensor Threshold Breached, described elsewhere herein. The figure conforms to the convention that the state machine remains in a state unless one of the illustrated transitions is activated ("loopback" transitions are omitted for clarity).

In some embodiments, whenever the state machine transitions to a new state, the transition is reported to Chassis Manager 533 as one or more events that describe the resultant state. The transitions are typically recognized as a status change, such as those detected by "Status Change?" 1201.13 (FIG. 12A), and event signaling is as illustrated by "Send StatusChange Event" 1201.14. In some embodiments, the events include information concerning the transition or the cause for the transition.

Consider the BMC Operational State Machine as starting in state P 1301. In this state, the module the BMC is included in is powered up only sufficiently for operation of the BMC sub-system, and other elements of the module remain powered down. BMC sub-system elements related to detecting selected module status information, receiving CM commands, and delivering event information to the CM are operational. In some embodiments, these elements include execution of all or portions Event Agent 552, and Command Agent 553 of FIG. 5C.

While in state P 1301, if the CM sends commands including any of Module Power Up, Module Hold Reset, and Module Boot to the BMC, then the state machine transitions to state C1 1302 via transition "Power Up OR Hold Reset OR Boot" 1301.C1. State C1 generally corresponds to a first or minimal configuration. If the command was Module Power Up, then state C1 1302 is the end state for processing the command. If the command was Module Hold Reset, then when conditions for transition "Valid BCT AND Configuration Complete OK" 1302.C2 are met, the state machine transitions to state C2 1303, and this is the end state for processing the Module Hold Reset command. State C2 generally corresponds to a second or customized configuration. If the command was Module Boot, then the state machine transitions first to state C2 1303 as Module Hold Reset. Then, when conditions for transition "Boot" 1303.S1 are met, the state machine transitions to state S1/D 1304, followed by a transition to state S2 1305 when conditions for transition "Heartbeat OK" 1304.S2 are met, and this is the end state for processing the Module Boot command.

While in state C1 1302, power is applied to all of the elements on the module, in addition to the BMC sub-system, and reset is active to any system or application processing elements. For example, CPUs included on PMMs, PCEs and TMs included on NMs, IOPs included on FCMs, and CPUs included on OLBs are continuously reset. If a Module Power Up command was being processed, then C1 is the final state, and is exited only upon receipt of another command. If a Module Power Down command is received, then the state machine transitions to state P 1301 via transition "Power Down" 1302.P. If a Module Force Fault command is received, then the state machine transitions to state F 1306 via transition "Force Fault" 1302.F.

If a Module Hold Reset or a Module Boot command is being processed, then C1 is a transient state, and is exited when the BMC sub-system detects or determines that the conditions for transition "Valid BCT AND Configuration Complete OK" 1302.C2 are met. Specifically, the Boot Configuration Table (BCT) information received with the command being processed has been found to be valid, and any module configuration information included in the BCT information has been successfully applied to the module. Thus the module configuration is complete and the machine transitions to state C2 1303.

While in state C2 1303, reset remains active to the system and application processing elements. If a Module Hold Reset command was being processed, then C2 is the final state, and is exited only upon receipt of another command. If any command that provides new BCT information is received, then the state machine transitions to state C1 1302 via transition "BCT Change" 1303.C1. If a Module Power Down command is received, then the state machine transitions to state P 1301 via transition "Power Down" 1303.P. If a Module Force Fault command is received, then the state machine transitions to state F 1306 via transition "Force Fault" 1303.F.

If a Module Boot command is being processed, then C2 is a transient state, and is exited when the BMC sub-system detects or determines that the conditions for transition "Boot" 1303.S1 are met. Specifically, the BMC determines that an implementation dependent delay has transpired, and the state machine transitions to state S1/D 1304.

While in state S1/D 1304, reset is released, allowing the system and application processing elements to begin fetching and executing code. If a Module Hold Reset command is received, then the state machine transitions to state C2 1303 via transition "Time Out OR Hold Reset" 1304.C2. If a Module Power Down command is received, then the state machine transitions to state P 1301 via transition "Power Down" 1304.P. If a Module Force Fault command is received, then the state machine transitions to state F 1306 via transition "Force Fault" 1304.F.

If a Module Boot command is being processed, then S1/D is a transient state. If the conditions for transition "Heartbeat OK" 1304.S2 are met, then the state machine transitions to state S2 1305 via transition "Heartbeat OK" 1304.S2. Specifically, the BMC sub-system receives a heartbeat indication from the system or application processor after the processor has executed sufficient start-up code (such as BIOS boot for a PMM) to communicate the heartbeat indication to the BMC. In some embodiments, BIOS execution communicates heartbeat information to the BMC via VIOC scratchpad registers.

However, if the BMC does not receive a heartbeat indication after a predetermined time interval, then the BMC Operational State Machine times out the operation, and transitions to state C2 1303 via transition "Time Out OR Hold Reset" 1304.C2. A special sub-case of the Module Boot command may specify (via information in the BCT) that off-line diagnostics are to be performed instead of a full boot. In this context, completion of the Module Boot command occurs when the off-line diagnostics are completed or have timed out. When this occurs, the state machine transitions to state C1 1302 via transition "Offline Diagnostics Finished" 1304.C1.

While in state S2 (the terminus of successful processing of a Module Boot command), reset to the processing elements remains released, and the processing elements continue executing instructions and periodically generating heartbeat indications to the state machine. If a predetermined period of time elapses without a heartbeat indication, then the state machine transitions to state F 1306 via transition "Heartbeat Timeout OR Force Fault" 1305.F.

If a Module Boot or a Module Hold Reset command is received, then the state machine transitions to state C2 1303 via transition "Boot OR Hold Reset" 1305.C2. If a Module Power Down command is received, then a transition is made to state P 1301 via transition "Power Down" 1305.P. If a Module Force Fault command is received, then a transition is made to state F 1306 via transition "Heartbeat Timeout OR Force Fault" 1305.F.

State F is a transient fault recovery state where an attempt is made to recover from whatever condition led to the transition into the state. If recovery from any non-fatal faults relating to state S2 is made, then the machine transitions to state F 1306 via transition "Recover" 1306.S2. If recovery from any fatal faults relating to states C2, S1/D, or S2 is made, then the machine transitions to state C2 1303 via transition "Recover" 1306.C2. If recovery from any fatal faults relating to state C1 is made, then a transition is made to state C1 1302 via transition "Recover OR Hold Reset" 1306.C1. A Module Hold Reset command overrides any in-progress or attempted recovery, and in response the machine transitions to state C1 1302 via transition "Recover OR Hold Reset" 1306.C1. A Module Power Down command is similarly overriding, and the machine moves to state P 1301 via transition "Power Down" 1306.P. The CM may issue a Module Power Down command in response to event information sent from the BMC indicating that the fault is an unrecoverable HW or SW failure, according to embodiment, or represents a catastrophic fault, also according to embodiment.

In some embodiments, some server provisioning and management operations typically require issuing one or more BMC commands that are processed according to the illustrated state diagram. A first example is booting a server, such as processing related to "BootServer" 1114 (FIG. 12). If the server to be booted is configured with multiple modules (such as two PMMs), then two separate BMC command streams will be issued, one to each of the two PMMs (see FIG. 13B for an example). A second example is shutting down a server, such as processing relating to "ShutdownServer" 1117, resulting in separate Module Power Down commands to some or all of the modules the server was provisioned from.

In some embodiments, selected BMC commands are ignored (and an error status is returned) unless a force-execute bit included with the command is asserted. More specifically, if processing a BMC command would result in a state transition of the BMC Operational State Machine, then the force-execute bit must be asserted for the command to have an effect. Requiring assertion of the force-execute bit reduces the likelihood that a booted server is erroneously reset or powered down, since the reset or power down command would not be executed unless the force-execute bit is asserted. In some embodiments, only a portion of the BMC commands that would result in state transitions are dependent on the force-execute bit, such as commands that would result in an operational server becoming inoperable (reset or power-down of a running server, for example).

While the BMC Operational State Machine has been described with respect to selected BMC commands (such as Module Power Up, Module Power Down, Module Hold Reset, Module Boot, and Module Force Fault), this is only a representative embodiment. Any combination of BMC commands (such as those described in the Selected BMC Command Details section, elsewhere herein) may be implemented by the BMC state machine. Additionally, in some embodiments, any combination of BMC Commands illustrated with respect to the BMC state machine may be implemented by other mechanisms.

Those of ordinary skill in the art will note that the BMC Operational State Machine may be implemented in HW, SW, or any combination of the two, according to embodiment. It is also apparent than any number of state machine states and transitions may be implemented to provide similar functionality, according to embodiment.

Figure 13B:
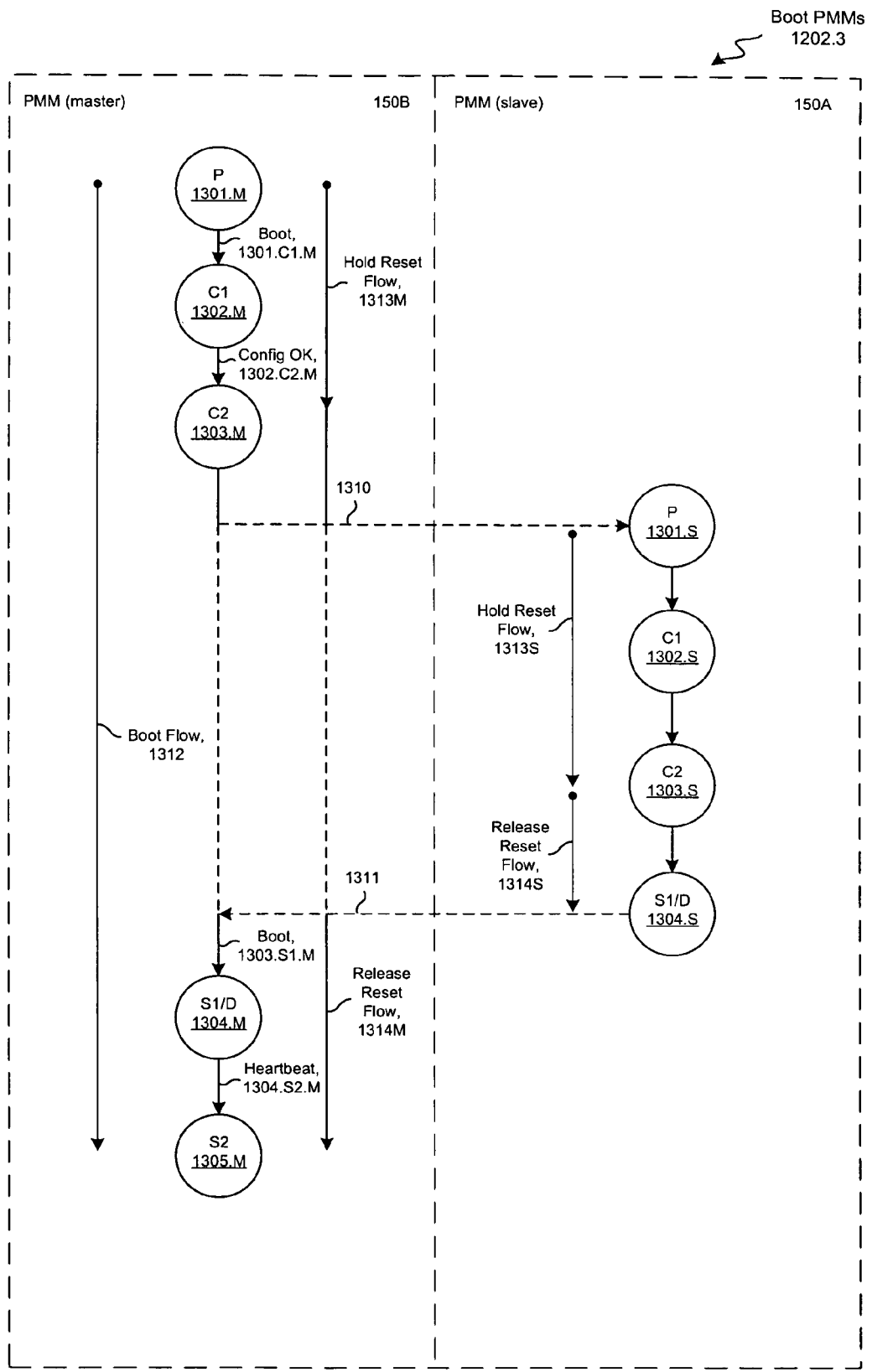
FIG. 13B illustrates selected operational aspects of single and dual PMM low-level hardware boot processing in an ES embodiment.

FIG. 13B illustrates selected operational aspects of single and dual PMM low-level hardware boot processing in an ES embodiment, as represented by "Boot PMMs" 1202.7 (FIG. 12B), for example. The processing illustrated in FIG. 13B conceptualizes selected paths through states as illustrated by FIG. 13A, with corresponding states and transitions named accordingly. FIG. 13B illustrates boot processing for a single PMM configuration (such as $P_3$ 203 of FIG. 2) and a dual PMM configuration (such as $P_4$ 204 of FIG. 2), and as such the generic Module commands described in FIG. 13A transitions correspond to specific PMM Module commands in the context of FIG. 13B. Conceptually a two-part sequencing is used to boot PMMs. First a HW initialization is performed, including ensuring power is on, initializing fabric communication HW, and performing board-level fabric initialization. Second a SW start-up is performed, including releasing reset and then allowing BIOS and subsequent SW to boot. In some embodiments the HW initialization is in response to the Module Hold Reset command. In some embodiments the SW initialization is in response to the Module Boot command.

Operation in the single PMM configuration is as follows. "Boot Flow" 1312 begins at state P 1301.M, when the BMC on PMM 150B receives a PMM Boot command via CM 533. The BMC Operational State Machine then moves to state C1 1302.M via transition "Boot" 1301.C1.M, and asserts reset to the PMM. When the BCT has been found to be valid and the configuration included therein has been properly applied to the PMM, the state machine moves to state C2 1303.M via transition "Configuration Complete OK" 1302.C2.M. The state machine then continues to state S1/D 1304.M via transition "Boot" 1303.S1.M, and releases reset to the PMM. The PMM then boots BIOS and generates a valid heartbeat. When the valid heartbeat from the PMM has been detected by the BMC, the machine moves to state S2 1305.M via transition "Heartbeat OK" 1304.S2.M, and the PMM boot flow is complete.

Each of the state machine transitions are reported to CM 533 via events describing the resultant state. For example, when the state machine has completed the transition to state C1 1302, an event describing the new state machine state as "C1" is generated and delivered to the CM. Events are similarly generated and delivered for all of the state machine transitions.

Operation in the dual PMM configuration is as follows, with PMM 150B operating as the master, and PMM 150A operating as the slave. Conceptually, the master PMM is partially booted ("Hold Reset Flow" 1313M), then the slave PMM is booted ("Hold Reset Flow" 1313S and "Release Reset Flow" 1314S), and then the master PMM is fully booted ("Release Reset Flow" 1314M). The final slave PMM boot state is different than the master PMM boot state, as the slave PMM omits booting of BIOS and hence generates no heartbeat. Coordination of transitions between the master and slave PMMs are managed by CM 533, via reception and processing of state transition events and issuing of appropriate commands to the master and slave BMCs on the respective PMMs.

More specifically, "Hold Reset Flow" 1313M begins at state P 1301.M, when the BMC on the master PMM (PMM 150B) receives a PMM Hold Reset command from CM 533. The BMC Operational State Machine then moves to state C1 1302.M (asserting reset to the master PMM) and then to state C2 1303.M as in "Boot Flow" 1312. However, the state machine remains in state C2 1303.M when processing the PMM Hold Reset command (leaving reset asserted), instead of continuing as when processing a PMM Boot command. As in all of the BMC Operational State Machine transitions, an event is generated upon arrival in state C2 1303.M and delivered to the CM.

In response (indicated conceptually by dashed-arrow 1310) the CM sends a PMM Hold Reset command to the BMC on the slave PMM (PMM 150A). The slave BMC Operational State Machine then transitions from state P 1301.S to state C1 1302.S (asserting reset to the slave PMM) and then to state C2 1303.S, where it remains, awaiting further CM commands. An event is generated and delivered to the CM indicating the slave BMC is now in the "C2" state. In response the CM provides a PMM Release Reset command to the slave BMC. The slave BMC then releases reset to the slave PMM and transitions to state S1/D 1304.S, whereupon another event is delivered to the CM indicating arrival in the "S1/D" state.

In response (indicated conceptually by dashed-arrow 1311) the CM sends a Release Reset command to the master BMC. The master BMC then transitions to state S1/D 1304.M and releases reset to the master PMM. When BIOS boot is complete and the resultant heartbeat is detected, the master BMC Operational State Machine transitions to state S2 1305.M and reports the new state to the CM. Booting of the dual PMM configuration is now complete, with both PMMs out of reset and the master PMM having booted BIOS.

In some embodiments the slave boot begins only after the master is configured a second time or configured in a more customized manner (such as in the C2 state). In some embodiments the slave boot proceeds as soon as the master is powered on and optionally minimally configured (such as in the C1 state).

According to embodiment, CM communication with BMCs is via any combination of transports and protocols. The transports include Ethernet (coupling 452 of FIG. 4A, for example, as described elsewhere herein), an Intelligent Chassis Management Bus (ICMB), an Intelligent Platform Management Bus (IPMB), RS-485, RS-232, PCI mailboxes, in-band or out-of-band signaling over the SFM, and any other similar mechanisms. The protocols include TCP/IP and any similar protocols. The communications include events from BMCs to the CM, and commands from the CM to the BMCs.

Some embodiments provide for larger than 8-way SMPs, and in a first group of implementations, BMC coordination is via explicit CM control, as illustrated in FIG. 13B. In a second group of implementations, BMC SW instances communicate and cooperate with each other in a peer-to-peer mode, independent of explicit CM control coordination and sequencing.

Selected BMC Event Details

BMC events are generated when a change in specific characteristics of an ES system or a pluggable module included therein occurs, and are also generated in response to most BMC commands (even those effecting no change in characteristics). The CM is the primary consumer of the generated events. At boot up of each pluggable module (such as a SIM, PMM, NM, FCM, and OLB), the CM establishes a separate TCP connection for each respective BMC, for communication of the events as TCP messages. Each of the TCP messages may include a returned data structure providing specific details regarding the event, such as detailed status or log information, according to embodiment. The data structure typically includes fields identifying the pluggable module type sourcing the event, and the event classification or number. SIMs, PMMs, NMs, and OLBs, may be identified as pluggable module types 1, 2, 3, and 4, respectively, with unknown modules identified as module type 0, according to embodiment. In some embodiments, a dedicated packet format is used to convey event information. In some embodiments, BMC events are conveyed as SNMP traps.

Pluggable modules including VIOCs (for example SIMs, PMMs, FCMs, and OLBs) communicate events specific to VIOC operation, such as VIOC Initialization Complete/Fail, and VIOC Reset Request. The VIOC Initialization Complete event is sent when the BMC has successfully initialized the VIOC after module reset has been released, and the VIOC Initialization Fail event is sent if the VIOC initialization fails. In some embodiments, the VIOC Initialization Complete and Fail events are implemented as a single event with a field in the associated return data structure specifying success or failure. The VIOC Reset Request event is sent by the BMC in response to receipt of a corresponding VIOC reset request from a VIOC Driver executing on the module. The CM determines if and when permission for the request is to be given, and if so sends a corresponding Module Reset VIOC command to the BMC, providing a mechanism for the VIOC Driver to reset an associated VIOC under control of the CM.

Other BMC events include Module Operational Status Up/Down, Release Reset Failure, and Sensor Threshold Breached. The Module Operational Status Up/Down event is sent when the BMC successfully establishes a heartbeat with SW executing on the module. The associated return data structure specifies that the module is operational (Up). Subsequently, if the heartbeat is not received within a predetermined time interval, then the BMC sends the event with the data structure indicating the module is not operational (Down). In some embodiments, separate events are used for Module Operational Status Up and Module Operational Status Down. The SW executing on the module and providing the heartbeat may be any combination of OS SW, Driver SW, and BIOS SW, varying according to module type and embodiment.

In some embodiments, the Module Operational Status Up/Down event is sent when the BMC Operational State Machine transitions to state S2 1305 (FIG. 13A), with the return data structure indicating the module is operational. In some embodiments, a general BMC State Change event may be used to communicate transitions of the BMC Operational State Machine, including transitions such as the transition to state S2 1305, as well as other transitions of the state machine.

The Release Reset Failure event is sent when the BMC detects that a module fails to respond to a request to release reset, typically delivered to the module by the BMC in response to a corresponding command from the CM. The Sensor Threshold Breached event is sent when any sensors included in the BMC sub-system report a value that crosses any predefined thresholds (for example an over-temperature or over-voltage detection). The event data structure may optionally include the sensor value at the time the event is detected, according to sensor type and embodiment.

PMM specific events generally relate to a BCT, that is typically a superset of a Partition Configuration Table (PCT), used to specify the configuration of a PMM, particularly with respect to the number of CPUs in a partition (such as 2-way, 4-way, or 8-way). PMM specific events include a BCT Valid event that is sent in response to a BMC command that communicates a BCT. The BMC checks the communicated BCT to determine that it is valid for the module (such as determining that a requested partitioning is possible for the module), and if so, then configures the module according to the information in the BCT. If the configuration is successful, then the BCT sends a BCT Valid event indicating that the BCT was valid for the module, and the module was successfully configured as specified by the BCT.

SIM specific events include Power Up/Down and Fan Up/Down events. The Power Up/Down event is sent when there is a change in the operational status of a power module in the system. The event data structure specifies if the module has become operational (Up) or has become non-operational (Down). Similarly, the Fan Up/Down event is sent to notify the CM of a change in a fan module operational state. In some embodiments, separate events are used for Power Up, Power Down, Fan Up, and Fan Down events.

Selected BMC Command Details

BMC commands are generally sent by the CM to determine information or status regarding pluggable modules, or to effect a change in configuration or status of pluggable modules. BMC commands may be directed to BMCs on any type of pluggable module (such as a SIM, PMM, NM, FCM, and OLB), via the separate TCP connections for each module established at module boot. In some embodiments the TCP connections are also used to communicate BMC events.

Some commands are specific to one module type (such as a PMM), and other commands may be applicable to more than one module type (such as any module including a VIOC, or any module having a configurable power supply). Typically commands directed toward a SIM are directed to a Redundant SIM by a Primary SIM, since the CM typically executes at least in part using computing resources included in a Primary SIM (such as Primary SCM 140A of FIG. 2).

Each BMC command generally includes a command parameter data structure defining specific details or values associated with the command. The data structure typically includes fields identifying the pluggable module type receiving the command, and the command identifier (or number). SIMs, PMMs, NMs, and OLBs, may be identified as pluggable module types 1, 2, 3, and 4, respectively, with unknown modules identified as module type 0, according to embodiment. In some embodiments, a dedicated packet format is used to convey command information. In some embodiments, processing of a BMC command may include generating a response event (directed to the CM, for example) acknowledging receipt of the command and describing the outcome of the command in the form of a return code.

BMC commands specific to BMCs on PMMs include Module BCT. The Module BCT command (identifier 0x000F) is used to instruct the BMC to configure the associated PMM (or a previously partitioned portion of it) according to a BCT (provided as a command parameter data structure), and is typically issued in the context of provisioning a server. The BMC parses the provided BCT to determine if the configuration is valid for the PMM in which the BMC is included. If the configuration is valid, then the BMC configures components on the PMM according to the configuration.

The parameters include structures for general, server, VNIC, boot, partition, console, and OS information. The general parameter structure includes a table version number (such as 0), and an action identifier describing an action to take based on the configuration information (such as provision identified by the value 1, and release or reclaim provision identified by the value 2). The general parameter structure further includes a count of the number of BMCs involved in applying the configuration (one BMC for a 2-way or a 4-way configuration, and two BMCs for an 8-way configuration). The general parameters further include an IP address identifying a master BMC associated with the configuration, and a list of IP addresses for all of the BMCs involved in the configuration.

The server structure includes a server type identifier (having values such as 1 for 2-way, 2 for 4-way, and 3 for 8-way), and a slot number and valid bit to associate with the provisioned server (having values such as 0 and 1). The server structure further includes a system number and valid bit to associate with the provisioned server (having values such as 0 and 1), and a boot method identifier (such as 1 for network booting and 2 for local FC booting). The server structure further includes a count of VNICs for the server (from 1 to 64, for example), a VNIC structure for each of the VNICs, and a list and count of FC boot paths. Each VNIC structure includes a VNIC identifier that is unique throughout the server (such as a 32-bit integer), a bandwidth specification, and a MAC address for the VNIC. Each FC boot path includes a port identifier of an associated FC port, a world wide name of a FC destination, and a logical unit number for the FC destination.

The partition structure includes a boot policy identifier (such as 1 for 'Wait-for-SIM', 2 for 'autoBoot', 3 for 'one-Shot' and 4 for 'Debug'), and a sticky bit to indicate if the configuration remains over reboots (such as 0 for not sticky and 1 for sticky). The console structure includes information describing a baud rate, a number of data bits, a parity type, a number of stop bits, and a console type (such as 1 for VT-100). The OS structure includes an OS identifier (such as 1 for Linux and 2 for Windows).

Processing performed in response to the Module BCT command analyzes the BCT and configures PMM HW accordingly. For example, when the action is to provision a server (action identifier equal to 1), the server type identifier is decoded to determine how to configure the HT links on the PMM. More specifically, if the server type is 2-way (type identifier equal to 1), then in the context of PMM 150A (FIG. 4B), HT couplings 460.5L and 460.5R are configured for coherent operation by BMC 402.5, and HT couplings 460.5X and 460.5Y are configured for isolated operation. If the server type is 4-way (type identifier equal to 2), then HT couplings 460.5L, 460.5R, 460.5L', 460.5R', 460.5X, and 460.5Y are configured for coherent operation. The MAC address in each VNIC structure is stored into corresponding configuration state in one or more VIOCs, such as setting MAC Address 603.1 (FIG. 6A), by writing corresponding configuration state implemented in VIOC Configuration block 706 (FIG. 7A).

The response event generated upon completion of the Module BCT command includes a return code selected from the set including Valid BCT Configuration Successful (encoded as 0x0000), Invalid Slot Information (0x0100), Valid BCT Configuration Failure (0x0200), and Invalid BCT (0x0300). Valid BCT Configuration Successful is returned when the BMC has determined that the provided BCT is valid for the associated module, and the specified configuration has been successfully applied to the module (or portion thereof). Valid BCT Configuration Failure is returned when the BCT is valid but the configuration has not been successfully applied. Invalid Slot Information is returned when the slot information in the BCT is not valid for the module. Invalid BCT is returned when the BMC determines that the BCT is not valid for the module (no attempt is made to configure the module).

BMC commands specific to BMCs on pluggable modules including VIOCs (such as SIMs, PMMs, FCMs, and OLBs) include Module Reset VIOC. The Module Reset VIOC command (identifier 0x000E) causes the BMC to reset a selected VIOC on the module (without resetting any other elements) and is typically issued in response to a request by a VIOC Driver to reset a VIOC. The parameters include a slot number, and a VIOC number to select which VIOC on the module to reset (such as 0 or 1). The return codes include VIOC Reset Successful (0x0000), Invalid Slot Information (0x0100), Invalid VIOC Number (0x0200), and VIOC Reset Failure (0x0300).

BMC commands specific to BMCs on pluggable modules having system or application processing elements include Module Reset Partition, Module Hold Reset, Module Release Reset, Module Boot, Module Firmware Update, and Module Firmware Update Status. Such modules include PMMs (having CPUs), NMs (having PCEs and TMs), FCMs (having IOPs), and OLBs (having CPUs).

The Module Reset Partition command (identifier 0x0006) causes the BMC to assert and then release reset for an entire module or a partition of a module (such as a partition of a PMM). If the module has been previously configured into partitions (by a Module BCT command, for example), then the command operates on a specified partition of the module. If the module is a partitionable module (such as a PMM) and there has been no previous partitioning of the module, then the entire module is reset and an error is returned.

The parameters include a slot number and a partition identifier. The associated return codes include Reset Partition Successful (0x0000), Invalid Slot Information (0x0100), Invalid Partition (0x0200), and Reset Partition Failure (0x0300). Reset Partition Successful is returned when the partition identifier is valid and reset has been successfully applied and released. Invalid Slot Information is returned when the slot information is not valid for the module (for example when the module is inserted in a different slot than the command was intended for, or an incorrect BMC received the command). Invalid Partition is returned when the partition identifier is incorrect for module. In some embodiments, Invalid Partition is returned when the module has not been previously partitioned (although the entire module is also reset).

The Module Hold Reset command (identifier 0x0005) causes the BMC to begin asserting reset to system and application processing elements on the module, a selected partition of the module, or a CPU sub-system on the module, and to continue asserting reset until a command to release reset is received. If the module has not been previously partitioned (or is not partitionable), then the entire module (or CPU sub-system) is reset and continues to be reset. The parameters include a slot number and a partition identifier. The return codes include Hold Reset Successful (encoding 0x0000) for indicating the partition identifier is valid (or ignored) and reset has been successfully applied, Invalid Slot Information (0x0100),), Invalid Partition (0x0200), and Hold Reset Failure (0x0300).

The Module Release Reset command (identifier 0x0004) causes the BMC to stop asserting reset to system and application processing elements on the module, a selected partition of the module, or a CPU sub-system on the module. Typically the Module Release Reset command enables the module (or the selected partition or CPU sub-system) to boot. It may be used, for example, when directed to a PMM as in "Release Reset Flow" 1314S (FIG. 13B). The parameters include a slot number and a partition identifier. The return codes include Release Reset Successful (encoding 0x0000), Invalid Slot Information (0x0100), and Release Reset Failure (0x0200).

The Module Boot command instructs the BMC to power up, reset, and release reset to system and application processing elements on the module, a selected partition of the module, or a CPU sub-system on the module. The Module Boot command typically enables the module (or the selected partition or CPU sub-system) to proceed from being not powered to a fully booted state without additional BMC commands. The parameters include a slot number and a partition identifier. The return codes include Boot Successful (encoding 0x0000), Invalid Slot Information (0x0100), and Boot Failure (0x0200). In some embodiments, intermediate events return information as the module proceeds through various stages of executing the Module Boot command.

The Module Firmware Update command (identifier 0xFFFE) instructs the BMC to download and program firmware into non-volatile memory (such as flash memory) on the module. Downloading typically uses the Trivial File Transfer Protocol (TFTP). The parameters include an IP address (in binary format) and a number and list of file names. The return codes include Firmware Update Successful (encoding 0x0000), indicating all of the requested files have been downloaded and stored into the non-volatile memory, and Firmware Update Failure (0x0100), indicating otherwise.

The Module Firmware Update Status command (identifier 0xFFFF) instructs the BMC to provide information concerning the most recent Module Firmware Update command. In some embodiments, there are no parameters. Multiple return codes are provided in response, including an overall status indicator, a stage indicator, and a completion/an error indicator. The overall status indicator states include Success (encoding 0x0000) and Failure (0x0100). The stage indicator states include Update Complete (0), Update Downloading (1), and Updating Flash (2). The completion/error indicator states include percent completion from 0% to 100% (encodings 0x00 to 0x64), Update Successful (0x70), No TFTP Server (0x71), File Not Found (0x72), Checksum Invalid (0x73), Bad Sector Number (0x74), TFTP Connection Closed (0x75), and Canceled (0x76).

Other BMC commands include Module Get VPD, Module SIM Fabric Port, Module Power Up, Module Power Down, Module Get Sensors, Module Get Sensor Information, Module Get Operational Status, and Module Force Fault. The Module Get VPD command (identifier 0x0002) causes the BMC to collect and report information describing the capabilities of the module. The parameters include a slot number. The return information includes several fields and structures, including a status code, a table identifier, a count of table entries, a variable number of table entries, an end marker tag, and a checksum. The status codes include VPD Retrieval Successful (0x0000) and VPD Retrieval Failure (0x0100). The table identifier is an 8-bit field in some embodiments. The count of table entries specifies the number of individual VPD table entries that follow the count. The end marker tag (encoded as 0x79) marks the end of the VPD table. The checksum is used to verify integrity of the response data, and is an 8-bit field in some embodiments.

In some embodiments, VPD entries are compatible with those described by the Conventional PCI v2.2 Specification, available from http://www.pcisig.com, and hereby incorporated by reference herein for all purposes. Each VPD table entry includes an entry beginning marker tag (0x90) followed by a count of fields in the entry and a variable number of fields as indicated by the count. Each field in turn includes a field name (a 3-character string in some embodiments), a field length, and a field value string having a length as indicated by the field length. The general format of the VPD table enables essentially unlimited information to be provided by the BMC to the CM, as the format is not restrictive.

The VPD returned may vary according to module and embodiment. In some embodiments, and for some modules, VPD may include descriptions of number and capabilities of system and application processing elements present on or associated with the module. Examples include number and frequency of CPUs included on PMMs, PCEs and TMs included on NMs and included on daughter cards coupled to NMs, IOPs included on FCMs, CPUs included on OLBs, and CPUs and Accelerators included on daughter cards coupled to OLBs. VPD may include memory size and organization on the module. VPD may include MAC address information associated with the module, such as a MAC address associated with a VIOC on the module.

VPD returned for SIMs may indicate the presence and capabilities of Mass Storage 412A (FIG. 4A), and information concerning Primary Switch Fabric Module 180A. VPD returned for PMMs may indicate the presence and capabilities of FCI 413.5 and FCI 413.5' (FIG. 4B). VPD returned for NMs may describe Interface 420 and IOP 421 (FIG. 4C), including bandwidth capacity and physical interface type. VPD returned for FCMs may describe operational parameters associated with FCPs, such as FCP 423.4 (FIG. 4D). VPD returned for OLB modules may describe the presence and capabilities of optional daughter cards or modules, such as PCI sub-module 425 and HT sub-module 424 (FIG. 4E), including descriptions of specific services or protocols accelerated by the daughter elements. The aforementioned module-specific VPD information may vary in specific details and may be provided in various combinations, according to embodiment.

The Module SIM Fabric Port command (identifier 0x000D) informs the BMC of the physical fabric port number of the Primary SIM (having an included Primary SCM), such as the fabric port associated with Primary SCM-Fabric coupling 149A (FIG. 2) as coupled to Primary Switch Fabric Module 180A. The parameters include a slot number and a fabric port number. The fabric port number corresponds to the fabric port number of the primary (or master) SIM of the chassis (such as 4 or 5). The return codes include SIM Fabric Port Success (0x0000) and SIM Fabric Port Failure (0x0100). In some embodiments, SIM Fabric Port Failure is returned when the BMC fails to register the SIM fabric port.

The Module Power Up and Module Power Down commands (identifiers 0x0003 and 0x007, respectively) instruct the BMC to apply and remove, respectively, operating power for the remainder of the module. The Module Power Up command leaves reset to system and application processing elements of the module asserted. The Module Power Down command optionally fails unless the module (such as a PMM) has no booted, active, or running partitions, or has no active heartbeat established, according to embodiment. The parameters include a slot number. The return codes include Success (0x0000), Invalid Slot Information (0x0100), and Failure (0x0200).

The Module Get Sensors command (identifier 0x000A) causes the BMC to return information regarding sensors available on the module, such as the number and types of sensors. The parameters include a slot number. The return information includes a status code, a count of sensors available, and a variable number of sensor identifiers. The status codes include Success (0x0000), Invalid Slot Information (0x0100), and Failure (0x0200). The count of sensors specifies the number of sensors available on the module and individually identified by the information following the count. Each of the sensor identifiers is a 32-bit integer in some embodiments.

The Module Get Sensor Information command (identifier 0x000B) causes the BMC to return information about a selected sensor or list of sensors, as specified by the command. The parameters include a slot number, a count of sensors requested, and a variable number of sensor identifiers. The count of sensors requested specifies the number of sensors for which information is requested and individually identified by the information following the count. Each of the sensor identifiers is a 32-bit integer in some embodiments. The return information includes a status code, and a sensor information structure for the sensors selected by the sensor identifiers. The status codes include Success (0x0000), Invalid Slot Information (0x0100), and Failure (0x0200). In some embodiments, sensor information structures are compatible with IPMI v1.5, available from ftp://download.intel.com/design/servers/ipmi/IPMIv1_5rev1_1.pdf, and hereby incorporated by reference herein for all purposes. Each of the sensor information structures includes a sensor identifier (32-bits, for example), a length specification (16-bits, for example) equal to the length of the following name, value, and type fields (including nulls), a name string, a value string (representing the current value of the sensor), and a data type field for the value string.

The Module Get Operational Status command (identifier 0x000C) instructs the BMC to return the operational status of a module or a selected partition of a previously partitioned module (such as a PMM). Typically the operational status is determined by the presence of a heartbeat between the BMC and an OS (or BIOS) executing on the module or the selected partition. The parameters include a slot number and a partition identifier. The return information includes a status code and an operational code. The status codes include Get Operational Status Successful (0x0000), Invalid Slot Information (0x0100), Invalid Partition (0x0200), and Get Operational Status Failure (0x0300). The operational codes include Down/Non-operational (0x0000) and Up/Operational (0x0100).

In some embodiments, The Module Force Fault command instructs the BMC to force the BMC Operational State Machine associated with the module (or a selected partition of a module) to transition to state F 1306 (FIG. 13A), and may be used when the CM detects operational errors requiring the module to be failed. The parameters may include a slot number and a partition identifier, according to embodiment.

Other BMC commands are IPMI-compliant, and relate to collecting and managing information in a System Event Log (SEL) maintained by a BMC, and include Module Get SEL and Module Clear SEL. The Module Get SEL command causes the BMC to provide selected log entries from the associated SEL. The parameters include a slot number, an offset, and a maximum count. The offset specifies a starting point in the SEL from which the BMC is to return data, to prevent resending older data. The maximum count specifies the maximum number of entries to provide in the return information.

The return information includes several fields and structures, including a status code, a count of returned log entries, and a variable number of log entries. The status codes include Get SEL Successful (0x0000), Invalid Slot Information (0x0100), Invalid Offset (0x0200), and Get SEL Failure (0x0300). The count of log entries specifies the number of individual log entries that follow the count. Each returned log entry, in some embodiments, includes a 16-byte field encoded according to an IPMI standard (such as is described on page 308 of IPMI specification Rev 1.1, incorporated herein by reference for all purposes).

The Module Clear SEL command (identifier 0x0009) causes the BMC to clear all or selected log entries from the associated SEL, according to embodiment. The parameters include a slot number. The return codes include Clear SEL Successful (0x0000), Invalid Offset (0x0200), and Clear SEL Failure (0x0300).

In some embodiments, the aforementioned command identifiers vary according to target module. For example, a prefix may be inserted identifying the module type (such as 0x0001 for SIMs, 0x0002 for PMMs, and 0x0003 for NMs, according to embodiment). In some embodiments, the aforementioned return codes are 16-bit values, and the status codes are 8-bit values. In some embodiments, the slot number is 0 or 1 for PMMs, 2 or 3 for SIMs, 4, 5, or 6 for NMs, and other values for other modules. In some embodiments, the partition identifier is 0 or 1 to select a first or a second partition of a PMM that is partitioned as a 2-way element. In some embodiments, the partition identifier is optional, and is provided only for a command directed to a PMM. In some embodiments (or contexts, such as a PMM), the partition identifier is ignored unless the module has been partitioned as a 2-way element.

Those of ordinary skill in the art will recognize that specifics related to BMC event and command communication, such as specific encodings, field sizes, and organization of structures, may vary according to embodiment.

Chassis Manager Operation

This section provides additional information on selected aspects of some embodiments of the CM. Typically the CM provides a single source of chassis information to all other processes in the system. It provides other processes with information such as presence of modules, properties of the modules and status of the modules. It also provides information about failure of modules and changes in module configurations. To provide such detailed information about each of the modules, the CM peers with the BMC on each of the modules in a chassis and obtains vital data to maintain a persistent database.

The CM may be considered to provide a window into an ES system embodiment and an interface to users and operators to view and modify various system level behaviors. Typically there is a plurality of slots (10, for example) in an ES system chassis embodiment. In some embodiments, each slot in the chassis is enabled to accommodate only one type of pluggable module. In these embodiments, the slot assignments and the module types in the chassis are predefined.

At startup (or ES system boot) the CM performs various initialization steps, including resetting values of global variables, initializing an event library, and initializing the BMC interface of the SCM the CM is executing on. Typical SCM embodiments include a Mastership Module (MM), and the CM initializes an interface of the MM. The CM then issues a Process Initialized Event.

The initialization of the various interfaces triggers an associated set of activities in the CM. The CM performs the initialization functions and then enters a loop for listening to events occurring in the system, such as those reported by the Module BMC SW.

The MM is typically implemented in all or a portion of an FPGA, according to embodiment, and provides various functions, also according to embodiment. The functions may include an application level heartbeat, and an identification of the slot that the SCM the CM is executing on is inserted. Other functions may include presence information of various modules inserted in the chassis, notification of pluggable module insertion (such as that associated with "Detect Module Insertion and Generate Presence Interrupt" 1201.2 of FIG. 12A), and notification of pluggable module removal. Further functions may include various indications of whether or not inserted modules are capable of powering up and powering down. Further functions may enable failover from a Primary SCM to a Redundant SCM (such as the Primary and Redundant SCMs 140 of FIG. 1A), either manually via a user or operator request, or automatically as a result of a system failure.

In some embodiments, the MM includes a Mastership state machine. In operation, the CM indicates it has booted, and in response the state machine transitions from a Waiting state to a Booted state. In the Booted state, the state machine determines whether the SCM the CM is executing on is a Primary SCM or a Secondary SCM, and transitions to a Primary or Redundant state accordingly.

In the Booted state, the SCM is determined to be the Primary SCM if there is currently no Primary SCM, and otherwise it is the Redundant SCM. If the determination of Primary versus Secondary roles is not possible, then an error is recognized and the state machine transitions to an Error state. If there is a failover (either manually or automatically) then a transition is made from the Redundant to the Primary state, and the SCM becomes a new Primary SCM and the CM changes roles from Redundant to Primary accordingly.

During initialization the CM also sets a watchdog time interval in the MM, corresponding to a heartbeat for SW executing on the SCM. The CM sets a watchdog bit at regular intervals (shorter than the watchdog time interval). If the CM is unable to set the watchdog bit within the timeout of the watchdog interval, then the MM assumes that the SW executing on the SCM is locked up and the SCM becomes unavailable. If the SCM is the Primary SCM, then an automatic failover occurs, and the Redundant SCM becomes a new Primary SCM. If the SCM was the Redundant SCM, then the SCM is no longer available for failover, and there is no longer a Redundant SCM.

When an SCM becomes a Primary SCM, the CM reads the identification of the SCM slot from the MM and stores it in an internal variable. The CM then obtains the presence information from the MM (such as by reading selected MM registers, in some embodiments) and determines the modules that are present in the chassis. The CM then populates a database of modules (such as Primary CIM Instance Repository 917.P of FIG. 9C) and attempts to set up communication channels with BMCs on each of the modules that were indicated as being present.

When a module is added or removed from the chassis, the MM detects this change and notifies the CM via an event. The CM receives the event, determines the affected slot, and carries out any necessary actions as determined by the specific module involved. There is also a notification when the SCM has changed from Secondary to Primary (such as during failover processing).

In some embodiments, the CM maintains a map of the slots in the chassis. In some embodiments, the slots are restricted to selected modules (for example, PMMs may only be inserted in slots 0 or 1, SIMs in slots 2 or 3, NMs in slots 4, 5, or 6, and so forth according to embodiment). In some embodiments, the map includes information concerning the type of module that may be inserted in each slot according to the restrictions. The module type information may vary according to any combination of product type, chassis type, or other similar customization information, according to various embodiments.

The CM attempts to establish a TCP connection for each module in the chassis by issuing a connect request to the BMC on each respective module. In some embodiments, the request issuing is non-blocking and arrives asynchronously. As each connection is established, the CM typically requests VPD for the corresponding module (using a Module Get VPD command, for example). Returned information arrives via a corresponding BMC event, and is processed and stored in the module database. The information is used, for example, to determine a module type and various properties associated with each respective module.

Once the VPD information has been collected and processed into the database, the CM issues module presence events to any other processes that may be listening for the module presence events. In some embodiments, the presence is published (i.e. module presence events generated) only if the VPD information is obtained. If there is a failure in retrieving the VPD data, then the module is considered of an unknown or unrecognized type.

The CM then collects other information such as module properties, sensor properties and anything else that may be necessary for CM and related functions. The CM may also poll the SEL maintained by the BMC to determine if there were any new system events logged. System events in the SEL may also be dumped into a system log file along with appropriate information to identify sources of the dumped system events.

When a module is prepared to boot, the CM may initiate booting by issuing a command (such as a Module Boot or a Module BCT command) to the BMC of the module. The CM also initiates module resets, reloads, and other related operations by issuing corresponding BMC commands. The various commands from the CM to the BMCs may be results of manual user input or automatic provisioning or configuration processing.

The CM stores module information (such as presence, sensor values, and so forth) in the database. Thresholds and policies relating to these values may also be stored in the database, and in some embodiments are implemented as queries having corresponding actions.

In some embodiments, booting of some pluggable modules that include system or application processing elements (such as PMMs, NMs, FCMs, and OLBs) includes providing one or more data images to the booting module. In some embodiments, after the CM has received VPD from the module, the CM updates a Dynamic Host Configuration Protocol (DHCP) configuration file and creates or updates a Pre-boot eXecution Environment (PXE) configuration file for the module. The CM then restarts a DHCP daemon and issues a BMC command to boot the module. The module subsequently issues a DHCP request, and the DHCP daemon responds with IP address and PXE configuration information, according to the updates the CM has performed. The module then requests a kernel image and RAM disk image via TFTP, the images are transferred, and the module boots using the images.

Since the DHCP configuration file is accessed during module boot, and modules may be dynamically configured in or added to live systems and then booted, the CM must dynamically alter the DHCP and PXE information as module configuration changes, or as modules are inserted into the chassis. Additionally, in these embodiments, the DHCP configuration file may also include entries corresponding to each of the bootable modules. In some embodiments, the VPD includes a MAC address, and the CM may determine some portion of DHCP and PXE configuration information based in part on the MAC address. In some embodiments, the configuration information may also be based in part on processing of an SCF when performing an install server command (such as "Installing" 1103 of FIG. 11).

In some embodiments, the CM stores portions of configuration data and portions of runtime information, including portions of the database, in the form of CIM instances, providing a standard interface for querying the information and other operational parameters. In some embodiments, Chassis Manager 533 may issue events to Repository Manager 535 to create CIM instances corresponding to modules inserted in the chassis, for example when VPD is returned and processed. Additional CIM instances may be created to represent components of inserted modules. In some embodiments, creation and maintenance of the CIM instances (or instances of classes) may be performed in a library form in a platform process (such as a process associated with Platform Manager 531).

In some embodiments, commands or requests originating from CLI and GUI operations trigger the CM to carry out operations necessary to perform the requested command. The operations may include accessing the database to view CIM instances (corresponding to modules or components in the chassis), and delivering BMC commands as needed. The operations may further include updating CIM instances as module state changes, as indicated by received BMC events. Some of the BMC events may be generated due to processing the BMC commands, and may indicate success or failure of a command. This enables a user to determine success or failure of a request by requesting a display of appropriate module status information.

In some embodiments, asynchronous requests are posted to the CM without blocking, and a requestor determines success or failure by specifically requesting status from the CM. In some embodiments, synchronous requests are posted to the CM with blocking, and wait for status returned from the CM before completion.

In some embodiments, one or more processes associated with any combination of Enterprise Manager 530 and Platform Manager 531 may require portions of module sensor information (and portions of other monitoring information) to be visible via CIM instances. In some embodiments, the CM acts as the instance provider for some or all of the sensor and monitoring instances, creating the instances as corresponding information is received (perhaps in response to commands) from the modules. In some embodiments, all non-configuration type CIM instances are managed in the CM context (the CM performs as the associated instance provider) and all configuration type CIM instances are managed by Platform Manager 531.

The embodiments described in the Chassis Manager Operation section are illustrative only, as those of ordinary skill in the art will recognize that selected CM functions may be performed elsewhere while still under the direct control of the CM. Additionally, some of the functions may be modified, added, or deleted, according to embodiment.

Rapid IP/MAC Address Takeover

Layer-3 and above networking protocols typically identify and name sources, destinations, and resources using one or more IP addresses, and the IP addresses are mapped to associated MAC addresses while performing various switching and routing functions. A pluggable module of an ES system embodiment is typically associated with (or assigned) one or more IP addresses, such as Public IP Address 604.1 (FIG. 6A), and one or more MAC addresses, such as MAC Address 603.1. IP and MAC addresses are typically assigned or configured when a server is provisioned (see the Server Operational States section, elsewhere herein). For modules having VIOCs implementing one or more VNICs, appropriate values are written into each of the respective public IP and MAC address registers corresponding to the assignments.

Layer-3 forwarding information (including correspondence between selected IP addresses and respective MAC addresses) is maintained by system management, control-plane, and load balancing processes (also referred to collectively as "SCM processes" since they are executed by an SCM that is part of a SIM). In some embodiments, the SCM processes provide portions of the layer-3 forwarding information to pluggable modules, typically as L3 FIB updates. For example, in some embodiments NMs include search engines accessing IP to MAC forwarding information that is managed by the SCM processes, and in some embodiments VIOCs access forwarding information (stored in coupled TCAM/SRAMs) that is also managed by the SCM processes.

Layer-2 networking protocols typically communicate source and destination information using MAC addresses, and pluggable modules in an ES system embodiment typically map each pluggable module MAC address to a corresponding fabric port address. The correspondence between module MAC addresses and fabric port addresses is maintained by the SCM processes, according to embodiment, and may be modified when a server is provisioned. The MAC address to fabric port address mapping (or forwarding) information is typically provided to pluggable modules, typically as L2 FIB updates. For example, in some embodiments the NM search engines access and manage a cache of MAC to fabric port forwarding information that is provided by the SCM processes. In some embodiments, VIOCs access and manage a cache of similar forwarding information (such as MACFIB information as discussed in the TCAM/SRAM Lookup State section, elsewhere herein) that is also managed by the SCM processes.

In some embodiments, server provisioning and management functions enable detection of a failed module, identification of a standby module (already available in the system), and automatic failover replacement of the failed module by the standby module. According to various embodiments, any combination of the IP address and the MAC address assigned to the failed module are re-assigned to the standby module. Consider an illustrative scenario such that before the failure, the module that is going to fail is associated with a first IP address and a first MAC address, and such that the standby module is associated with a second IP address and a second MAC address. Also consider that there may be an optional mapping between a service provided by the module that is going to fail and a service IP address, such that before the failure the service IP address is equal to the first IP address.

In a first group of takeover embodiments, where only the IP address is re-assigned, the standby module is associated with the first IP address (replacing or "taking over" the first IP address) as part of performing the module failover. The standby module remains associated with the second MAC address, and thus the first IP address should no longer be resolved to the first MAC address, but to the second MAC address. In some implementations, an Address Resolution Protocol (ARP) compatible address discovery mechanism is used to discover the new mapping when the remapped IP address is referenced. The new mapping is then propagated to the layer-3 forwarding information tables (such as those accessed by the NM search engine and the VIOCs, according to embodiment). In other implementations, the SCM processes intercede during the ARP-compatible processing, recognizing a "local" IP address and providing a corresponding local MAC address without overheads typically associated with ARP-compatible processing. Local IP addresses include IP addresses allocated to pluggable modules (such as SIMs, PMMs, NMs, FCMs, and OLBs) within an ES system or within an ES chassis. In still other implementations, the SCM processes actively update the new mapping in the layer-3 forwarding information tables upon the replacement event, irrespective of if or when the remapped IP address is referenced. Since the MAC addresses are unchanged in the first group of embodiments, the layer-2 forwarding information (such as mappings to fabric port addresses) is also unchanged. If there is a mapping between the service and an associated service address, then since the standby module has been assigned the first IP address, no change in the service address is made.

In a second group of embodiments, where only the MAC address is reassigned, the standby module is associated with the first MAC address (taking over the first MAC address) as part of performing module failover. The second group of embodiments is typically used in conjunction with local service IP addresses (i.e. the service address is not visible external to the ES system), or in conjunction with a proxy, or in circumstances where changes to the service address are inconsequential. The standby module remains associated with the second IP address, and thus the mapping between the first IP address and the first MAC address is no longer valid, and a new mapping between the second IP address and the first MAC address is created. As in the first group of embodiments, some implementations use the ARP-compatible mechanism and some implementations use the active update of the new mapping. Since the MAC address is changed, the layer-2 forwarding information is also changed accordingly, and the SCM processes actively propagate new MAC to fabric port address mapping information to the pluggable modules. If there is a mapping between the service and an associated service address, then since the standby module is assigned the second IP address, the service address is changed to the second IP address. Some implementations perform passive discovery of this new mapping via the ARP-compatible mechanism and some implementations use the active updating of the new mapping.

In a third group of embodiments, where both the IP and the MAC addresses are re-assigned, the standby module is associated with the first IP address and the first MAC address as part of performing module failover. The mapping between the first IP address and the first MAC address remains valid, however the layer-2 mapping between the first MAC address and the associated fabric port is updated, and the associated layer-2 forwarding information is changed by active propagation to the pluggable modules. If there is a mapping between the service and an associated service address, then since the standby module has been assigned the first IP address, no change in the service address is made.

Figure 14:
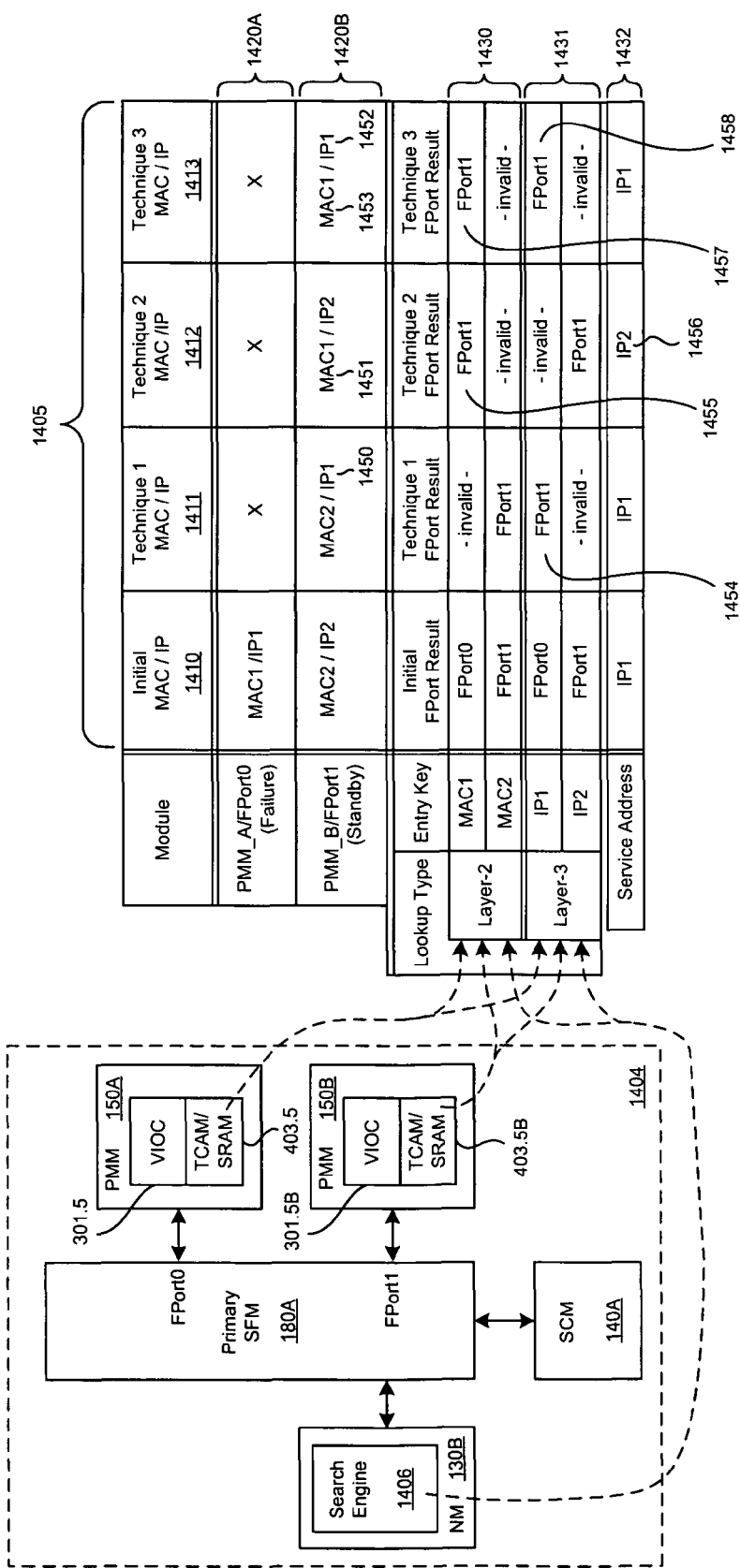
FIG. 14 illustrates a conceptual view of selected aspects of embodiments of Internet Protocol (IP) and Media Access Control (MAC) address failover data structures and associated operations.

FIG. 14 illustrates a conceptual view of selected aspects of embodiments of IP and MAC address failover data structures and associated operations, including HW elements 1404 and IP/MAC Address and Forwarding Chart 1405. Three techniques are illustrated, corresponding to one embodiment of each of the aforementioned three groups of embodiments.

For clarity, the illustrated HW elements include only selected portions of an ES system embodiment, Primary Switch Fabric Module 180A providing communication between included modules NM 130B, Primary SCM 140A, PMM 150A, and PMM 150B. The NM includes Search Engine 1406 to search state information included on the NM to perform layer-3 forwarding functions, including supplying a forwarding MAC address for a provided IP address. The SCM executes the SCM processes. PMM 150A illustrates a "failure" PMM, in other words a PMM that is initially functioning properly, but then becomes non-functional. PMM 150B illustrates a "standby" PMM, in other words a PMM that is initially unused (or spare), but is later used to replace the failed PMM. Each of the PMMs includes a VIOC (301.5 and 301.5B) and a TCAM/SRAM (403.5 and 403.5B) accessed in part for layer-2 and optionally for layer-3 forwarding functions, according to various implementations.

IP/MAC Address and Forwarding Chart 1405 illustrates address and forwarding information before PMM 150A fails, and corresponding information after PMM 150B has replaced PMM 150A, for each of the three techniques. The chart is organized in rows and columns. "Initial MAC/IP" column 1410 shows information before the failure, and "Technique 1 MAC/IP" column 1411, "Technique 2 MAC/IP" column 1412, and "Technique 3 MAC/IP" column 1413 show final information after failure processing for the three techniques.

Failure PMM Address Row 1420A and Standby PMM Address Row 1420B show IP and MAC address information stored in VIOCs 301.5 and 301.5B included in PMMs 150A and 150B respectively, for the initial and final states. More specifically, the failure and standby IP address information are stored in respective instances of Public IP Address 604.1 (FIG. 6A), corresponding to VNICs implemented in VIOCs 301.5 and 301.5B. The failure and standby MAC addresses are stored in respective instances of MAC Address 603.1.

MAC to Fabric Port Forwarding Rows 1430 shows destination MAC address to destination fabric port address forwarding information stored in TCAM/SRAMs 403.5 and 403.5B and referenced by VIOCs 301.5 and 301.5B respectively. More specifically, 1430 shows key and result pairs as described in association with FIG. 8B. For example, instances of Egress Key 801 are programmed with MAC addresses as shown in 1430 (MAC1 and MAC2), and corresponding Unicast Result 803 instances are programmed with DstFabAddr 811 as shown in 1430 (FPort0 and FPort1). Typically identical information is stored in TCAM/SRAMs 403.5 and

403.5B, such that both VIOC 301.5 and VIOC 301.5B have access to the same mappings. IP to Fabric Port Forwarding Rows 1431 show destination IP address to destination fabric port address forwarding information referenced by Search Engine 1406. Service Address Row 1432 shows an IP address associated with a service provided by PMM 150A before failing, and by PMM 150B after completion of failover processing. In some implementations the IP address to service mapping of 1432 is also referenced by Search Engine 1406.

In the subsequent discussion the terminology "address(es) stored in PMM" is shorthand for "address(es) stored in a VNIC implemented in a VIOC included in PMM". The shorthand terminology is meant to refer to storage in an instance of Public IP Address 604.1 for an IP address, and to storage in an instance of MAC Address 603.1 for a MAC address.

Initially, as illustrated by the chart ("Initial MAC/IP" column 1410), the IP address stored in PMM 150A (the PMM that is to fail) is IP1, and the MAC address stored in PMM 150A is MAC1. The corresponding initial addresses stored in PMM 150B (the standby PMM) are IP2 and MAC2. The initial MAC address to fabric port forwarding information stored in the TCAM/SRAMs of both PMM 150A and PMM 150B associates MAC address MAC1 (of PMM 150A) with fabric port 0 (FPort0, corresponding to slot 0), and MAC2 (of PMM 150B) is associated with fabric port 1 (FPort1, corresponding to slot 1). The initial IP to fabric port address forwarding information referenced by Search Engine 1406 associates IP1 to FPort0 and IP2 to FPort1. The initial mapping for the service is to IP address IP1 (that of PMM 150A).

After a failover processed according to the first technique (an IP takeover as in the first of the aforementioned groups of embodiments), the IP address stored in PMM 150B (the standby PMM that has replaced the failed PMM) is set to the value of the IP address previously stored in PMM 150A (the failed PMM). This is illustrated by PMM_B IP address 1450 (of "Technique 1 MAC/IP" column 1411) having the value IP1. The IP and MAC address information stored in the VIOC of PMM 150A (the failed PMM) is no longer relevant, as the module is no longer being used. The IP to fabric port address forwarding information has changed, since the replacement module has taken on the IP address of the failed module without also taking on the fabric port address of the failed module (i.e. the modules remain in their original slots). This is illustrated by IP to fabric port address entry 1454 having the value FPort1. The MAC address to fabric port forwarding and service IP address mapping information are not changed (see the intersection of rows 1430 and 1432, respectively, with column 1411), as the initial mappings remain applicable. Note that the MAC address to fabric port forwarding information previously associated with MAC1 is no longer valid, as the MAC1 address is no longer being used.

After a failover processed according to the second technique (a MAC takeover as in the second of the aforementioned groups of embodiments), the MAC address stored in PMM 150B (the replacement PMM) is set to the value of the MAC address previously stored in PMM 150A (the failed PMM). This is illustrated by PMM_B MAC address 1451 (of "Technique 2 MAC/IP" column 1412) having the value MAC1. As in the first technique, the IP and MAC address information stored in PMM 150A is no longer relevant, as the module is no longer being used. The MAC address to fabric port forwarding information is changed, since the replacement PMM has a new MAC address but has remained inserted in the same slot. This is illustrated by MAC address to fabric port address entry 1455 (of "Technique 2 MAC/IP" column 1412) having the value FPort1. With reference to the intersection of column 1412 with row 1430, the MAC address to fabric port forwarding information associated with MAC2 is no longer valid, and the MAC1 address is now associated with a different fabric port address. The IP to fabric port address forwarding associated with the IP address of the failed module is now invalid. The service IP address mapping has changed, since the replacement module is known by a different IP address than the failed module. This is illustrated by service IP address 1456 having the value IP2.

After a failover processed according to the third technique (both IP and MAC address takeover as in the third of the aforementioned groups of embodiments), the IP and MAC addresses stored in PMM 150B (the replacement PMM) are set to the corresponding values previously stored in PMM 150A (the failed PMM). This is illustrated by PMM_B IP address 1452 (of "Technique 3 MAC/IP" column 1413) having the value IP1, and PMM_B MAC address 1453 having the value MAC1. As in the first and second techniques, the IP and MAC address information stored in PMM 150A is no longer relevant, as the module is no longer being used. As in the second technique, the MAC address to fabric port forwarding information is changed, as illustrated by MAC to fabric port address entry 1457 having the value FPort1. With reference to the intersection of column 1413 with row 1430, the MAC address to fabric port forwarding information associated with MAC2 is no longer valid, and the MAC1 address is now associated with a different fabric port address. As in the first technique, the IP to fabric port address forwarding is changed, as illustrated by IP to fabric port address entry 1458 having the value FPort1. The service IP address mapping information associated with IP1 is not changed, as the initial mappings remain applicable.

Figure 15:
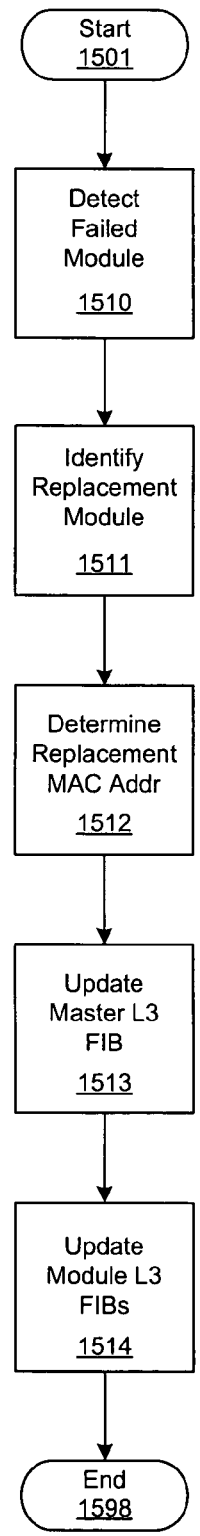
FIG. 15 illustrates a flow diagram of an embodiment of rapid IP address takeover.

FIG. 15 illustrates a flow diagram of an embodiment of rapid IP address takeover in a context of replacing a failed module with a standby module. An IP address originally associated with a first MAC address (corresponding to the failed module), is re-associated with a second MAC address (corresponding to the standby module). Although failover processing that directs the re-association is typically executed outside of the standby module, the re-association is often described as the standby module "taking over" the IP address from the failed module, and corresponds to the aforementioned first group of embodiments.

Processing begins at "Start" 1501, and then flows to "Detect Failed Module" 1510 upon determination that a module is no longer functional (such as PMM 150A as shown in FIG. 14). Flow then proceeds to "Identify Replacement Module" 1511 to determine a standby module to serve in place of the failed module (such as PMM 150B replacing PMM 150A). Processing continues at "Determine Replacement MAC Address" 1512 where the MAC address of the standby module is ascertained. This may be performed by consulting appropriate MAC address assignment or allocation tables maintained by the SCM processes, by reading state managed by the module (such as an instance of MAC Address 603.1), or by other similar mechanisms, according to embodiment. Note that this operation is distinct from determining an IP to MAC address mapping, as there is no specific IP address involved in "Determine Replacement MAC Address" 1512.

The standby module MAC address, and its correspondence to the IP address previously associated with the failed module, is made known throughout the SCM processes by updating a master Layer-3 FIB table ("Update Master L3 FIB" 1513). Flow continues to "Update Module L3 FIBs" 1514, where the correspondence between the IP address and the standby module MAC address is actively disseminated to module tables (such as forwarding information consulted by Search Engine 1406), replacing the stale correspondence to the failed module MAC address. Typically the SCM processes communicate with interface management processes that in turn provide updates to search engine look up state via the switch fabric module. This contrasts to a more passive replacement of IP to MAC correspondence information for IP addresses external to an ES system (such as Client 103 of FIG. 1A) via Address Resolution Protocol (ARP) requests. Note: as ARP responders, the SCM processes reply to subsequent ARP requests for the re-associated IP address with the standby module MAC address. Processing is then complete at "End" 1598.

The illustrated embodiment of FIG. 15 is shown determining and propagating a new IP address to MAC address association (leaving an original IP address for an associated service intact) when replacing a failing module with a standby module (corresponding to the aforementioned first group of embodiments). Some embodiments also determine and propagate a new IP address to fabric port address association in conjunction with propagating a new IP address to MAC address association. Other embodiments determine and propagate an IP address update, or both MAC and IP address updates (corresponding to the aforementioned second and third groups of embodiments, respectively), including propagating updates as appropriate for the following mappings: IP address to MAC address, MAC address to fabric port address, and IP address to fabric port address.

In some embodiments, the SCM processes program the Layer-2 and Layer-3 module tables (L2 FIBs and L3 FIBs) in their entirety with respect to all elements known to reside within an ES system. For example, with respect to FIG. 14, all IP and MAC addresses to fabric port address correspondences are programmed into the TCAM/SRAM structures included on the PMMs and into the search engines included in the NMs. The pre-programming of mapping information guarantees that references to local IP and MAC addresses will be found in the module tables (i.e. will be "hits"). Subsequently, when IP and MAC takeover occurs (for example during failover processing), the SCM processes update the L2 and L3 FIBs immediately, guaranteeing that later references to local IP and MAC addresses will continue to be hits in the module tables.

In some embodiments, the L2 and L3 FIB preprogramming is limited according to VLAN configuration but still sufficient to guarantee that local IP and MAC address references are hits, to conserve TCAM/SRAM entry usage. For example, TCAM/SRAM 403.5 would be initially preprogrammed only with entries corresponding to the VLANs that VNICs implemented in VIOC 301.5 were members of, while TCAM/SRAM 403.5B would be initially programmed according to VLAN membership of VNICs implemented by VIOC 301.5B. Depending on specific VLAN membership of VNICs, there could be entries uniquely present in TCAM/SRAM 403.5, entries uniquely present in TCAM/SRAM 403.5B, and entries present in both TCAM/SRAMs 403.5 and 403.5B. Failover processing would immediately update and add TCAM/SRAM 403.5B entries in order to continue to continue guarantee local IP and MAC address hits.

According to various embodiments, NMs and PMMs may implement any combination of L2 and L3 FIBs and perform corresponding L2 and L3 forwarding lookups. In some embodiments, the L2 and L3 module tables are distinct, while in other embodiments the L2 and L3 module tables are implemented in a single combined module table, with L2 and L3 type entries being differentiated by a table identification field (of one or more bits) stored in the table and included in the lookup key.

The foregoing discussion focuses on module tables typically implemented as TCAM/SRAM elements associated with VIOCs included on PMMs. However, TCAM/SRAM elements associated with VIOCs included on SCMs, FCMs, and OLBs, as well as TCAM/SRAM elements included on NMs function similarly. Those of ordinary skill in the art will readily appreciate how to extend the failover techniques to other module types having TCAM/SRAM elements implementing Layer-2 and Layer-3 module tables.

Multi-Chassis Provisioning and Management

Figure 16:
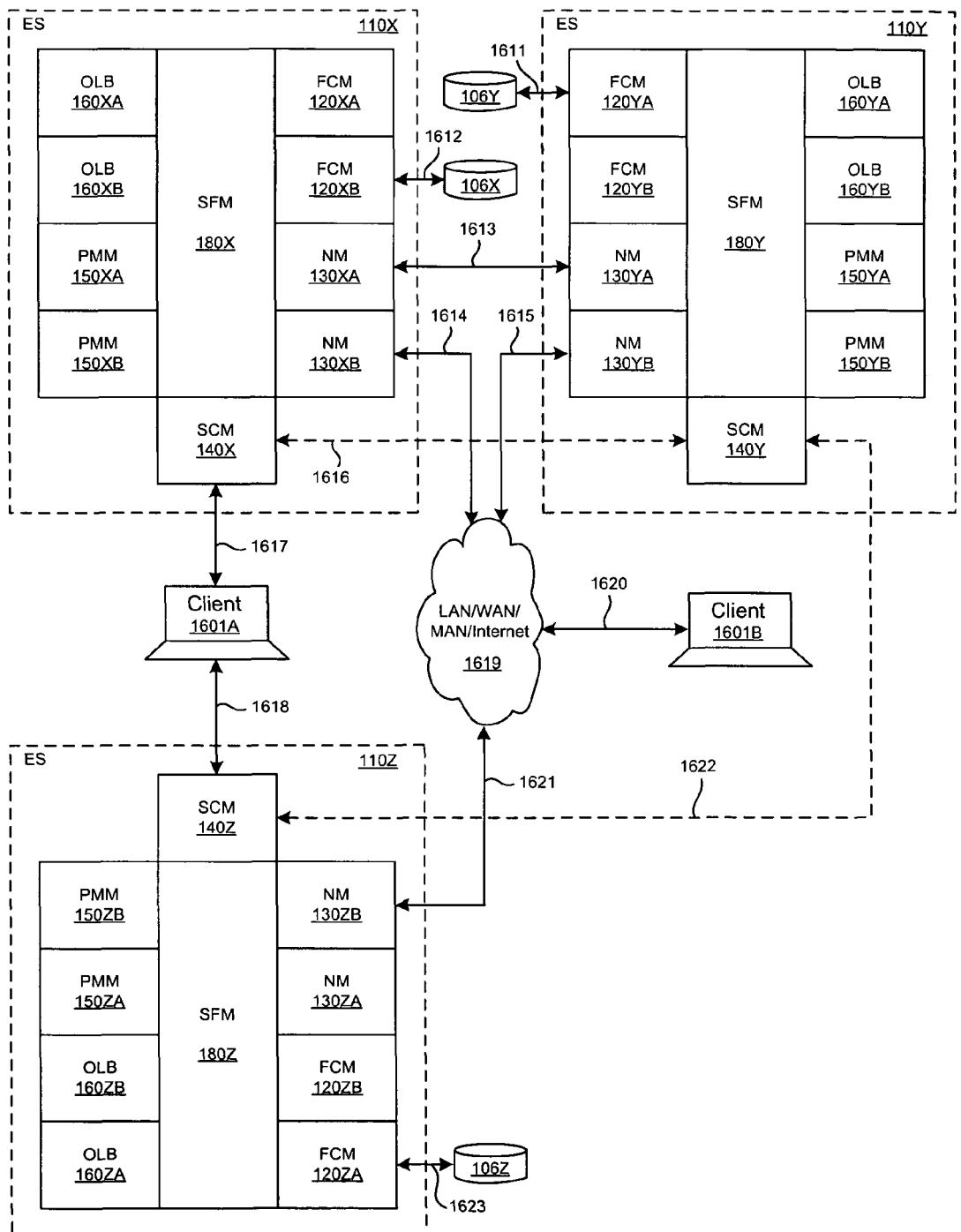
FIG. 16 illustrates an embodiment of a multi-chassis fabric-backplane ES system.

FIG. 16 illustrates an embodiment of a multi-chassis fabric-backplane ES system, also referred to simply as a "multi-chassis system". Servers may be provisioned from compute, storage, and I/O resources available via three chassis (ES 110X, ES 110Y, and ES 110Z), each similar to ES1 110A (see FIG. 1A). Conceptually the multi-chassis provisioning process is similar to that of a single chassis, as illustrated in FIGS. 9A, 9B, and 11 and their respective discussions, except that resources for provisioning are distributed amongst more than one chassis.

As illustrated in FIG. 16, each chassis includes an SFM (SFM 180X of ES 110X, for example) coupled to various compute, storage, and I/O modules. The compute modules include two OLBs (OLB 160XA and OLB 160XB of ES 110X, for example), two PMMs (PMM 150XA and PMM 150XB of ES 110X, for example), and an SCM (SCM 140X of ES 110X, for example). Storage modules include two FCMs (FCM 120XA and FCM 120XB of ES 110X, for example). I/O modules include two NMs (NM 130XA and NM 130XB of ES 110X, for example). ES 110Y and ES 110Z are similar to ES 110X (similar elements are identified with a 'Y' and a 'Z', respectively, in the identifier name instead of an 'X'). FC standard storage arrays (or networks coupled to arrays, according to implementation) are coupled to each ES chassis, as illustrated by FC Array/Networks 106X, 106Y, and 106Z, coupled to ESs 110X, 110Y, and 110Z, respectively.

Each ES system chassis is coupled to LAN/WAN/MAN/Internet network 1619, ES 110X via NM 130XB and coupling 1614, ES 110Y via NM 130YB and coupling 1615, and ES 110Z via NM 130ZB and coupling 1621. In some embodiments, network 1619 (or similar network interconnectivity reached via NMs) provides a majority of communication bandwidth between various chassis of a multi-chassis system, including communication between the SCMs of the multiple chassis. In some embodiments, additional connectivity between SCMs of a multi-chassis system is included, as illustrated by dash-line coupling 1616 between SCM 140X and SCM 140Y, and dashed-line coupling 1622 between SCM 140Y and SCM 140Z. Client 1601A is coupled to ES 110X (via coupling 1617 to SCM 140X) and to ES 110Z (via coupling 1618 to SCM 140Z). Client 1601B is coupled to network 1619 via coupling 1620, and the network provides indirect coupling between Client 1601B and SCMs 140X, 140Y, and 140Z.

At least two major variations of multi-chassis provisioning and management operations are possible. A first, or "Master-Free" variation, is illustrated by Client 1601B operating in conjunction with a host SCM (such as any one of SCM 140X, SCM 140Y, and SCM 140Z) executing multi-chassis management and provisioning operations (such as those provided by Enterprise Manager 530 of FIG. 5B). A second, or "Client-Mastered" variation, is illustrated by Client 1601A operating as a master to two or more SCMs (such as SCM 140X and SCM 140Y), with each SCM executing single-chassis management and provisioning operations (such as those provided by CM 533). The two variations are described in more detail with respect to FIG. 17.

The illustrated embodiment shows couplings 1617 and 1618 coupling Client 1601A to SCM 140X of ES 110X and SCM 140Z of ES 110Z respectively. Other embodiments may provide communication between a Client acting as a multi-chassis master and a plurality of SCMs via any network connectivity between the SCMs and the client, such as portions of network 1619. It is important only that the master Client establish logical connectivity with a CM executing in each SCM included in each respective chassis of the multi-chassis system under management of the master Client.

While the aforementioned multi-chassis system embodiments include identical chassis, other embodiments may include chassis of varying capabilities. For example, a first chassis in a multi-chassis system may not include any FCMs, a second chassis may not include any OLBs, and a third chassis may include four OLBs. These and all other similar combinations of compute, storage, and I/O resources are contemplated. Furthermore, embodiments of multi-chassis systems may include as few as two chassis to tens, hundreds, or thousands of chassis, interconnected without restriction via various combinations and topologies of LANs, WANs, MANs, and the Internet. In addition, multi-chassis management may be performed via either or both of the two aforementioned variations and embodiments may include multiple instances of each variation operating substantially in parallel, provisioning and managing a plurality of provisioned servers.

Figure 17:
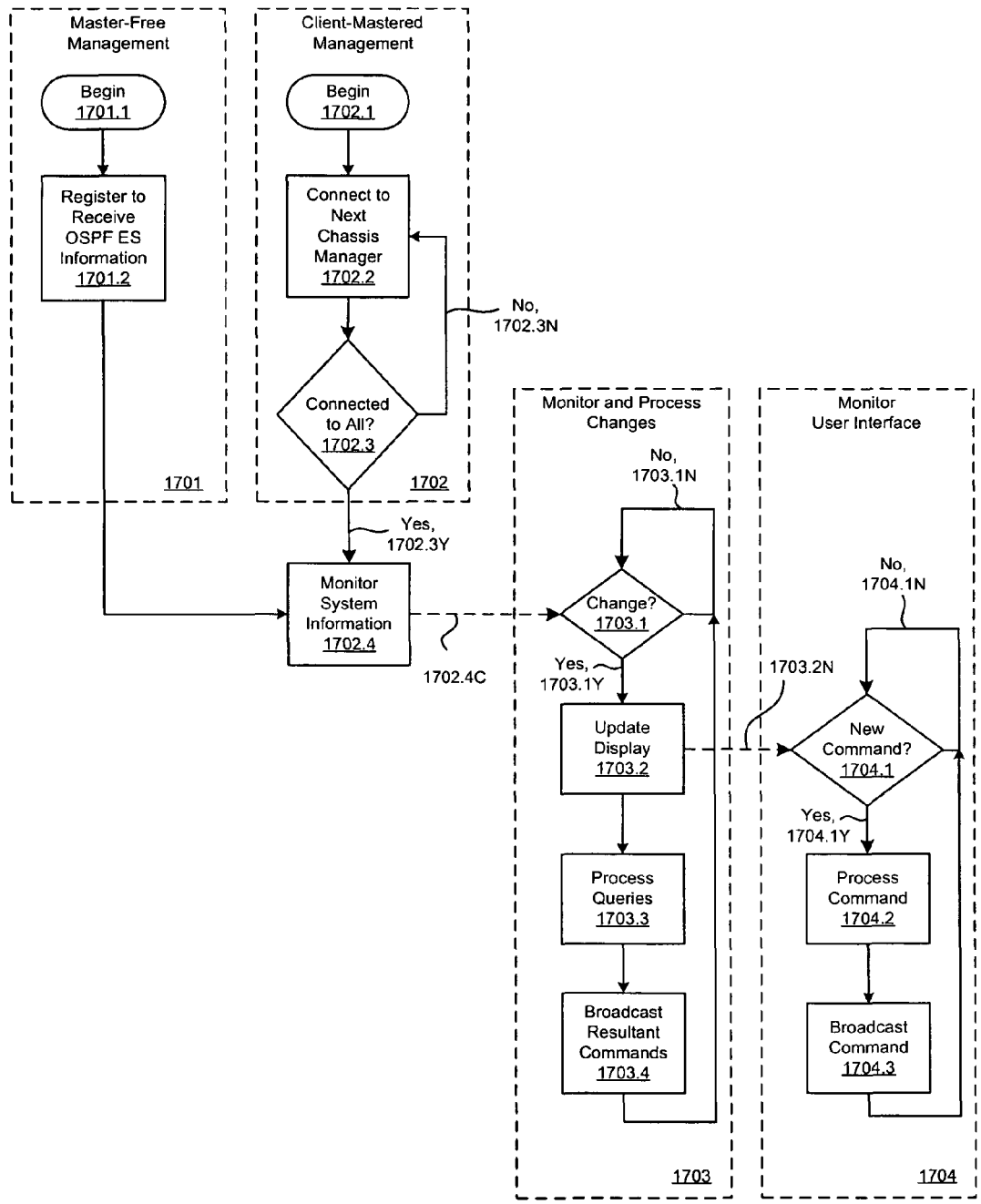
FIG. 17 illustrates an embodiment of two variations of multi-chassis provisioning and management operations.

FIG. 17 illustrates an embodiment of two variations of multi-chassis provisioning and management operations. Generally, in the Client-Mastered variation, a client (such as Client 1601A) acts as a master for gathering information and distributing commands (rather than relying on an Enterprise Manager proxy). The client, acting as the master, logically couples to a plurality of CMs executing on respective SCMs (such as SCMs 140X and 140Z). The CMs, acting as slaves, individually provide the information to the client (master) and individually receive and act on the distributed commands from the client.

Generally, in the Master-Free variation, a host Enterprise Manager executing on a host SCM operates as a proxy for receiving system information from all chassis in the system, passing the information to a client (such as Client 1601B) as necessary, depending on state information required by the client. Such information may include event information for processing with respect to queries, system status changes, or similar management and provisioning data. The host Enterprise Manager further operates as a proxy for broadcasting or distributing commands from Client 1601B to the proper chassis in the system. Such commands may include commands to provision or manage servers, or to perform other similar multi-chassis operations.

Communication of system information and commands between the host Enterprise Manager and the other Enterprise Managers of the multi-chassis system is typically performed via an OSPF protocol (an industry standard link-state protocol for routing IP packets). An example of an OSPF protocol is described in "RFC 2328—OSPF Version 2", April 1998, (http://www.faqs.org/rfcs/rfc2328.html), herein incorporated by reference for all purposes. In some embodiments, data distribution is implemented via extensions to an OSPF protocol, such as an opaque Link Status Advertisement (LSA) option (an industry standard technique of data distribution for arbitrary purposes throughout an OSPF domain). An example of an opaque LSA option extension is described in "RFC 2370—The OSPF Opaque LSA Option", July 1998, (http://www.faqs.org/rfcs/rfc2370.html), herein incorporated by reference for all purposes. Other embodiments communicate management and provisioning information, events, commands, and other related data via other OSPF-like protocols adapted for propagating and distributing data in an environment of dynamically varying bandwidth and topology.

With respect to OSPF processing, each ES system of the multi-chassis system acts as a router, originating OSPF Link State Update messages (according to opaque LSAs, in some embodiments) indicating the current state of the respective ES system. The ES systems further operate to propagate similar information from adjacent ES systems (also acting as routers with respect to OSPF processing) throughout the multi-chassis system (often referred to as autonomous system in regards to OSPF operations). The propagated information includes data values required for proper determination and processing of server provisioning and management operations, including data values referenced by queries being monitored for activation. For example, command execution results and module status changes (such as Module Operational Status Up/Down events, as described in the Selected BMC Event Details section, elsewhere herein) are packaged for dissemination via Link State Update messages, and provided to the adjacent ES systems. Since the Link State Update messages are communicated reliably (via the Link State Ack acknowledgement handshake), all ES systems in a multi-chassis system have access to reliable near real time status information for all of the chassis in the multi-chassis system. In some embodiments, OSPF Hello and Link State Request messages may be used to discover ES systems present in the multi-chassis system.

Referring to FIG. 17, Master-Free Management Flow 1701 illustrates processing specific to an embodiment of the first variation, and Client-Mastered Management Flow 1702 illustrates processing specific to an embodiment of the second variation. The Master-Free flow starts at "Begin" 1701.1. The flow then continues to "Register to Receive OSPF ES Information" 1701.2. Here the client (such as Client 1601B) registers with a host enterprise management process executing on a host SCM (such as SCM 140X) to receive and broadcast information via OSPF opaque LSAs, with the host enterprise management process acting as a proxy. Communication between the client and the host enterprise management process is via coupling 1620, network 1619, and coupling 1614. The host SCM in turn communicates with the other SCMs (or more specifically enterprise management processes executing thereon) of the multi-chassis system via network 1619 and coupling 1613, and optionally via coupling 1616. Processing in "Register to Receive OSPF ES Information" 1701.2 completes the Master-Free-specific portion of the overall flow.

The Client-Mastered flow starts at "Begin" 1702.1 and continues to "Connect to Next Chassis Manager" 1702.2. Here communication between the client (such as client 1601A) and a CM process executing on the SCM of the first ES system (such as SCM 140X via coupling 1617) in the multi-chassis system is established. A check is then made to determine if connections have been established to all of the ES systems of the multi-chassis system at "Connected to All?" 1702.3. If there are more systems to connect to, then flow proceeds along "No" 1702.3N back to 1702.2 "Connect to Next Chassis Manager". The next connection is then established (such as to SCM 140Z via coupling 1618). If connections have been established to all desired ES systems of the multi-chassis system, then flow continues via "Yes" 1702.3Y, and the Client-Mastered-specific portion of the overall flow is complete.

Flow continues from "Register to Receive OSPF ES Information" 1701.2 and via "Yes" 1702.3Y to "Monitor System Information" 1702.4, where information received from each chassis of the multi-chassis system is monitored. The Master-Free variation receives status change and event information via the host enterprise management process, and the host enterprise management process in turn collects the information via OSPF opaque LSA processing. The Client-Mastered variation receives the information directly from each chassis via the respective connections established in Client-Mastered Management Flow 1702.

In parallel with the system information monitoring, two other flows are occurring, Monitor and Process Changes 1703 and Monitor User Interface 1704. Generally, Monitor and Process Changes 1703 includes receiving and acting upon information collected from the system monitoring activity (status changes and events), including updating information displayed to one or more operators (such as users, system managers, and other related personnel). The functions further include processing queries and sending commands generated by any activated queries to member systems of the multi-chassis system that are required to execute the commands. Monitor User Interface 1704 includes waiting for commands from the operators (provided in response to the updating of information displayed, for example) and distributing the commands to appropriate members of the multi-chassis system.

More specifically, information regarding status changes and events is propagated to "Change?" 1703.1 from "Monitor System Information" 1702.4, as shown conceptually by dashed-arrow 1702.4C. "Change?" 1703.1 determines if there has been a system status change or an event. If not ("No" 1703.1N), then processing loops back to "Change?" 1703.1. If there has been a change or an event ("Yes" 1703.1Y), then flow continues to "Update Display" 1703.2., where the client updates any relevant display information according to user interface requirements. Processing then proceeds to "Process Queries" 1703.3, where queries are processed with respect to the status changes and events, and commands may be formulated in response to activated queries (similar to "Pre-Select Queries and Respond to Activated Queries" 1201.7 of FIG. 12A). Flow continues to "Broadcast Resultant Commands" 1703.4, where any resultant commands are distributed to appropriate chassis, in a manner dependent on whether the operating mode is the Master-Free or the Client-Mastered variation. After completion of command broadcast, flow returns to "Change?" 1703.1 to await another status change or event.

"Broadcast Resultant Commands" 1703.4 processing, in the Master-Free variation, unfolds in a two stage process. The commands are first sent from the client to the host enterprise management process, and then the commands are broadcast via OSPF opaque LSAs to all of the managed ES systems of the multi-chassis system. In the Client-Mastered variation, commands are broadcasted by the client to each managed ES system. The broadcasting may be performed directly by the client, using a form of unicast transmission, or indirectly by the client using a form of multicast transmission, according to various embodiments.

Processing in "New Command?" 1704.1 determines if the operator has provided a command (frequently this occurs in response to changes in displayed information, as indicated conceptually by dashed-arrow 1703.2N). If not ("No" 1704.1N), then processing loops back to "New Command?" 1704.1. If a command has been received ("Yes" 1704.1Y), then flow proceeds to "Process Command" 1704.2, where the operator command is processed into one or more commands for communication to the elements of the multi-chassis system. Processing continues in "Broadcast Command" 1704.3, where the command (or commands) is sent to the appropriate multi-chassis system members, in a variation dependent way, as in "Broadcast Resultant Commands" 1703.4.

In some embodiments, commands sent to the multi-chassis system (as generated by "Broadcast Resultant Commands" 1703.4 and "Broadcast Command" 1704.3, for example), may be multi-stage commands (or sub-commands) requiring one or more synchronization events with respect to execution of sub-commands by members of the multi-chassis system. Synchronization may extend across any number and combination of the multi-chassis members, depending on specifics of the command, topology of the multi-chassis system, and implementation specific characteristics.

Storage Gateway

Figure 18A:
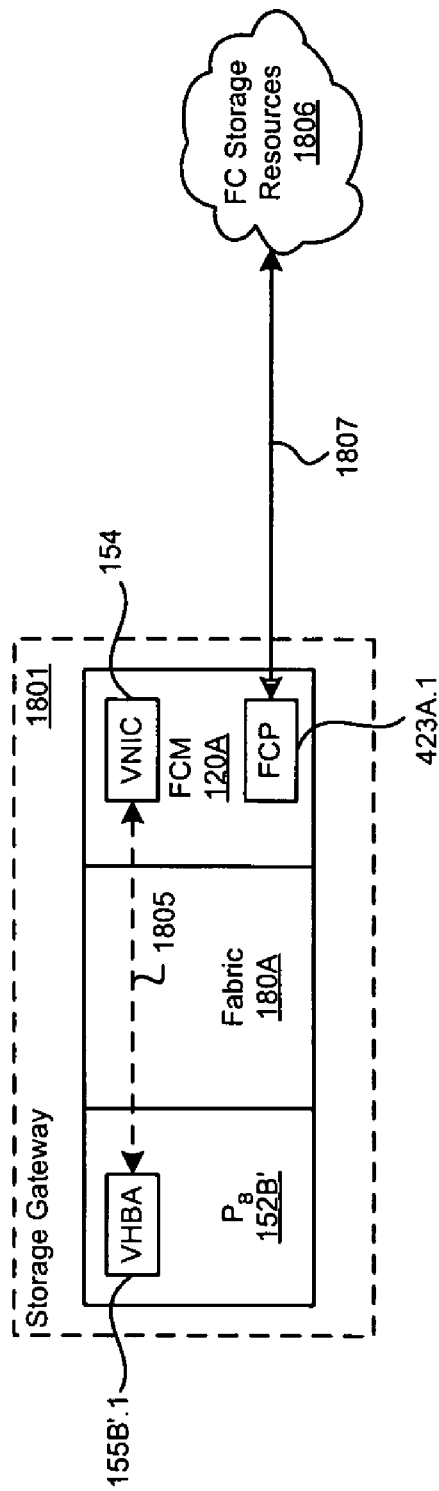
FIG. 18A illustrates selected conceptual aspects of an embodiment of a storage gateway of an ES system.

FIG. 18A illustrates selected conceptual aspects of an embodiment of a storage gateway of an ES system. The illustrated embodiment is shown including a subset of portions of FIG. 1B, for ease of conceptual understanding. Storage Gateway 1801 includes PMM physical partition $P_{B'}$ 152B', coupled via Primary Switch Fabric Module 180A to FCM 120A. FCPs 423.1, included in FCM 120A, implement FC coupling 1807 to FC Storage Resources 1806 (such as elements similar to FC Storage Network 106). VHBA 155B'.1 (implemented, for example in a VIOC included in PMM physical partition $P_{B'}$ 152B') supports communication pathway 1805 to VNIC 154 (implemented, for example, in a VIOC included in FCM 120A). Communication pathway 1805 is provided in part by data transmission resources of the switch fabric. FC coupling 1807 may include one or more FC-compatible couplings (such as one, two, four, or eight couplings), varying according to embodiment. In some embodiments PMM physical partition $P_{B'}$ 152B' is any instance of a PMM physical partition (such as 4-way SMP Processing Complex 901.0 of FIG. 9A), Primary Switch Fabric Module 180A is any instance of a switching fabric, and FCM 120A is any instance of an FCM or FCM/OLM.

More generally, one or more storage gateways provide provisioned servers (typically including a PMM partition) with access to local and remote FC storage resources. The provisioned server accesses the FC storage resources via abstractions provided by the storage gateway. More specifically, processes executing on the provisioned servers (including OS routines and associated drivers as well as selected applications) perform storage 10 accesses as if communicating with a traditional HBA via the storage gateway abstractions.

Access to the FC storage resources is thus virtualized by the storage gateways, enabling transparent sharing of resources between provisioned servers, including bandwidth available from individual FC ports (typically implemented on FCMs). For example, in usage scenarios where a provisioned server requires (and is thus allocated) only a portion of bandwidth available from a single FC port, the remainder of the available bandwidth may be allocated to another provisioned server. Typically the resource sharing provides for operation of a plurality of provisioned servers with fewer FC ports than otherwise required, providing better overall utilization of physical HBAs coupling to the storage resources. The sharing is enabled between elements of single-chassis as well as multi-chassis ES system embodiments (i.e. the illustrated PMM partition and the FCM may be in the same or distinct chassis).

The FC storage resources may include any combination of FC disks, FC tape drives, FC tape libraries, FC storage arrays, FC switches, FC directors, FC routers, FC networks (such as SANs), and various other storage and other devices compatible with FC connectivity. The FC storage resources may be any combination of homogenous and heterogeneous FC devices, coupled together in various topologies, restricted only by availability of devices and FC ports.

Typically a storage gateway is implemented across a plurality of distributed components, many of which include RAS enhancements. In addition, provisioned servers may be operated with simultaneous access to a plurality of storage gateways, thus providing for reduced single points of failure in various ES system embodiments. Storage gateway VLAN assignment, zoning, and LUN masking techniques are used to selectively provide access to various subsets of available storage resources to different provisioned servers.

Some storage gateway embodiments include an initiator portion (typically implemented in part by a VHBA and associated initiator SW) and a target portion (typically implemented in part by portions of an FCM and associated target SW). The VHBA and associated SW function as a portal between processes executing on a PMM partition of a provisioned server and any combination of local and remote storage resources. The portions of the FCM (typically including a plurality of FC ports) and associated SW function as an interface between the VHBA provided portal and FC resources coupled to the FC ports.

The following storage gateway discussion uses the term "SCSI router" to refer to a logical view of selected SCSI interface functions typically implemented in an FCM. In some embodiments a SCSI router is identified by a name, includes a VNIC having an associated bandwidth and IP address, is a member of a VLAN, and is accessed via a predetermined username/password. In some embodiments a SCSI router includes a VHBA (similar or identical to that in the initiator portion) that in turn includes a VNIC, such that implementations of VHBA and VNIC elements according to the figure may be symmetrical, similar, or identical to each other. For convenience, in much of the subsequent storage gateway discussion, the initiator is described as including a VHBA and the target is described as including a VNIC. Those of ordinary skill in the art will recognize the interchangeability of VHBA and VNIC elements.

A storage gateway (such as implemented in part by a VHBA) appears to programs executing on a PMM partition as a conventional PCI or PCI-X FC HBA. Bandwidth allocated to a VHBA may be any portion or all of a target FC port available bandwidth (such as 2 Gb for a typical FC port), and the allocated bandwidth may be adjusted (or reallocated) dynamically in a manner transparent to processes accessing storage via the storage gateway.

The selective access (via VLAN assignment, zoning, and LUN masking) is managed on a per VHBA basis, typically while provisioning each VHBA. More specifically, the end-to-end relationship between a VHBA, an FCM, an FC port of the FCM, a target disk, and a LUN of the disk are specified during VHBA provisioning and configuration. During operation the provisioning and configuration information is used in part to populate storage gateway zoning and masking tables (typically referenced by the target SW). The information is also used in part to program mode and operational parameter information in VHBA implementations (such as VIOCs).

RAS capabilities implemented, according to various embodiments, include high availability (particularly with respect to the VHBA) and failover as well as fall-back between FCMs. RAS capabilities further include dynamic alteration of VHBA operating parameters (such as capacity and/or bandwidth) transparently with respect to processes accessing storage resources via an altered VHBA. Additional RAS capabilities include dynamic modification of VHBA to FC port assignments (such as reassigning and/or reallocating between the same or different FCMs).

Server provisioning operations (via CLIs and GUIs) include operations for provisioning VHBA properties and accessibility of attached FC disk arrays. In some embodiments VHBA configuration and provisioning is limited to a single interface at a time to prevent resource contention. In some embodiments CLIs provide little or no user feedback (even as far as omitting requests for user confirmation or retry of failed commands). In some embodiments configuration and provisioning is according to a Command Line Protocol (CLP) compatible with associated developments by the Server Management Work Group (SMWG) of the DMTF.

Figure 18B:
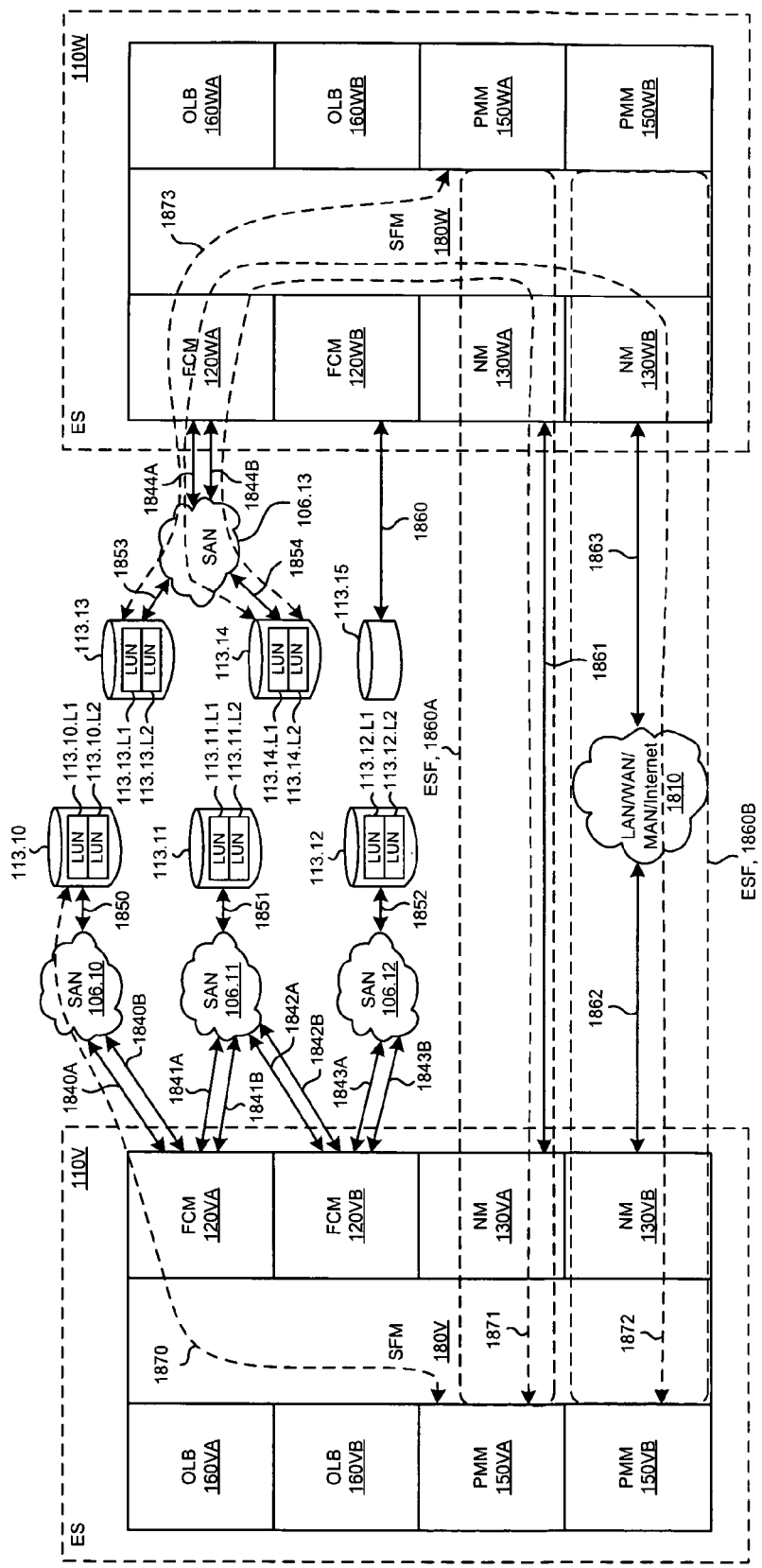
FIG. 18B illustrates an embodiment of partitions of PMMs (typically functioning in provisioned servers) accessing local FCMs and remote FCMs to exchange data with disk arrays.

FIG. 18B illustrates an embodiment of partitions of PMMs (typically functioning in provisioned servers) accessing local FCMs and remote FCMs to exchange data with disk arrays. In some embodiments a VHBA is enabled to access a plurality of FC ports on one or more FCMs (and a plurality of physical targets). In some embodiments a plurality of VHBAs is enabled to access a shared FC port (and any combination of physical targets reachable via the shared FC port) or a shared FCM (and any combination of FC ports of the shared FCM along with any associated reachable targets). In some embodiments each VHBA is restricted to accessing a single FCM or a single FC port (and any reachable targets), although the single FCM or the single FC port may be accessed by a plurality of VHBAs. The following description of data exchanges is with respect to embodiments that restrict each VHBA to accessing a single FCM or a single FC port. Several example data exchanges, including local (single chassis) and remote (multi chassis) data exchanges are illustrated as follows.

Dashed arrow 1870 illustrates a local data exchange between a first partition of PMM 150VA and a portion of FC Disk Array 113.10, via SFM 180V, FCM 120VA, and any combination of FC couplings 1840A and 1840B, along with SAN 106.10 and SAN-to-Disk coupling 1850. The data exchange is considered local because the initiator (all or part of the first partition of PMM 150VA) and the associated interface to the target (all or part of FCM 120VA) are included in a single chassis. Dashed arrow 1873 illustrates another local data exchange between a partition of PMM 150WA and a portion of FC Disk Array 113.13, via SFM 180W, FCM 120WA, and any combination of FC couplings 1844A and 1844B, along with SAN 106.13 and SAN-to-Disk coupling 1853.

Dashed arrow 1871 illustrates a remote data exchange between a second partition of PMM 150VA and a first portion of FC Disk Array 113.14. The data exchange is considered remote because the initiator (all or part of the second partition of PMM 150VA) and the associated interface to the target (all or part of FCM 120WA) are included in more than one chassis. The data is exchanged internal to ES 110V via SFM 180V and NM 130VA. The data is exchanged between ES 110V and ES 110W via network coupling 1861, and by processing performed by NMs 130VA and 130WA. The data is exchanged internal to ES 110W via NM 130WA, SF 180W, and FCM 120WA. The data is exchanged between ES 110W and the disk array portion via any combination of FC couplings 1844A and 1844B, along with SAN 106.13 and SAN-to-Disk coupling 1854.

Dashed arrow 1872 illustrates another remote data exchange between a partition of PMM 150VB and a second portion of FC Disk Array 113.14. The data is exchanged internal to ES 110V via SFM 180V and NM 130VB. The data is exchanged between ES 110V and ES 110W via network coupling 1862, LAN/WAN/MAN/Internet 1810, and network coupling 1863, and by processing performed by NMs 130VB and 130WB. The data is exchanged internal to ES 110W via NM 130WB, SF 180W, and FCM 120WA. The data is exchanged between ES 110W and the disk array portion via any combination of FC couplings 1844A and 1844B, along with SAN 106.13 and SAN-to-Disk coupling 1854.

The aforementioned data exchange paths are described from initiator (PMM partition) to target (FC Disk Array portion). However the data exchanges are bidirectional, and include data movement from target to initiator as well as from initiator to target. The data exchanges include commands and raw storage data from initiator to target and responses and raw storage data from target to initiator.

In the aforementioned data exchange examples PMM 150VA is configured as a first and a second partition, communicating as illustrated by dashed arrow 1870 and dashed arrow 1871, respectively, to two distinct storage resources. However, in other examples PMM 150VA may be configured as a single partition and the single partition may be configured to perform data exchanges by a plurality of communication pathways to a plurality of storage resources, as exemplified by dashed arrow 1870 and dashed arrow 1871. In general, a PMM partition may exchange data with storage resources via any number and arrangement of storage gateways, limited only by available system resources.

Each of the data exchanges illustrated by dashed arrows 1870-1873 may be considered to include two logical portions, a transport portion between a PMM and an FCM, and an interface portion from the FCM through an included FCP to a storage resource. Each transport portion is exclusive (or dedicated) to a respective data exchange, since at least one endpoint (typically the initiator) of the exchange is unique to the exchange. In other words, transport portions are not shared between data exchanges, even though underlying physical elements implementing the logical transport portions (such as an SF) may be shared. The interface portions, however, may be shared between data exchanges.

In some embodiments each transport portion of a storage gateway data exchange is terminated by a dedicated VHBA (included in a corresponding PMM) and by a selected VNIC (included in a corresponding FCM). A single VNIC may provide a termination for more than one corresponding VHBA. In some implementations where VHBAs and VNICS are implemented in VIOCs, allocating a dedicated VHBA and a selected VNIC to each logical transport portion enables effective bidirectional bandwidth control. Bandwidth control from the PMM partition (via a VHBA) is provided by VIOC egress bandwidth control functions (such as transmit queue selection) operating in a VIOC in the PMM. Bandwidth control into the PMM partition (from a VNIC in an FCM) is provided in part by the VIOC egress bandwidth control functions operating in a VIOC in the FCM.

In the illustrated embodiment, each of the transport portions of the data exchanges corresponding to dashed arrows 1870-1873 terminate at a first terminus at a respective VHBA (not shown for simplicity) included in a PMM, and terminate at a second terminus at a corresponding VNIC included an FCM (also not shown for simplicity). More specifically, PMM 150VA includes at least two VHBAs (one for each of the paths illustrated by dashed arrows 1870 and 1871), and each of PMMs 150VB and 150WA include at least one VHBA (corresponding to 1872 and 1873, respectively). FCM 120VA includes at least one VNIC for the path illustrated by dashed arrow 1870. FCM 120WA includes at least one VNIC (and as many as three VNICs) for the paths illustrated by 1871-1873.

Each of the interface portions of the data exchanges pass through a respective FC port (also not shown for simplicity) implemented by the associated FCMs. The FC ports are typically shared between paths, unlike VHBAs, which are dedicated to each path. More specifically, FCM 120VA implements at least one FC port (coupled via 1840A, for example) used in the path corresponding to 1870. FCM 120WA implements a first FC port used by the path corresponding to 1871 (coupled via 1844B), and a second FC port shared by the paths corresponding to 1872 and 1873 (coupled via 1844A).

Conceptually a first combination of an SF and an NM, an external transport, and a second combination of an SF and an NM may be considered an example of an Extended Switch Fabric (ESF). An ESF is logically equivalent to an SF, as remote transport via an ESF is transparent compared to local transport via an SF. As an example, ESF 1860A includes functionality provided by SFM 180V, NM 130VA, network coupling 1861, NM 130WA, and SFM 180W. As another example, ESF 1860B includes functionality provided by SFM 180V, NM 130VB, network coupling 1862, LAN/WAN/MAN/Internet 1810, network coupling 1863, NM 130WB, and SFM 180W. While the aforementioned ESF examples are described with respect to storage gateway data exchanges compatible with a transport layer such as Ethernet (as implemented by NMs), other embodiments with different transport layers are possible, as those of ordinary skill in the art will recognize.

In some embodiments network coupling 1861 is limited to an Ethernet cable, while in other embodiments network coupling 1861 includes one or more Ethernet repeaters. Transport between chassis, via portions of an ESF, is not limited to such embodiments, as illustrated by LAN/WAN/MAN/Internet 1810, which is illustrative of arbitrarily complex repeating, switching, routing, and associated network transport functions. As illustrated, LAN/WAN/MAN/Internet 1810 may include one or more hops via the Internet. Operation of storage gateways is not affected by mode of transport between chassis (other than performance under various conditions).

Storage gateway data traffic carried between chassis may include encrypted data, unencrypted (i.e. clear text) data, or both, according to various embodiments. In some embodiments supporting encryption of storage gateway traffic on an ESF, data is encrypted before transmission from one chassis and decrypted after reception in another chassis. In some embodiments the encryption/decryption of storage gateway data traffic is according to a protocol compatible with Internet Protocol Security (IPSec).

Storage data encryption and decryption may be provided by any combination of various cryptographic resources included in an ES chassis, varying by embodiment. Cryptographic resources may be optionally provided by PMMs (such as by SW executing on PMM partitions or by cryptographic acceleration HW optionally included on VIOCs of the PMMs). Cryptographic resources may be optionally provided by OLBs (in a manner similar to SSL service processes and associated HW acceleration). Cryptographic resources may be optionally provided by NMs and FCMs (via SW executing on processing resources such as IOPs or by the optional VIOC cryptographic acceleration HW).

Storage gateway operation with target devices provides for protection and management capabilities including access control, security, and selected aspects of QoS (such as bandwidth management). The protection and management capabilities are typically implemented by several techniques including assignment of one or more VLANs, zoning, and LUN masking. VLAN assignment is managed and operated according to VHBAs, i.e. a VHBA is assigned to one or more VLANs, according to usage scenario and embodiment. The VHBA is accessible only to other members of the VLANs the VHBA is assigned to, thus isolating the VHBA (and storage resources reachable through it) from other elements. Some embodiments provide only port-based VLAN membership, while other embodiments provide other forms of VLAN membership. Still other embodiments provide any combination of granular bandwidth control, accounting, and QoS agreements with respect to various VLANs according to embodiment.

Storage gateway zoning includes internal zoning and external zoning. Internal zoning is typically managed and operated with respect to each VHBA and associated target devices. In contrast, external zoning is typically managed and operated with respect to each FC port and associated target devices, and is thus "external" to core elements of typical ES system embodiments. The internal and external zoning are usable in various combinations and may be managed and operated independently or together, according to embodiment.

Internal zoning, when enabled, provides for isolation of VHBAs by associating them with different internal zones. Furthermore, VHBAs not associated with any internal zones are unable to access any targets coupled to FC ports when internal zoning is enabled. An internal zone is identified by a tag and is defined by inclusion of initiators (such as VHBAs) and targets (associated with various combinations of FCMs, FC ports implemented by FCMs, specific target identifiers, and LUN identifiers). An initiator is thus included in one or more internal zones and is allowed access only to targets included in the internal zones that the initiator is included in.

Internal zoning enables a plurality of VHBAs to share access to a single FC port coupled to a plurality of storage elements included in a single external zone, while restricting or dedicating access to the storage elements. For example, a first and a second of the VHBAs may be enabled for exclusive access to respective first and second portions of the storage elements via a first FC port while also being enabled for shared access to a third portion of the storage elements via either the first FC port or a second FC port.

In some embodiments internal zones may be defined that span FC port targets reachable from a plurality of FCMs, i.e. an internal zone may include more than one FCM. In some embodiments internal zones are restricted such that all FC port targets reachable from an internal zone are reachable from a single FCM, and internal zones are managed on a per FCM basis. In various embodiments internal zones are defined at a granularity of any combination of an FC port, an FC storage array, and a LUN of an FC storage array. Some internal zoning implementations provide for at least 512 internal zones.

External zoning is typically provided by various combinations of "hard zoning" (enforced in FC switch and director HW, often included in SANs), and "soft zoning" (enforced in SW by cooperation of initiators), according to embodiment. Filtering relating to hardware zoning is based on zone membership defined by elements including domain/port number and World Wide Name (WWN). Zone membership visibility relating to soft zoning is based on name server zone types including port based, world wide port/node name based, and FC address based types. In some external zone implementations a dynamic reallocation of LUNs within a zone is enabled, within the same partition or to another partition.

LUN masking provides for selectively enabled access from a VHBA to a LUN (or a portion of an FC device). When LUN masking is enabled a VHBA is prevented from accessing LUNs that the VHBA is not specifically enabled to access. In some embodiments 64-bit LUN identifiers are supported. Some implementations provide for at least 128 LUNs (active and failover) per VHBA, at least 512 LUNs per port, at least 4096 LUNs per module, and at least 8192 LUNs per ES system.

Conceptually relationships between VHBAs, FCMs, FC ports, targets, and LUNs may be considered as a collection of M to N relationships and may be represented as VHBA:FCM:FCport:Target:LUN. For simplicity, in some embodiments VHBAs are associated with only a single FCM. Internal zoning may be considered to provide groups of FCport:Target and optionally FCport:Target:LUN elements.

User processes (such as applications) executing on processing resources of provisioned servers (such as PMM partitions) access an FC storage resource via a VHBA that is tightly associated (or implemented) with a VNIC of a VIOC included on the PMM partition. A plurality of VHBAs is available to each user process, and each VHBA is in turn enabled to carry a plurality of iSCSI sessions.

Figure 19:
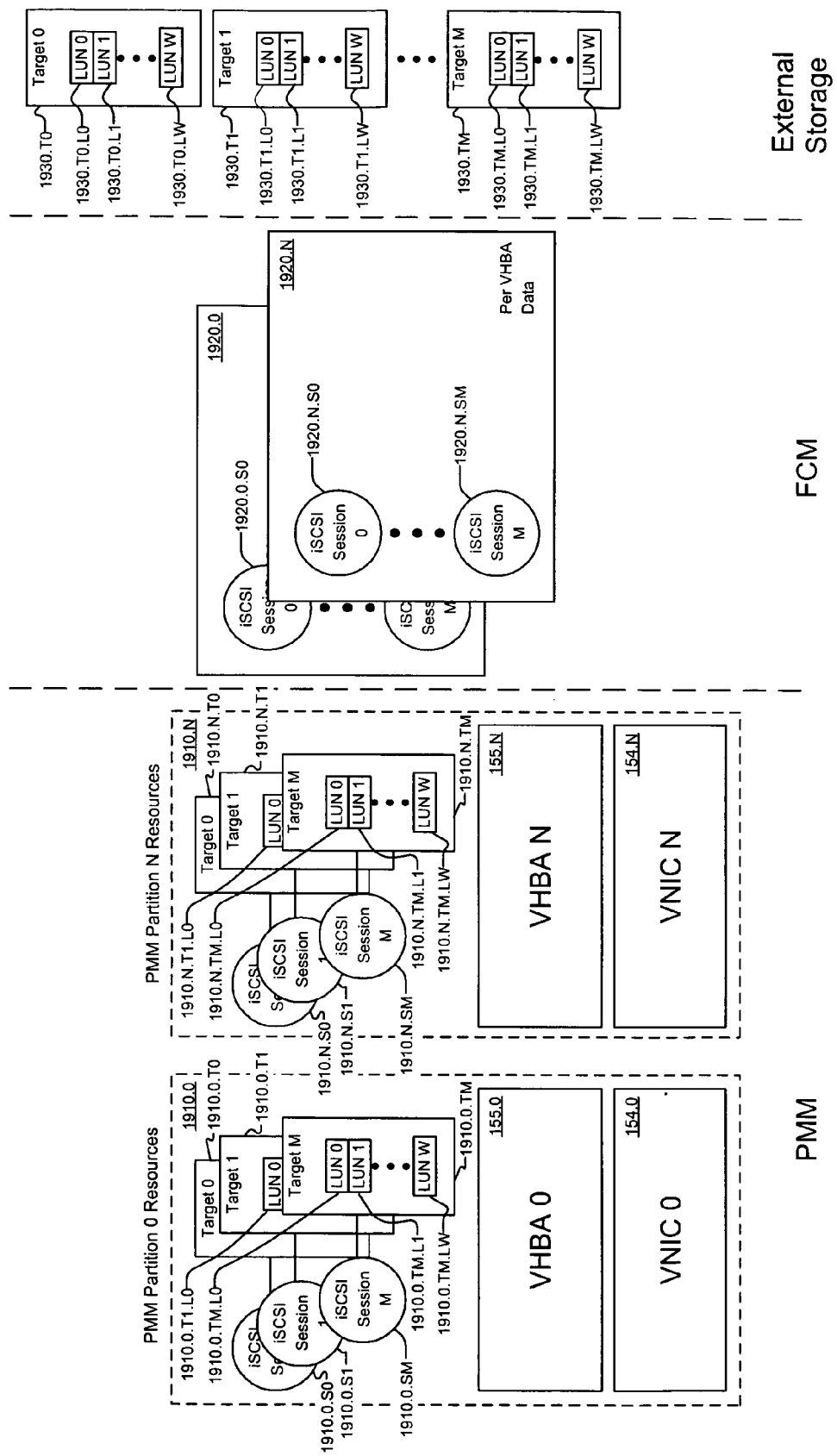
FIG. 19 illustrates an embodiment of Virtualized Host Bus Adaptors (VHBAs) and associated VNIC pairs, Small Computer System Interface (SCSI) over Transmission Control Protocol/Internet Protocol (iSCSI) initiator sessions and corresponding active targets, iSCSI target sessions, and Fibre Channel (FC) physical targets.

FIG. 19 illustrates an embodiment of VHBA and associated VNIC pairs, iSCSI initiator sessions and corresponding active targets, iSCSI target sessions, and FC physical targets. A plurality of iSCSI initiator sessions is illustrated as associated with each VHBA/VNIC pair and operating as shown using resources of PMM partitions. More specifically, PMM Partition 0 Resources 1910.0 includes VHBA 0 155.0 and VNIC 0 154.0. PMM Partition 0 Resources 1910.0 provides resources to enable iSCSI (initiator) Session 0 1910.0.S0, iSCSI (initiator) Session 1 1910.0.S1, and iSCSI (initiator) Session M 1910.0.SM. Each of the iSCSI initiator sessions (1910.0.S0, 1910.0.S1, and 1910.0.SM) manages active target information illustrated respectively as Target 0 1910.0.T0, Target 1 1910.0.T1 (shown with LUN 0 Information 1910.0.T1.L0), and Target M 1910.0.TM (shown with LUN 0 Information 1910.0.TM.L0, LUN 1 Information 1910.0.TM.L1, and LUN W Information 1910.0.TM.LW). Similarly, PMM Partition 1 Resources 1910.N includes a VHBA and a VNIC pair, and provides resources to enable a plurality of iSCSI sessions managing active target information. Elements of PMM Partition N Resources are similar to corresponding elements of PMM Partition 0 Resources having similar element identifiers (such as 155.N corresponding to 155.0, and 1910.N.TM.L0 corresponding to 1910.0.TM.L0, and so forth).

A plurality of iSCSI target sessions (or associated state) is shown arranged per VHBA and implemented using FCM resources. More specifically, Per VHBA Data 1920.0 is implemented with FCM resources and is associated with VHBA 0/VNIC 0 pair 155.0/154.0. Per iSCSI session data is illustrated as iSCSI (target) Session 0 1920.N.S0 and iSCSI (target) Session M (1920.N.SM). Similarly, Per VHBA Data 1920.N is implemented with FCM resources and is associated with VHBA N/VNIC N pair 155.N/154.N. Per VHBA Data 1920.N includes iSCSI (target) session data such as iSCSI (target) Session 0 1920.0.S0.

Several FC physical target resources are illustrated as external storage resources coupled (not explicitly shown) to FC ports of the FCM. More specifically, FC Target Resources 0, 1, and M (1930.T0, 1930.T1, and 1930.TM, respectively) are accessible via PMM Partition Resources 0 and N (1910.0 and 1910.N, respectively) via FCM FC ports. Each FC target resource is illustrated as including several LUN resources. Target 0 Resource 1930.T0 includes LUN 0 Resource 1930.T.L0, LUN 1 Resource 1930.T0.L1, and LUN W Resource 1930.T0.LW. Similarly Target 1 Resource 1930.T1 includes LUN Resources 0, 1, and W (1930.T1.L0, 1930.T1.L1, and 1930.T1.LW, respectively), and Target M Resource 1930.TM includes LUN Resources 0, 1, and W (1930.TM.L0, 1930.TM.L1, and 1930.TM.LW, respectively).

Throughout the figure, similarly named and identified elements correspond to each other. For example, Target M LUN 0 data 1910.0.TM.L0 (managed by PMM Partition 0 Resource 1910.0) and Target M LUN 0 data 1910.N.TM.L0 (managed by PMM Partition N Resource 1910.N) correspond to Target M LUN 0 1930.TM.L0. Similarly, Target 1 LUN 0 data 1910.0.T1.L0 (managed by PMM Partition 0 Resource 1910.0) and Target 1 LUN 0 data 1910.N.T1.L0 (managed by PMM Partition N Resource 1910.N) correspond to Target 1 LUN 0 1930.T1.L0. For another example, PMM Partition 0 iSCSI (initiator) Session 0 1910.0.S0 corresponds to FCM VHBA 0 iSCSI (target) Session 0 1920.0.S0, and PMM Partition N iSCSI (initiator) Session 0 1910.N.S0 corresponds to FCM VHBA N iSCSI (target) Session 0 1920.N.S0. PMM Partition N iSCSI (initiator) Session M 1910.N.SM corresponds to FCM VHBA N iSCSI (target) Session M 1920.N.SM.

In some implementations at least one iSCSI initiator session is created for each FC physical target accessed by the user processes, and corresponding iSCSI target state is managed by FCM resources. For example, PMM Partition N iSCSI (initiator) session 1910.N.SM is created for accessing FC physical Target M Resource 1930.TM, and corresponding iSCSI target state is 1920.N.SM. In some embodiments if a specific FC physical target resource is reachable by more than one VHBA, then only one iSCSI session is carried per VHBA per physical target resource. In some implementations a single VHBA is associated with a single initiator VNIC, enabling bandwidth control via VIOC VNIC functionality. In some embodiments a plurality of VHBAs are associated with a single initiator VNIC.

Although the figure illustrates a pair of PMM partitions resources and a single FCM resource, embodiments may include any number of PMM resources accessing FC storage via any number and arrangement of FCM resources. An FCM providing access to FC storage may be in the same chassis as an accessing PMM partition (i.e. be local with respect to the PMM partition) or the access providing FCM may be in a different chassis than the accessing PMM partition (i.e. be remote with respect to the PMM partition). The figure illustrates each PMM partition resource as accessing the same targets and LUNs therein, via identical iSCSI (initiator) sessions, but embodiments are not so limited, and one PMM partition resource may access a target while another PMM partition resource is accessing another target. Any number targets may be independently accessed by any number of PMM partition resources. Although the figure illustrates identical numbers and apparent arrangement of LUNs on a plurality of target devices, embodiments are not so limited, and may include any number of LUNs per target device, with each device having an arbitrary number and arrangement of LUNs.

In some embodiments field revisions or upgrades of any combination of initiator and target implementations are supported. In some embodiments various revision levels of initiator and target implementations are supported. For example, target SW executing on an FCM may be upgraded independently of initiator SW executing on a PMM. In some embodiments iSCSI protocol version numbering is used to enable protocol backward compatibility. In some embodiments data structures communicated between pluggable modules include version identification.

Storage Gateway Configuration

Various storage gateway behaviors and elements require configuration specification and management, including VLAN assignment, internal zoning, and LUN masking. Storage gateway configuration settings, including VHBA configuration data, may be provided by a variety of mechanisms, according to embodiment, including any combination of explicit and derived values. Explicit values are typically provided manually by system administration personnel and identify configuration options at a relatively low-level (such as assigning a specific VHBA to a specific FC port). Derived values may be generated by SW based on required resource statements (such as numbers of VHBAs and respective bandwidth allocations) provided automatically or by system administration personnel. Derived values may also be computed by SW based on relatively high-level storage system requirements specifications (such as any combination of performance, reliability, and uptime)

Storage Gateway VLAN Assignment Configuration

Figure 20A:
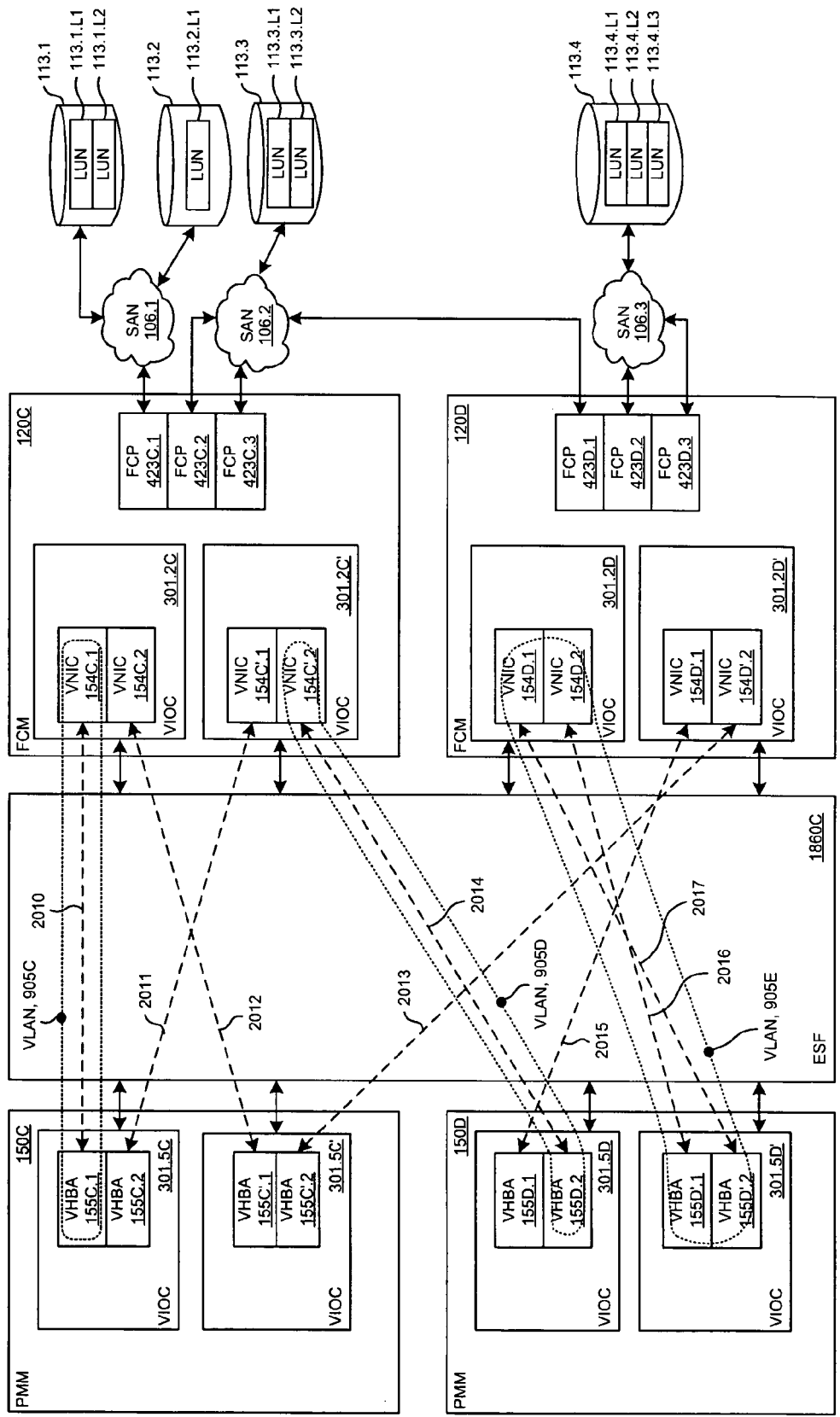
FIG. 20A illustrates an embodiment of Virtual Local Area Network (VLAN) assignment with respect to an ES system storage gateway.

FIG. 20A illustrates an embodiment of VLAN assignment with respect to an ES system storage gateway. Two provisioned servers (each having a PMM) access storage resources via two FCMs. Each PMM implements four VHBAs (two in each of two VIOCs), and each FCM implements four VNICs (two in each of two VIOCs). The VHBAs and VNICs are operated according to four VLANs (only three of which are illustrated, for simplicity). VLAN 905C includes VHBA 155C.1 and VNIC 154C.1. VLAN 905D includes VHBA 155D.2 and VNIC 154C'.2. VLAN 905E includes VHBA 155D'.1, VHBA 155D'.2, VNIC 154D.1, and VNIC 154D.2. A fourth VLAN (not shown) includes the remaining VHBAs and VNICs: VHBA 155C.2, VHBA 155C'.1, VHBA 155C'.2, VHBA 155D.1, VNIC 154C.2, VNIC 154C'.1, VNIC 154D'.1, and VNIC 154D'.2.

In usage scenarios where the PMMs and FCMs are included in a single chassis, the SF may be considered a local SF, and the VLANs are internal to the single chassis. In usage scenarios where the PMMs and FCMs are distributed throughout two or more chassis, the SF may be considered an ESF, and one or more of the VLANs may span multiple chassis. Storage gateway VLAN configurations may include arbitrary numbers of elements arranged in various topologies, and are limited only by available resources.

In some embodiments configuration processing includes assigning VHBAs to one or more VLANs, according to required security and performance requirements. Typically the VLANs are associated with one or more provisioned servers of an ES system (see VLANs 905A and 905B of FIG. 9B, for an example context). In some usage scenarios VLAN requirements (as represented conceptually by L2/L3 Switch 930 of FIG. 9B, for example), including PMM partition membership in one or more VLANs, are specified before configuration of VHBAs. Subsequently VHBAs are allocated within the PMM partitions, associated with FC ports, and then VLANid values are assigned to the elements of each of the VLANs.

In some embodiments assigning VLANid values includes programming selected registers included in the initiator portion, the target portion, or both of the storage gateway. Since the initiator portion may implement VHBAs in part using VNICs of VIOCs, and the target portion may include VNICs of VIOCs, configuring VLANs may include programming VIOCs. The VIOC programming includes writing VLANid registers (such as VLANid 617.1 of FIG. 6A) in any combination of one or more VIOCs included in a PMM, an FCM, an OLB, and an FCM/OLM, according to embodiment and usage scenario. For example, a VNIC VLANid register corresponding to VHBA 155C.1 and the VLANid register of VNIC 154C.1 are both written with a VLANid corresponding to VLAN 905C.

While a provisioned server is operational, VLAN membership (including membership associated with storage gateways) may be changed dynamically by system administration personnel or automatically by OS processes, as required. For example, the VNIC VLANid register corresponding to VHBA 155C.1 and the VLANid register of VNIC 154C.1 may be written with a VLANid corresponding to VLAN 905D, effectively merging VLAN 905C and VLAN 905D.

Storage Gateway Internal Zoning Configuration

Figure 20B:
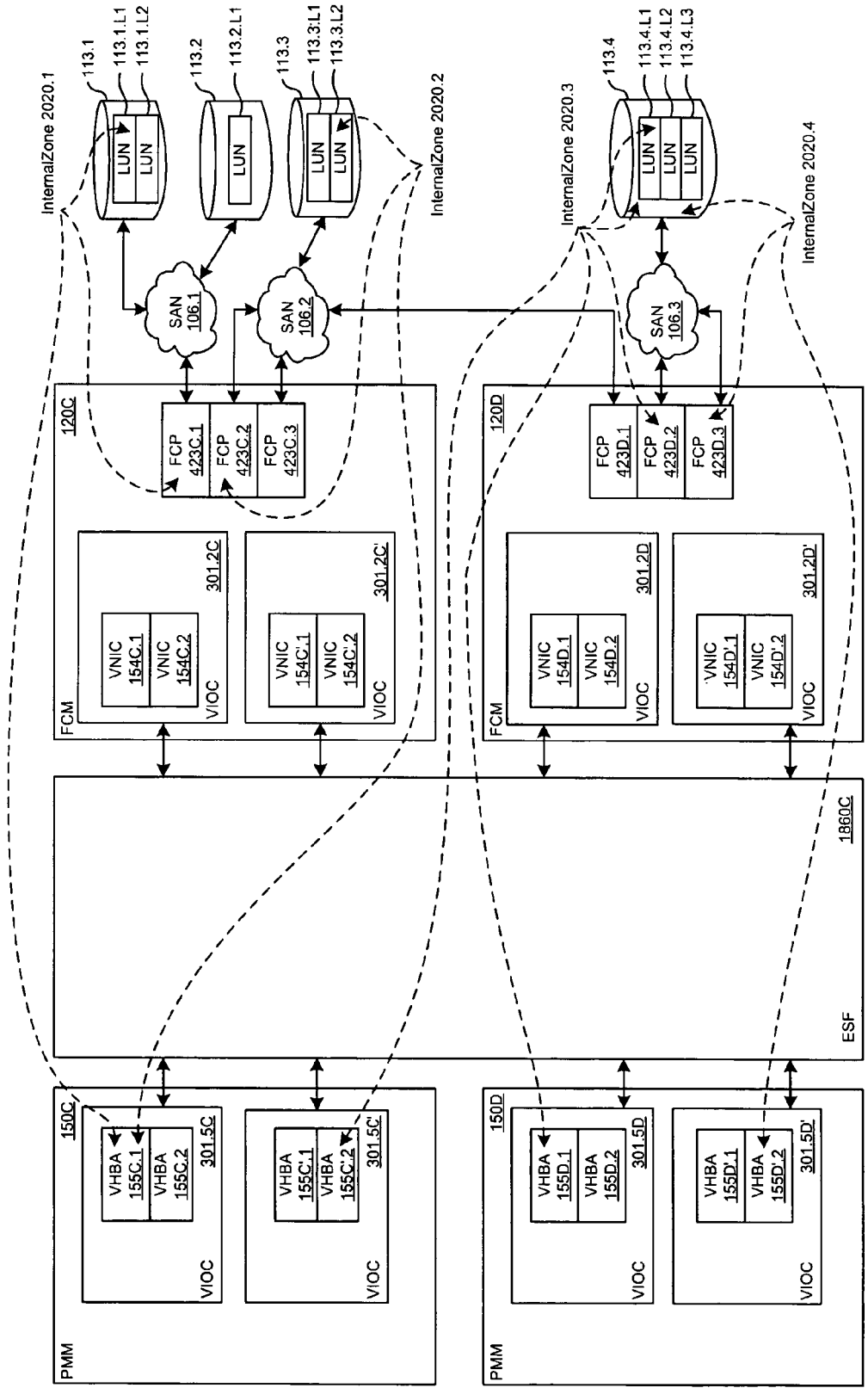
FIG. 20B illustrates an embodiment of storage gateway zoning in an ES system.

FIG. 20B illustrates an embodiment of storage gateway zoning in an ES system. The ES system and associated context are identical to that of FIG. 20A, but instead of illustrating VLAN assignment, four internal zones are illustrated. InternalZone 2020.1 includes VHBA 155C.1, FCP 423C.1, and LUN 113.1.L1, while InternalZone 2020.2 includes VHBA 155C.1, FCP 423C.2, and LUN 113.3.L2, thus permitting processes executing on PMM 150C to access storage on LUN 113.1.L1 and LUN 113.3.L2. InternalZone 2020.1 and InternalZone 2020.2 together are an example of a single VHBA being a member of more than one internal zone. InternalZone 2020.3 includes VHBA 155C'.2, VHBA 155D.1, FCP 423D.2, FC Disk Array 113.4, and optionally LUN 113.4.L1, and allows processes executing on either of PMM 150C and PMM 150D to access any portion of FC Disk Array 113.4 (or optionally only LUN 113.4.L1). InternalZone 2020.3 is an example of more than one VHBA being a member of a single internal zone. InternalZone 2020.4 includes VHBA 155D'.2, FCP 423D.3, and FC Disk Array 113.4, and permits processes executing on PMM 150D to access any element of FC Disk Array 113.4. InternalZone 2020.3 and InternalZone 2020.4 together are an example of a single target (FC Disk Array 113.4) being a member of more than one internal zone.

External zoning is not illustrated in the figure, but may include various combinations of SANs, Disks, and LUNs selected according to various access and protection requirements, varying by usage scenario. In some usage scenarios internal zoning may be configured to be more restrictive than external zoning.

Those of ordinary skill in the art will recognize that the illustrated internal zoning topologies are examples only, and that any number of variations in arrangement and number of internal zones and member elements are possible.

Configuring internal zoning includes enabling and disabling internal zoning as well as describing the name (i.e. tag) of the internal zone and the elements included in it. Typically internal zones are defined before VHBAs are configured. Internal zones may be conceptualized according to an internal zone table. Table 1, following, illustrates an example internal zone table.

TABLE 1

| Internal Zone Tag | | FCM | | | FC Ports | |
|---|---|---|---|---|---|---|
| Zone1 | | FCM1 | | | Port1 | |
| Zone2 | | FCM1 | | | Port2 | |
| Zone3 | | FCM2 | | | Port5 | |
| Zone4 | | FCM2 | | | Port6 | |
| VHBA Number or Name | VHBA WWN | FCM and Port Numbers | Internal Zone Tag | Target ID | LUN Number (Optional) | |
| VHBA1 | 50:06:0b:00: 00:1d:21:fd | FCM1, Port1 | Zone1 | Target1 | LUN1 | |
|  |  | FCM1, Port2 | Zone2 | Target3 | LUN5 | |

TABLE 1-continued

| VHBA4 | 60:06:0b:00: 00:1d:21:fd | FCM2, Port5 | Zone3 | Target4 | LUN6 |
| VHBA5 | 70:06:0b:00: 00:1d:21:fd | FCM2, Port5 | Zone3 | Target4 | LUN6 |
| VHBA8 | 80:06:0b:00: 00:1d:21:fd | FCM2, Port6 | Zone4 | Target4 | |

In Table 1 Internal Zone Tag entries Zone1-4 correspond respectively to InternalZones 2020.1-4. FCM entries FCM1-2 correspond respectively to FCM 120C-D. FC Port entries Port1-2 correspond respectively to FCP 423C.1-2, and entries Port5-6 correspond respectively to FCP 423D.2-3. VHBA entries VHBA1, VHBA4, VHBA5, and VHBA8 correspond respectively to VHBA 155C.1, VHBA 155C'.2, VHBA 155D.1 and VHBA 155D'.2. Target ID entries Target1, Target3, and Target4 correspond respectively (in some embodiments) to FC Disk Array 113.1, FC Disk Array 113.3, and FC Disk Array 113.4. LUN Number entries LUN1, LUN5, and LUN6 correspond respectively to LUN 113.1.L1, LUN 113.3.L2, and LUN 113.4.L1. Zone tables are not limited to a single FCM per internal zone, as some usage scenarios may include a plurality of FCMs associated with a single internal zone. Zone tables are also not limited to a single LUN per target, as some usage scenarios may include a plurality of LUNs associated with a single target.

Entries in internal zone tables may be managed via any combination of CLI and GUI mechanisms (such as drag and drop to add VHBAs and FCMs to internal zones, and to add devices to VHBAs), according to embodiment. Management commands include operations to add, delete, modify, and query internal zoning information. In some embodiments any combination of FCM, FC port, and WWN information in internal zone tables is provided automatically by SW based on VHBA port selection or configuration. In some embodiments any combination of the FCM, FC port, and WWN information is protected from explicit manipulation by management commands. A plurality of internal zone tables may be created and managed. In some embodiments a single table instance is active for an ES system implemented as one or more chassis. In other embodiments each chassis in a system is managed by a respective table instance.

An Enable Internal Zoning command begins enforcement of internal zoning rules as specified by a selected internal zoning table. Changes to zoning tables are ignored until a subsequent Enable Internal Zoning command (referring to a table having the changes) is provided. Changes for offline devices are ignored (i.e. only changes to online devices such as VHBAs, FCMs, and targets are effective). When a VHBA is deleted from a provisioned server, all corresponding (active) internal zone table entries are deleted. However, if a VHBA is disconnected from a provisioned server (such as due to a failure or physical disconnection), then the internal zone table information is retained. If the disconnected VHBA is subsequently recovered, then the retained rules are automatically applied. In some embodiments WWN names corresponding to VHBAs included in a provisioned server are stored in a manner accessible to processes executing on the provisioned server. When a VHBA transitions to an on-line status (for example due to insertion of an FCM into a slot of a chassis) an associated WWN (if any) is located and corresponding internal zoning rules are enforced.

In some embodiments internal zoning configuration includes the following operations:
1. A user determines desired internal zones, and enters corresponding zone tags into a selected internal zone table (using CLI and/or GUI mechanisms). The user then selects and adds FCMs to the internal zones.
2. The user is now enabled to select from a set of available targets (typically identified by LUNs). The user determines a set of desired targets (as a subset of the available targets) and adds them to the internal zones as desired.

When a VHBA is being configured, it may be added to one or more existing internal zones or one or more newly created internal zones. Targets (identified by LUNs, for example) are then selected from available targets from the internal zones the configured VHBA is a member of. The selected targets are then added to the internal zone table target entry (or entries) associated with the configured VHBA.

Storage Gateway LUN Masking Configuration

Selective access as configured by the internal zones illustrated in FIG. 20B may also be configured, in another usage scenario, by LUN masking. Four LUN masking lists (one for each of VHBA 155C.1, VHBA 155C'.2, VHBA 155D.1, and VHBA 155D'.2) are used with LUN masking enabled. The LUN masking list for VHBA 155C.1 includes a LUN identifier for LUN 113.1.L1 and LUN 113.3.L2. In usage scenarios restricting access to FC Disk Array 113.4, the LUN masking lists for VHBA 155C'.2 and VHBA 155D.1 identify LUN 113.4.L1 (an example of more than one VHBA being allowed to access the same LUN). The LUN masking list for VHBA 155D'.2 identifies LUNs 113.4.L1-3, as VHBA 155D'.2 has access to all LUNs of FC Disk Array 113.4. With LUN masking enabled, each VHBA is permitted to access only LUNs on the respective LUN masking list for the VHBA.

Storage Gateway VHBA Provisioning and Configuring Procedures

Storage gateway configuration and provisioning conceptually includes discovering storage gateway targets (typically FCMs), joining external zones, discovering storage devices (typically disks), discovering LUNs (typically part of the disks), configuring one or more VLANs, and configuring one or more VHBAs. Configuring a VHBA typically includes configuring internal zoning, LUN masking, and optionally assigning failover and load balancing paths. Storage gateway discovery may be implemented via any combination of a Service Location Protocol (SLP), an Internet Storage Name Service (iSNS), and any other similar location and name service protocols.

Provisioning and configuring VHBAs, including setting up connections between VHBAs and LUNs, are performed via a variety of techniques, according to various embodiments. A first technique includes a system administrator providing relatively low-level provisioning and configuration information, while second and third techniques include the administrator providing respectively low-level and high-level storage resource requirements. The second and third techniques include SW processing to determine specifics of VHBA provisioning and configuration information.

Figure 21A:
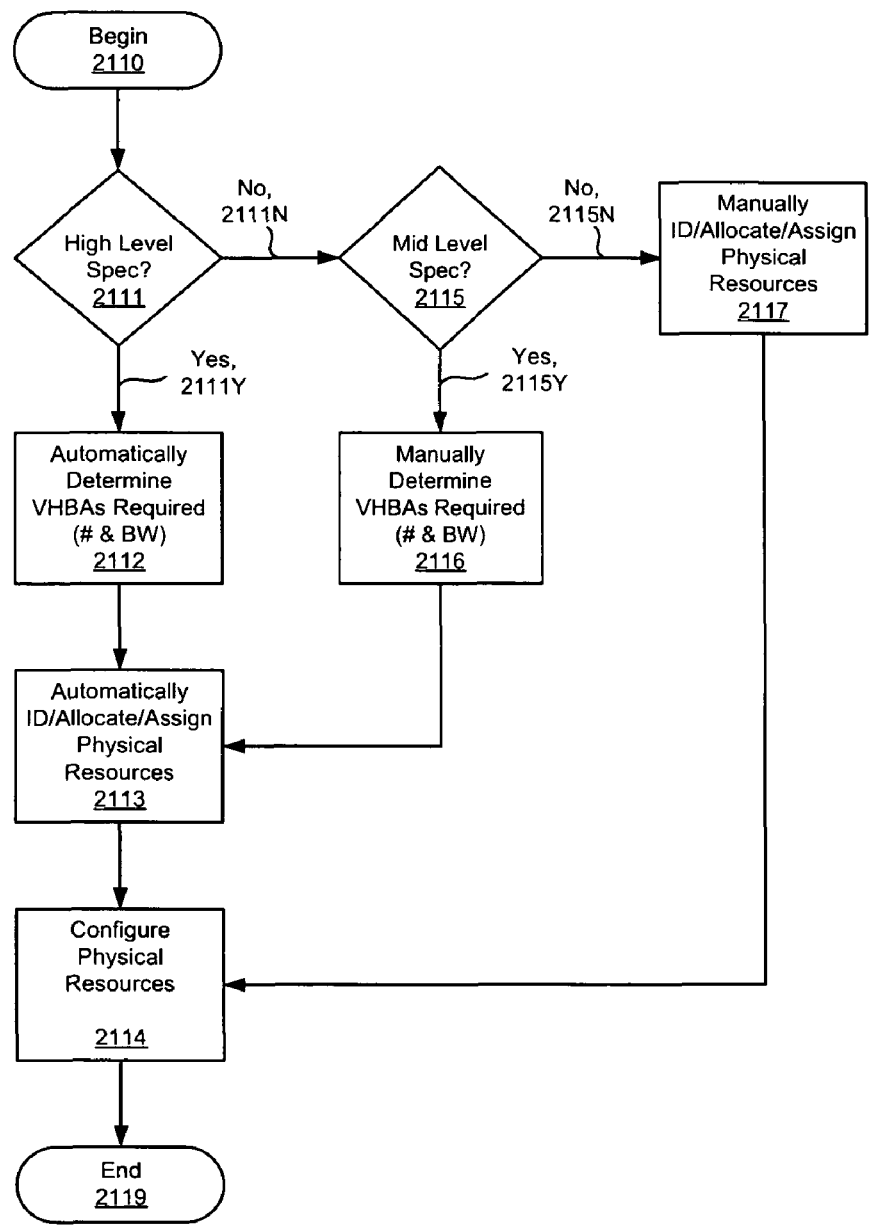
FIG. 21A illustrates selected details of an embodiment of processing relating to various techniques of VHBA provisioning and configuring.

FIG. 21A illustrates selected details of an embodiment of processing relating to various techniques of VHBA provisioning and configuring, including processing according to the aforementioned first, second, and third techniques. From an overview perspective, the first technique (based on relatively low-level provisioning and configuration information) includes processing associated with elements 2117 and 2114. The second technique (based on low-level storage resource requirements) includes processing associated with elements 2116, 2113, and 2114. The third technique (based on high-level storage resource requirements) includes processing associated with elements 2112, 2113, and 2114.

More specifically, flow starts ("Begin" 2110) and proceeds to determine if there is a high level storage resource requirement specification available according to the aforementioned third technique ("High Level Spec?" 2111). If so, then processing continues ("Yes" 2111Y) to compute (via SW processing) how many VHBAs are required to meet the requirements, and respective bandwidth requirements for each of the required VHBAs ("Automatically Determine VHBAs Required (# & BW)" 2112). Flow then proceeds to compute (via SW processing) specific physical elements to associate with the required VHBAs ("Automatically ID/Allocate/Assign Physical Resources" 2113). The physical elements are programmatically identified for use, and set aside (or allocated) by assigning the physical elements (or resources) to provide the required VHBAs. Processing then continues to program various mode and configuration information associated with the physical elements to prepare the elements for processing according to the requirements, such as writing values into registers such as VLANid 617.1, BW min 618.1*d*, and BW max 618.1*e* of FIG. 6A ("Configure Physical Resources" 2114). Processing according to the third technique is then complete ("End" 2119).

If a high level storage resource specification is not available, then processing continues ("No" 2111N) to determine if there is a low-level storage resource requirement (also known as a middle level specification) available according to the aforementioned second technique ("Mid Level Spec?" 2115). If so, then processing continues ("Yes" 2115Y) to manually determine (by a system administrator, for example) VHBAs required (number and respective bandwidths) to meet the middle level specification requirements ("Manually Determine VHBAs required (# & BW)" 2116). Flow then continues according to an ending portion of the third technique to assign (2113) and then configure (2114) the manually determined elements. Processing according to the second technique is then complete ("End" 2119).

If a middle level specification is not available, then flow proceeds ("No" 2115N) to manually assign physical elements (or resources) according to the aforementioned first technique characterized by low-level provisioning and configuration information ("Manually ID/Allocate/Assign Physical Resources" 2117). Flow then continues according to an ending portion of the third technique to configure the assigned elements (2114) and processing according to the first technique is complete ("End" 2119).

More specifically, the first technique generally includes the system administrator manually assigning VHBAs to specific FCMs and/or FC ports of FCMs, and assigning respective bandwidths to the VHBAs. A physical path is selected between a VHBA and one or more desired target LUNs. The path includes a VHBA (to act as an initiator) and an FCM having an FC port physically coupled to at least one of the desired target LUNs. The couplings between the FC port and desired target LUNs may (implicitly) include redundancy and failover capabilities that are transparent to the selection of VHBA to LUN physical paths. Additional redundancy and failover capabilities may be specified explicitly by providing multiple VHBAs and associated physical paths to target LUNs. An optional LUN masking list may be developed and associated with the VHBA.

The first technique includes various combinations of the following operations (typically executed by SW unless specified otherwise), according to embodiment:
1. A selected SCF is modified to specify VHBA parameters including a name, bandwidth requirement(s), an optional over-provisioning flag, an optional specific FCM location/selection, and an optional priority tag (high, medium, or low) relating to QoS.

2. In response to a command (such as "Create VHBA") a new VHBA is created according to the specified parameters. If the new VHBA name is already in use by another VHBA, then an error is returned and further configuration and provisioning operations are not possible for the new VHBA.

The following three operations may be performed in any order, according to various embodiments:

3. The required bandwidth is allocated (example values include 250, 500, 750, 1000, 1250, 1500, 1750, 2000, 4000, 6000, 8000, and 10000 Mb).
4. If the optional over-provisioning flag is asserted (allowing other VHBAs to share physical ports with the new VHBA), then dedicated FCM FC ports are not required for the new VHBA. If the over-provisioning flag is omitted or deasserted, then one or more FCM FC ports are dedicated to the new VHBA.
5. If the optional FCM location/selection is present, then an available FC port on the identified FCM is allocated to the new VHBA.

At this point the resultant VHBA profile may be saved in a specified SCF, at the specific request of the system administrator or automatically by SW. If the administrator desires to dynamically add the resultant VHBA profile to a currently running provisioned server, then some or all of the following operations are performed:

6. The VHBA configuration is included in the SCF corresponding to the running provisioned server.
7. If internal zoning is enabled, the administrator adds the VHBA to at least one internal zone. In some embodiments this is performed by associating the VHBA to an existing internal zone tag. Subsequently a corresponding entry for the VHBA is automatically created in the internal zone table associated with the running provisioned server. Additional internal zones may be added as desired for the VHBA. Note that the internal zone table FC port information is determined automatically by SW in part based on VHBA port selection.
8. The administrator then selects one or more target LUNs from a target LUN selection pool. If internal zoning is disabled, then the LUN selection pool includes all targets physically accessible via the VHBA. If internal zoning is enabled, then the LUN selection pool includes only targets that are included in the internal zones the VHBA is a member of. The selection process corresponds to creating a LUN masking or mapping list. In some embodiments the LUN selection may be communicated in the form of CLI commands such as "Connect VHBA_name TargetLUN_name". If internal zoning enabled, then the command is effective only if the requested target is a member of an internal zone the VHBA is also a member of, and otherwise an optional error message is returned. A command (such as "ShowIO") may be provided to generate a listing of LUNs accessible for a selected VHBA. If the VHBA bandwidth is greater than what is available from a single FC port (of an FCM), then separate target LUN lists for a plurality of FC ports are specified.
9. Optionally the administrator may initiate a command (such as "Show Available Ports") to determine FC ports reachable by a specified VHBA (after accounting for VLAN and internal zoning restrictions) and having connectivity to desired LUNs. Response information may include multiple paths (if such paths are defined and available). Path information typically includes a port name that is unique to an ES system (such as System#-Chassis#-FCM#-Port#), a chassis identifier, an FCM identifier, and an FC port identifier. If no paths are available (due to lack of connectivity or bandwidth, for example), then explanatory information is provided instead. The response information includes remaining bandwidth for each respective FC port, and typically FC ports are ordered by unallocated bandwidth (those ports having highest available capacity being listed first).
10. The administrator selects one or more available FC ports to assign to the VHBA. In some usage scenarios the administrator selects an available FC port having greater than the required capacity, thus enabling dynamically increasing the VHBA bandwidth at a later time, as such increases are possible only when the physical port has sufficient available bandwidth. Multiple FC ports may be assigned to obtain higher bandwidth. If an invalid FC port is selected or the selected port lacks required bandwidth, then an error is reported and the selection has no effect.
11. The administrator then issues a command (such as "Commit VHBA") to activate a specified VHBA.
12. A unique WWN name is automatically created for the VHBA. In some embodiments the WWN is inaccessible to agents outside of the ES system.

The aforementioned operations of the first technique are repeated as necessary for each desired VHBA, including VHBAs that participate in multipathing. A VHBA may be disabled while it is in use in a running provisioned server, or while the provisioned server is offline. Typically processes accessing files via the VHBA are gracefully terminated (after warning users, for example), all associated file systems are unmounted, and the VHBA is removed from any active volume manager SW configurations. A disabled VHBA may be deleted from the provisioned server. A VHBA may be enabled at any time.

The optional VHBA priority tag parameter is interpreted as follows. A high priority guarantees requested bandwidth all of the time. A medium priority guarantees a specified minimum bandwidth and additional resources up to a maximum bandwidth may also be made available, depending on otherwise unused bandwidth. A low priority results in a best effort operation, wherein a low priority VHBA may not receive any bandwidth when all available bandwidth is consumed by medium and high priority VHBAs. If the priority tag is omitted, then a high priority is assigned if the optional over-provisioning flag is not present.

In some embodiments a VHBA priority tag is provided and no bandwidth requirements are specified. A high priority guarantees all available bandwidth (irrespective of the optional over-provisioning flag), at the expense of VHBAs having medium and low priorities and sharing the same underlying resources (such as VIOCs, FCPs, or both). In some embodiments if multiple high priority VHBAs share an underlying resource, then the resource is apportioned between the high priority VHBAs sharing the resource.

The optional over-provisioning flag enables over-provisioning with respect to the VHBA. In some embodiments VHBAs allowing over-provisioning may not share FCM FC ports with VHBAs not allowing such over-provisioning. In other words, if one FC port on an FCM is associated with a VHBA having an over-provisioning flag, then all VHBAs associated with any of the FC ports on the FCM also have respective over-provisioning flags (such VHBAs may be said to be operating in an over-provisioned environment). In some embodiments, all of the VHBAs in an over-provisioned environment are not specifically assigned bandwidth and are restricted to having optional priority tag values of medium and low. In some embodiments VHBAs in an over-provisioned environment and having an optional priority tag value of medium receive a guaranteed specified minimum bandwidth up to a specified maximum bandwidth.

The second technique generally includes a system administrator indicating a number of required VHBAs and required respective bandwidths. Processing by SW then determines specific VHBAs and associated configuration parameters (including bandwidths), and then allocates specific FCMs and/or FC ports of FCMs for assignment to the VHBAs.

The second technique begins with operations similar to the aforementioned operations (1) through (8) of the first technique. Subsequently various combinations of the following operations are performed (typically by SW unless specified otherwise), according to embodiment:

13. A pool of available FC ports is developed based on the VHBA VLAN and internal zoning membership. One or more FC ports are selected from the available pool for assignment to the VHBA. Priority is given to selecting FC ports that are unused, thus enabling HA, since failure of an FC port that is dedicated to a single VHBA affects only the single VHBA. If no unused FC ports are available, then priority is given to selecting FC ports having relatively higher available bandwidth, thus enabling subsequent dynamic increasing of bandwidth allocated to the VHBA. If connectivity or available bandwidth is lacking, than error information is provided and processing is complete.

14. After a VHBA is successfully created, a port identifier (FCM identifier and FC port identifier) and path (including a chassis identifier) associated with the VHBA are provided.

15. A command (such as "Commit VHBA") is then used to activate a specified VHBA, and a unique WWN (typically private to the ES system) is automatically created.

Similar to the first technique, the aforementioned operations of the second technique are repeated as necessary for each desired VHBA (including those for multipathing). In some embodiments a command (such as "Recreate VHBA") may be provided and used to create a clone VHBA with attributes matching an existing VHBA. A VHBA created with the second technique may be managed and deleted similarly to a VHBA created with the first technique.

FIGS. 21B-E illustrate selected details of an embodiment of processing relating to VHBA provisioning and configuring. Operations associated with the first and the second techniques are illustrated in context. In some usage scenarios a system administrator desires to specify particular paths between one or more VHBAs and selected targets, typically to provide specific failover and load balancing capabilities. The first technique is typically used to set up the specific paths, as the second technique lacks such capabilities.

Figure 21B:
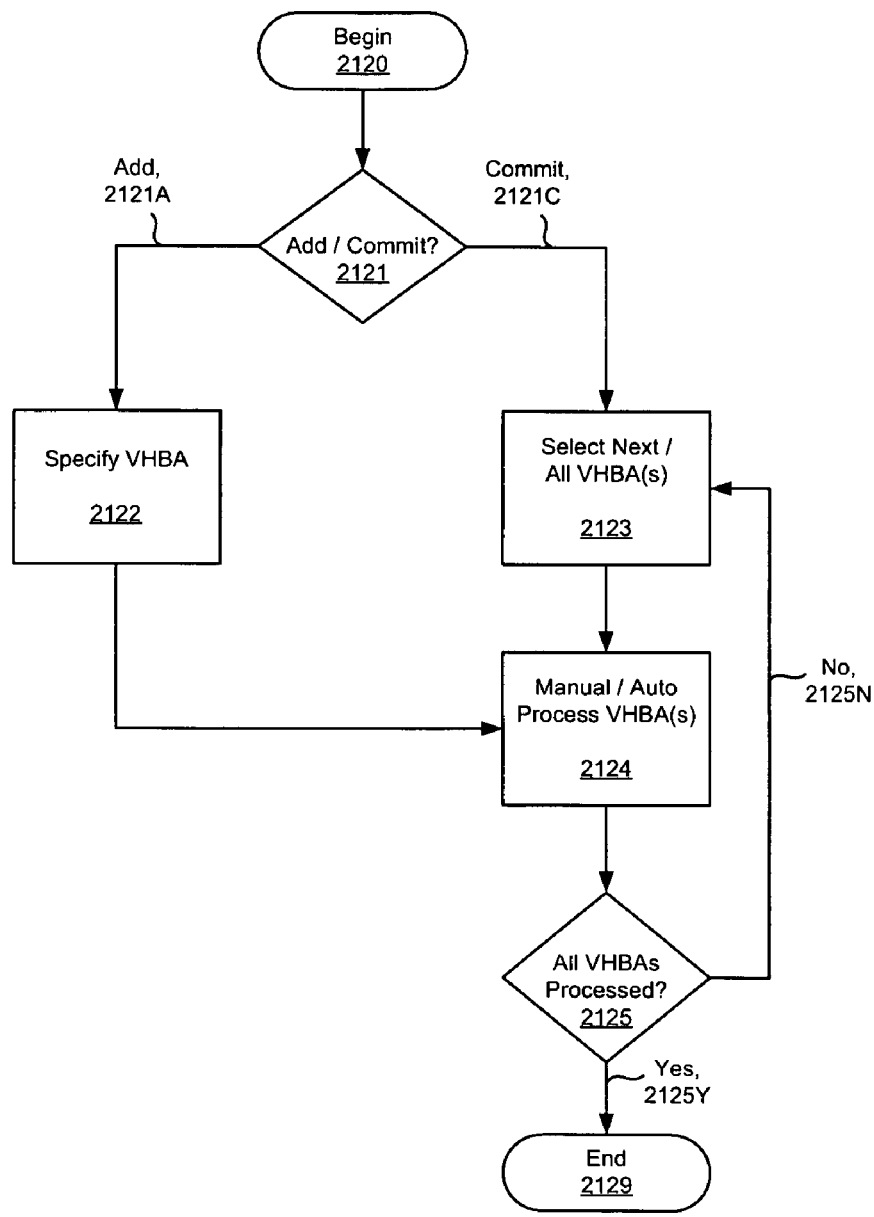
FIGS. 21B-E illustrate selected details of an embodiment of processing relating to VHBA provisioning and configuring.

More specifically, FIG. 21B illustrates selected details of an embodiment of a top level flow for provisioning and configuring one or more VHBAs. Two usage scenarios are illustrated. In a first usage scenario, a VHBA is configured in an SCF (i.e. "added" to the SCF) or dynamically included in a live (online) server (i.e. "added" to the server). In a second usage scenario, one or more VHBAs are brought online to a live server (i.e. "committed" to the server). Processing for the two scenarios starts ("Begin" 2120) and proceeds to determine if a VHBA is being added to an SCF or live server, or if VHBAs are being committed to a live server ("Add/Commit?" 2121). If a VHBA is being added ("Add" 2121A), corresponding to the first scenario, then flow proceeds to state characteristics associated with the VHBA being added ("Specify VHBA" 2122). In some embodiments and/or usage scenarios (not specifically shown in the figure) processing is then complete (for example when the VHBA is added to an SCF without specifying physical devices or resources). In some embodiments and/or usage scenarios (as illustrated in the figure) processing continues to specify and assign physical devices associated with the specified VHBA ("Manual/Auto Process VHBA(s)" 2124). Flow then continues to determine if all VHBAs are processed ("All VHBAs Processed? 2125). In the case of a VHBA being added, there is only a single VHBA, so all VHBAs have been processed ("Yes" 2125Y). Processing for adding a VHBA is then complete ("End" 2129).

If a VHBA is being brought online to a live server ("Commit" 2121C), corresponding to the second scenario, then flow proceeds to choose either a next VHBA to process or to choose all remaining VHBAs to process ("Select Next/All VHBA(s)" 2123). Processing is thus either one-at-a-time (a single VHBA) or all-at-once (all VHBAs) according to various embodiments and usage scenarios. Flow then continues to specify and assign physical devices associated with either the single chosen VHBA or all remaining VHBAs ("Manual/Auto Process VHBA(s)" 2124). Flow then continues to determine if all VHBAs are processed ("All VHBAs Processed? 2125). In the case of all-at-once processing, all VHBAs have been processed ("Yes" 2125Y), and processing for committing VHBA(s) is then complete ("End" 2129). In the case of one-at-a-time processing, if any VHBAs remain to be processed, then flow loops back ("No" 2125N) to choose another VHBA for processing. If all VHBAs are processed ("Yes" 2125Y), then processing for committing VHBA(s) is then complete ("End" 2129).

Figure 21C:
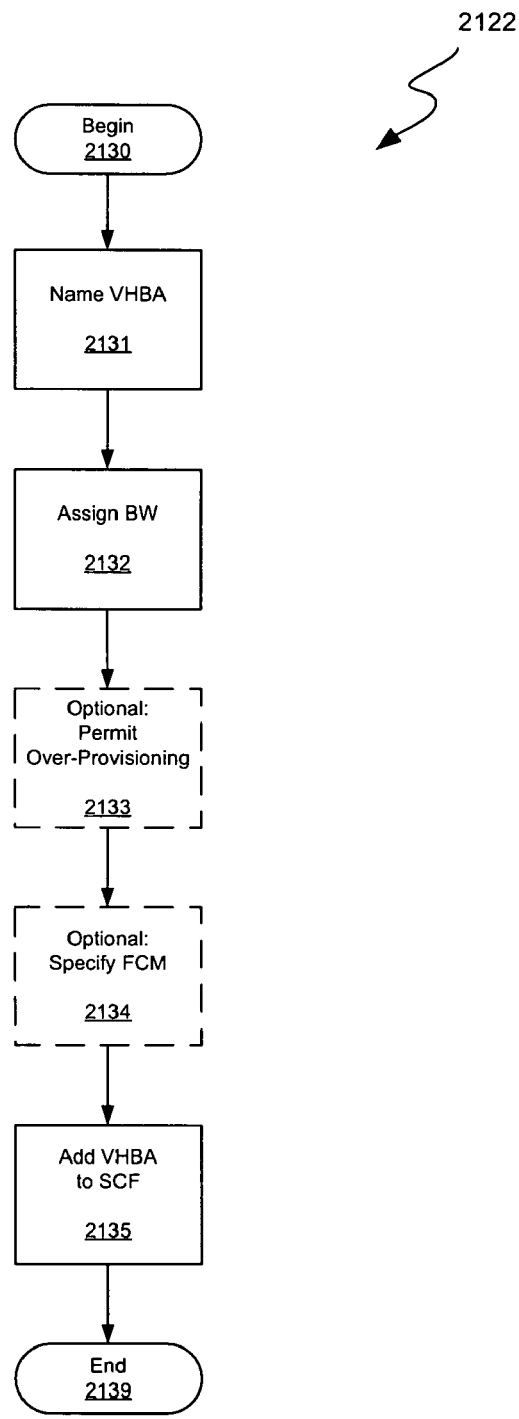

FIG. 21C illustrates selected details of an embodiment of processing associated with "Specify VHBA" 2122. Flow starts ("Begin" 2130) and proceeds to create an identifier associated with the VHBA being specified ("Name VHBA" 2131). Processing continues to specify bandwidth associated with the VHBA ("Assign BW" 2132). The specified bandwidth values may include 500 Mb, 1.0 Gb, 1.5 Gb, 2.0 Gb, 4.0 Gb, 6.0 Gb, 8.0 Gb, and 10.0 Gb. Flow then proceeds to optionally specify whether over-provisioning is allowed with respect to the VHBA ("Optional: Permit Over-Provisioning" 2133). Processing continues to optionally identify a specific FCM to allocate a portion of for interfacing to FC resources accessed via the VHBA ("Optional: Specify FCM" 2134). Flow then continues to add the VHBA and the specified information (including any combination of name, bandwidth, over-provisioning permission, and FCM assignment) to an SCF ("Add VHBA to SCF" 2135). Processing is then complete ("End" 2139). Any portion of the specified information may be provided by a system administrator, according to various embodiments.

Figure 21D:
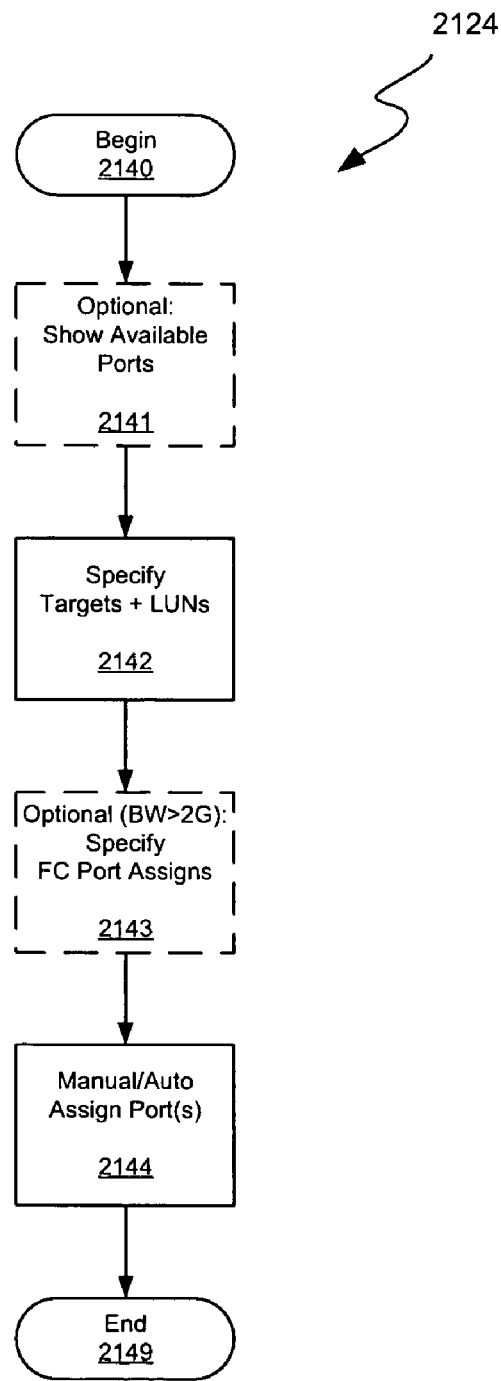

FIG. 21D illustrates selected details of an embodiment of processing associated with "Manual/Auto Process VHBA(s)" 2124. In the context of the figure, processing may be performed for a single VHBA (such as the aforementioned one-at-a-time scenario), or for a plurality of VHBAs (such as the aforementioned all-at-once scenario). Processing starts ("Begin" 2140) and proceeds to optionally display unused (or free) ports ("Optional: Show Available Ports" 2141). Flow then continues to identify target FC devices (such as disks) and included LUNs ("Specify Targets+LUNs" 2142). In some embodiments system administrators or customers may enter target and LUN information in an instance profile, assign a name to the profile, save the profile, and at a later time associate a VHBA being configured with the saved instance profile. If bandwidth associated with the VHBA being processed is greater than what is available through a single port (such as 2.0 Gb), then specific FC port target associations may be provided, according to implementation ("Optional (BW>2

G): Specify FC Port Assigns" 2143). For example, first and second targets may be associated with respective first and second FC ports. The associated targets may be according to an entire disk array or portion thereof (such as a LUN), according to various implementations. Processing then continues to allocate specific FC ports, in accordance with any optionally provided FC port target associations ("Manual/Auto Assign Port(s)" 2144). Flow is then complete ("End" 2149).

Figure 21E:
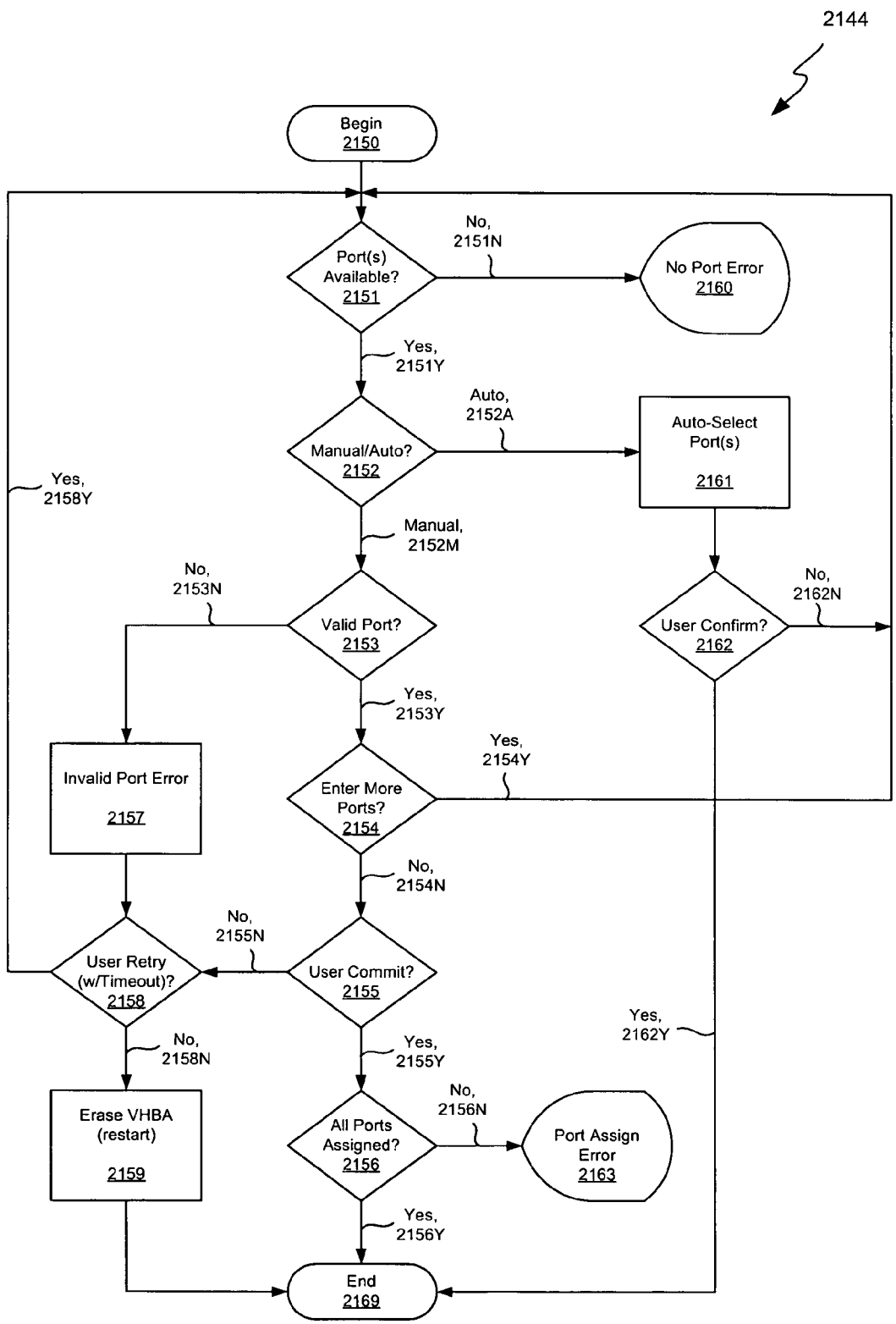

FIG. 21E illustrates selected details of an embodiment of processing associated with "Manual/Auto Assign Port(s)" 2144. In the context of the figure, processing may be performed for a single VHBA (such as the aforementioned one-at-a-time scenario), or for a plurality of VHBAs (such as the aforementioned all-at-once scenario). At an overview level, processing is broadly according to a "manual" scenario (with a non-error flow including 2153, 2154, 2155, and 2156) and an "automatic" scenario (with a flow including 2161 and 2162). The manual flow generally corresponds to processing unique to the aforementioned first technique, while the automatic flow generally corresponds to processing unique to the aforementioned second technique.

More specifically processing starts ("Begin" 2150) and proceeds to determine if there are free (or unused) ports ("Port(s) Available?" 2151). If ports are free ("Yes" 2151Y), then processing continues to determine if manual or automatic port selection/assignment is to be performed ("Manual/Auto?" 2152). If there are no free ports ("No" 2151N), then it is not possible to assign any ports and an error message is delivered ("No Port Error" 2160). In some embodiments processing is then complete (as illustrated), and in some embodiments an opportunity is provided to free up ports and try again (not illustrated).

Manual processing ("Manual" 2152M) flow proceeds to determine if a legal port value has been provided, such as by a system administrator ("Valid Port?" 2153). If the entered port is legal ("Yes" 2153Y), then processing continues to determine if additional ports need to be processed, such as due to a required bandwidth greater than the maximum bandwidth available from a single port ("Enter More Ports?" 2154). If more ports are to be entered ("Yes" 2154Y), then flow loops back to process additional ports starting by determining if any ports are free ("Port(s) Available?" 2151). If no more ports are to be entered ("No" 2154N), then flow continues to determine if a command to accept (or commit) the port information has been provided ("User Commit?" 2155). If the port information is accepted via the command ("Yes" 2155Y), then processing proceeds to check that all required ports have been provided ("All Ports Assigned?" 2156). If all required ports have been provided ("Yes" 2156Y), then manual processing completes by automatically assigning an ID and a WWPN for the VHBA. The VHBA is then brought online to a live server or saved in an SCF (with an associated server optionally committed), according to usage scenario ("End" 2169).

If the entered port is not legal ("No" 2153N), then flow proceeds to display an invalid port error message and solicit replacement port information ("Invalid Port Error" 2157). Flow then continues to determine if another attempt is desired ("User Retry w/Timeout?" 2158). Processing also continues to await another attempt if the port information is not accepted ("No" 2155N). If a retry attempt is desired ("Yes" 2158Y), then flow returns to enable further system administrator input ("Port(s) Available?" 2151). If another attempt is not desired, or if greater than a maximum time period elapses while waiting for a request for another attempt ("No" 2158N), then the VHBA information is removed, i.e. undone, and all work in progress associated with the VHBA is discarded ("Erase VHBA (restart)" 2159). Manual processing is then complete ("End" 2169).

If all required ports have not been provided after the port information is accepted ("No" 2156N), then a port assignment error message is displayed ("Port Assign Error" 2163). In some embodiments (illustrated) manual processing is then complete. In other embodiments (not illustrated), a retry attempt may be enabled by looping back in the flow and starting processing over ("Port(s) Available?" 2151).

Returning to automatic processing ("Auto" 2152A), flow proceeds to programmatically identify specific ports to associate with one or more VHBAs ("Auto-Select Port(s) 2161). Processing then continues to display the identified ports for all of the VHBAs and solicit acceptance from a system administrator ("User Confirm?" 2162). If the selection is accepted ("Yes" 2162Y), then automatic processing completes by automatically assigning ID(s) and WWPN(s) for the VHBA(s). The VHBA(s) are then brought online to a live server or saved in an SCF (with an associated server optionally committed), according to usage scenario ("End" 2169). If the selection is not accepted ("No" 2162N), then processing loops back to make another attempt ("Port(s) Available?" 2151).

In some embodiments "Manual/Auto?" 2152 corresponds to explicit operations performed by any combination of system administrators and computational elements, such as an implementation programmatically determining if a higher-level VHBA requirement is present (as in "High Level Spec?" 2111 of FIG. 21A, for example), and if so invoking the automatic flow. In some embodiments "Manual/Auto?" 2152 corresponds to implicit operations such as an implementation operating only with manual port assignment/selection, or an implementation operating only with automatic port assignment/selection.

The third technique generally includes a system administrator providing a high-level description of storage requirements, including information such as required performance, reliability, failover, and uptime characteristics). Subsequently management SW included in an ES system embodiment (or third-party SW executing on the ES system) determines required VHBA resources (such as number and respective bandwidths). Then SW proceeds to determine specific VHBAs and associated configuration parameters, as in the second technique.

In some embodiments SCSI routers may be explicitly provisioned (by any combination of CLI and GUI commands, for example). In some implementations provisioning a SCSI router is directed toward configuring a selected FCM. For example, a SCSI router configuration command may specify an associated FCM via a slot number (referring to a pluggable module location in an ES system chassis). Configuration parameters provided during SCSI router configuration include any combination of a name, selection of a particular VNIC within a specified FCM, a VLAN identifier, a bandwidth or speed requirement, an IP address, and a username/password for accessing the SCSI router.

Storage Gateway Configuration and Management Commands

Various commands are provided, according to embodiment, to enable management of storage gateway VHBAs, including functions for creating, deleting, showing, and modifying VHBAs and associated parameters (such as bandwidth), as well as statistics relating to VHBA, FCM and FC port performance.

Support for storage gateway configuration and management includes implementing MIBs according to any combination of various MIB standards. The MIB standards include Fibre Channel Element MIB (FE-MIB) (as described in RFC-2837), Fibre Alliance MIB version 4.0, TCP/IP MIB-II Groups (including features defined by groups such as system, interface, address translation, IP, ICMP, TCP, UDP, and SNMP groups), and other related standards. Commands to manage storage gateway configuration provide capabilities to modify FC port parameters (such as maximum command queue size and maximum frame size, and mode as arbitrated-loop or fabric-switch). Commands to manage FCMs provide for changing FCM World Wide Port/Node names, check and update firmware version, enable/assign class of service, reset an FCM and/or selected FC ports, and query a name server for an FC port.

Commands to show VHBA attributes provide information including any combination of a VHBA name or identifier, a WWN, a path (or paths) allocated to the VHBA (including chassis, FCM, and FC port identifiers), target device information (including type such as disk or tape, name, and LUN), and assigned bandwidth. Commands to show VHBAs may selectively provide information specific to a selected VHBA, all VHBAs included in a provisioned server, all VHBAs associated with a specific FCM, all VHBAs included in a specific HW module (such as a PMM or a chassis), and all VHBAs associated with an SF or portion thereof.

Commands to show FC port attributes provide information including any combination of physical port identifier, node/port/switch WWN(s), link speed, local/previous port identifier, and maximum frame size. Commands to show assigned resources and FC port attributes may selectively provide information relating to specific FC port (or ports), a specific FCM, a specific chassis, and an SF or portion thereof. Commands to display internal zoning information provide zoning information specific to a particular VHBA, collection of VHBAs accessible from a particular partition, or internal zoning information for an entire ES system.

Commands to show statistics provide information including performance per FC port, and optionally per PMM partition accessing the FC port. The performance information includes any combination of port identifier, PMM partition identifier, disk name, read and write operations (count and size) per second and cumulatively, waiting transactions (queue length), active transactions, service time, queue non-empty time or percent, and busy time. In some embodiments automatic polling to provide updated statistics information is supported (specified by an interval and a count, for example).

A command to show all devices connected to an FC port and optionally matching either a specific type or a specified name string provides descriptive information concerning the matching devices and available/reachable status information. A command to show port scan information provides status of all ports (including an on/off indication). A diagnostic command to enable analysis and debugging provides dump information into a data file for subsequent examination.

Those of ordinary skill in the art will recognize that any combination of the aforementioned commands (or related adaptations thereof) may be included in various embodiments, according to specific design requirements.

Storage gateway embodiments typically provide events (via Event Agent 552 of FIG. 5C, for example) and receive commands (via Command Agent 553, for example) with respect to FCMs. See the Real Time Server Provisioning and Management section, elsewhere herein, for further details regarding events and commands. For example, changes in VHBA status (such as due to changes in FCM status) typically result in reporting of one or more events via Event Agent 552. For another example, processing of the "Commit VHBA" command typically includes one or more lower-level commands communicated to selected FCMs by Command Agent 553.

Events relating to VHBAs, FCMs, and FC ports are classified into high-level categories including critical, major warning, minor warning, and information. Critical warnings include failures, faults, and unexpected status changes. Failures include loopback test, self-test, module installation, initialization, port initialization, failed port Authentication and DISCovery (ADISC), failed loop initialization, failover path activation (without VHBA failover), failover path activation (with VHBA failover), general VHBA failure, and assorted fatal and critical BMC events. Faults include defective or not ready FC driver, incomplete device login or PRocess LogIn (PRLI) timed out, error rate exceeding a threshold, faulty FCM condition, faulty FC port condition, and link downtime exceeding a threshold. Unexpected status changes or conditions include removed FCM, inbound data overflow, invalid SCSI request, invalid port state for FC Mass Storage Adapter, device removed from monitoring, and unexpected topology change.

Major warnings include unsupported protocol, device login timed out, incomplete ADISC, command rejected by device, FCM or FC port reset, no valid LUNs found, invalid LUN format, and missing command acknowledgement. Minor warnings include write transmission overflow, incomplete read transmission, receipt of unknown/unexpected frame, changed FC address, changed World Wide Port/Node Name, and various non-critical BMC events.

Information events include new FCM or FC port installed or on-line, FCM or FC port configuration or parameter changes, FCM shutdown, reset, or reboot events, FC port on-line, link status change, loopback or self-test status. Additional information events include error-induced log out, administrator-initiated topology change, device added to monitoring, SW upgrade complete, and SW version. Various embodiments provide various combinations of the aforementioned VHBA, FCM, and FC port events. Various implementations include reporting of information relating to specific errors as appropriate (such as module/port identifier, device name/address, checksum, and a HW/SW indicator).

In some embodiments various combinations of critical and major warning events result in configurable administrator notifications (such as any of e-mail, pop-up, and instant messaging). In some embodiments event information is retained in one or more log files accessible to system administrators, and the event information may include possible causes, recommended actions, or both.

Storage Gateway Configuration and Management Implementation

Storage gateway configuration operations are performed by cooperation amongst various management processes (typically executing on a Primary SCM), including an FCM Manager, a CM, an Interface Manager, a Platform Manager, and an Enterprise Manager (such as elements 541, 533, 537, 531, and 530, respectively, of FIG. 5B). Processes executing on the FCM (such as an FCM Agent or client) exchange configuration and status information with the FCM Manager.

In some embodiments the FCM Manager operates at a relatively higher level of abstraction, and implements policy definitions (such as internal zones), warnings, alerts, and error checking. The FCM Agent operates at a relatively lower level of abstraction, and implements associations between per VHBA FC Port/Target pairs. Policies implemented include any combination of:
- A VHBA access is restricted to a single FCM;
- A VHBA having access to an FCM may optionally have access to any combination of FC ports of the FCM (internal zoning and LUN masking may restrict such access);
- Internal zones (per FCM in some embodiments);
- A provisioned server may include a plurality of VHBAs associated with a plurality of FCMs, thus enabling multipathing, bandwidth aggregation, and related operations;
- A specific target may be included in one or more internal zones; and
- A specific target may be reached via only one FC port per VHBA, thus enabling deterministic bandwidth management by VNIC operations.

In some embodiments provisioning a server includes provisioning one or more VHBAs (and associated VNICs) as part of the server. The process of provisioning a VHBA is also known as "creating" a VHBA. Conceptually creating a VHBA includes one or more of the following operations:
- Creating (or assigning) a VNIC to assign to the VHBA, including specifying selected VNIC attributes such as VLANid and bandwidth;
- Specifying an IP address and a network mask for the VHBA;
- Assigning the VHBA to a SCSI router by specifying the IP address of the SCSI router (the VHBA and the SCSI router are configured to be on the same VLAN and subnet);
- Associating one or more internal zones with the VHBA;
- Assigning an FC port to every (reachable) target in the internal zones associated with the VHBA; and
- Enabling the VHBA, resulting in communication of VHBA provisioning parameters to underlying VHBA and appropriate FCM HW, and creation of per VHBA data structures by SW executing on the appropriate FCM.

In some embodiments selected attributes of a running provisioned server may be changed on the fly, including selected VHBA attributes such as enabled/disabled, bandwidth, internal zone membership, and FC port target associations. Specific examples include:
- Enabling (or disabling) the VHBA (performed in some embodiments by enabling or disabling a corresponding VNIC);
- Increasing (or reducing) bandwidth of the VHBA by modifying bandwidth parameters of the corresponding VNIC;
- Adding access to an internal zone with respect to the VHBA;
- Removing access to an internal zone with respect to the VHBA by removing all port associations for all targets known to the VHBA and belonging to the internal zone (i.e. port associations not shared by any other internal zone in the VHBA);
- Associating a new (target, port) pair with the VHBA (in some embodiments the new association is available after a variable delay); and
- Removing a previously associated (target, port) pair with respect to the VHBA (in some embodiments other operations such as unmounting filesystems and ceasing I/O activity are performed to prevent data loss and/or corruption).

In some embodiments internal zones may be modified on the fly. For example, targets may be added to internal zones, although in some implementations a corresponding target and port association is not visible to provisioned servers unless the corresponding target and port association was specified on a per VHBA basis. A target may be removed from an internal zone at any time if there are no port associations with any VHBAs. An internal zone may be removed if it is not associated with any VHBAs. Changes to internal zoning, including addition and removal of targets and internal zones, result in modifications to one or more corresponding internal zone tables (described elsewhere herein).

In some embodiments storage gateway management objects are represented by classes and other CIM-like related abstractions and representations. Relationships between the storage gateway management objects may be expressed as many-to-one, one-to-many, and many-to-many relationships. For example, selected relationships between elements of some types are illustrated in Table 2, following.

TABLE 2

|  | VHBA | SCSI Router | FCPort | Internal Zone | Target | Path |
|---|---|---|---|---|---|---|
| VHBA | x | M:1 | M:N | M:N | M:N | — |
| SCSIRouter | x | x | 1:N | 1:N | M:N |  |
| FCPort | x | x | x | — | M:N | M:N |
| Internal Zone | x | x | x | x | M:N | — |
| Target | x | x | x | x | x | M:N |
| Path | x | x | x | x | x | x |

Figure 22:
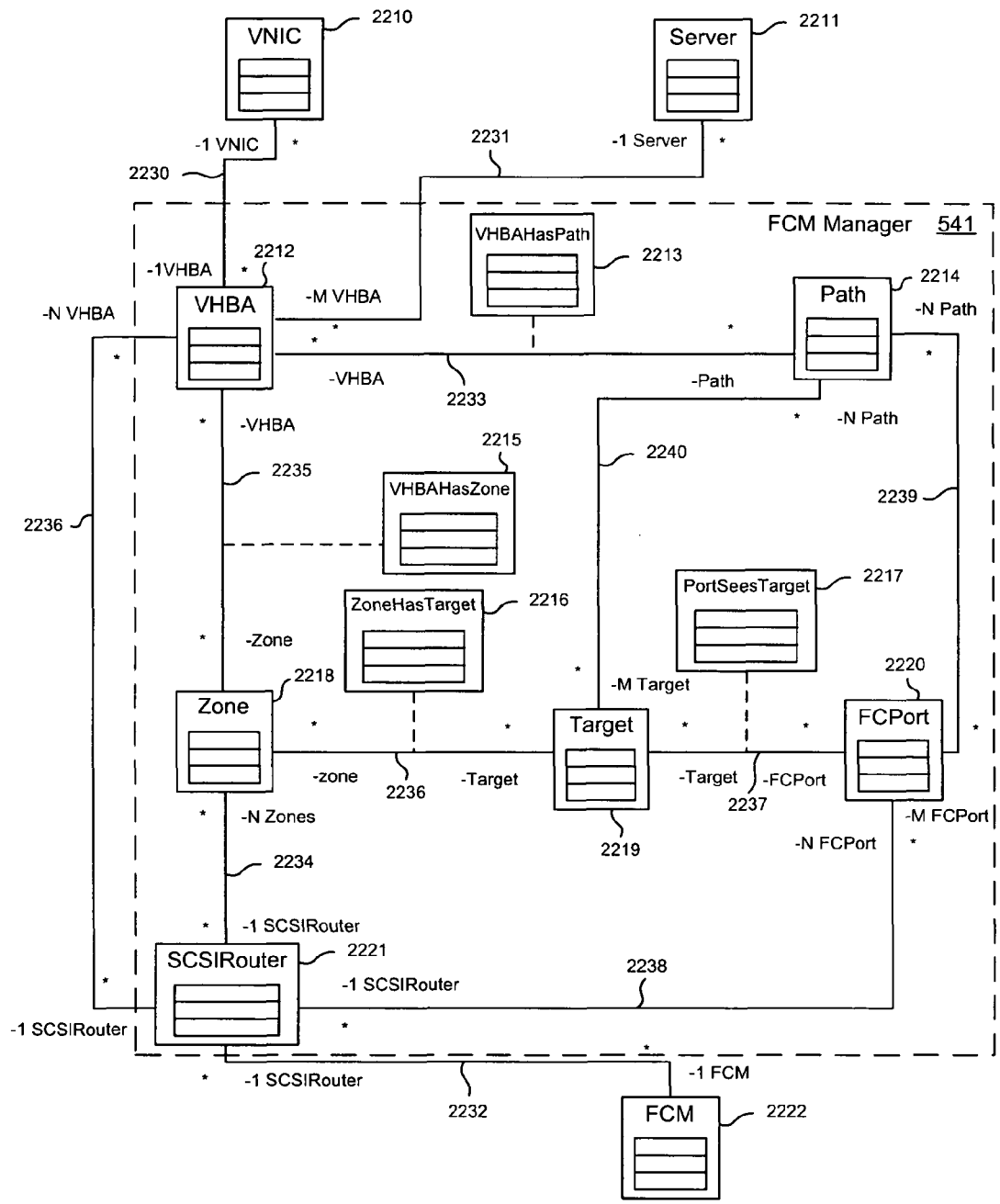
FIG. 22 illustrates selected elements of an embodiment of a data model as class objects for configuration and management of a storage gateway.

FIG. 22 illustrates selected elements of an embodiment of a data model as class objects for configuration and management of a storage gateway operating in a context of a provisioned server. FCM Manager 541 manages all the illustrated classes except the VNIC, (provisioned) Server, and FCM classes, as indicated conceptually by the dash-ed box enclosure. Various relationships defined include:
- VNIC Object 2210 is created by the CM. The relationship VNIC:VHBA 2230 is 1:1.
- Server Object 2211 is created by the CM. and a Server may have multiple VHBAs. However a VHBA may belong only to one Server so the relationship Server:VHBA 2231 is 1:M.
- FCM Object 2222 holds attributes of a corresponding FCM and is maintained by the CM. A SCSI Router Object 2221 holds attributes that are related to storage routing. The relationship FCM:SCSIRouter 2232 is 1:1.
- VHBA Objects 2212 define per VHBA information.
- Target Objects 2219 define per target information.
- FCPort Objects 2220 define per FCPort information.
- Path Objects 2214 define per VHBA FC Port/Target pairs. The Relationship 2233 between Path and VHBA is M:N and therefore an association object VHBAHasPath 2213 is created.
- Zone Objects 2218 define per zone items included in the respective zone.
- VHBAHasZone 2215 is an association class defining Association 2235 between internal zones and VHBAs and is an M:N relationship.
- ZoneHasTarget 2216 is an association class defining Association 2236 between internal zones and targets and is an N:M relationship.
- Relationship 2236 VHBA:SCSIRouter is N:1.
- Relationship 2234 SCSIRouter:Zone is 1:N (Zone is an internal zone).
- Relationship 2238 SCSIRouter:FCPort is 1:N.

FCPort and Target Relationship 2237 is M:N and related association Object PortSeesTarget 2217 describes the FCPort:Target association.

In some embodiments (not illustrated) the FCPort to Path relationship is M:N. In some embodiments (illustrated) FCPort is kept constant, and since the two keys to the Path are Target and FCPort, Relationship 2239 is reduced to 1:N, and no association object is used.

In some embodiments (not illustrated) the Path to Target relationship is M:N. In some embodiments (illustrated) Target is kept constant, and since the two keys to the Path are Target and FCPort, Relationship 2240 is reduced to 1:N, and no association object is used.

In some embodiments an interface compatible with all or portions of a standard storage management interface is implemented. An example standard storage management interface is a Storage Management Initiative Specification (SMI-S), as described by the Storage Networking Industry Association (SNIA) from http://www.snia.org/smi/tech_activities/smi_spec_pr/spec/SMIS_1_0_2_final.pdf, herein incorporated by reference for all purposes.

Storage Gateway RAS

Storage gateways typically provide capabilities for improved RAS. Elements such as VHBAs are implemented for HA and dynamic resource allocation and reallocation, and elements such as FCMs are implemented to support hot-swapping. Various combinations of manual and automatic failover and fail-back are supported by VHBAs and related SW, according to various embodiments.

A plurality of modes are available to support HA, including an Active-Active (load-balancing) mode and an Active-Standby (Failover) mode. Detected failover conditions include any combination of cable disconnect, controller failure, memory failure, and other HW failure, according to implementation. In some embodiments a provisioned server is configured to execute OS-hosted HA and multipathing SW (such as Linux running Veritas DMP, EMC PowerPath, or, HP SecurePath, or such as Windows Server running MultiPath I/O (MPIO) using PMM partition resources. Typically the system administrator configures a provisioned server to have multiple VHBAs (simultaneously accessible by the PMM partition allocated to the server) and then configures the multipathing SW to implement load-balancing and failover groups using the multiple VHBAs.

Some embodiments support configuration and management of load-balancing storage paths, each of which typically includes an aggregation of VHBAs. Failover usage scenarios may specify active and standby paths as a single VHBA path or a load balancing VHBA aggregation of paths. In some embodiments default load balancing group failover occurs when any number of the underlying VHBA paths fail, according to embodiment. For example, a first embodiment recognizes a failover when one VHBA path fails, a second embodiment fails over when all of the VHBA paths fail, and a third embodiment recognizes a failover when more than half of the VHBA paths fail. Other embodiments provide system administration specification of how many (or what fraction) of VHBA paths are specified to fail before a failover is recognized. In some embodiments failover/standby VHBAs are configured to use different FC ports than associated primary VHBAs, to enhance reliability. In some implementations failover/standby VHBA paths may be changed and reconfigured without affecting operations occurring on the related primary paths.

Bandwidth allocated to a VHBA may be dynamically increased or decreased on-the-fly, without interruption of in-progress IO operations, in response to manually provided commands (via a GUI or a CLI) or automatically generated commands (such as by system management SW). In some embodiments bandwidth adjustment is limited according to spare bandwidth available from the FC port the VHBA is associated with. Bandwidth relinquished by a decreased allocation to a VHBA is immediately available for allocation to other VHBAs. In some embodiments VHBA bandwidth adjustment granularity is 250 Mb.

In some embodiments commands and associated functions provide for reassigning a VHBA from one FC port to another without disruption of outstanding IO operations (i.e. replacing an existing VHBA with a new VHBA having a different configuration). A command (such as "Reconfigure VHBA") specifies an existing VHBA to modify. Operations according to the aforementioned first and second VHBA provisioning and configuring techniques are then performed to configure the new (or replacement) VHBA as desired, but the new VHBA is not visible until a second command (such as "Enable VHBA") is issued. In some embodiments the new VHBA is associated with an FC port that is distinct from the FC port of the VHBA that is being replaced. Subsequent to the second command traffic is gracefully migrated from the VHBA that is being replaced to the new VHBA.

In some usage scenarios (such as failure, upgrade, or removal of an FCM or failure of an FC port on an FCM) hot-swapping of FCMs is performed. If an FCM to be removed from service is running live traffic, then failover to other resources is performed to enable the live traffic (and future connections) to function without disruption. Graceful removal of an FCM typically includes configuring failover paths for all VHBAs implemented by the FCM and then activating the paths to backup VHBAs on backup FCMs (typically via multipathing SW). Power is then removed from the (now inactive) FCM and it is physically removed from the chassis it was operating in. After a replacement (or serviced) FCM is inserted a hot-swap may be performed again to move traffic to the replacement module. In some usage scenarios hot-swapping relating to removal of an FCM from service is not required, and the FCM is merely shutdown and removed from the slot.

Storage gateway embodiments are typically compatible with various Fibre Channel Protocol standards, including any combination of FCP, FCP-2, FCP-3, FC-GS-2, FC-GS-3, FC-SW-2, FC-PH Rev 4.3, FC-PH-2, FC-PH-3, SCSI-FCP, FC-Tape, FC-FS, and FC-FG standards, according to embodiment. Storage gateway embodiments are typically compatible with various FC topology standards, including any combination of FC-FLA, FC-PLDA, FC-PI, FC-PtoP, FC-AL (FC-AL2), and FC fabric (FL_Port and F_Port) standards according to embodiment. In some embodiments transport is via IP over FC (also referred to as FCIP, FC/IP, or FC tunneling) provided in addition to or instead of iSCSI transport. In some embodiments enhanced security is provided via Fibre Channel-Security Protocol (FC-SP) or similar security protocols. In some embodiments FC Registered State Change Notification (RSCN) related information is propagated to all affected VHBAs and SCSI layer instantiations.

Example Storage Gateway Usage Scenarios

Figure 23A:
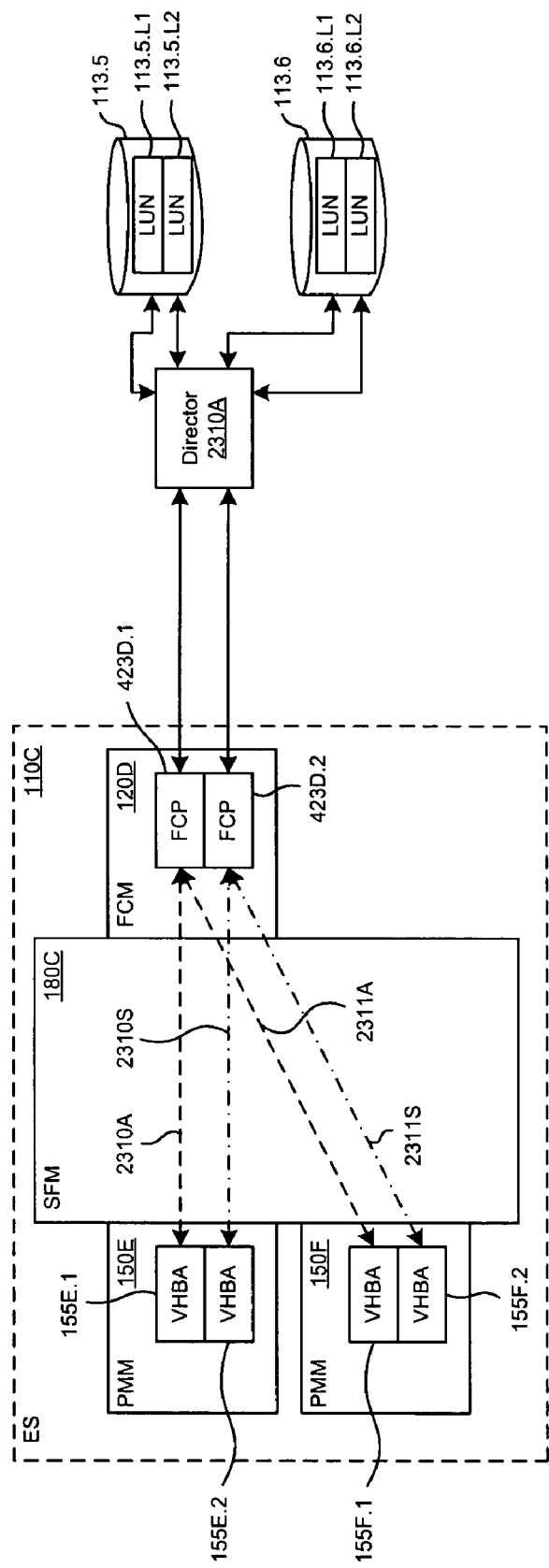
FIG. 23A illustrates selected elements of an embodiment of a storage gateway in a single chassis usage scenario.

FIG. 23A illustrates selected elements of an embodiment of a storage gateway in a single chassis usage scenario. The chassis implements ES 110C and includes PMMs 150E and 150F (each configured as a single partition running a single OS) and FCM 120D enabled for communication via SFM 180C. Each partition is allocated one active VHBA (VHBA 155E.1 and VHBA 155F.1 respectively) and one standby VHBA (VHBA 155E.2 and VHBA 155F.2 respectively). Each VHBA is allocated 1 Gb of bandwidth. VHBA 155E.1 and VHBA 155F.1 are associated with FC Disk Array 113.5 accessible via FCP 423D.1. VHBA 155E.2 and VHBA 155F.2 are associated with FC Disk Array 113.5 accessible via FCP 423D.2. Failover paths from VHBA 155E.1 to VHBA 155E.2 and VHBA 155F.1 to VHBA 155F.2 are implemented in active/standby mode using multipathing SW. Thus if FCP 423D.1 fails (active paths 2310A and 2311A), VHBA 155E.1 fails over to VHBA 155E.2 (standby path 2310S) and VHBA 155F.1 fails over to VHBA 155F.2 (standby path 2311S). After failover, VHBA 155E.2 and VHBA 155F.2 operate in active mode, accessing the targets via FCP 423D.2. In some usage scenarios, any combination of internal and external zoning as well as LUN masking is used to grant exclusive access to FC Disk Array 113.5 from PMM 150E, and to grant exclusive access to FC Disk Array 113.6 from PMM 150F, according to various implementations.

Communication between the illustrated VHBAs and FCPs, as illustrated by paths 2310A, 2310S, 2311A, and 2311S typically includes transport from each respective PMM to a switch fabric by one or more respective included VIOCs. Each VIOC implements respective VHBAs, typically in part using included VNIC functionality. Transport then continues from the fabric to a VIOC (implementing one or more VNICs) included on the FCM, and then proceeds to each respective FCP. The transport paths are bidirectional, with commands and data generally traveling from the VHBAs to the FCPs, and status and data generally traveling from the FCPs to the VHBAs.

Figure 23B:
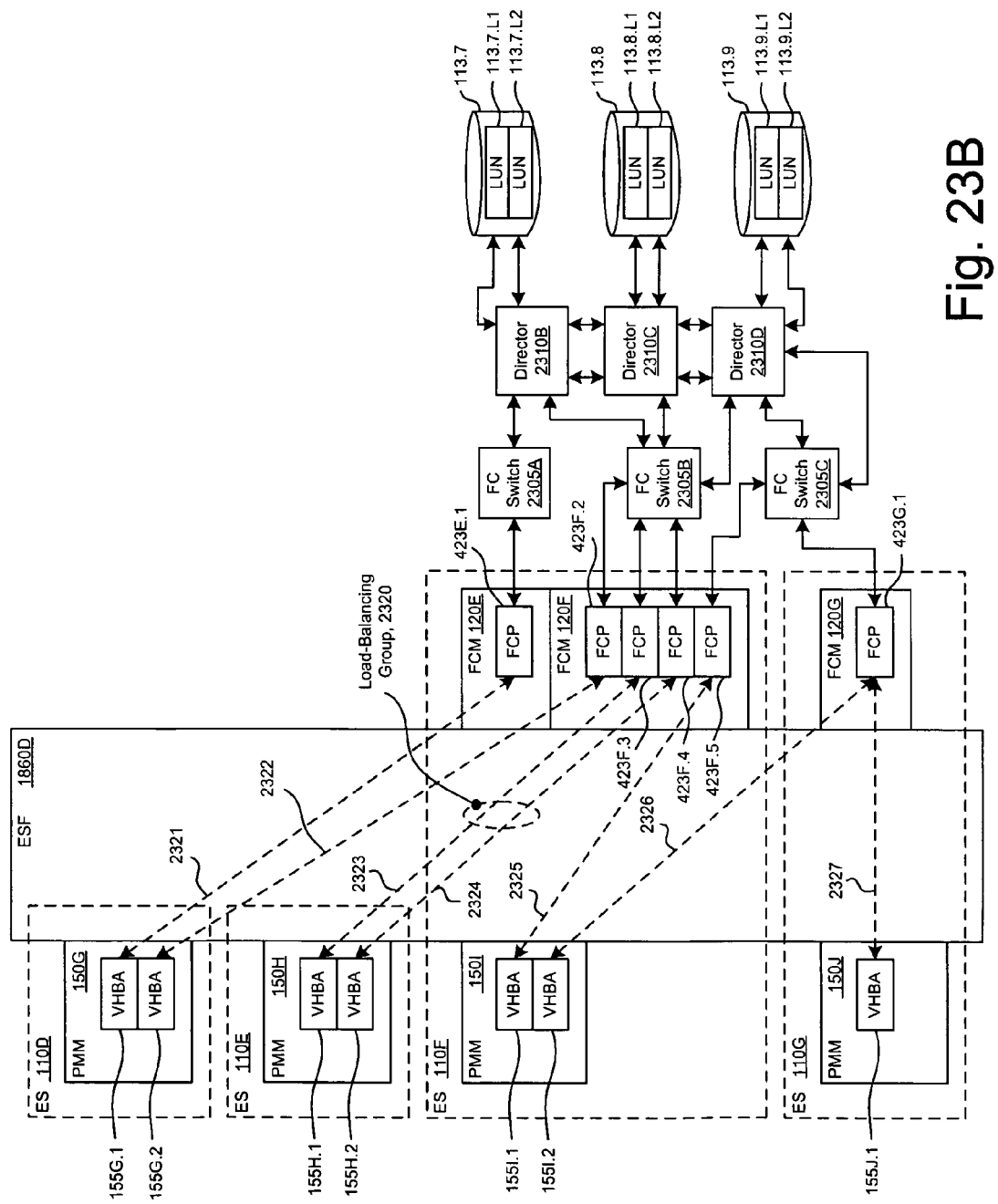
FIG. 23B illustrates selected elements of an embodiment of a storage gateway in a multiple chassis usage scenario.

FIG. 23B illustrates selected elements of an embodiment of a storage gateway in a multiple chassis usage scenario. Four chassis (ESs 110D-G) are in communication via network interconnections (not explicitly shown, but partially represented by portions of ESF 1860D). Each chassis includes a PMM (PMMs 150G-J respectively), and each PMM is configured as one partition executing one OS. Two of the chassis (ES 110F and ES 110G) include FCM resources (FCMs 120E-F and FCM 120G respectively). As illustrated, three of the partitions (PMM 150G-I) each include two VHBAs (VHBAs 155G.1-2, VHBAs 155H.1-2, and VHBAs 155I.1-2, respectively), and one of the partitions (PMM 150J) includes one VHBA (VHBA 155J.1).

In the illustrated usage scenario, PMM 150G requires HA access to FC Disk Array 113.7. Path 2321 from VHBA 155G.1 to FCP 423E.1 (of FCM 120E) and failover path 2322 from VHBA 155G.2 to FCP 423F.2 (of FCM2) provide access to FC Switch 2305A and FC Switch 2305B respectively to Director 2310B and then to FC Disk Array 113.7. PMM 150H requires a high bandwidth access to FC Disk Array 113.8. Path 2323 from VHBA 155H.1 to FCP 423F.3 (of FCM 120F) and path 2324 from VHBA 155H.2 to FCP 423F.4 (also of FCM 120F) are aggregated in Load-Balancing Group 2320 having access via FC Switch 2305B and Director 2310C to FC Disk Array 113.8. PMM 150I requires access to FC Disk Array 113.8, with no special HA or bandwidth requirements. Path 2325 from VHBA 155I.1 to FCP 423F.5 (of FCM 120F) provides access via FC Switch 2305C to Director 2310D, to Director 2310, and then to FC Disk Array 113.8. PMM 150I also requires access to LUN 113.9.L1 (of FC Disk Array 113.9) at a 1 Gb bandwidth. Path 2326 from VHBA 155I.2 to FCP 423G.1 provides access to FC Disk Array 113.9 via FC Switch 2305C and Director 2310D. Internal zoning is configured such that VHBA 155I.2 is given access to LUN 113.9.L1 but denied access to LUN 113.9.L2 (both of FC Disk Array 113.9). PMM 150J requires access to LUN 113.9.L2. Path 2327 from VHBA 155J.1 to FCP 423G.1 provides access to FC Disk Array 113.9 via FC Switch 2305C and Director 2310D. FCP 423G.1 bandwidth is shared between VHBA 155I.2 and VHBA 155J.1. Internal zoning is used to grant access to LUN 113.9.L2 to VHBA 155J.1 while denying access to LUN 113.9.L1.

External zoning (not illustrated) is configured to enable access between FC ports and appropriate disks, according to the partition access requirements. Specifically a first External Zone is defined as including FCP 423E.1, FCP 423F.2, and FC Disk Array 113.7. A second External Zone includes FCP 423F.3, FCP 423F.4, FCP 423F.5, and FC Disk Array 113.8. A third External Zone has members FCP 423G.1 and FC Disk Array 113.9. In some embodiments external zoning is implemented in FC switches (such as FCswitches 2305A-C).

In some embodiments, VLANs (not illustrated) are configured to enable access between VHBAs and appropriate FCMs or VNICs provided by FCMs. Specifically a first VLAN is defined to include VHBAs 155G.1-2, 155H.1-2, and 155I.1, FCM 120E (or selected VNICs implemented therein), and FCM 120F (or selected VNICs implemented therein). In some embodiments the first VLAN is defined to include VHBAs 155G.1-2, 155H.1-2, and 155I.1 and corresponding VNICs (not illustrated) in FCM 120E and FCM 120F. A second VLAN is defined to include VHBA 155I.2, VHBA 155J.1, and FCM 120G (or selected VNICs implemented therein). In some embodiments the second VLAN is defined to include VHBA 155I.2, VHBA 155J.1, and one or two associated VNICs (not illustrated) in FCM 120G.

Internal zoning (not illustrated) is configured to enable access between partitions and target LUNs, as well as protect selected LUNs, as defined by the usage scenario. In one embodiment a first Internal Zone includes VHBAs 155G.1-2, FCP 423E.1, FCP 423F.2, and FC Disk Array 113.7 (LUNs 113.7.L1-2). A second Internal Zone includes VHBAs 155H.1-2, FCPs 423F.3-4, and FC Disk Array 113.8 (LUNs 113.8.L1-2). A third Internal Zone includes VHBAs 155I.1-2, FCP 423F.5, FCP 423G.1, and LUN 113.9.L1 (of FC Disk Array 113.9). A fourth Internal Zone includes VHBA 155J.1, FCP 423G.1, and LUN 113.9.L2 (of FC Disk Array 113.9). In another embodiment internal zones are constructed such that VHBA to target path information may be inferred from the internal zoning (i.e. only one VHBA to target path is covered by each zone). Since the aforementioned first Internal Zone includes two FCPs (FCP 423E.1 and FCP 423F.2), the elements of the first Internal Zone are separated into two new internal zones (a first new Internal Zone including FCP 423E.1 but excluding FCP 423F.2, and a second new Internal Zone including FCP 423F.2 but excluding FCP 423E.1). Similarly the second Internal Zone includes FCP 423F.3 and FCP 423F.4 and is therefore separated into two new zones (having FCP 423F.3 alone and FCP 423F.4 alone, respectively). The third Internal Zone includes FCP 423F.5 and FCP 423G.1 and is therefore separated into two new zones (having FCP 423F.5 alone and FCP 423G.1 alone, respectively). The fourth Internal Zone includes only one FCP and thus requires no separation.

In some embodiments LUN masking is only configured when required to enforce security or protection requirements. In the multi-chassis usage scenario illustrated in FIG. 23B, internal zoning alone, without LUN masking, provides all required protection (i.e. VHBA 155I.2 and VHBA 155J.1 are prevented from accessing LUN 113.9.L2 and LUN113.9.L1, respectively). In some embodiments LUN masking is configured whenever a VHBA is configured. In the illustrated usage scenario, target identifier (such as FC WWN) and LUN identifier pairs are used to specify paths to specific targets. LUN masking maps (not illustrated) are built from the specific paths. Specifically a first LUN mask includes VHBAs 155G.1-2 having access to LUNs 113.7.L1-2. A second LUN mask includes VHBAs 155H.1-2 having access to LUNs 113.8.L1-2. A third LUN mask includes VHBAs 155I.1-2 having access to LUN 113.9.L1. A fourth LUN mask includes VHBA 155J.1 having access to LUN 113.9.L2.

The aforementioned storage gateway usage scenarios are examples only. Any number of single and multi chassis usage scenarios are possible, limited only by resources available in each scenario.

Storage Gateway Protocol Stack

As described, data transport between processes executing on partitions of PMMs allocated to provisioned servers is by way of HW and SW, typically including at least one transit across a switched fabric. A process executing on a partition of a PMM operating as a portion of a provisioned server typically originates a storage request. The initiator request is passed from higher level to lower level SW layers, transformed according to various protocols, and passed to HW present in the server, including a VNIC coupled to a switched fabric. The initiator request is communicated via the fabric, as cells corresponding to Ethernet frames, to a target FCM. It is then processed by HW to be reconstituted as Ethernet frames and passed upward from lower level to higher level SW frames, transformed according to various protocols. The request is then processed by a HBA interfaced to an attached FC storage resource. A target response is formulated by the FC storage resource and passed in a reverse manner (with respect to the request) to the process executing on the PMM partition.

The end-to-end data transport may occur with relatively little HW assist (i.e. as in a SW-intensive implementation) or with significant HW assist (i.e. as in a HW-intensive implementation). The data transport (via the fabric) may be restricted to a single (or local) chassis via an SF (such as local data exchange 1870 of FIG. 18B), or may pass from one chassis to another (or remote) chassis via an ESF (such as remote data exchange 1871 of FIG. 18B). In the following discussion, the term "switched fabric" is used to refer generically to either a single-chassis (SF) or a multi-chassis (ESF) scenario. The PMM partition and FCM end-to-end communication is the same for single and multiple chassis scenarios.

In a SW-intensive initiator implementation, the VHBA is implemented as a modified VNIC driver and underlying VNIC (typically as portions of a VIOC). In a HW-intensive initiator implementation, the VHBA is implemented as a VHBA driver and underlying VHBA HW including RDMA support (typically as portions of an RDMA-VHBA implemented by an RDMA-enhanced VIOC). In a SW-intensive target implementation, the target VNIC is implemented as a VNIC of a VIOC. In a HW-intensive target implementation, the target VNIC is implemented as an enhanced VNIC including RDMA support (typically as portions of an RDMA-enhanced VIOC). In various embodiments initiator, target, or both may include TCP Offload Engine (TOE) functionality in addition to or in place of RDMA support.

Various embodiments of ES systems may include any number and combination of instances of SW-intensive and HW-intensive storage gateway initiators and targets interoperating with each other. This is enabled by SW-intensive and HW-intensive initiator implementations that are compatible with SW-intensive and HW-intensive target implementations (and vice-versa). In the following discussion the term "SW-intensive" refers to an implementation including a SW-intensive initiator operating in conjunction with a SW-intensive target, and the term "HW-intensive" refers to an implementation including a HW-intensive initiator operating in conjunction with a HW-intensive target. Those of ordinary skill in the art will appreciate how to apply the concepts to embodiments including mixtures of HW-intensive and SW-intensive initiators and targets.

Figure 24A:
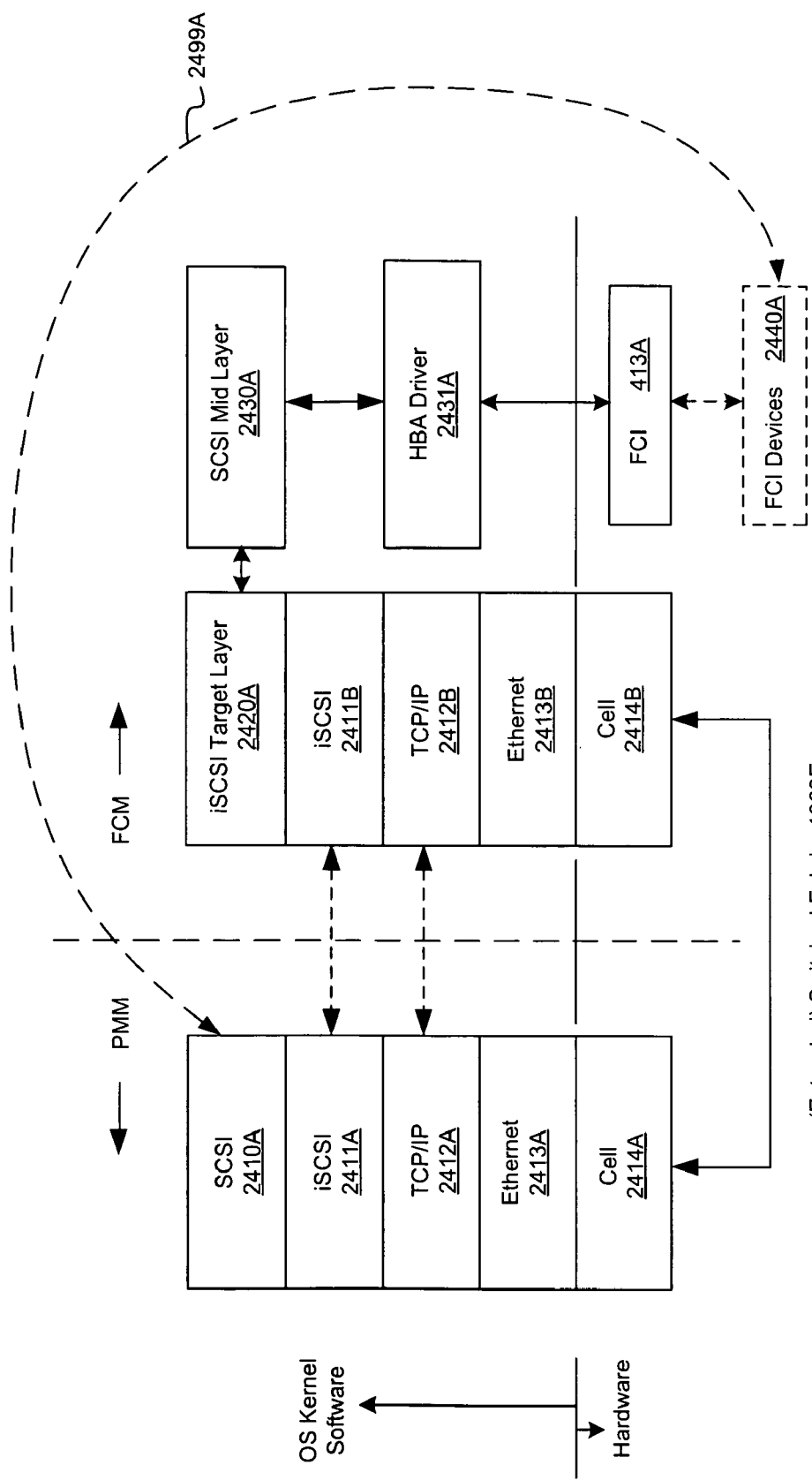
FIG. 24A illustrates selected details of a SW-intensive embodiment of a HardWare (HW)/SW protocol stack to implement data exchanges between processes executing on PMMs and disk arrays coupled via FCMs.

FIG. 24A illustrates selected details of a SW-intensive embodiment of a HW/SW protocol stack to implement data exchanges (such as illustrated conceptually by dashed-arrow 2499A) between processes executing on PMMs and disk arrays coupled via FCIs implemented on FCMs (such as FCI Devices 2440A accessible via FCI-413A). A switched fabric (such as Extended Switched Fabric 1860E) enables an Ethernet over cell interface (such as Ethernet Layer 2413A in conjunction with Cell Layer 2414A and Ethernet Layer 2413B in conjunction with Cell Layer 2414B) to transfer data from one point to another. The switch fabric and Cell Layers are implemented in HW. In various embodiments various combinations of Ethernet Layers 2413A-B are implemented as VNIC drivers. A reliable link (with retransmits for dropped/lost packets) is implemented between processes executing on a PMM partition and the FCM, using the switched fabric for communication. The link sends SCSI commands from the PMM partition processes (as initiators) to HBAs implemented on FCMs (functioning as targets). Response information is returned via the link. In some embodiments, the link is implemented via TCP/IP (such as TCP/IP Layer 2412A and TCP/IP Layer 2412B), so that the combination of SCSI command/response transmission over TCP/IP transport is essentially iSCSI (such as shown as Initiator iSCSI Layer 2411A and Target iSCSI Layer 2411B).

Conceptually a SCSI SW stack (such as illustrated in FIG. 24A) includes several layers. A lower layer includes device drivers for various SCSI-compatible HBAs (such as HBA Driver Layer 2431A). A middle layer (such as SCSI Mid Layer 2430A) includes a state machine providing common access methods to the lower layer from a higher level. A higher layer (such as any combination of SCSI Layer 2410A and iSCSI Target Layer 2420A) includes a driver to control high level devices, for example a SCSI disk driver, a SCSI tape driver, and a generic SCSI driver.

An end-to-end SCSI path begins at a SCSI high level driver (such as SCSI Layer 2410A) operating for example as a disk or tape driver on the initiator side (such as a PMM) and ends at the SCSI stack at a physical target (such as an FCM or a portion thereof such as FCI-413A). The initiator SCSI stack operates as if in direct communication with the physical target LUNs, and is unaware of the intervening additional transport layers (such as iSCSI, TCP/IP, cellification, and the switched fabric). The transport layers (including processing on FCMs) are transparent, and all SCSI commands and responses between the initiator and the external storage targets are relayed. For example, vendor specific SCSI commands, command extensions, and associated responses pass between initiators and physical targets unchanged. In some usage scenarios third party multipathing SW relies on such transparent communication.

In some embodiments various portions of SCSI Layer 2410A and Initiator iSCSI Layer 2411A correspond to iSCSI initiator sessions (such as iSCSI (initiator) Sessions 0-1 1910.0.S0-1 of FIG. 19) or provide processing closing related to the iSCSI initiator sessions. In some embodiments various portions of Ethernet Layer 2413A and Cell Layer 2414A correspond to VHBA and VNIC processing (such as VHBA 0 155.0 and VNIC 0 154.0 of FIG. 19). In some embodiments various portions of iSCSI Target Layer 2420A, Target iSCSI Layer 2411B, and SCSI Mid Layer 2430A perform management of various per VHBA information (such as Per VHBA Data 1920.0). In some embodiments FCI Devices 2440A implement or include FC storage resources (such as FC Target Resources 0-1 1930.T0-1 of FIG. 19).

Figure 24B:
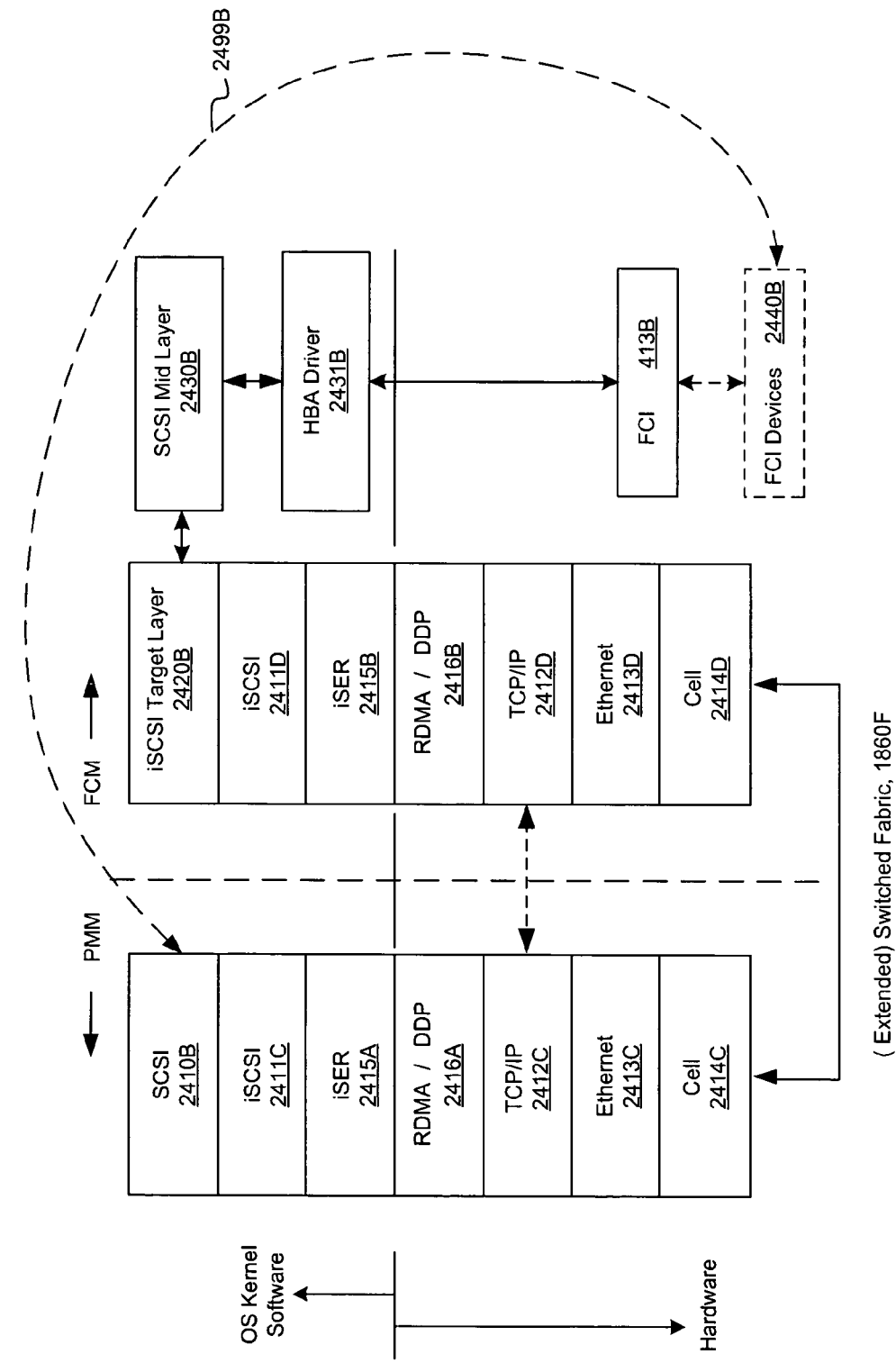
FIG. 24B illustrates selected details of a HW-intensive embodiment of a HW/SW protocol stack to implement data exchanges between processes executing on PMMs and disk arrays coupled via FCMs.

FIG. 24B illustrates selected details of a HW-intensive embodiment of a HW/SW protocol stack to implement data exchanges (such as illustrated conceptually by dashed-arrow 2499B) between processes executing on PMMs and disk arrays coupled via FCIs implemented on FCMs (such as FCI Devices 2440B accessible via FCI-413B). Several elements of FIG. 24B are substantially similar (or identical, according to embodiment) to correspondingly named and identified elements of FIG. 24A, and are not further described herein. For example, Cell Layers 2414C-2414D of FIG. 24B are substantially similar to Cell Layers 2414A-B of FIG. 24A. For another example, Extended Switch Fabric 1860F is substantially similar to Extended Switch Fabric 1860E.

An RDMA-enhanced VIOC enables HW processing of Ethernet, TCP/IP and RDMA/DDP protocol layers, in addition to the HW processing of cells as in the SW-intensive embodiment. Thus RDMA/DDP (such as RDMA/DDP Layers 2416A-B), TCP/IP (such as TCP/IP Layers 2412C-D), and Ethernet functions (such as Ethernet Layers 2413C-D) are implemented in HW in addition to the switch fabric and Cell Layers. In some embodiments the driver implemented for use with the RDMA-enhanced VIOC is a VHBA driver, and all storage accesses are performed via the VHBA driver. In some embodiments the driver is implemented in any combination of driver functions executing on a PMM (such as any portion of Initiator iSER Layer 2415A or other closely associated processing) and driver functions executing on an FCM (such as any portion of Target iSER Layer 2415B or other closely associated processing). The HW-intensive embodiment may be described as providing an "RDMA offload" capability in the HW (and as illustrated also includes TCP/IP offload functionality).

The SW-intensive and HW-intensive embodiments appear substantially identical (other than performance) to higher level SW layers, as the differences are hidden by the driver layer SW. The SW-intensive embodiment provides a NIC abstraction to upper layer SW, and the HW-intensive embodiment provides an RDMA NIC abstraction to upper layer SW. Provisioning and management of VHBA capabilities are similar for the SW-intensive and the HW-intensive protocol embodiments. In some HW-intensive embodiments any combination of TCP/IP acceleration (via TOE offload HW blocks) and RDMA acceleration (via RDMA offload HW blocks) may be provided and accessed by corresponding initiator and target SW.

Figure 24C:
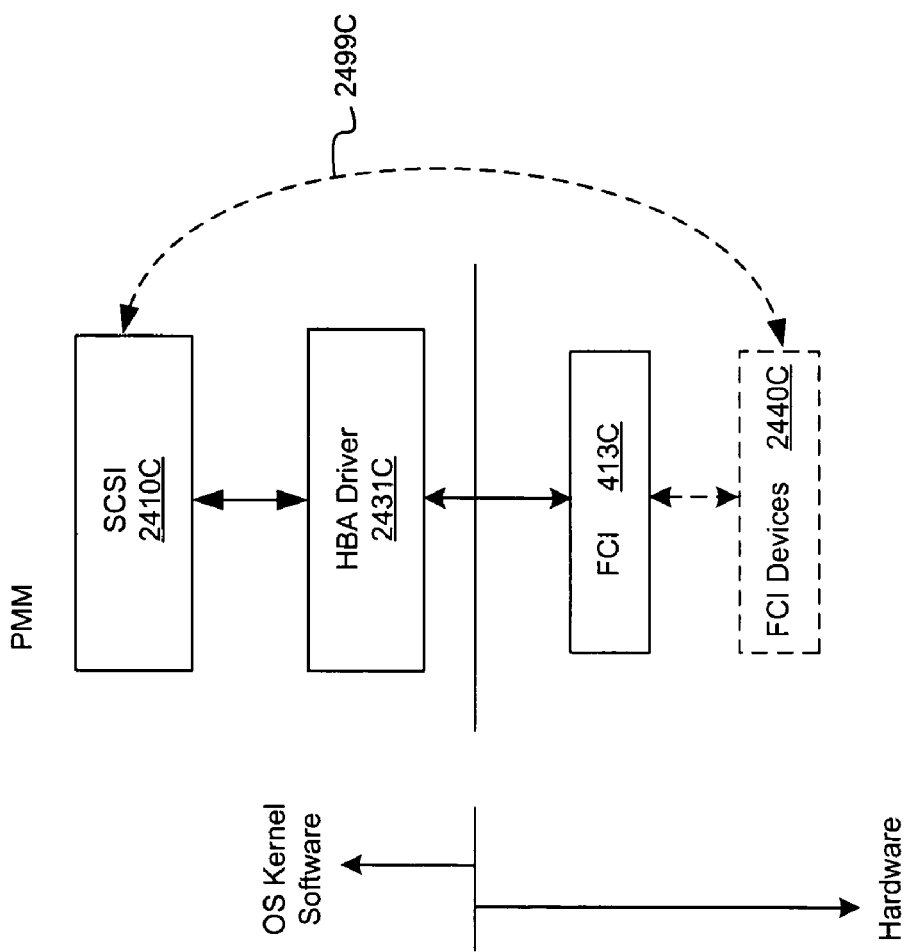
FIG. 24C illustrates selected details of an embodiment of a HW/SW protocol stack to implement data exchanges between processes executing on PMMs and directly coupled FC storage resources, such as disk arrays or Storage Array Networks (SANs).

FIG. 24C illustrates selected details of an embodiment of a HW/SW protocol stack to implement data exchanges (such as illustrated conceptually by dashed-arrow 2499C) between processes executing on PMMs and directly coupled FC storage resources (such as disk arrays or SANs). In contrast to local and remote storage resources accessed via storage gateways, FCIs included directly on PMMs exchange data between PMM processes and FC storage resources without accessing the switched fabric. Consequently fewer protocol layers are required, as illustrated by the figure. SCSI SW (such as SCSI Layer 2410C) manages SCSI-compatible transactions via a driver layer (such as HBA Driver Layer 2431C), in communication with HW FC interfaces (such as FCI-413C), enabling data exchanges with SAN elements (such as FCI Devices 2440C).

ISCSI Initiator Architecture

The iSCSI SW is divided into two parts: initiator and target. The initiator SW initiates data transfers, i.e. read and write requests. The target SW responds to the initiator and sends back response status, data, or both. In some embodiments, the iSCSI initiator driver executes on a PMM (as one of several driver processes) and the iSCSI target executes on an FCM. The iSCSI target on the FCM presents the FC disks attached to the FCM as iSCSI targets to the initiator. The target maintains the iSCSI-compatible Initiator-Target-Lun (ITL) nexus information between the FC disks and the iSCSI initiators on various PMMs.

Selected portions of the iSCSI initiator SW are similar in concept to open source SW as described in http://linux-iscsi.sourceforge.net (Cisco), http://unh-iscsi.sourceforge.net (University of New Hampshire), http://www.cs.uml.edu/~mbrown/iSCSI (University of Massachusetts Lowell), and http://sourceforge.net/projects/intel-iscsi (Intel). Generally, an iSCSI driver communicates SCSI operations and data from a kernel SCSI layer to an iSCSI target, and manages returned response data and status. An iSCSI daemon communicates (at a relatively low level) with iSCSI targets (as defined, for example in /etc/iscsi.conf in a Linux environment).

FIG. 25A illustrates selected details of an embodiment of a SW-intensive iSCSI initiator architecture. An iSCSI driver (such as iSCSI Driver 2521, and roughly corresponding to all or portions of Initiator iSCSI Layer 2411A of FIG. 24A) and associated illustrated functions provide a PMM with an ability to access storage devices through an IP network (typically at least through one switched fabric). The iSCSI driver uses the iSCSI protocol to transport SCSI requests and responses over the IP network between the processes executing on PMMs (as host applications) and an iSCSI target device (not illustrated). The iSCSI protocol is an IETF defined protocol for IP storage, and more information is available in RFC 3720.

Architecturally, the User and Kernel Space elements of the figure execute as SW on CPUs included in PMMs, and the Hardware elements (such as VNICs) are implemented in part by VIOCs included in PMMs. In a broader context, the elements of the figure generally provide "initiator" functions equivalent to a traditional SCSI or FC adapter driver with an HBA. The initiator functions, taken together with corresponding "target" functions (typically implemented in FCMs), provide iSCSI-compatible end-to-end data exchange between processes executing on PMM partitions and FC devices coupled to the (local and remote) FCMs.

User SW elements include various processes executed on behalf of applications (such as Host Applications 501A) and control processes relating to iSCSI operations (such as iSCSI Driver Control Daemon 2510A). Kernel SW elements include upper and middle layer SCSI processing (such as SCSI Upper/Mid Layer 2520A, and roughly corresponding to all or portions of SCSI Layer 2410A of FIG. 24A). Additional Kernel SW elements include TCP/IP processing (such as TCP/IP Stack 2412E and roughly corresponding to TCP/IP Layer 2412A of FIG. 24A) and low-level driver functions (such as VNIC Driver 514A and roughly corresponding to all or portions of Ethernet Layer 2413A and an instance of a VNIC Driver as shown in FIG. 5A). HW elements include a DMA-enabled cellifying interface to couple to a fabric interface (such as VIOC 301A). The cellyfing interface implements various combinations of VNIC and VHBA functionality (such as VNIC/VHBA 2544A and roughly corresponding to portions of Cell Layer 2414A of FIG. 24A) according to various embodiments.

In some embodiments the target request mechanism includes an iSCSI compatible SendTargets mechanism that requires an IP address for each FCM that is to be interrogated. In some implementations the FCM IP addresses are specified by a user when a VHBA is provisioned, and passed to the iSCSI driver as part of the initial or subsequent configuration data. Responses to SendTarget requests include available targets accessible to the associated requestor (accounting for storage gateway zoning and LUN masking), typically in iSCSI name format (as described in RFC 3720, for example).

In some usage scenarios a plurality of VHBAs of a provisioned server have simultaneous access to one or more shared storage resources (as part of multipathing, for example). However, each VHBA requires respective target information. Thus in some embodiments the iSCSI initiator target request mechanism is enabled to explicitly select an interface (such as corresponding to a first or a second VHBA) when requesting available targets. In some embodiments the explicit selection is via an SO_BINDTODEVICE socket option.

In some embodiments the target request mechanism is compatible with an SLP. In some embodiments the request mechanism is driven by a request configuration file. Some implementations support any combination of SendTargets, SLP, and configuration file. In some embodiments a target discovery address is retained that includes the value of an IP address and/or port of an FCM implementing a corresponding discovered target, for example as provided in some implementations using SLP.

Figure 25B:
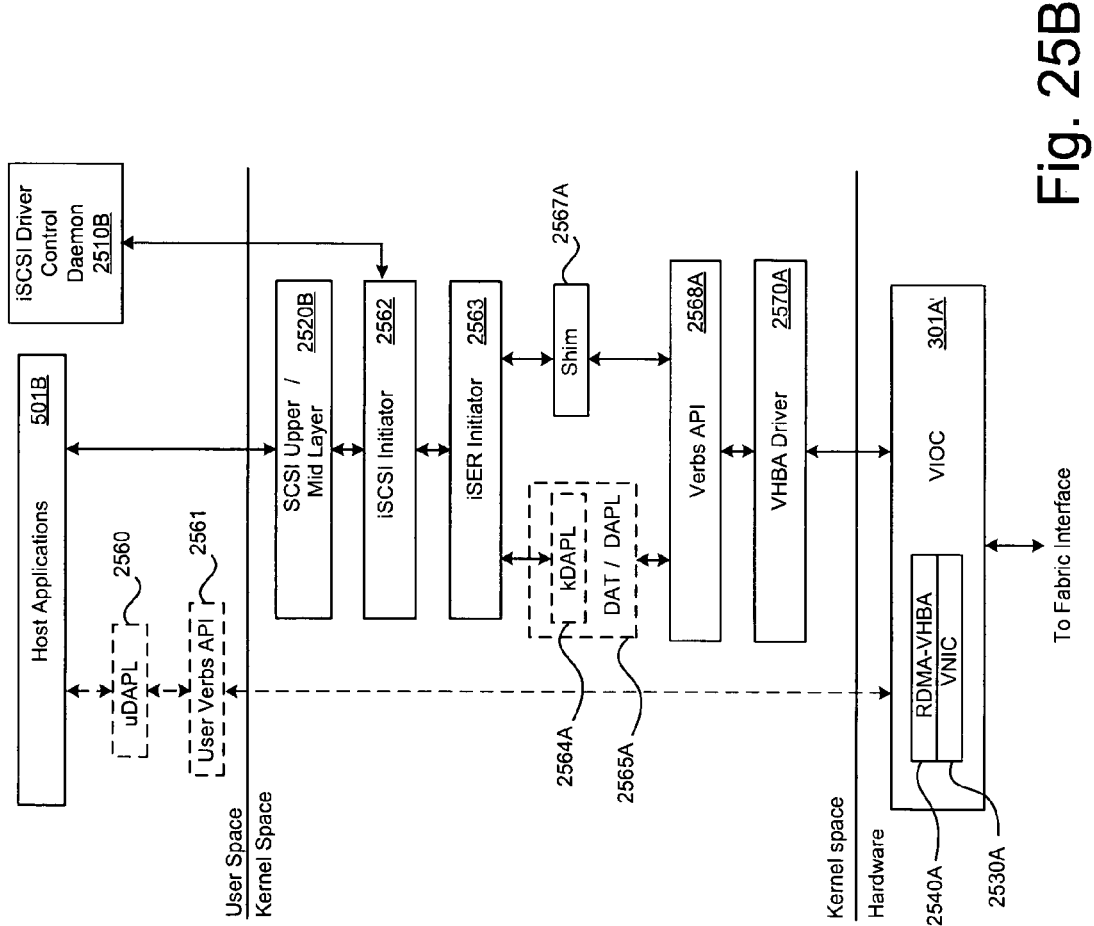
FIG. 25B illustrates selected details of two embodiments of HW-intensive iSCSI initiator architectures.

FIG. 25B illustrates selected details of two embodiments of HW-intensive iSCSI initiator architectures. The overall operation of the embodiments is similar to the SW-intensive iSCSI initiator architecture. However, differences exist to make full use of additional HW capabilities present in the HW-intensive initiator architectures. The additional HW capabilities include HW-accelerated RDMA functionality, also known as an RDMA NIC (for example implemented in RDMA-enhanced VIOC 301A', as provided by a combination of RDMA-VHBA 2540A and VNIC 2530A). VHBA driver 2570A is used in the HW-intensive embodiments to manage the VHBA abstraction. The RDMA NIC accepts and processes information in the form of Work Requests. Data completions are notified using Completion Events. The requests are sent and received via Receive/Completion Queues.

In a relatively simpler embodiment (omitting elements of the figure illustrated with dashed lines), Host Applications 501B communicates indirectly with the RDMA-NIC via SCSI Upper and Middle Layers 2520B (roughly corresponding to all or portions of SCSI Layer 2410B of FIG. 24B), iSCSI Initiator 2562 (roughly corresponding to all or portions of Initiator iSCSI Layer 2411C of FIG. 24B), iSCSI Extensions for RDMA (iSER) Initiator 2563, Shim module 2567A, Verbs API module 2568A, and VHBA driver 2570A. The iSCSI Initiator operates at least partially in response to command and control information provided by iSCSI Driver Control Daemon 2510B. In some embodiments various portions of iSCSI Extensions for RDMA (iSER) Initiator 2563, Shim module 2567A, Verbs API module 2568A, and VHBA driver 2570A roughly correspond to all or portions of iSER Layer 2415A of FIG. 24B.

In a relatively more complex embodiment (including elements of the figure illustrated with dashed lines), the host applications fully or partially bypass some of the aforementioned elements when communicating with the RDMA-enhanced VIOC. A more direct communication path is enabled via User-level Direct Access Programming Library (uDAPL) 2560, User Verbs API 2561, Kernel-level Direct Access Programming Library (kDAPL) 2564A, and Data Access Transport (DAT)/Direct Access Programming Library (DAPL) 2565A SW functions. Data is communicated via the uDAPL and User RDMA Verbs API elements directly to the VIOC, while control information is communicated between the User RDMA Verbs API and the DAT/DAPL elements. In other words, the relatively more complex embodiment enables host applications with higher-performance data communication access to the RDMA NIC.

In some embodiments one or more of the uDAPL, kDAPL, DAT, and DAPL functions are compatible with portions of an iWARP protocol suite, such as is described by documents available from http://www.rdmaconsortium.org. Selected documents include:

http://www.rdmaconsortium.org/home/draft-hilland-iwarp-verbs-v1.0-RDMAC.pdf, http://www.rdmaconsortium.org/home/draft-recio-iwarp-rdmap-v1.0.pdf, http://www.rdmaconsortium.org/home/draft-shah-iwarp-ddp-v1.0.pdf, and http://www.rdmaconsortium.org/home/draft-culley-iwarp-mpa-v1.0.pdf, herein incorporated by reference for all purposes.

The iSER initiator includes the iSER Datamover from Voltaire, similar data transport code, or combinations thereof, according to various embodiments. The Shim interfaces the iSER initiator to the Verbs API. The Verbs API provides a standard semantic interface to the RDMA-NIC.

In some embodiments the iSCSI initiator associated with the iSER initiator disables header and data digest computation, reducing CRC (such as CRC-32c) computations. In some embodiments third party iSCSI initiators activate CRC computations. In some embodiments CRC (or other equivalent) computations performed in HW, such as by a TOE or RDMA/DDP module included in a VIOC, replace CRC digests performed in SW.

The iSCSI initiator supports any combination of targets as illustrated in FIGS. 25A and 25B as well as third-party iSCSI targets, according to embodiment. In some of the embodiments supporting third-party targets, selected kernel symbols and filenames used by the iSCSI initiator are chosen to be unique with respect to typical third-party iSCSI initiators. This enables the use of third-party iSCSI initiators with third-party iSCSI targets in parallel with the use of iSCSI initiators and iSCSI targets as illustrated in FIGS. 24A and 24B.

In some embodiments VHBA statistics (including frames transmitted and received) in absolute count and rate per unit time are accumulated. Typically OS instances executing on PMM partitions maintain SCSI statistics (including IO operations and blocks read/written) on a per disk basis, also by count and rate. Various storage gateway operational statistics, including the VHBA and the SCSI statistics are made available for presentation to system administrators.

In some embodiments a user-space application, or daemon, collects the statistics and provides them to management SW executing on the Primary SCM via the BMC associated with the PMM partition providing the execution resources for the daemon. In some embodiments providing the statistics includes the daemon sending the statistics to a VNIC driver (typically executing on the same PMM as the daemon). The VNIC driver then uses the VIOC scratchpad protocol to communicate the statistics to the BMC associated with the PMM partition, and the BMC in turn relays the statistics to the management SW.

In some embodiments providing the statistics includes executing an SNMP agent on the PMM partition and retrieving the statistics via SNMP executed on the Primary SCM. The SNMP retrieval is in part via a routable path between an SFM Ethernet port and a VNIC interface of the PMM partition. In some embodiments, iSCSI initiator events (such as any portion of those sent to log files) are communicated to management SW executing on the Primary SCM in any of the aforementioned mechanisms associated with providing the statistics. In some embodiments an optional HBA API (compatible with SNIA definitions) provides a mechanism for obtaining the statistics and other information regarding VHBA operation and performance.

Initiator functions are not limited to PMMs, as various other embodiments may implement initiator functions via SW and HW (such as included in VIOCs) executing on other pluggable modules (such as SCMs, FCMs, OLBs, and FCM/OLMs).

ISCSI Initiator Operation

Operation of the iSCSI initiator includes configuring, starting, and stopping the initiator. Device names are discovered, determined, and assigned. File systems are auto-mounted, and log messages are provided.

iSCSI Initiator Configuration

In typical embodiments the iSCSI initiator is started, configured, and stopped at any time by an OS or Driver process running on a partition of a PMM (executing as a root user in some scenarios). Communication of selected data associated with the configuring is performed using VIOC scratchpad registers. More specifically the VIOC Manager executing on an SCM (such as Primary SCM 140A) passes the selected configuration data to the OS executing on the PMM partition to set up the VNIC and the VHBA configurations via the VIOC scratchpad protocol.

Typical VHBA data for configuring the iSCSI initiator includes any combination of:
  VNIC personality i.e. VNIC or VHBA
  VHBA number enable/disable
  Bandwidth requirements/limits
  iSCSI initiator unique name
  Address of FCM (per VHBA) for target discovery
  Connection Fail timeout value
  Disk Command timeout value (in some embodiments a single value is supported, while in other embodiments two values are supported: one for operation with Multipathing enabled, and another one for operation with Multipathing disabled).
  Incoming username or FCM username for Challenge Handshake Authentication Protocol (CHAP)
  Incoming password or FCM password for CHAP
  Outgoing username or initiator username for CHAP
  Outgoing password or initiator password for CHAP The aforementioned data values are typically per VHBA. In addition, a unique identifier name for each associated iSCSI initiator is used on a per provisioned server basis. Further configuration data optionally includes specification of associated FCMs and target names. The configuration data is specified in various combinations of default values (defined in SW), values in configuration files, and other similar mechanisms, according to embodiment (see the Storage Gateway Configuration section, elsewhere herein).

Booting an OS on a PMM from an image accessed via a storage gateway requires special processing, since configuration files stored on iSCSI targets are not accessible until an iSCSI initiator is operational. This circular condition is addressed by a two stage boot process used to access a final boot image accessible via a selected storage gateway. A first stage is loaded using BOOTP via a PXE client provided by BIOS SW executed on the PMM. The special first stage image includes a built-in iSCSI initiator and associated VHBA driver(s) (of limited capabilities, in some embodiments) that receive initial configuration data. A second stage uses the built-in iSCSI initiator to communicate with an FCM (typically specified by the initial configuration data) to request and receive the final boot image.

During the first boot stage, the initial configuration data is provided to the built-in iSCSI initiator via a special mechanism. The special mechanism includes a provisioning or management process executing on an SCM (such as a VIOC manager) providing the initial configuration data to the built-in iSCSI initiator via the scratchpad protocol. In some embodiments the initial configuration data is associated with VHBA provisioning. A VNIC driver then reads the scratchpad information and stores it into memory. After the iSCSI built-in initiator starts, it requests the initial configuration data from the VNIC driver, and the previously stored initial configuration data is read from memory. The built-in iSCSI initiator then uses the initial configuration data to locate and login to the specified target to request the final boot image and any associated configuration data.

Network-boot and storage-boot usage scenarios are supported according to embodiment. In some embodiments where the VHBA provisioning process provides the initial configuration data, the OS filesystem includes no specific target information, and the built-in and final boot image iSCSI initiators are not specifically aware of target connectivity. Instead the targets are specified by the final boot image (or associated final configuration data files, according to embodiment) accessed by the built-in iSCSI initiator using the initial configuration data. The special mechanism enables use of VHBA provisioning information irrespective of associated PMM partitions and connectivity to storage gateways. The special mechanism also enables assigning underlying storage resources (such as disks) to various provisioned servers independently of configuration information that would otherwise be stored on the storage resources.

iSCSI Initiator Storage Device Discovery

Once the iSCSI driver is operational, the host proceeds with a discovery process for storage devices, typically implementing one or more of the following:
  1. The iSCSI driver requests available targets using a target request mechanism.
  2. Each iSCSI target (typically implemented as part of an FCM) sends available iSCSI target names to the iSCSI driver.
  3. The iSCSI driver discovery daemon process looks up each discovered target in a bindings file. If an entry exists in the bindings file for the target, the corresponding SCSI target ID is assigned to the target. If no entry exists for the target, the smallest available SCSI target ID is assigned and an entry is written to the bindings file. The driver then sends a login request to the iSCSI target.
  4. The iSCSI target accepts the login and sends target identifiers.
  5. The iSCSI driver queries the targets for device information.
  6. The targets respond with the device information.
  7. The iSCSI driver creates a table of available target devices.

Once the table is completed, the iSCSI targets are available for use by processes executing on the PMM using commands and utilities in the same manner as a direct attached storage device.

The iSCSI initiator uses CHAP for authentication during the login process, and each iSCSI initiator has a unique name. In some embodiments a unique login username/password is set on a per VHBA basis, enabling the iSCSI target (typically implemented in an FCM) to use the username/password information to enforce any combination of internal zoning and LUN masking during discovery and login sequences. The username/password information is typically included as a portion of the iSCSI initiator configuration data. The iSCSI target implements a CHAP authentication protocol. In some embodiments the username/password information (optionally on a per VHBA basis) is included in an SCF, enabling provisioning of a server with similar or identical storage settings.

iSCSI Initiator Starting and Stopping

The iSCSI initiator is started automatically on boot of a provisioned server, and may optionally be restarted manually using a command (via any combination of CLI or GUI style interactions, according to embodiment). The iSCSI initialization reports information on each detected storage device to a console device (optionally redirected or virtualized, according to embodiment) or via standard OS logging mechanisms (such as dmesg (8) output of Linux). The information includes any combination of vendor identification, model and revision numbers, access type, SCSI revision level, identification information (such as SCSI, channel, ID, and LUN numbers), individual sector size, and total disk capacity. Typically the information is stored in a file system accessible to PMM partition processes, in a file (or files) indexed or identified by controller number, according to various embodiments. A provided utility enables viewing iSCSI devices currently available. In some embodiments, errors detected during loading (or starting) of an iSCSI kernel module are recorded in a dedicated log file.

The iSCSI driver is automatically unloaded on a system shutdown, and it may be manually stopped by a command (via any combination of CLI or GUI style interactions, according to embodiment). In typical embodiments, when the iSCSI driver is to be stopped, a script attempts to kill all processes using iSCSI devices first by sending a "SIGTERM" signal, and then by sending any surviving processes a "SIGKILL" signal. The script then unmounts all iSCSI devices (as listed in /etc/fstab.iscsi, for example) and kills the iSCSI daemon, thus terminating all connections to iSCSI devices. In some scenarios the script leaves some iSCSI filesystems mounted, and selected applications using the iSCSI filesystems are stopped manually before stopping the iSCSI driver. In addition, selected iSCSI filesystems (those not listed in /etc/fstab.iscsi, for example) are stopped manually before stopping the driver. In some circumstances, iSCSI filesystems not properly unmounted before stopping the iSCSI driver fail to commit one or more buffered writes and consequently disk and file corruption occur.

iSCSI Initiator Asynchronous Event Notification

Changes occurring at iSCSI targets are communicated to appropriate iSCSI initiators as asynchronous messages, and include any combination of the following:

PortalOnline—indicates a portal (IP Address and TCP port), has been added, enabling establishment of target sessions and future failover use with the portal.

PortalOffline—indicates a portal (IP Address and TCP port) has been removed, hence if connectivity with the portal is lost, no retries are attempted.

TargetOnline—indicates a new target is available for use, allowing establishment of connectivity with the new target.

TargetOffline—indicates a target is no longer available, hence if connectivity with the target is lost, no retries are attempted if any further connection attempt is denied.

Typically the asynchronous messages are communicated after negotiating the key "SendAsyncText" during login.

ISCSI Initiator Implementation

Implementation of the iSCSI initiator includes functions relating to QoS and multipathing, according to various embodiments. Further considerations in the iSCSI initiator are related to internal zoning, LUN masking, and iSCSI device names.

iSCSI Initiator QoS Implementation

In some embodiments the VHBA bandwidth requirements/limits are implemented in a VNIC, and the VNIC is in turn implemented in certain embodiments in a VIOC. Egress data from the VHBA to the fabric (via the VIOC) is limited according to an egress bandwidth limit. Ingress data from the fabric to the VHBA (also via the VIOC) is limited according to an ingress bandwidth limit. In some embodiments the VIOC drops packets to enforce the ingress bandwidth limit. In implementations using TCP/IP as a transport mechanism, retransmissions in the TCP layer eventually deliver data included in the dropped packets. In addition, automatic end-to-end throughput control implemented in the TCP layer results in eventual transmission according to the ingress bandwidth limit.

The egress and ingress bandwidth limits are communicated on a per VHBA (or per VNIC) basis by a VNIC driver programming appropriate registers in a VIOC (such as Bandwidth Minimum 618.1*d* and Bandwidth Maximum 618.1*e* of FIG. 6A). Optional I/O priority levels may also be included in the description of the VHBA configuration, and these may also be optionally propagated by the VNIC driver to the VIOC.

iSCSI Initiator Multipathing Implementation

Multipathing in an iSCSI environment is an ability to discover and use more than one route to a target storage unit (such as a disk), and may be useful in various failover scenarios. Multipathing, when viewed in a strict end-to-end sense, is implemented at multiple levels according to embodiment. In some embodiments an FCM seamlessly manages SCSI traffic across multiple physical FC paths to the same target. The FCM is thus a single point of failure.

In some embodiments multipathing is implemented at higher levels of OS and driver SW executing on PMM partitions. A configuration is specified that includes more than one unique path to a target storage device, thus providing at least one redundant path to the target. Each of the unique paths typically specifies unique FCMs, each having connectivity to the target, thus eliminating an FCM as a single point of failure. Each of the unique paths is also typically configured via a corresponding unique VHBA.

In some embodiments multipathing is implemented at the iSCSI level, and at least in part by the iSCSI initiator. iSCSI sessions are established on multiple network paths and failures are handled at an iSCSI level. In some implementations dedicated iSCSI multipathing is supported in iSCSI SW executing on PMM partitions (such as portions of iSCSI Driver of FIG. 25A, or portions of iSER Initiator of FIG. 25B). In some implementations third-party multipathing SW is installed to provide iSCSI initiator multipathing support.

In some embodiments multipathing is implemented conceptually at the SCSI level. For example, multipathing SW (such as third-party multipathing SW including Veritas DMP and EMC Powerpath) sends SCSI commands to two or more instances of a single target via a standard iSCSI driver. The two or more target instances are discovered via two or more corresponding (redundant) unique paths and are recognized as the single target by the multipathing SW.

iSCSI Initiator Storage Gateway Internal Zoning and LUN Masking

In some embodiments the iSCSI initiator is not aware of storage gateway zoning and LUN masking. The iSCSI target uniquely identifies each VHBA according to a unique iSCSI initiator name and username/password. The iSCSI target then supplies a list of accessible target devices accordingly, accounting for appropriate storage gateway zoning and LUN masking.

The unique iSCSI initiator name is provided by each respective iSCSI initiator instance, and is distinct system wide. In some embodiments the name is specified as part of VHBA provisioning using a combination of a user specified string and a unique number generated by provisioning operations. The name is communicated as part of the initial configuration data, or with subsequent configuration data, according to embodiment.

iSCSI Device Names

Some OS implementations executing on PMM partitions (such as Linux) assign SCSI device nodes (e.g., /dev/sda or /dev/sdb) to SCSI logical units in the order that devices are discovered. There are two potential issues that may arise related to device node assignment. The first is that the mapping from the device node to the iSCSI logical unit may vary each time the iSCSI driver is started, because of variations in process scheduling and network delay, and because of hardware reconfiguration. The second is that the device node represents a path to a SCSI logical unit (where a path may include any combination of a SCSI host adapter identifier, a bus number, a target ID and a LUN). If there are multiple paths to a SCSI logical unit, then the logical unit will be reachable through multiple device nodes.

If applications or utilities executing on PMM partitions are configured to issue I/O to the SCSI device node, and a reconfiguration or reboot causes the device node to be reassigned, then the I/O may not reach the appropriate device. Also, if there are multiple paths to the SCSI device node, then the applications or utilities may unintentionally view a single SCSI device as multiple independent SCSI devices.

Because of these issues, in typical embodiments, PMM partition applications and OS utilities are not configured to access the SCSI device nodes directly. Instead, any combination of the following alternatives is used:

Mounting by filesystem Universal Unique IDentifiers (UUIDs) or labels (as associated with Linux commands mke2fs, tune2fs, mount, and fstab, for example)

Volume management SW (e.g. lvm and Veritas)

SW Redundant Arrays of Independent Disks (RAID) (as associated with the Linux command md, for example)

Devlabel (as associated with http://freshmeat.net/projects/devlabel, for example)

The UUID mounting, volume management SW, and SW RAID alternatives write location information to the disk and subsequently use the location information to locate the disk, so any device node assignment is irrelevant. SW RAID additionally provides the capability to join multiple paths to a device into a single virtual device, with automatic failover when paths fail. The devlabel alternative relies on a World-Wide unique IDentifier (WWID) that is provided by most SCSI storage devices. Devlabel also automatically detects multiple paths to a device, and applies path-specific device labels, so that the multiple paths are not mistaken for separate devices.

ISCSI Target Architecture

The iSCSI target SW includes various kernel modules, user space applications, libraries, and configuration scripts executing under a host OS (such as Linux). Selected portions of the iSCSI target SW are similar in concept to open source SW as described in http://unh-iscsi.sourceforge.net (University of New Hampshire), http://www.ardistech.com/iscsi (Ardis Technologies), and http://iscsitarget.sourceforge.net (The iSCSI Enterprise Target Project). Generally, the iSCSI target selectively accepts iSCSI session initiations and connections from iSCSI initiators and provides responses to SCSI operations received from an iSCSI driver. The iSCSI target functions according to configuration and management settings for the various VHBAs operating in an ES system.

Figure 26A:
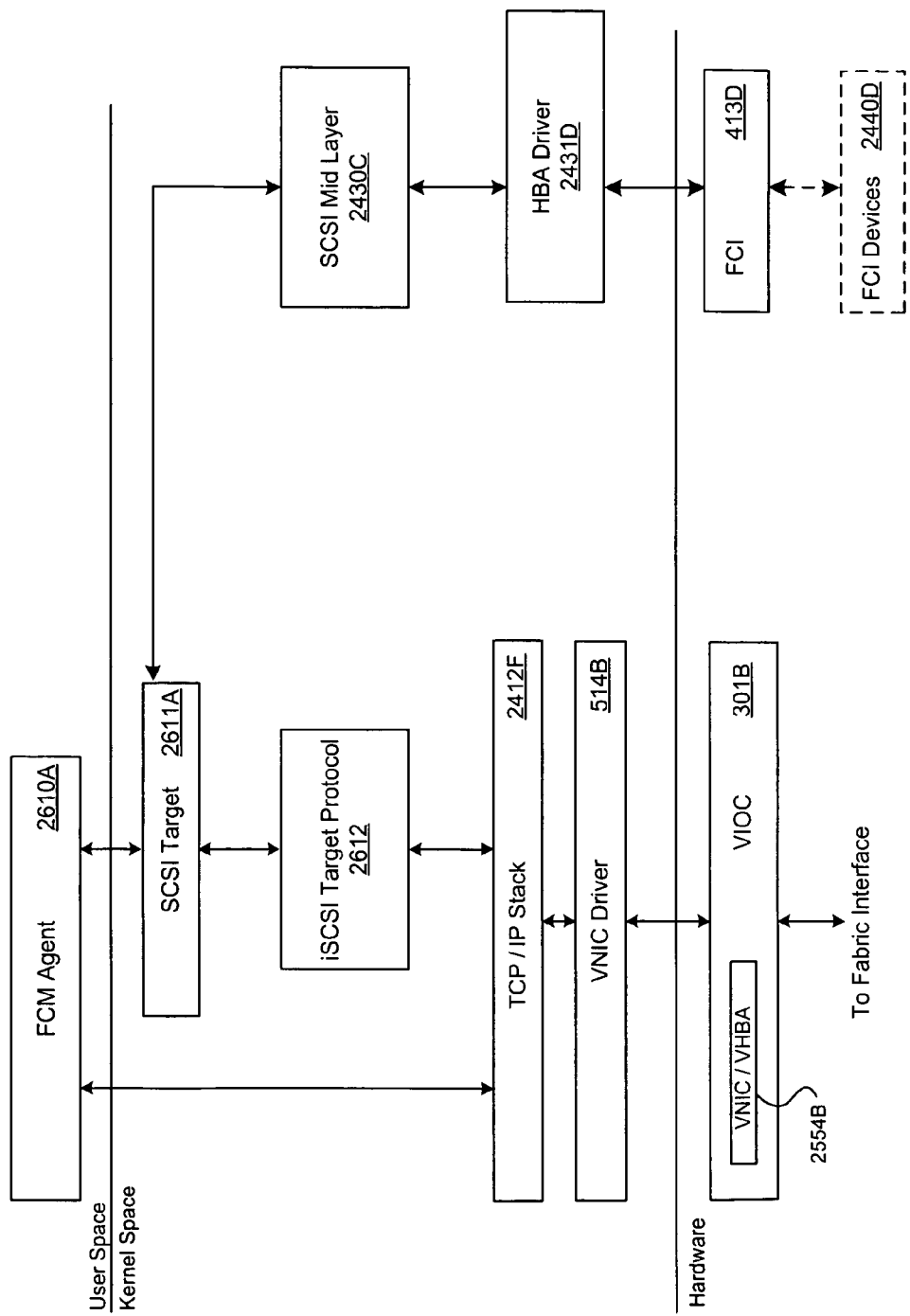
FIG. 26A illustrates selected details of an embodiment of a SW-intensive iSCSI target architecture.

FIG. 26A illustrates selected details of an embodiment of a SW-intensive iSCSI target architecture. The iSCSI target enables an FCM to access storage devices on behalf of processes executing on various pluggable modules (such as PMMs, SCMs, FCMs, OLBs, and FCM/OLMs). The iSCSI target receives requests and provides responses in SCSI-compatible format via the iSCSI protocol. Architecturally, the User and Kernel Space elements of the figure execute as SW on IOPs included in FCMs, and the Hardware elements (such as VNIC/VHBAs) are provided in part by VIOCs included in the FCMs. In a broader context, the elements of the figure generally provide "target" functions equivalent to a traditional SCSI or FC adapter driver with an HBA.

User SW elements include a high-level FCM control element (such as FCM Agent 2610A). Kernel SW elements include an iSCSI target providing upper layer target iSCSI/SCSI processing (such as any combination of SCSI Target 2611A and iSCSI Target Protocol 2612 and roughly corresponding to all or portions of iSCSI Target Layer 2420A and Target iSCSI Layer 2411B of FIG. 24A). Kernel SW elements further include middle layer SCSI processing (such as SCSI Mid Layer 2430C and roughly corresponding to various portions of SCSI Mid Layer 2430A of FIG. 24A), and low-level HBA driver functions (such as HBA Driver 2431D and roughly corresponding to HBA Driver Layer 2431A of FIG. 24A). Additional Kernel SW elements include TCP/IP stack functions implementing network protocol processing (such as TCP/IP Stack Layer 2412F and roughly corresponding to TCP/IP Layer 2412B of FIG. 24A) and low-level driver functions (such as VNIC Driver 514B and roughly corresponding to all or portions of Ethernet Layer 2413B and an instance of a VNIC Driver as shown in FIG. 5A).

HW elements include a DMA-enabled cellifying interface to couple to a fabric interface (such as VIOC 301B). The cellyfing interface implements various combinations of VNIC and VHBA functionality (such as VNIC/VHBA 2544B and roughly corresponding to portions of Cell Layer 2414B of FIG. 24A) according to various embodiments. HW elements further include FC-compatible interface HW (such as FCI-413D and corresponding to FCI-413A of FIG. 24A) coupled to FC-compatible elements (such as FCI Devices 2440D and corresponding to FCI Devices 2440A of FIG. 24A).

An iSCSI target protocol module (such as any portion of iSCSI Target Protocol 2612) is decoupled from a plurality of pairs of target receive and corresponding target send threads (not shown). A pair of threads (one receive and one send) is created per iSCSI connection. The receive thread receives iSCSI Protocol Data Units (PDUs) from an initiator, parses the PDUs according to the iSCSI protocol using the iSCSI target protocol module, and passes resultant SCSI Command Descriptor Blocks (CDBs) to the SCSI middle layer after setting appropriate timeouts and allocating necessary buffers along with associated data structures. The send thread processes SCSI responses originating from the SCSI middle layer, constructing iSCSI PDUs according to the iSCSI protocol using the iSCSI target protocol module and then sending the responses back to the initiators. In some error situations the target thread communicates with the corresponding receive thread, but other communication between the receive and the send thread is generally minimal. The SCSI middle layer implements bidirectional communication with the HBA driver that in turn provides bidirectional communication with the FCI.

An iSCSI Server thread (not shown) listens on the iSCSI port for connections via the TCP/IP stack functions provided by the OS executing on the FCM. The iSCSI Server processes iSCSI login requests (via CHAP) and establishes the associated per iSCSI connection receive and send thread pairs. Selected per session and per VHBA related bookkeeping information (such as internal zoning and various statistics) is also managed by the iSCSI Server. The iSCSI Server is in communication with the FCM Agent (also known as an FCM configuration client and/or daemon).

The FCM Agent is in turn in communication with various management processes typically executing on the Primary SCM, including an FCM manager process (such as FCM Manager 541 of FIG. 5B). The FCM Agent receives configuration information from the FCM Manager and relays it to the iSCSI Server. The FCM Agent also provides status and statistics information to the FCM Manager. The FCM Manager interacts with other management and controlplane functions executing on the Primary SCM, as well as interacting with FCM Agents for each FCM. Various management and configuration functions are controlled via CLI and GUI functions in communication with the FCM Manager.

In some embodiments the iSCSI target operates to reduce memory copies, and maximizes parallelism by using threads (such as per connection receive and send threads) and implementing fine grain locking of various data structures. In some embodiments the iSCSI target reduces context switches between various kernel executing contexts. The iSCSI target optionally implements any combination of security protocols including IPSec and Internet Key Exchange (IKE), according to various embodiments.

Figure 26B:
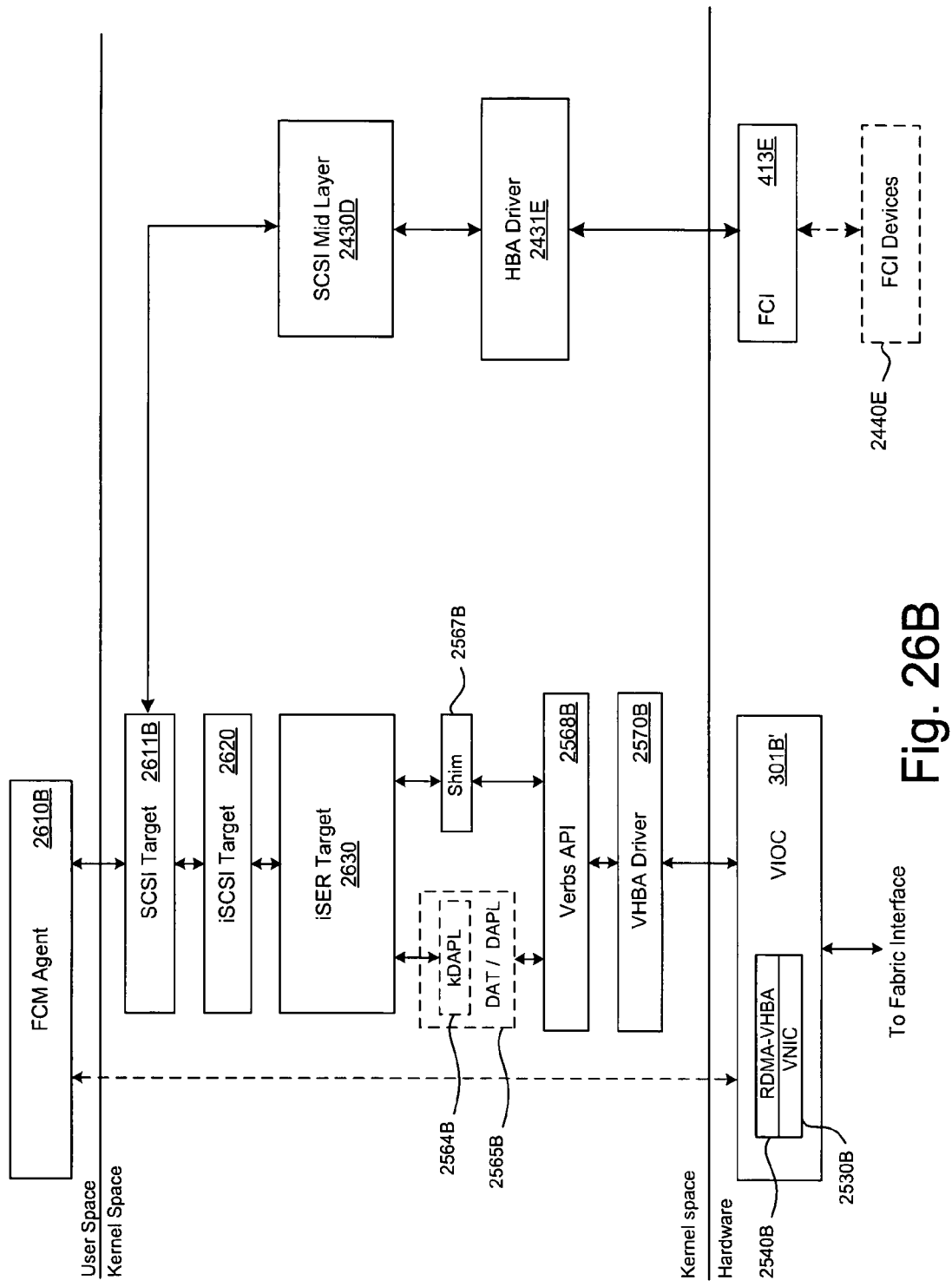
FIG. 26B illustrates selected details of two embodiments of HW-intensive iSCSI target architectures.

FIG. 26B illustrates selected details of two embodiments of HW-intensive iSCSI target architectures. The overall operation of the embodiments is similar to the SW-intensive iSCSI target architecture. However, differences exist to make full use of additional HW capabilities present in the HW-intensive target architectures, including HW-accelerated RDMA functionality, such as an RDMA-NIC (for example implemented in RDMA-enhanced VIOC 301B', as provided by a combination of RDMA-VHBA 2540B and VNIC 2530B). VHBA driver 2570B is included in the HW-intensive embodiments to manage the VHBA abstraction.

In a relatively simpler embodiment (omitting elements of the figure illustrated with dashed lines), FCM Agent 2610B communicates indirectly with the RDMA-NIC via SCSI Target 2611B (roughly corresponding to all or portions of iSCSI Target Layer 2420B), iSCSI Target 2620 (roughly corresponding to all or portions of Target iSCSI Layer 2411D), iSER Target 2630, Shim module 2567B, Verbs API module 2568B, and VHBA driver 2570B. The SCSI Target operates at least partially in response to command and control information provided by the FCM Agent. In some embodiments various portions of iSER Target 2630, Shim module 2567B, Verbs API module 2568B, and VHBA driver 2570B roughly correspond to all or portions of iSER Layer 2515B of FIG. 24B. In some embodiments SCSI Mid Layer 2430D, HBA Driver 2431E, FCI-413E, and FCI Devices 2440E are substantially similar or identical to respective elements SCSI Mid Layer 2430C, HBA Driver 2431D, FCI-413D, and FCI Devices 2440D of FIG. 26A.

In a relatively more complex embodiment (including elements of the figure illustrated with dashed lines), the FCM Agent fully or partially bypasses some of the aforementioned elements when communicating with the RDMA-enhanced VIOC. A more direct communication path is enabled via kDAPL 2564B and DAT/DAPL 2565B SW functions. Data is communicated directly with the VIOC by the FCM Agent. In other words, the relatively more complex embodiment enables the FCM Agent with higher-performance data communication access to the RDMA NIC. In some embodiments the FCM Agent may include a uDAPL module, a User Verbs API, or both.

In some ES server embodiments storage gateway initiators and targets may be intermixed according to various SW-intensive and HW-intensive implementations. For example, a SW-intensive initiator (such as illustrated in FIG. 25A) may be operated in conjunction with any combination of a SW-intensive target (such as illustrated in FIG. 26A) and a HW-intensive target (such as the relatively simpler and relatively more complex embodiments illustrated in FIG. 26B). Similarly, a HW-intensive initiator (such as the relatively simpler and relatively more complex embodiments illustrated in FIG. 25B) may be operated in conjunction with any combination of target implementations. These and other similar variations will be readily apparent to those of ordinary skill in the art.

In some embodiments storage gateway targets may include services such as block caching, read-ahead, read/write load balancing, and other performance related functions that may be shared by clients of the services (such as storage gateway initiators on PMMs or other pluggable modules). Other target services may include volume virtualization, coalescing, data mirroring, and selected multipathing functions. In some embodiments target services are available to clients external to an ES server, such as workstations or PCs accessing storage gateway targets via the Internet.

ISCSI Target Operation

In some embodiments SCSI commands are issued to the target SCSI layers immediately upon receipt from initiators, according to FIFO ordering. Rate control associated with VHBA bandwidth allocation is performed in the VNIC, and congestion is recognized and responded to by the TCP/IP layer. In some usage scenarios an iSCSI command window is varied between zero (idle), one (serialized), and N(N outstanding operations) in conjunction with TCP/IP congestion avoidance in order to favor selected iSCSI sessions over others. In some embodiments various combinations of scheduling priorities, such as round-robin and weighted round-robin are provided on a per physical target basis and a per VHBA basis.

Booting an OS (on a PMM, for example) from an image accessed via a storage gateway is enabled by the storage gateway iSCSI target accepting initiator sessions only after the iSCSI target is itself booted and fully operational. Subsequently the iSCSI target provides boot image and related information as requested by a (remotely) booting module.

In some embodiments the iSCSI target is not aware of multipathing, i.e. multipathing is a function of higher-level SW operating in conjunction with one or more initiators. In alternate embodiments the iSCSI target provides full or limited multipathing capability. In some embodiments the iSCSI target provides little or no specific HA functionality, and HA functions are instead provided by multipathing operations performed in conjunction with one or more iSCSI initiators. In alternate embodiments the iSCSI target provides portions of HA capability.

The iSCSI Target Protocol module interacts with the SCSI middle layer (via the receive and send threads) and typically operates in pass-through mode to provide transparent communication between initiators and physical targets. In some embodiments raw SCSI commands (such as vendor-specific SCSI commands) are relayed unchanged from initiators to physical targets. Errors and timeouts are pushed back to an associated initiator for further processing. In some usage scenarios timeout values associated with target processing are set to prevent a chain of cascaded or related timeouts from occurring.

iSCSI Target Device Mapping

In some embodiments iSCSI logical target names are used to assign target devices from different physical targets to shared logical targets, typically at a target LUN level. In some embodiments a target-only mapping scheme is used to map iSCSI logical target names to physical target devices. The target-only mapping maps only the name of the physical target, i.e. all LUNs belonging to a specific physical storage target are mapped to the same iSCSI logical target name. In some embodiments a standard target naming mechanism is used, such as a technique standardized by the Institute of Electrical and Electronics Engineers (IEEE), including a 64-bit Extended Unique Identifier (EUI) (as described by http://standards.ieee.org/regauth/oui/tutorials/EUI64.html). In some embodiments the physical target World-Wide Port Name (WWPN) is used to uniquely identify specific physical storage targets. Table 3, following, illustrates examples of target device mapping.

TABLE 3

| Name (FCM OS) | Name (initiator OS) | iSCSI Target Name | iSCSI LUN | Physical Storage Address | Physical LUN |
| --- | --- | --- | --- | --- | --- |
| /dev/sdb | /dev/sdf | EUI_one | LUN 2 | WWPN_one | LUN 2 |
| /dev/sdc | /dev/sdg | EUI_two | LUN 3 | WWPN_two | LUN 3 |
| /dev/stb | /dev/sta | EUI_three | LUN 1 | WWPN_three | LUN 1 |

Those of ordinary skill in the art will recognize that storage gateway concepts, while described elsewhere herein with respect to FC compatible elements, are not restricted to FC and apply to storage and other types of devices accessible via other interfaces. Storage gateway embodiments are equally applicable to devices accessed via Ethernet, InfiniBand, Serial Advanced Technology Attachment (SATA), USB, FireWire, iSCSI, NAS, and other similar interfaces. In some embodiments modified FCMs (or OLM/FCMs) may include daughter cards compatible with non-FC target devices, such as an Ethernet or an Infiniband host adapter daughter card. In some embodiments an FCM (or OLM/FCM) may be adapted to function both as a target and an initiator, acting as an initiator by relaying iSCSI transport to another module (such as an NM) that is in turn coupled to one or more storage gateway targets. In some embodiments virtual disk concepts may be used to provide names for accessing target devices via storage gateways.

Scratchpad Protocol

Figure 27:
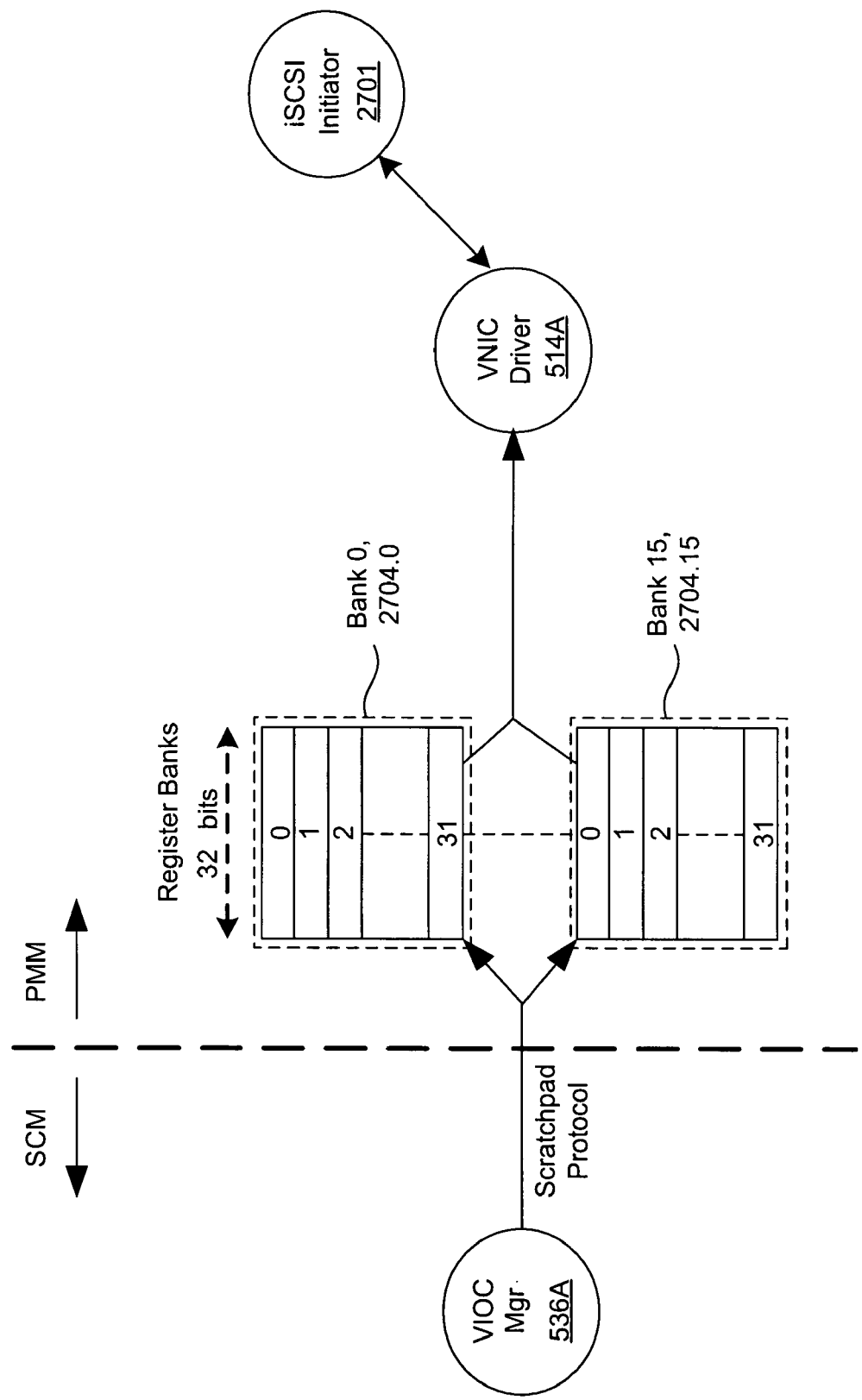
FIG. 27 illustrates selected details of an embodiment of configuration data communication from a VIOC Manager to an Operating System (OS) executing on a PMM partition.

FIG. 27 illustrates selected details of an embodiment of configuration data communication from VIOC Manager 536A (in some implementations an instance of VIOC Manager 536 of FIG. 5B) to functions associated with an OS executing on a PMM partition, in a storage gateway usage context. The functions include VNIC Driver 514A (in some embodiments an instance of a VNIC Driver such as VNIC Driver 1 514 of FIG. 5A) and iSCSI Initiator 2701 (in various embodiments an instance of any of iSCSI Driver 2521 of FIG. 25A and iSCSI Initiator 2562 of FIG. 25B). The VIOC Manager uses the scratchpad protocol to write to VIOC register banks allocated for scratchpad purposes. In some embodiments there are 16 scratchpad register banks, each bank (such as Bank 0 2704.0 and Bank 15 2704.15) including 32 registers of 32 bits each. In some embodiments the banks are implemented in configuration logic in a cellifying interface (such as VIOC Configuration block 706 of FIG. 7A). The VHBA configuration data is passed via a space allocated within one of the register banks.

Data written to scratchpad registers is valid only for the duration of a transaction. In response to a scratchpad register write interrupt, the VNIC driver reads values supplied via the scratchpad registers and stores them. The VNIC driver maintains (all or portions thereof, according to embodiment) configuration data for the VHBA and the iSCSI initiator in memory addressable by processes executing on the PMM partition, enabling later querying by the iSCSI initiator. For example, the iSCSI initiator queries the configuration data upon startup.

The scratchpad protocol may be used for other communications between various management SW executing on an SCM and OS and Driver processes executed on pluggable modules having VIOCs. For example, storage gateway target SW (executing on an FCM) may receive configuration information via the scratchpad protocol. The storage gateway target SW may provide selected target performance and statistics information via the scratchpad protocol, according to various embodiments.

CONCLUSION

Although the foregoing embodiments have been described in some detail for purposes of clarity of understanding, the invention is not limited to the details provided. There are many alternative ways of implementing the invention. The disclosed embodiments are illustrative and not restrictive.

It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. Also, unless specifically stated to the contrary, the value ranges specified, the maximum and minimum values used, or other particular specifications (such as the quantity and type of processors and memory on the modules, the channel bandwidths, the degree of redundancy for any particular component or module, the particular version of an interface standard or component, the number of entries in a buffer), are merely those of the illustrative embodiments, can be expected to track improvements and changes in implementation technology, and should not be construed as limitations.

Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in module and chassis partitioning; different module and chassis form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:

1. A method comprising:
   programmatically determining a plurality of host bus adapter channels required to meet a list of storage interface requirements, including computing how many host bus adapter channels are needed and associated bandwidths;
   programmatically computing a respective plurality of operational parameters for each of the host bus adapter channels;
   programmatically identifying a plurality of storage interfaces to implement the determined number of host bus adapter channels;
   programmatically computing mode information to configure the storage interfaces according to the respective pluralities of operational parameters;
   configuring and operating the storage interfaces in accordance with the respective pluralities of operational parameters;
   and wherein the storage interfaces are accessible by a plurality of processes executing on a plurality of physical partitions of a physically partitionable symmetric multiprocessor, each physical partition comprising links between processors of the physically partitionable symmetric multiprocessor, the links being programmatically configurable to selectively isolate subsets of the processors with respect to respective shared memory coherency and cache memory coherency transactions.

2. The method of claim 1, wherein the list of storage requirements comprises at least one of a security requirement and a quality of service requirement.

3. The method of claim 1, wherein the operational parameters comprise at least one of a security parameter and a quality of service parameter.

4. The method of claim 3, wherein the security parameter comprises at least one of a Virtual Local Area Network (VLAN) identifier, an internal zone specification; and a storage volume access parameter.

5. The method of claim 4, wherein the internal zone specification identifies at least one of the storage interfaces and at least one storage device coupled to the identified storage interface.

6. The method of claim 4, wherein the storage volume access parameter identifies a group of Logical Unit Numbers (LUNs).

7. The method of claim 1, wherein the storage interfaces are enabled for coupling to a storage device, the storage device being at least one of a disk drive, a tape drive, a tape library, a storage array, a storage switch, a storage director, a storage router, a storage network, and a storage area network (SAN).

8. A method comprising:
   manually determining a plurality of host bus adapter channels required to meet a list of storage interface requirements, including computing how many host bus adapter channels are needed and associated bandwidths;
   manually computing a respective plurality of operational parameters for each of the host bus adapter channels;
   programmatically identifying a plurality of storage interfaces to implement the determined number of host bus adapter channels;
   programmatically computing mode information to configure the storage interfaces according to the respective pluralities of operational parameters;
   configuring and operating the storage interfaces in accordance with the respective pluralities of operational parameters;
   and wherein the storage interfaces are accessible by a plurality of processes executing on a plurality of physical partitions of a physically partitionable symmetric multiprocessor, each physical partition comprising links between processors of the physically partitionable symmetric multiprocessor, the links being programmatically configurable to selectively isolate subsets of the processors with respect to respective shared memory coherency and cache memory coherency transactions.

9. The method of claim 8, wherein the list of storage requirements comprises at least one of a security requirement and a quality of service requirement.

10. The method of claim 8, wherein the operational parameters comprise at least one of a security parameter and a quality of service parameter.

11. The method of claim 10, wherein the security parameter comprises at least one of a Virtual Local Area Network (VLAN) identifier, an internal zone specification; and a storage volume access parameter.

12. The method of claim 11, wherein the internal zone specification identifies at least one of the storage interfaces and at least one storage device coupled to the identified storage interface.

13. The method of claim 11, wherein the storage volume access parameter identifies a group of Logical Unit Numbers (LUNs).

14. A method comprising:
   manually determining a plurality of host bus adapter channels required to meet a list of storage interface requirements, including computing how many host bus adapter channels are needed and associated bandwidths;
   manually computing a respective plurality of operational parameters for each of the host bus adapter channels;
   manually identifying a plurality of storage interfaces to implement the determined number of host bus adapter channels;
   programmatically computing mode information to configure the storage interfaces according to the respective pluralities of operational parameters;
   configuring and operating the storage interfaces in accordance with the respective pluralities of operational parameters;
   and wherein the storage interfaces are accessible by a plurality of processes executing on a plurality of physical partitions of a physically partitionable symmetric multiprocessor, each physical partition comprising links between processors of the physically partitionable symmetric multiprocessor, the links being programmatically configurable to selectively isolate subsets of the processors with respect to respective shared memory coherency and cache memory coherency transactions.

15. The method of claim 14, wherein the list of storage requirements comprises at least one of a security requirement and a quality of service requirement.

16. The method of claim 14, wherein the operational parameters comprise at least one of a security parameter and a quality of service parameter.

17. The method of claim 16, wherein the security parameter comprises at least one of a Virtual Local Area Network (VLAN) identifier, an internal zone specification; and a storage volume access parameter.

18. The method of claim 17, wherein the internal zone specification identifies at least one of the storage interfaces and at least one storage device coupled to the identified storage interface.

19. The method of claim 17, wherein the storage volume access parameter identifies a group of Logical Unit Numbers (LUNS).

20. The method of claim 14, wherein the storage interfaces are enabled for coupling to a storage device, the storage device being at least one of a disk drive, a tape drive, a tape library, a storage array, a storage switch, a storage director, a storage router, a storage network, and a storage area network (SAN).

* * * * *